(12) United States Patent
Thakur et al.

(10) Patent No.: US 12,556,216 B2
(45) Date of Patent: Feb. 17, 2026

(54) DISTRIBUTED RADIOHEAD SYSTEM

(71) Applicant: Intel Corporation, Santa Clara, CA (US)

(72) Inventors: Jayprakash Thakur, Bangalore (IN); Ofir Degani, Haifa (IL); Ronen Kronfeld, Shoham (IL); Ehud Reshef, Qiryat Tivon (IL); Seong-Youp J. Suh, Portland, OR (US); Tal Shoshana, Ein Ayala (IL); Eytan Mann, Modiin (IL); Maruti Tamrakar, Durg (IN); Ashoke Ravi, Portland, OR (US); Jose Rodrigo Camacho Perez, Guadalajara (MX); Timo Sakari Huusari, Hillsboro, OR (US); Eli Borokhovich, Modiin-Maccabim-Reut (IL); Amir Rubin, Kiryat Ono (IL); Ofer Benjamin, Petach-Tikva (IL); Tae Young Yang, Portland, OR (US); Harry Skinner, Beaverton, OR (US); Kwan Ho Lee, San Jose, CA (US); Jaejin Lee, Beaverton, OR (US); Dong-Ho Han, Beaverton, OR (US); Shahar Gross, Nes Ziona (IL); Eran Segev, Tel Aviv (IL); Telesphor Kamgaing, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 328 days.

(21) Appl. No.: 18/029,932

(22) PCT Filed: Nov. 3, 2020

(86) PCT No.: PCT/US2020/058622
§ 371 (c)(1),
(2) Date: Apr. 3, 2023

(87) PCT Pub. No.: WO2022/098342
PCT Pub. Date: May 12, 2022

(65) Prior Publication Data
US 2023/0361802 A1 Nov. 9, 2023

(51) Int. Cl.
*H04B 1/40* (2015.01)
(52) U.S. Cl.
CPC .................................. *H04B 1/40* (2013.01)
(58) Field of Classification Search
CPC .......... H04B 1/40; H04B 1/18; H04B 1/1009; H04B 1/44
See application file for complete search history.

(56) References Cited

U.S. PATENT DOCUMENTS 7,236,065 B2 6/2007 Hyvoenen
7,880,677 B2 2/2011 Rofougaran et al.
(Continued)

FOREIGN PATENT DOCUMENTS

CN 210897279 U 6/2020
WO 2012087287 A1 6/2012

OTHER PUBLICATIONS

International Search Report for the corresponding International Application No. PCT/US2020/058622, dated Jul. 23, 2021, 5 pages (for informational purposes only).
(Continued)

*Primary Examiner* — Ayodeji O Ayotunde
(74) *Attorney, Agent, or Firm* — VIERING, JENTSCHURA & PARTNER mbB

(57) ABSTRACT

In various aspects, a radio frequency circuit is provided. The radio frequency circuit may include a substrate that may include a radio frequency front-end to antenna (RF FE-to-Ant) connector. The RF FE-to-Ant connector may include a conductor track structure and a substrate connection structure coupled to the conductor track structure. The substrate may include radio frequency front-end circuitry monolithically integrated in the substrate. The substrate connection structure may include at least one of a solderable structure, a weldable structure, or an adherable structure. The substrate connection structure may be configured to form at least one radio frequency signal interface with an antenna circuit connection structure of a substrate-external antenna circuit. The substrate may include an edge region. The substrate connection structure may be disposed in the edge region.

20 Claims, 51 Drawing Sheets

(56) References Cited

U.S. PATENT DOCUMENTS

| | | |
|---|---|---|
| 8,421,686 B2 | 4/2013 | Soler Castany et al. |
| 10,056,922 B1 | 8/2018 | Tsvelykh et al. |
| 2012/0249380 A1* | 10/2012 | Soler Castany ......... H01Q 9/30 343/702 |
| 2013/0313692 A1* | 11/2013 | Soler Castany ......... H01Q 1/38 257/659 |
| 2019/0305402 A1 | 10/2019 | Dalmia et al. |
| 2020/0036086 A1 | 1/2020 | Yazaki et al. |
| 2020/0253040 A1 | 8/2020 | Dalmia et al. |

OTHER PUBLICATIONS

Translation of Taiwan office action issued for corresponding Taiwan patent application No. 110133412, dated Dec. 23, 2024, 2 pages (for informational purposes only).

Supplementary European Search Report issued for the corresponding EP patent application No. EP 20 960 954.4 dated Jun. 6, 2024, 1 page (For informational purposes only).

* cited by examiner

Exploded View

DISTRIBUTED RADIOHEAD SYSTEM

This is a national phase of PCT Application PCT/US2020/058622 filed on Nov. 3, 2020, the entire contents of which are incorporated by reference.

TECHNICAL FIELD

The present disclosure relates to radiohead and antenna structures for wireless communications.

BACKGROUND

Various aspects of this disclosure generally may relate to the field of wireless communications.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various aspects of the disclosure are described with reference to the following drawings, in which.

DESCRIPTION

The following detailed description refers to the accompanying drawings that show, by way of illustration, exemplary details and aspects in which aspects of the present disclosure may be practiced.

As demand for wireless data traffic increases, wireless communication devices may require more wireless transceivers (e.g., multiple input multiple output (MIMO) technology, distributed input/distributed output (DIDO) networks, and/or multi-radio systems) to support wider bandwidths (BW), e.g., a BW of 320 MHz or more, and/or higher-order modulations schemes, e.g., a modulation schemes of up to 4 k Quadrature Amplitude Modulation (QAM), or more. As demand for more efficient wireless communication devices (e.g., smaller size, less power consumption, higher performance, less material, lower costs), wireless communication devices may require greater integration while avoiding interference caused by the greater integration.

However, conventional implementations of the radiohead and antenna and conventional cable connectivity schemes offer limited integration abilities due to cable losses, interference, thermal issues, and power consumption limitations. For example, in current wireless communication devices, such as those devices compliant with WiFi, Bluetooth (BT), GSM, CDMA, UMTS, LTE, or 5G communication standards, the radiohead is separate and remote from the antenna.

Figure 1A:
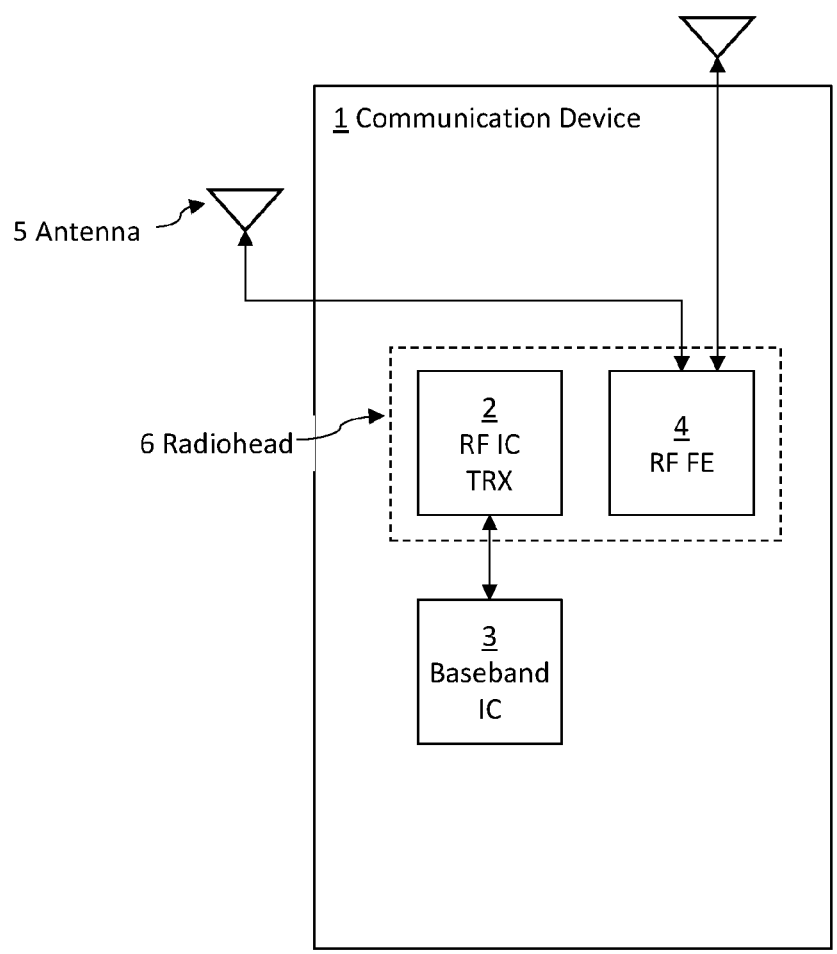
FIG. 1A exemplarily shows a block diagram of a wireless communication device including a radiohead system.

FIG. 1A shows a block diagram of a wireless communication device including a conventional radiohead system. Referring to FIG. 1A, the wireless communication device 1 includes a baseband integrated circuit 3 for baseband signal processing, a centralized radiohead 6 for radio frequency signal processing, and one or more discrete antennas 5. The radiohead 6 and antennas 5 are separate modules that are connected using a specialized radio frequency (RF) cable, e.g., coax cable, as a feed line to communicate RF electrical signals between the radiohead and the antennas. Typically, as high-performance mini coax cables are costly components, only a single mini coax cable to each antenna is used due to cost and space constraints. Moreover, the RF electrical signals still suffer impedance mismatches and accumulated insertion losses even on a high performance specialized RF cable depending on the cable length.

In general, a radiohead may be considered as the radio equipment or RF circuitry for providing an air interface for wireless communication. A radiohead includes a wireless transceiver for transmitting and receiving RF signals. For transmission, the radiohead may include a converter to convert a digital signal to an RF analog signal and an amplifier to amplify the RF analog signal to a desired power level for radiating the RF signal via an antenna. For reception, the radiohead may include an amplifier to amplify an RF analog signal received from an antenna and a converter to convert the RF analog signal to a digital signal. A radiohead may be considered as an (integrated) RF transceiver combined with a front-end module (FEM) part that is related to a specific antenna, and includes the least amount of signal processing. A FEM, in general, can include circuitry between a transceiver's (e.g., receiver's) antenna input up to and including the mixer stage. In other words, the FEM may be provided in the Tx path as well as in the Rx path or in both the Tx path and the Rx path.

For example, the radiohead 6 may include an RF integrated circuit (IC) 2 including one or more RF transceivers (TRX) and a common RF front end (FE) 4. The RF IC 2 may receive one or more data and control signals and operate to receive a communication signal from the baseband IC and generate an RF electrical signal from the communication signal for radio transmission from the device 1 or receive an RF electrical signal and generate a communication signal from the RF electrical signal for providing to the baseband IC. The RF FE 4 may convert an RF electrical signal into a format for transmission via the antenna(s) 5 and/or convert a signal received from the antenna(s) 5 into an RF electrical signal for the RF IC.

As the number of antenna elements in a communication device increases, a radiohead may include more co-located RF transceivers. However, the use of co-located RF transceivers and RF transceiver chains based on a conventional centralized radiohead and antennas may present technical inefficiencies, disadvantages and/or technical problems and pose limitations on overall system performance and capabilities that are difficult to overcome.

For example, co-located RF transceivers can cause cross interference problems which may introduce design or physical constraints limiting integration. These size or physical constraints also reduce scalability potential, e.g., increase in transceiver chain footprint which limits the overall radiohead performance and increases cost.

For another example, using a conventional RF coax cable to connect antennas to a radiohead may result in a cable loss, e.g., in excess of 2 dB at 60 cm. The cable size and cable loss may limit system performance and/or antenna placement, and/or may increase system cost. Moreover, the cable loss may limit smart antenna applications, for example, Voltage Standing Wave Ratio (VSWR) correction and/or the like. Accordingly, various technical limitations including cross interference, power consumption limitations, thermal limitations, fanout, and/or RF circuit complexity need to be overcome to efficiently to realize the integration of co-located RF transceiver chains.

Further, as the radiohead and antennas are provided in different packages and may be positioned or disposed rather far away from each other, packaging and connection parasitics may have deleterious effects on the electrical designs of integrated circuits for radio frequencies. As a result, additional processing is needed to mitigate the signal degradations, thereby further increasing costs.

Further, some combinations of radioheads and antennas may be incompatible or difficult to combine. For example, RF components and antenna components may interfere with each other.

Accordingly, advanced digital Complementary Metal-Oxide-Semiconductor (CMOS) processes or different circuit layout design and arrangement may be needed to facilitate increasing numbers of RF transceiver chains.

The present disclosure describes various aspects relating to a low-cost, low-power, compact RF transceiver arrangement with increased silicon integration while avoiding or overcoming the various technical limitations associated with integrating co-located transceiver chains and integrating co-locating RF circuitry and antenna circuitry. For example, in some examples, a System-in-Packages (SIP) approach is used where two or more different dies are placed into a common package either side-by-side or stacked on top of each other. By combining dies of different technology and functionalities (e.g., RF, analog, digital) into one package, SIP provides substantial performance benefits, including, eliminating or reducing packaging parasitics. For another example, the present disclosure describes various aspects facilitating the placement of RF components co-located with or near an antenna while still providing optimized system performance.

The present disclosure relates to a radiohead for a distributed radiohead (or radio) system (DRS), where at least a portion of the radiohead is co-located with an antenna. Ideally, a radiohead unit including an RF transceiver and RF FE module will be located or placed with the antenna/module or in close proximity to the antenna. For example, the radiohead RF circuitry and antenna circuitry may be coupled to each other within a common enclosure. For another example, the antenna may be integrated with the silicon into a compact radiohead package. That is, the radiohead RF circuitry and antenna circuitry may be formed on separate silicon dies/boards that are positioned or disposed near each other. The radiohead RF circuitry and antenna circuitry may be coupled to each other within a common module or system package. The present disclosure describes various ways of integrating the antenna and at least a portion of the radiohead. Various aspects of the present disclosure describe interconnection structures and partitioning arrangements to simplify manufacturing, reduce manufacturing costs, improve transmission and reception quality, and/or improve energy efficiency. For example, each of these improvements derived from co-locating the RF circuitry and the antenna circuitry can incrementally reduce manufacturing cost by $0.5-$1.5/improvement (depending on SISO vs MIMO etc)(eliminating lengthy specialized RF cables), improve key performance indicators (KPIs), and enable new use cases and experiences in wireless communication that are impossible to realize without a distributed radiohead system. The improvements to KPIs include eliminating insertion loss of 2-4 dB to providing higher power/range, better reception sensitivity, and/or reduced current for improved battery life.

In a distributed radiohead arrangement according to various aspects of the present disclosure, the transceiver chain may be divided into a time-domain processing physical (TD PHY) portion and a frequency-domain processing physical (FD PHY) portion. The TD PHY portion is co-located with one or more antennas. The TD PHY portion and the one or more antennas may be integrated. The TD PHY portion and the FD PHY portion may be separate and remotely located. The TD PHY portion and the FD PHY portion are connected to each other through a digital interface, e.g., a Serial Time-Encoded Protocol (STEP) interface (developed by Intel Corporation), to communicate digitized baseband RF signals. The TD-FD interface may be an optical or electrical signal interface.

The TD PHY portion may contain the radiohead RF circuitry, the analog-to-digital/digital-to-analog (AD/DA) converters, the up/down converters, and line conditioning or impedance matching circuitry. The TD PHY portion includes an optical/electrical interface circuitry. The TD PHY portion may also have circuitry for operation and management processing capabilities.

The TD PHY portion may include a transmitter chain that is configured to convert a digital baseband RF signal to an RF electrical signal and amplify the RF electrical signal to the desired power level for radiation. The TD PHY portion may include a receiver chain that is configured to receive the desired band of an induced RF electrical signal from an antenna and amplify the RF electrical signal and convert the RF electrical signal into a digital baseband RF signal.

Figure 54:
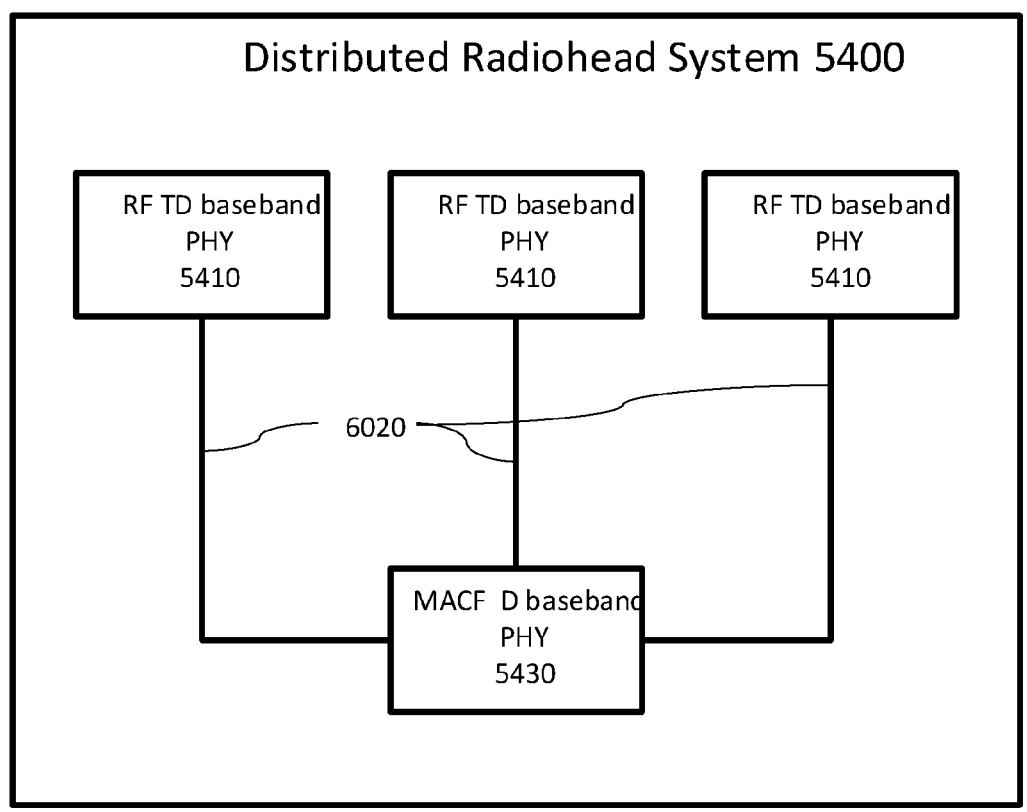
FIG. 54 exemplarily shows a distributed radiohead system in accordance with various aspects of the present disclosure.

FIG. 54 shows a distributed radiohead system (or distributed radio system) 5400 for wireless communication in accordance with various aspects of the present disclosure. Referring to FIG. 54, the distributed radiohead system 5400 may include two main aspects or functionalities, represented as RF TD baseband PHY 5410 and media access control (MAC) FD baseband PHY 5430.

The first main functional aspect of the distributed radiohead system 6000 is provided by the RF TD baseband PHY 5410. The RF TD baseband PHY 5410 functionalities include transmitting, receiving, filtering, and amplifying RF signals. Each RF TD baseband PHY 5410 may be integrated, co-located, or in the proximity of a respective antenna or antenna structure. The RF TD baseband PHY 5410 functionalities are performed in the time domain. The RF TD baseband PHY 5410 may further include frequency locking means to accurately or precisely generate analog signals at a desired frequency. In addition, the RF TD baseband PHY 5410 can perform analog-to-digital and digital-to-analog conversions and up/down conversions. Up/down conversion includes shifting the frequency of a signal between from baseband (low frequencies) to RF (high frequencies) or vice versa. The RF TD baseband PHY 5410 can transform a digital signal into an analog signal or produce a digital signal from an analog signal. As such, the RF TD baseband PHY 5410 can include a digital interface.

The distributed radiohead system 5400 may include a plurality of RF TD baseband PHYs 5410. Each RF TD baseband PHY 5410 may operate in a same frequency band or different frequency bands. Each RF TD baseband PHY 5410 may be integrated with an antenna and independently arranged. The individual nature of each RF TD baseband PHY 5410 can allow for easy modular certification approval.

The second main functional aspect of the distributed radiohead system 5400 is provided by the MAC FD baseband PHY 5430. The MAC FD baseband PHY 5430 is responsible for controlling the flow of signals to/from the radio transmission medium and provide radio controls to regulate how the physical radio transmission medium is shared. The provided radio controls can include modulation/demodulation and encoding/decoding of signals. The signal processing performed by the MAC FD baseband PHY 5430 can be done in the frequency domain. For example, the MAC FD baseband PHY 5430 can perform frequency domain processing based on a combination of two or more receive signals from two or more RF TD baseband PHYs 5410 as well generate two or more transmit signals for two or more RF TD baseband PHYs 5410.

In the distributed radiohead system 5400, the MAC FD baseband PHY 5430 is physically separated from the RF TD baseband PHYs 5410 or is located on a platform physically separate from the RF TD baseband PHYs 5410. The digital signals between the RF TD baseband PHY 5410 and the MAC FD baseband PHY 5430 can be transmitted by means of a digital interface or digital links 5420. The signals between the RF TD baseband PHY 5410 and the MAC FD baseband PHY 5430 may be in a phase alignment but not necessarily in frequency alignment with each other.

In some devices, there may be multiple TD baseband PHYs and FD baseband PHYs. A respective TD PHY may be connected to a respective FD PHY. Alternatively, one or more TD PHYs may be connected to a respective FD PHY.

In some devices, implementing wireless protocols that are defined in the time domain, the FD PHY portion may implement the require signal processing portions in the time domain.

A distributed radiohead system may be implemented for various wireless communication systems, including WiFi, Bluetooth, and cellular communication systems.

Figure 1B:
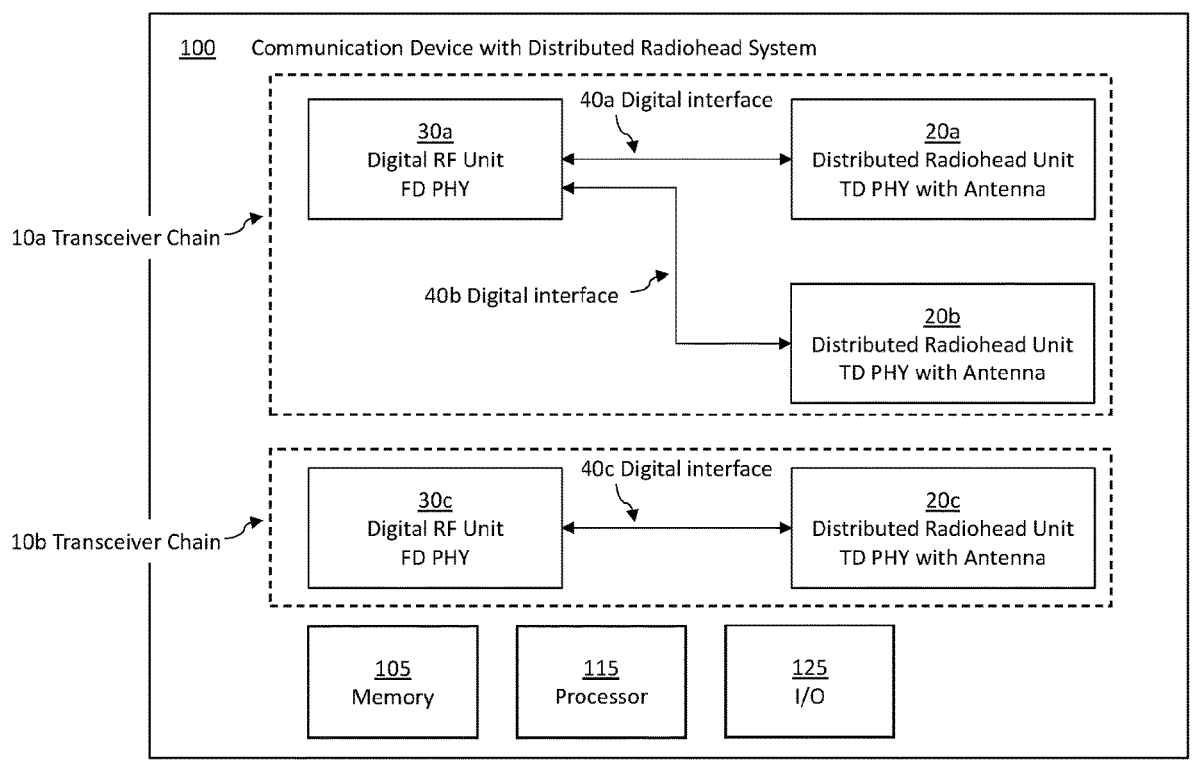
FIG. 1B exemplarily shows a block diagram of a wireless communication device including a distributed radiohead system in accordance with various aspects of the present disclosure.

FIG. 1B illustrates a block diagram of wireless communication device 100 including a distributed radiohead system in accordance with various aspects of the disclosure. Device 100 may be capable of communicating content, data, information and/or signals via a wireless medium or air interface. A wireless medium or air interface may include, for example, a radio channel, a cellular channel, a Global Navigation Satellite System (GNSS) channel, an RF channel, a WiFi channel, an IR channel, and the like.

Referring to FIG. 1B, device 100 may include two transceiver chains 10a, 10b. Each transceiver chain 10 may include a digital RF unit (e.g. a digital RF circuit) 30 coupled to one or more distributed radiohead circuitries 20. For example, a first transceiver chain 10a may include a first digital RF unit (e.g. a first digital RF circuit) 30a including an FD baseband PHY portion of the first transceiver chain 10a and two distributed radiohead circuitries 20a, 20b each including a TD baseband PHY portion of the first transceiver chain 10a. Digital RF unit 30a is coupled to distributed radiohead circuitries 20a, 20b via digital interfaces 40a, 40b, respectively. A second transceiver chain 10b may include a second digital RF unit (e.g. a second digital RF circuit) 30c coupled to distributed radiohead circuitry 20c via digital interface 40c. The digital RF units 30 and the distributed radiohead circuitries 20 may be separately and remotely located. Each distributed radiohead unit (e.g. a distributed radiohead circuitry) 20 is co-located with one or more antennas.

Distributed radiohead circuitry 20 may be a multiband radiohead configured for concurrent and/or simultaneous operation(s) over one or a plurality of wireless communication frequency bands. For example, distributed radiohead circuitry 20 may be configured to communicate over a first frequency band, e.g., the 2.4 GHZ band, and to communicate over a second frequency band, e.g., the 5 GHZ and/or 6-7 GHz bands. In various aspects, distributed radiohead circuitry 20 may be configured to communicate over a mmWave frequency band and/or sub-60 GHz frequency band as a first frequency band and/or a second frequency band, respectively.

The antenna co-located with the distributed radiohead circuitry 20 may include any type of antennas or phased array antennas suitable for transmitting and/or receiving wireless communication signals, blocks, frames, transmission streams, packets, messages and/or data. For example, the antenna may include any suitable configuration, structure and/or arrangement of one or more antenna elements, components, units, assemblies and/or arrays. In some examples, the antenna may implement transmit and receive functionalities using common, separate, or integrated transmit and receive antenna elements.

Distributed radiohead circuitry 20 may be a standalone unit in accordance with various aspects of the present disclosure. For example, distributed radiohead circuitry may be pre-certified by a regulatory authority, as a stand-alone unit, even before being included or implemented as part of device 100. The distributed radiohead circuitry 20 may be an RF integrated circuit (IC) chip with an integrated antenna. In some examples, the RF IC may include an RF transceiver chain, a PHY TD processor, and a digital interface. A modular design of the distributed radiohead circuitry provides design flexibility. For example, distributed radiohead circuitries with different characteristics may be easily incorporated or interchanged. For another example, multiple distributed radiohead circuitries 20 may be easily disposed at different positions of a device 100 to provide improved antenna coverage.

Referring to FIG. 1B, digital RF units 30a, 30c may be configured to individually process each digital RF baseband signal. Alternatively, digital RF units 30a, 30c may be configured to collectively process the digital RF baseband signals over the plurality of distributed radiohead circuitries 20a, 20b, 20c.

Digital RF unit 30 may include a message processor configured to generate, process and/or access one or more messages for communication by device 100. In one example, the message processor may include at least one first component configured to generate a message, for example, in the form of a frame, field, information element and/or protocol data unit, for example, a MAC Protocol Data Unit (MPDU); and/or at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message.

In some examples, digital RF unit 30 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic. For example, digital RF unit 30 may be implemented as or included in a System-on-Chip (SoC) package.

As shown in the example of FIG. 1B, the DRS arrangement of communication device 100 can support the connection of multiple radioheads (e.g., distributed radiohead unit 20) to a single modem (e.g., digital RF unit 30) and can include dynamic selection of the active radioheads. The capability may be valuable, for example, to support high order MIMO (Multiple Input Multiple Output) systems, by adding more radioheads as needed and connecting the radioheads to a modem, which can create a distributed radio system rather than prevalent collocated radio system which is less scalable. This capability may also be valuable, for example, for "transformer" and/or "detachable" form-factors, where at a first system configuration it may be better to have antennas at a first location, and at a second system configuration, e.g., different from the first system configuration, it may be better to have the antennas at a different location.

A distributed radiohead system arrangement as shown in FIG. 1B may provide improved KPIs, for example, lower noise figure (NF), e.g., improved RX sensitivity, higher Tx power out, reduced power consumption, e.g., due to close proximity of antenna and RF, which may reduce the loss of the feed line from antenna to active components.

For example, to reduce cross talk and interference, each distributed radiohead circuitry may be formed on a different die. This also results in reduced thermal density. The arrangement also facilitates the integration of "smart" antenna applications due to the proximity of the RF circuit and the antenna.

Two or more devices 100 may be configured to communicate with each other through a wireless medium. For example, device 100 may include, operate as, and/or perform the functionality of one or more WLAN STAs, including access point (AP) STAs or non-AP STAs. A WLAN STA may include a logical entity that is a singly addressable instance of a medium access control (MAC) and physical layer (PHY) interface to the wireless medium (WM). The STA may perform any other additional or alternative functionality. Alternatively, device 100 may include, operate as, and/or perform the functionality of a multi antenna Bluetooth station.

In some examples, device 100 may include a distributed radiohead system configured to operate in a 2.4 GHz frequency band, and/or one or more other wireless communication frequency bands, for example, a 5 GHz frequency band, a 6-7 GHz frequency band, a millimeterWave (mm-Wave) frequency band, e.g., a 60 GHz frequency band, a Sub-1 GHz (S1G) band, and/or any other frequency band.

In some examples, a distributed radiohead circuitry may provide a highly flexible and/or scalable solution. In some examples, device 100 may support using a same distributed radiohead circuitry for or as part of different configurations, e.g. 1×1, 2×2, 3×3 configurations, and the like. A distributed radiohead circuitry may correspond to an antenna element of a group or array of antenna elements configured to facilitate beamforming in accordance with a particular phase and amplitude taper (or other distribution). In some examples, device 100 may support and/or integrate multi-standard distributed radiohead circuitries, which may be implemented to support multiple communication standards, e.g. LTE, Wi-Fi, and the like. In another example, device 100 may support use of a same distributed radiohead circuitry 20 for multiple applications, e.g., ranging from cellphone, laptop, AP, IOT and/or the like. In another example, device 100 may support flexible transceiver and/or antenna location, for example, digital interface 40 may be a cable extending several meters in length with low power/performance impact, which may be applicable to large systems, e.g., industrial robots and the like.

Referring again to FIG. 1B, device 100 may include, for example, one or more processors 115, an input/output interface 125, and memory 105. Device 100 may optionally include other suitable hardware components and/or software components. In some examples, some or all of the components of device 100 may be enclosed in a common housing or packaging, and may be interconnected or operably associated using one or more wired or wireless links. In other aspects, components of device 102 may be distributed among multiple or separate devices.

In some examples, processor(s) 115 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor(s) 115 executes instructions, for example, of an Operating System (OS) of device 100 and/or of one or more suitable applications.

In some examples, memory 105 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable storage units including, for example, a hard disk drive, a floppy disk drive, a Solid State Drive (SSD), a Compact Disk (CD) drive, a CD-ROM drive, a DVD drive, or other suitable removable or non-removable storage units. Memory 105, for example, may store instructions for operating device 100 and/or data processed by device 100.

Figure 2:
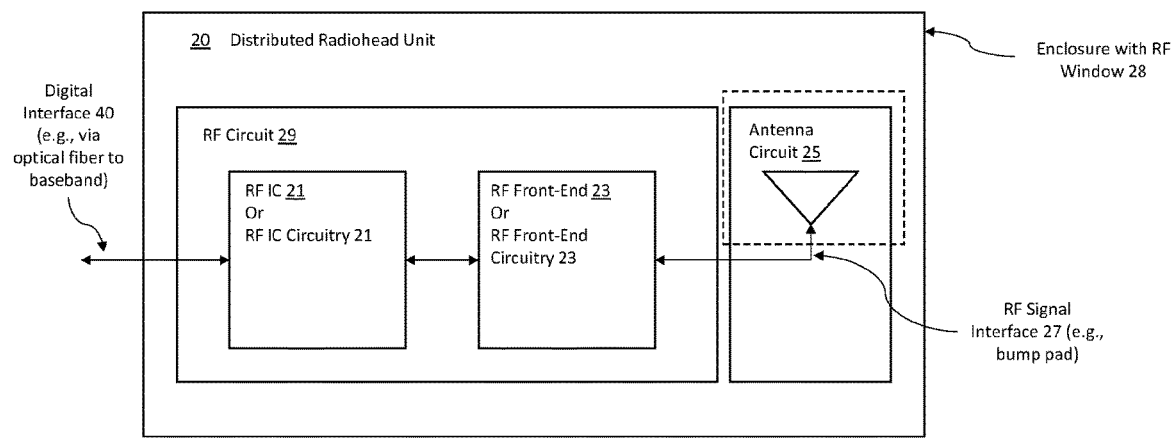
FIG. 2 exemplarily shows a block diagram of a distributed radiohead circuitry of a distributed radiohead system in accordance with various aspects of the present disclosure.

FIG. 2 illustrates a block diagram of a distributed radiohead circuitry 20 in accordance with various aspects of the disclosure. The distributed radiohead circuitry 20 includes an RF circuit 29 and antenna circuit 25 that are co-located. By co-locating the RF circuit 29 and antenna circuit 25, a specialized RF cable is not needed. Referring to FIG. 2, the RF circuit 29 and antenna circuit 25 may be connected via an RF electrical signal interface 27 at a silicon die or circuit board level. The various RF electrical interfaces 27 that will be described herein will provide reduced manufacturing costs, improved communication performance, and compact design.

Further, the RF electrical signal interfaces 27 as described herein also facilities a modular antenna circuit design. For example, the RF circuit 29 may be formed on one silicon die or circuit board and the antenna circuit 25 may be formed on another silicon die or circuit board. As the RF electrical interface 27 may be predefined, a custom antenna circuit or an antenna circuit from another vendor may be easily incorporated or interchanged into the distributed radiohead circuitry 20.

In some examples, the RF circuit 29 and antenna circuit 25 may be further integrated into a single enclosure or package. This may further provide improved performance by reducing interference between the RF circuit 29 and the antenna circuit 25.

Referring to FIG. 2, RF circuit 29 may include an RF integrated circuit (IC) or RF IC circuitry 21 and a RF front-end (FE) or RF FE circuitry 23. RF IC circuitry 21 may include an RF transceiver having one or more RF transmission chains. The RF FE circuitry 23 may include band pass filters, amplifiers, matching network.

In some examples, the RF IC 21 may be implemented on a separate die as a System-in-a-Package (SIP) mounted on a radiohead PCB (not shown) and RF FE circuitry 23 and circuitry for a digital interface 40 may also be mounted on the same radiohead PCB module. An antenna circuit 25 may be provided on a separate antenna PCB (not shown). The radiohead PCB and antenna PCB may each include circuitry for the RF electrical interface 27 for coupling to each other.

The example distributed radiohead circuitry 20 is provided for ease of explanation, and may include additional, less, or alternate components as those shown in FIG. 2.

Figure 3:
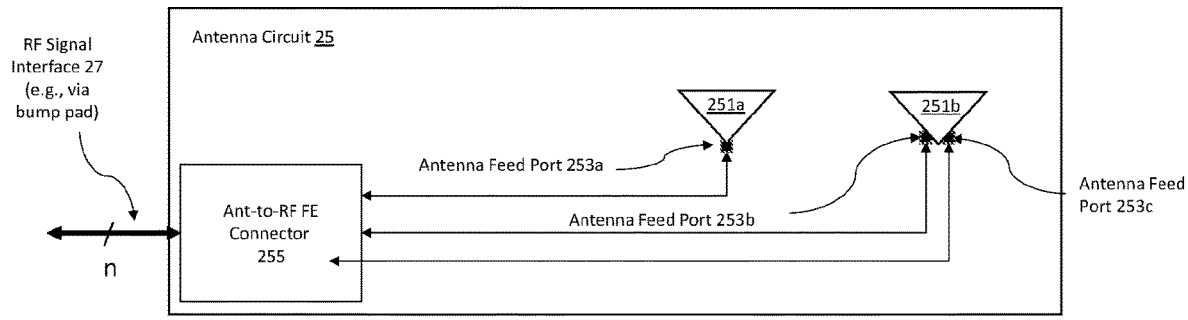
FIG. 3 exemplarily shows a block diagram of an antenna circuit of a distributed radiohead circuitry in accordance with various aspects of the present disclosure.

FIG. 3 illustrates a block diagram of antenna circuit 25 in accordance with various aspects of the present disclosure. An antenna circuit 25 may include one or more antennas 251. An antenna may include one or more feed ports 253. For example, referring to FIG. 3, antenna circuit 25 may include two antennas 251a and 251b, where a first antenna 251a includes a single antenna feed port 253a and a second antenna includes two antenna feed ports 253b and 253c. Each of the antenna feed ports may be associated with a different frequency band. Each of the antenna feed ports may be electrically connected to an antenna-to-RF FE connector 255 for the RF signal interface 27. The RF signal interface 27 may provide a plurality of separate electrical signal lines, each corresponding to a respective one of the antenna feed ports allowing signals of different frequency bands to be communicated to RF circuit 25 without using combiners and splitters typical of conventional radioheads which have only one coaxial cable connection to the antenna. The connector 255 also provides design flexibility by facilitating connections to various antenna designs (i.e., modular antenna circuits).

Figure 4:
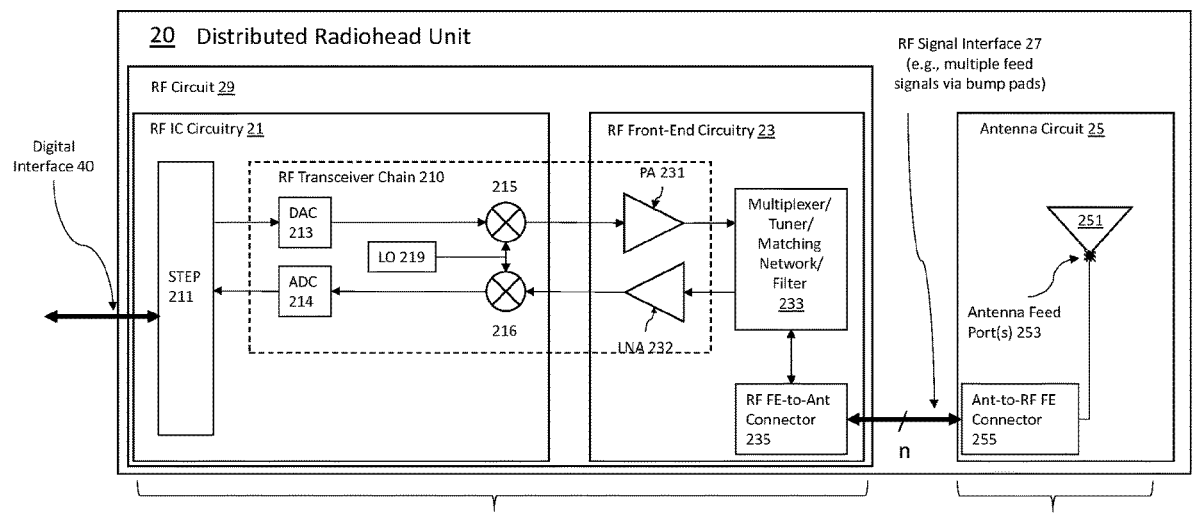
FIG. 4 exemplarily shows a more detailed block diagram of the distributed radiohead circuitry of FIG. 2 in accordance with various aspects of the present disclosure.

FIG. 4 illustrates a more detailed block diagram of the distributed radiohead circuitry of FIG. 2 in accordance with various aspects of the present disclosure. Referring to FIG. 4, RF circuit 29 may include one or more RF transceiver chains 210 configured to perform time-domain processing of the RF electrical signals. Each RF transceiver chain 210 may include a transmit chain and a receive chain. A transmit chain may be configured to convert a digitized baseband signal for RF transmission. A transmit chain may include a digital-to-analog converter (DAC) 213, a mixer 215 for up-converting, and a power amplifier (PA) 231, and a passive element circuit 233 such as a multiplexer, tuner, matching network, and/or filter. A receive chain may be configured to convert received RF energy into a digitized baseband signal. A receive chain may include a passive element circuit 233, a low noise amplifier (LNA) 232, a mixer 216 for down-converting, an analog-to-digital converter (ADC) 214. The RF transceiver chain 210 may include a local oscillator (LO) 219 configured to distribute timing signals to one or more radio chains, e.g., a transmit chain and/or a receive chain. This example is not limiting. The RF circuit 29 may include more or less components. For example, the RF circuit 29 may also include a low pass filter (LPF) on the transmit chain and adjusted gain control (AGC) on the receive chain. The RF circuit 29 may also include a STEP interface 211. The STEP interface 211 is a digital interface configured to communicate digital RF baseband signal to a digital RF unit configured to perform frequency-domain processing of the digital RF baseband signal. A physical link of the STEP interface 211 may be electrical or optical.

An RF circuit 29 may be implemented on a single silicon die or circuit board or on a plurality of silicon dies or circuit boards. Referring again to FIG. 4, an RF circuit 29 may be provided on two silicon dies or circuit boards, where a portion of RF transceiver chain 210 is provided in RF IC circuitry 21 and another portion of RF transceiver chain 210 is provided in RF FE circuitry 23. For example, RF IC circuitry 21 may include DAC 213, ADC 214, mixers 215, 216, and LO 219 and RF FE circuitry 23 may include amplifiers PA 231, LNA 232. Alternatively, RF transceiver chain 210 may be included only in RF IC circuitry 21.

In the example RF FE circuitry 23, as shown, one or more antenna feed signals (e.g., n>=1) may be communicated from/to RF FE circuitry 23 at connector 235 to/from antenna circuit 25. The RF FE circuitry 23 may include a passive element 233 such as for example multiplexer or matching network for adjusting the line impedance of each respective antenna feed signal transmitted and/or received. The RF FE circuitry 23 may also include PA and LNA amplifiers for each respective antenna feed signal.

Referring again to FIG. 4, RF circuit 23 may receive an RF Rx signal via antenna circuit 25. The RF circuit 29 may include or be a PHY TD processor implemented as or include an RF IC circuit 21 and an RF FE circuit 23. The RF circuit 29 may generate a digital PHY TD Rx signal (e.g., a digital RF baseband signal) based on the RF Rx signal. The STEP interface 211 may communicate the digital PHY TD Rx signal from the distributed radiohead circuitry 20 to digital RF unit 30 via digital interface 40. Reciprocally, the distributed radiohead circuitry 20 may receive a digital PHY TD Tx signal from digital RF unit 30 via digital interface 40. RF circuit 29 may generate an RF Tx signal based on the digital PHY TD Tx signal.

Figure 5:
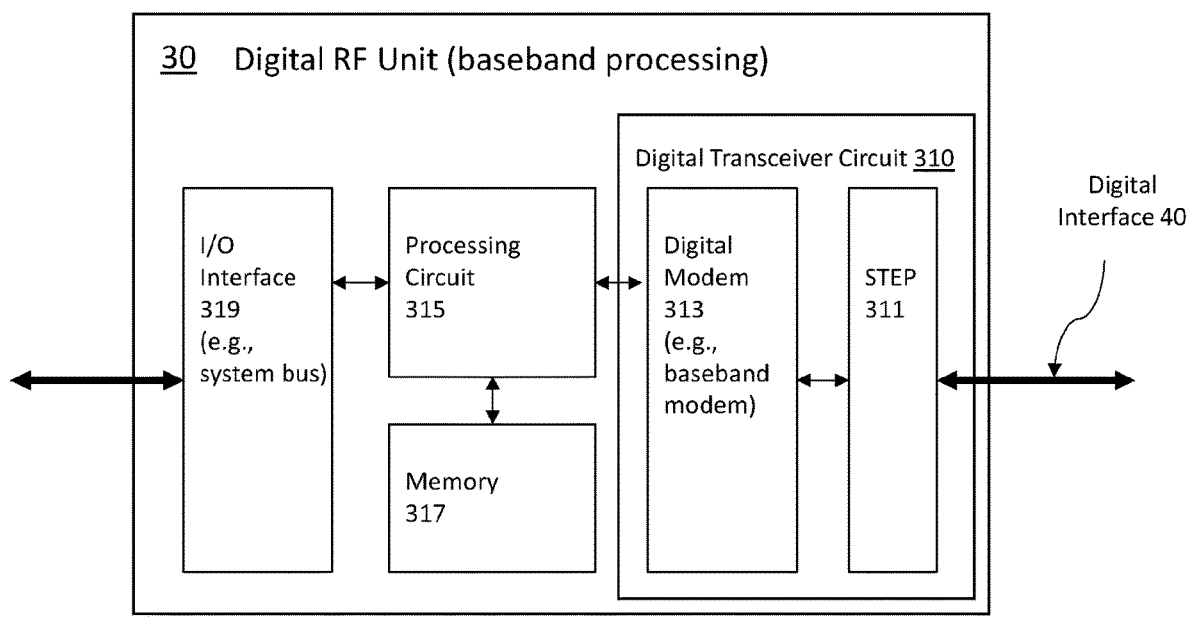
FIG. 5 exemplarily shows a block diagram of a digital RF circuit of a distributed radiohead system in accordance with various aspects of the present disclosure.

FIG. 5 is a block diagram of a digital RF unit (e.g. digital RF circuit) 30 in accordance with various aspects of the present disclosure. As shown in FIG. 5, a digital RF unit 30 may include a digital transceiver circuit 310 including a digital RF baseband signal interface 311 (e.g., a STEP interface) and digital baseband modem 313. A digital RF unit 30 may also include a processing circuit 315 (e.g., one or more processors), a memory 317, and an input/output interface 319 (e.g., a system bus). A digital RF unit 30 may be connected to one or more distributed radiohead circuitries 20 depending on processing capabilities. In accordance with various aspects, a digital RF unit 30 may be coupled to a distributed radiohead circuitry 20 via digital interface 40 or any suitable type of communication link that facilitates digital communications between these components. For example, a digital interface 40 may be implemented using an optical fiber cable. As another example, the digital interface 40 may be implemented using a flexible cable, e.g. a flat cable, (FFC), flexible printed circuit (FPC) cable, etc. Alternatively, the digital interface 40 may be implemented as any suitable type of wired or wireless interconnection, such as cabling, for example, configured to carry bidirectional communication of digital baseband signal data in accordance with one or more suitable communication protocols.

For instance, the aspects as described throughout this section are not limited to the particular distributed radiohead system, units, or layouts as shown in FIG. 1 to FIG. 5. In other words, the device 100 including a distributed radiohead system as shown in FIG. 2 may have various configurations, with different or alternative components being coupled to or associated with individual dies or chips. To provide an illustrative example, the antenna circuit 25 may include additional components depending upon the particular mode of operation and/or design, including, for example, multiple or arrays of radiating elements or multiple feed ports. For another example, the antenna may be a phased array including one or more phase shifters formed in the silicon.

Moreover, in the last few years, the use of wireless mobile devices has increased rapidly, with high demands on wireless connection performance. High performance wireless connections generally require high power transmissions which may be harmful to human bodies. As a result, government regulations require a reduction of output power levels in the presence of a human body.

The regulations for human exposure to electromagnetic radiation have become a limiting factor in the performance of wireless communication. The effect of reduced power levels may lead to an interrupted connection. In order to prevent unnecessary reduction of power levels, an accurate detection of a human body is critical.

The limitations are explored through the use of specific examples where sensors are triggered falsely by non-human objects, hence limiting the output power of the device when that is not required. Capacitive sensing techniques are proposed to distinguish between human and non-human sensor activation.

Further design criteria for the sensor location, sensor performance and software detection algorithms are discussed. The examples include most common triggers, such as mobile device covers, glass and metal. The ability of the sensor to adapt to the environment is a key aspect in accurate sensing when in proximity to human and non-human objects.

As described above, the radio frequency circuit 29 and the antenna circuit 25 may be formed on separate substrates (e.g. a different printed circuit board). Furthermore, the baseband integrated circuit 3 may also be formed on a yet separate substrate. Connecting these circuits may be costly and time consuming. Therefore, various aspects of this disclosure provide various options of standardized interfaces between these circuits to allow a simple and cost efficient coupling of the substrates and their respective circuits.

Figure 6:
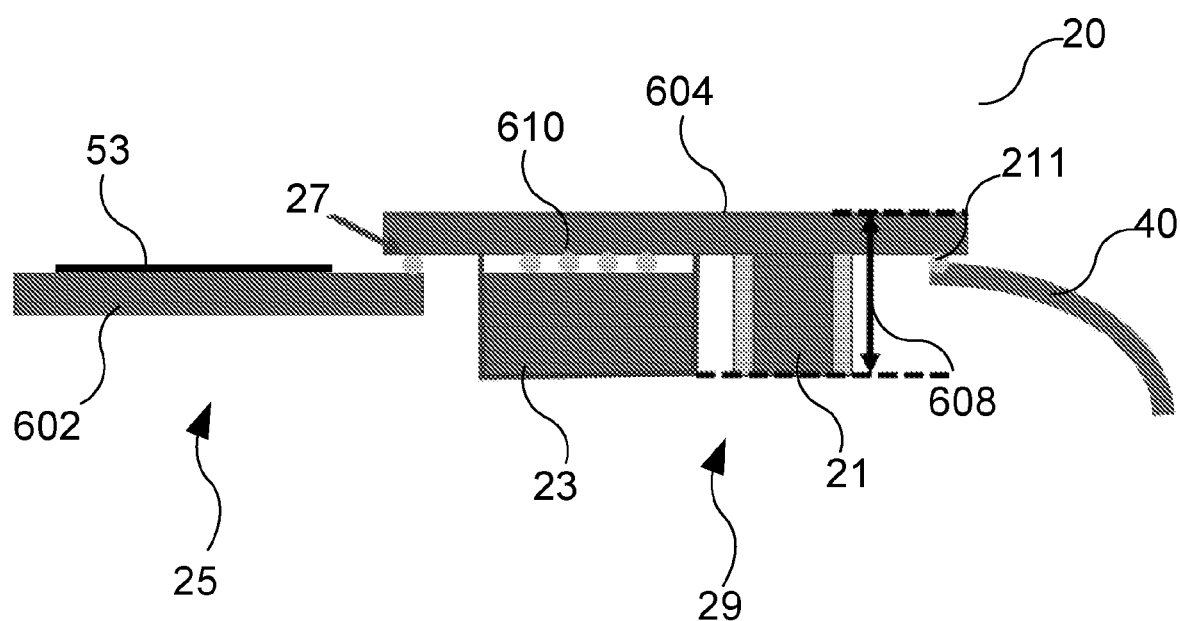
FIG. 6 exemplarily shows a schematic cross-sectional view of a distributed radiohead circuitry in accordance with various aspects of the present disclosure FIG. 7A exemplarily shows a schematic cross-sectional view of an antenna circuit and a radio frequency circuit of a distributed radiohead circuitry before forming a connection in accordance with various aspects of the present disclosure.

FIG. 6 illustrates a schematic cross-sectional view of a distributed radiohead circuitry 20 (as one exemplary implementation of the distributed radiohead unit 20) according to various aspects of this disclosure. The distributed radiohead circuitry 20 may be configured to send or receive radio frequency signals of a mobile terminal, e.g. a smartphone, a laptop or a tablet computer. The mobile terminal may be a mobile terminal of a 4G or 5G or even 6G network. The distributed radiohead circuitry 20 may include an antenna circuit 25 and a radio frequency circuit 29.

The radio frequency circuit 29 and the antenna circuit 25 may be formed on separate substrates 602, 604 (e.g. an antenna substrate 602 and an RF substrate 604) and connected via a soldered structure, a welded structure or a conductive, e.g. electrically conductive adhesive structure forming a radio frequency signal interface 27. Illustratively, the antenna circuit 25 and the radio frequency circuit 29 are connected with each other without using a coaxial cable connection as radio frequency signal interface 27 but instead using a conductive, e.g. electrically conductive substrate connection structure for forming the radio frequency signal interface 27 according to various aspects. In other words, the substrates 602, 604 are free from coaxial cable connectors.

The antenna circuit 25 and the radio frequency circuit 29 are connected to each other by the conductive, e.g. electrically conductive substrate connection structure in such a manner that signals received at an antenna 53 of the antenna circuit 25 are submitted through the conductive, e.g. electrically conductive substrate connection structure of the radio frequency signal interface 27 to the radio frequency circuit 29, e.g. in receive mode (also denoted as Rx mode).

Radio frequency circuit 29 may process radio frequency signals received via the antenna 53 of the antenna circuit 25. Alternatively or in addition, the radio frequency circuit 29 may generate and/or process signals to be sent via the distributed radiohead circuitry 20 and may further transmit through the conductive, e.g. electrically conductive substrate or layer connection structure of the radio frequency signal interface 27 to the antenna circuit 25, which sends the signals via the antenna 53 of the antenna circuit 25 to the outside of the distributed radiohead circuitry 20.

Thus, a distributed radiohead circuitry 20 without a mechanical connector, e.g. without a coaxial connector, may be realized. A coaxial connector increases the height of the distributed radiohead circuitry. Thus, a slim (e.g. thickness 608 (also denoted as height) may be less than 1 mm) distributed radiohead circuitry 20 may be realized.

Alternatively or in addition, the radio frequency circuit 29 and the antenna circuit 25 may be positioned or disposed substantially adjacent to each other with only little overlap. Thus, radio frequency interference at the radio frequency circuit 29 may be minimized.

In various aspects, the conductive, e.g. electrically conductive substrate or layer connection structure of the radio frequency signal interface 27 of the radio frequency circuit 29 may be standardized. Thus, a plurality of different antenna circuits 25 may be connected to the radio frequency circuit 29 and any antenna circuit 25 may be connected to the radio frequency circuit 29 by a vendor. Thus, the distributed radiohead circuitry 20 does not rely on an antenna circuit 25 on board (on the same RF substrate or layer 604) of the radio frequency circuit 29. Thus, in various aspects, different types of antenna 53 may be used other than e.g. GSG. As an example, a radio frequency circuit 29 may be provided to enable multi-port antenna for SMC, single antenna MiMo/diversity, TBDC, etc. using the substrate or layer connection structure. In contrast, in a conventional radio frequency circuit, multiple radio frequency signal interfaces are required that add cost due to additional coaxial cable connectors and coaxial cables.

In various aspects, a conductive, e.g. conductive, e.g. electrically conductive connection of the substrates of the antenna circuit and of the radio frequency circuit may be realized by an adhesive connection, a solder connection or a welding connection. The connection may be releasable, e.g. reversible, e.g. in case of a pressure sensitive adhesive. However, the connection may also be non-releasable, e.g. irreversible. A non-releasable connection may only be separated by destroying the connecting structure.

In the connected state, the substrate or layer connection structure of the antenna circuit may be connected to the substrate or layer connection structure of the radio frequency circuit by atomic and/or molecular forces.

In various aspects, a conductive, e.g. electrically conductive adhesive connection may be realized by an anisotropic conductive film (ACF) bonding. In various aspects, a conductive, e.g. electrically conductive welding connection may be realized by an ultrasonic (US) bonding.

The radio frequency (RF) circuit 29 may include the RF substrate or layer 604. A total thickness 608 (also denoted as height) of the radio frequency circuit 29 may be less than about 2 mm, e.g. less than about 1 mm, e.g. in a range from about 0.1 mm to about 1 mm.

The RF substrate or layer 604 may include a center region and at least one edge region, e.g. a first edge region and a second edge region. A radio frequency front-end circuitry 23 and/or a radio frequency integrated circuit circuitry 21 may be arranged in the center region. The edge region may be arranged on the same side of the RF substrate or layer 604 as the center region or on an opposite side of the RF substrate or layer 604. The edge region may be adjacent to the center region and may at least partially surround the center region. The edge region may be the area at a most distal end of the RF substrate or layer 604.

The RF substrate or layer 604 may be a semiconductor substrate or layer, including compound semiconductor substrate or layer. As example, the RF substrate or layer 604 may include silicon, e.g. may be a silicon RF substrate or layer 604. As an alternative, the RF substrate or layer 604 may include gallium arsenide or gallium nitride or silicon germanium, e.g. may be a gallium arsenide RF substrate or layer 604 or a gallium nitride RF substrate or layer 604 or a silicon germanium RF substrate or layer 604. Any other suitable semiconductor material may be used in various implementations.

The RF substrate or layer 604 may include a radio frequency front-end (RF FE) circuitry 23. The radio frequency front-end (RF FE) circuitry 23 may be monolithically integrated in the RF substrate or layer 604. As an example, conductor tracks may be formed in the RF substrate or layer 604, e.g. by doping the substrate material with doping atoms. Thus, the RF FE circuitry 23 may be formed at least partially in the substrate or layer.

The RF substrate or layer 604 may further include the radio frequency integrated circuit (RF IC) circuitry 21. The RF substrate or layer 604 of the radio frequency circuit 29 may include a radio frequency front-end circuitry 23 and/or a radio frequency integrated circuit circuitry 21. Alternatively or in addition, the radio frequency integrated circuit circuitry 21 and/or the radio frequency front-end circuitry 23 may be coupled to the RF substrate or layer 604 via a solder structure 610. The solder structure 610 may include one or more solder balls soldered on one or more solder pads provided on the RF substrate or layer 604 of the radio frequency circuit 29 and soldered on one or more corresponding solder pads provided on the radio frequency integrated circuit circuitry 21 and/or on one or more corresponding solder pads provided on the radio frequency front-end circuitry 23. The one or more solder balls may form one or more ball grid arrays.

The RF substrate or layer 604 may include a radio frequency front-end to antenna (RF FE-to-Ant) connector 235 (see above). The RF FE-to-Ant connector may include a conductor track structure and a substrate or layer connection structure coupled to the conductor track structure. The radio frequency FE-to-Ant connector may form together with a conductive, e.g. electrically conductive substrate or layer connection structure of the Ant-to-radio frequency FE connector at least one radio frequency signal interface 27.

The radio frequency front-end circuitry 23 and/or the radio frequency integrated circuit circuitry 21 may be coupled to the conductor track structure. As an example, the radio frequency front-end circuitry 23 may be directly coupled to the conductor track structure and the radio frequency integrated circuit circuitry 21 may be directly coupled to the radio frequency front-end circuitry 23. Thus, the radio frequency integrated circuit circuitry 21 may be indirectly coupled to the conductor track structure.

The substrate or layer connection structure may be positioned or disposed in the edge region. The substrate or layer connection structure may include at least one of a solderable structure, a weldable structure, or an adherable structure. The substrate or layer connection structure may include one or more solder bumps (also referred to as solder balls) or one or more conductive, e.g. electrically conductive adhesive connections. The substrate or layer connection structure may be configured to form at least one radio frequency signal interface 27 with an antenna circuit 25 connection structure of a substrate-external or layer-external antenna circuit 25. The substrate or layer connection structure may include at least a first port to be coupled to a first port of the antenna circuit 25 to form a first radio frequency signal interface 27 and a second port to be coupled to a second port of the antenna circuit 25 to form a second radio frequency signal interface 27. The conductive, e.g. electrically conductive substrate or layer connection structure may be exposed on the RF substrate or layer 604 at least before the radio frequency signal interface 27 is formed. The conductive, e.g. electrically conductive substrate or layer connection structure may be coupled to the conductor track structure. The conductor track structure may be used to locate the conductive, e.g. electrically conductive substrate or layer connection structure at a distal end of the RF substrate or layer 604 of the radio frequency circuit 29. Thus, a lateral overlap of the antenna circuit 25 and the radio frequency circuit 29 in the distributed radio head circuitry may be reduced or even minimized.

In various aspects, a further substrate or layer connection structure 211 may be formed on the RF substrate or layer 604 and coupled to the radio frequency integrated circuit circuitry 21. The further substrate or layer connection structure 211 may include at least one of a solderable structure, a weldable structure, or an adherable structure. The further substrate or layer connection structure 211 may be configured to form the at least one digital interface 40, e.g. using a cable, e.g. a flat cable. The further substrate or layer connection structure 211 may be of the same type as the substrate or layer connection structure, e.g. the radio frequency signal interface 27 and the digital interface may be formed by solder connections, e.g. including one or more solder balls (e.g. forming one or more ball grid arrays).

As an illustrative example, the RF substrate or layer 604 may include a radio frequency front-end to antenna (RF FE-to-Ant) connector, the RF FE-to-Ant connector may include a conductor track structure and a first substrate or layer connection structure coupled to the conductor track structure. The first substrate or layer connection structure may include at least one of a solderable structure, a weldable structure, or an adherable structure. The first substrate or layer connection structure may be configured to form at least one radio frequency signal interface 27 with an antenna circuit 25 connection structure of a substrate or layer-external antenna circuit 25. The RF substrate or layer 604 may include radio frequency front-end circuitry 23 monolithically integrated in the RF substrate or layer 604 and a second substrate or layer connection structure coupled to the radio frequency front-end circuitry 23 (e.g. via the radio frequency integrated circuit circuitry 21). The second substrate or layer connection structure may include at least one of a solderable structure, a weldable structure, or an adherable structure. The second substrate or layer connection structure may be configured to form at least one radio frequency signal interface 27 with a cable, e.g. a flat cable, of a substrate-external or layer-external digital interface 40.

The RF substrate or layer 604 may include a first edge region and a second edge region. The first and second edge regions may be located at opposite sides of the RF substrate or layer 604. The first substrate or layer connection structure may be positioned or disposed in the first edge region and the second substrate or layer connection structure may be positioned or disposed in the second edge region.

The second substrate or layer connection structure may be of the same type as the first substrate or layer connection structure. As example, the first and/or second substrate or layer connection structures may include a solder bump or conductive, e.g. electrically conductive adhesive.

The first substrate or layer connection structure may include at least a first port to be coupled to a first port of the antenna circuit 25 to form a first radio frequency signal interface 27 and a second port to be coupled to a second port of the antenna circuit 25 to form a second radio frequency signal interface 27.

The antenna circuit 25 may include the antenna substrate or layer 602 that may include an antenna 53 and an antenna to RF front-end (Ant-to-RF FE) connector 255 (see above) coupled to the antenna 53. The antenna circuit 25 may include at least one antenna 53 configured to emit and/or to receive a radio frequency signal. A total thickness 608 (also denoted as height) of the antenna circuit 25 may be the same as of the radio frequency circuit 29, e.g. less than about 1 mm.

The antenna substrate or layer 602 may include an edge region and a center region. The edge region may at least partially surround the center region. The Ant-to-RF FE connector may be positioned or disposed in the edge region and the antenna may be arranged in the center region. The antenna substrate or layer 602 may be a semiconductor substrate or layer. As an example, the substrate or layer may include silicon. As example, the antenna substrate or layer 602 may include silicon, e.g. may be a silicon antenna substrate or layer 602. As an alternative, the antenna substrate or layer 602 may include gallium arsenide or gallium nitride or silicon germanium, e.g. may be a gallium arsenide antenna substrate or layer 602 or a gallium nitride antenna substrate or layer 602 or a silicon germanium antenna substrate or layer 602. Any other suitable semiconductor material may be used in various implementations. Alternatively, the antenna substrate or layer 602 may be a printed circuit board.

The antenna 53 may be monolithically integrated in the antenna substrate or layer 602. Alternatively, the antenna 53 may be formed on the antenna substrate or layer 602. As example, the antenna 53 may be formed by or include a conductor track configured according to a predetermined radio frequency range of electromagnetic radiation, e.g. in the HF-, UHF- or microwave frequency range. The antenna 53 may be selected from the group of: GSG 53, GSGSG 53, a multiport antenna 53, a MIMO antenna 53, a TBDC 53.

The Ant-to-RF FE connector may include a substrate or layer connection structure.

The substrate or layer connection structure may be configured to form at least one radio frequency signal interface 27 with a radio frequency circuit connection structure of a substrate or layer-external radio frequency circuit 29. The substrate or layer connection structure may be at least one of a solderable structure, a weldable structure, or an adherable structure. The substrate or layer connection structure may include one or more solder bumps or one or more conductive, e.g. electrically conductive adhesive connections. The substrate or layer connection structure may be of the same kind as the substrate or layer connection structure as of the substrate-external radio frequency circuit 29. The substrate or layer connection structure may include at least a first port to be coupled to a first port of the radio frequency circuit 29 to form a first radio frequency signal interface 27 and a second port to be coupled to a second port of the radio frequency circuit 29.

Thus, the radio frequency circuit 29 may include a (first) RF substrate or layer 604 that may include a radio frequency front-end to antenna (RF FE-to-Ant) connector. The RF FE-to-Ant connector may include a conductor track structure and a first substrate or layer connection structure coupled to the conductor track structure. The RF substrate or layer 604 may include an edge region and the first substrate or layer connection structure may be positioned or disposed in the edge region. The RF substrate or layer 604 may include radio frequency front-end circuitry 23 monolithically integrated in the RF substrate or layer 604.

The antenna circuit 25 may include a (second) antenna substrate or layer 602 that may include an antenna 53 and an antenna to RF front-end (Ant-to-RF FE) connector coupled to the antenna 53. The Ant-to-RF FE connector may include a second substrate or layer connection structure. The antenna substrate or layer 602 may include an edge region. The second substrate or layer connection structure may be positioned or disposed in the edge region. The first and second substrate or layer connection structures may be at least one of a soldered structure, a welded structure, or an adhesive structure. The first and second substrate or layer connection structures may form at least one radio frequency signal interface 27. A total thickness 608 (also denoted as height) of the distributed radiohead circuitry 20 may be less than about 1 mm. As described above, the antenna and/or RF substrate or layer s 602, 604 may be a semiconductor substrate or layer, respectively. As an example, the antenna and/or RF substrate or layer s 602, 604 may include silicon. In various aspects, the antenna circuit 25 may include an antenna-to-radio frequency front-end connector having a conductive, e.g. electrically conductive substrate or layer connection structure (conductive, e.g. electrically conductive) coupled to the antenna 53, e.g. to a conductor track of the antenna 53. The conductive, e.g. electrically conductive substrate or layer connection structure may form together with a conductive, e.g. electrically conductive substrate or layer connection structure of the radio frequency circuit 29 the radio frequency signal interface 27. The conductive, e.g. electrically conductive substrate or layer connection structure of the antenna circuit 25 may be coupled to the antenna 53 in such a manner that radio frequency signals from the radio frequency circuit 29 to be sent to the outside of the distributed radiohead circuitry 20 via the antenna 53 or radio frequency signals received via the antenna 53 and to be transmitted to the radio frequency circuit 29 are passed through the conductive, e.g. electrically conductive substrate or layer connection structures of the radio frequency signal interface 27.

The conductive, e.g. electrically conductive substrate or layer connection structures of the radio frequency signal interface 27 may be, as example, a solder pad of the antenna circuit 25 that is to be connected with a solder bump attached to the radio frequency circuit 29 and vice versa. In various aspects, the conductive, e.g. electrically conductive substrate or layer connection structure of the radio frequency signal interface 27 may be a direct connection between a solder bump and a bond pad, e.g. without using a wire. The Ant-to-radio frequency FE connector of the antenna circuit 25 may include a first conductive, e.g. electrically conductive material, e.g. a first material composition, and the radio frequency FE-to-Ant connector of the radio frequency circuit 29 may include a second conductive, e.g. electrically conductive material, e.g. a second material composition. The conductive, e.g. electrically conductive substrate or layer connection structure of the radio frequency signal interface 27 may thus be formed by the first and second material compositions. In various aspects, the material of the conductive, e.g. electrically conductive substrate or layer connection structure of the radio frequency signal interface 27 may be a third material composition. The third material composition may be formed due to a mixing of the first and second material compositions.

The antenna circuit 25 may include the antenna substrate or layer 602 having a distal end, e.g. at an edge region of the substrate or layer 25 distanced from the antenna 53. The conductive, e.g. electrically conductive substrate or layer connection structure of the Ant-to-radio frequency FE connector may be arranged at the distal end of the antenna substrate or layer 602 (also denoted as edge region). The conductive, e.g. electrically conductive material may be exposed such that the conductive, e.g. electrically conductive material is accessible at the antenna substrate or layer 602 from the outside before the radio frequency signal interface 27 is formed. Thus, a radio frequency signal interface 27 may be formed generating a minimal lateral overlap of the antenna circuit 25 and the radio frequency circuit 29 and, in addition, includes a minimal height 608. Thus, inter alia, electronic interference at the radio frequency circuit 29 may be minimized.

The conductive, e.g. electrically conductive substrate or layer connection structure of the radio frequency signal interface 27 may be one of a solder bump connection, an conductive, e.g. electrically conductive adhesive connection or a welding connection. In various aspects, the conductive, e.g. electrically conductive substrate or layer connection structure of the antenna circuit 25 and the conductive, e.g. electrically conductive substrate or layer connection structure of the radio frequency circuit 29 may be coupled to form a solder connection, an adhesive connection or a welding connection.

The substrate or layer connection structure may be formed symmetrically, e.g. a solder bump or adhesive portion (e.g. to form a composite) as conductive, e.g. electrically conductive substrate or layer connection structure at the antenna circuit 25 and at the radio frequency circuit 29. Alternatively, the substrate or layer connection structure may be formed asymmetrically, e.g. a solder bump as a conductive, e.g. conductive, e.g. electrically conductive substrate or layer connection structure at one of the antenna circuit 25 and the radio frequency circuit 29 and a bond pad as conductive, e.g. electrically conductive substrate or layer connection structure at the other of the antenna circuit 25 and the radio frequency circuit 29.

At least a first radio frequency signal interface 27 and a second radio frequency signal interface 27 may be formed between the antenna circuit 25 and the radio frequency circuit 29. In various aspects, at least a first and a second radio frequency signal interface 27 may be formed between the antenna circuit 25 and the radio frequency circuit 20, e.g. to connect at least a first and second port 253 (see above) of the antenna circuit 25 and the radio frequency circuit 29 (e.g. n different ports, with n being a rational number). The first and second radio frequency signal interfaces 27 may be isolated from each other. Analogously, the radio frequency circuit 29 may include first and second conductive, e.g. electrically conductive substrate or layer connection structures to form a first and second radio frequency signal interface 27. The first conductive, e.g. electrically conductive substrate or layer connection structure of the antenna circuit 25 may be connected to the first conductive, e.g. electrically conductive substrate or layer connection structure of the radio frequency circuit 29 and the second conductive, e.g. electrically conductive substrate or layer connection structure of the antenna circuit 25 may be connected to the second conductive, e.g. electrically conductive substrate or layer connection structure of the radio frequency circuit 29. Thus, a multiport structure may be formed between the antenna circuit 25 and the radio frequency circuit 29. A multiport structure may be used when utilizing an antenna array as antenna 53, as example.

However, in the distributed radiohead circuitry 20, the radio frequency circuit 29 may include a different number of ports than the antenna circuit 25 coupled to the radio frequency circuit 29. As example, the radio frequency circuit 29 may be configured to be utilized with a plurality of different antenna types. Thus, the radio frequency circuit 29 may include a port arrangement suitable for each type of the antenna types. Thus, some of the ports of the radio frequency circuit 29 may not be coupled to the antenna circuit 25.

The RF substrate or layer 604 may further include a radio frequency integrated circuit circuitry 21. The radio frequency front-end circuitry and the radio frequency integrated circuit circuitry 21 may be coupled to the conductor track structure. The RF substrate or layer 604 may include a further substrate or layer connection structure, the further substrate or layer connection structure 211 may be coupled to the radio frequency integrated circuit circuitry 21. The further substrate or layer connection structure 211 may include at least one of a solderable structure, a weldable structure, or an adherable structure. The further substrate or layer connection structure 211 may be configured to form at least digital interface 40 via a cable, e.g. a flat cable, to a substrate or layer-external device. The further substrate or layer connection structure 211 may be of the same type as the first substrate or layer connection structure.

It is to be noted that the above exemplary connections implemented by e.g. soldered connections may be replaced by a different type of connections, e.g. by mechanical connectors as will be described in more detail below.

The antenna circuit 25 and the radio frequency circuit 29 may be configured according to any one of the aspects described above. However, in various aspects, the antenna circuit 25 and the radio frequency circuit 29 may be connected by a mechanical connector to each other, as illustrated in FIG. 7A to FIG. 11.

Figure 7A:
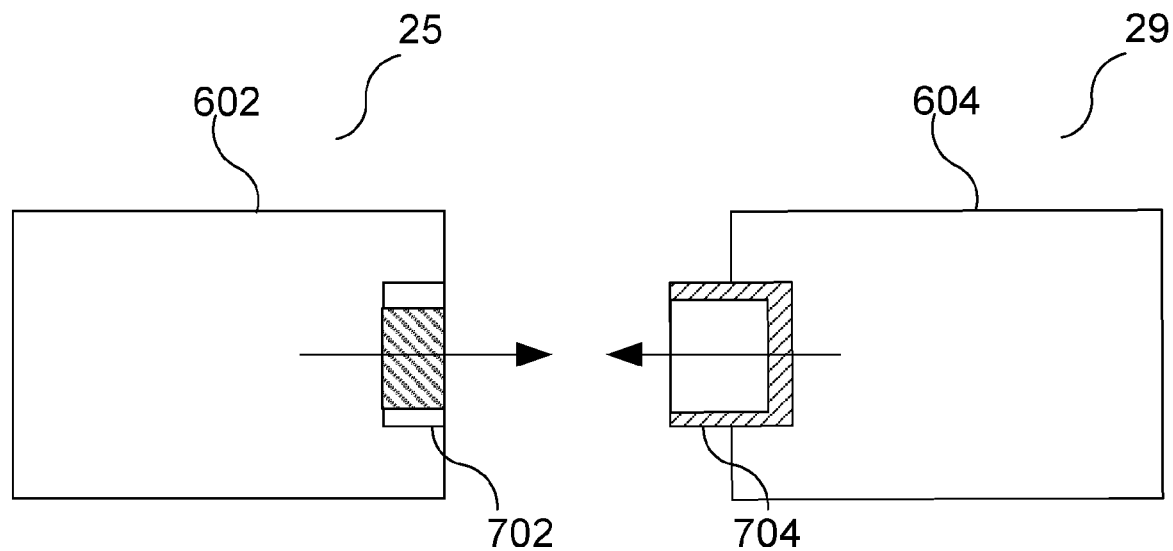
FIG. 7B exemplarily shows a schematic cross-sectional view of an antenna circuit and a radio frequency circuit of a distributed radiohead circuitry after forming a connection in accordance with various aspects of the present disclosure.
Figure 7B:
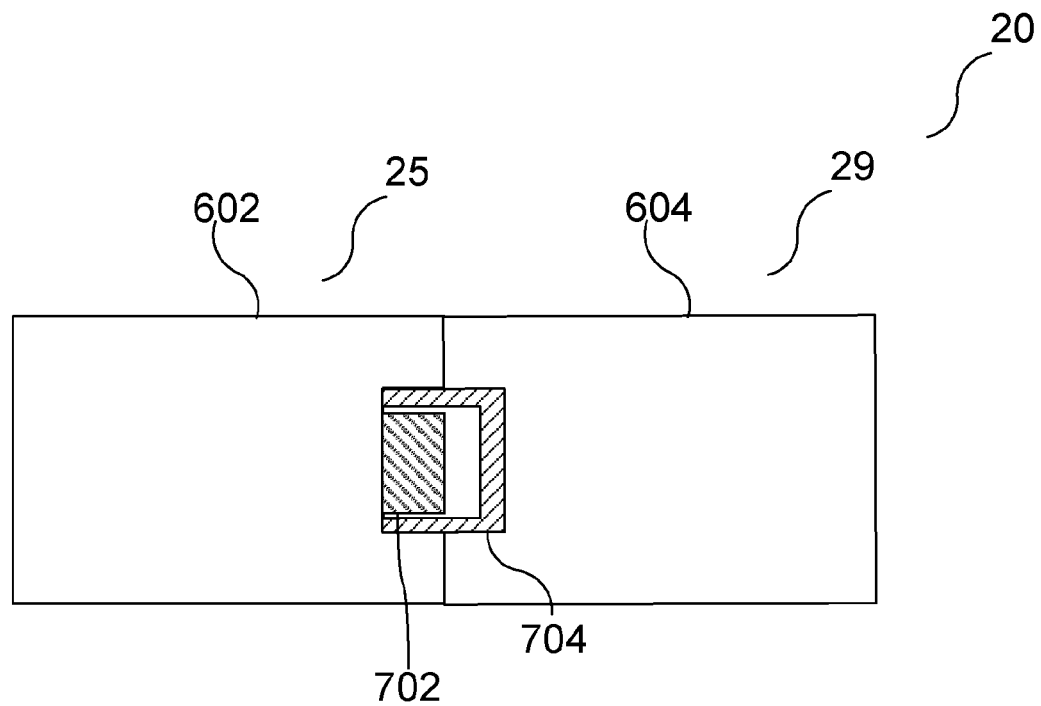

FIG. 7A and FIG. 7B illustrate schematic cross-sectional views an antenna circuit 25 and a radio frequency circuit 29 of a distributed radiohead circuitry 20 before the connection (FIG. 7A) and after connection (FIG. 7B) of the antenna circuit 25 and a radio frequency circuit 29 according to various aspects.

The antenna circuit 25 and the radio frequency circuit 29 are connected through the conductive substrate or layer connection structures 702, 704 to each other in such a manner that the antenna circuit 25 which receives signals via its antenna 53 sends the received signals through the radio frequency signal interface 27, e.g. through the conductive, e.g. electrically conductive substrate or layer connection structures 702, 704 or via field coupling, to the radio frequency circuit 29, which may operate e.g. in receive mode. The radio frequency circuit 29 may be configured to process the radio frequency signals received via the antenna 53 of the antenna circuit 25. Alternatively or in addition, the radio frequency circuit 29 may be configured to generate or process the signals to be sent via the distributed radiohead circuitry 20 and transmitted through the radio frequency signal interface 27 to the antenna circuit 25 and sent by a/the antenna 53 of the antenna circuit 25 to the outside of the distributed radiohead circuitry 20.

Illustratively, the antenna circuit 25 and the radio frequency circuit 29 are connected with each other without using a coaxial cable connection as radio frequency signal interface 27 but instead using mechanical substrate or layer connection structures 702, 704 that are formed at least partially by the substrate or layer s 602, 604 according to various aspects. Thus, the substrate or layer s 602, 604 of the antenna circuit 25 and of the radio frequency circuit 29 may be coplanar (arranged in the same plane) and, thus, a slim distributed radiohead circuitry 20 may be achieved.

In various aspects, the conductive, e.g. electrically conductive substrate or layer connection structures 704 of the radio frequency circuit 29 (also denoted as RF substrate or layer connection structure) of the radio frequency signal interface 27 may be standardized. Thus, a plurality of different antenna circuits 25 may be connected to the radio frequency circuit 29 and any antenna circuit 25 may be connected to the radio frequency circuit 29 by a vendor. Thus, the distributed radiohead circuitry 20 does not rely on an antenna circuit 25 on board (on the same RF substrate or layer 604) of the radio frequency circuit 29. Thus, different types of antenna 53 may be used other than e.g. GSG. As an example, a radio frequency circuit 29 may be provided enabling multi-port antenna for SMC, single antenna MiMo/diversity, TBDC, etc. using the RF substrate or layer connection structure 704.

Figure 10:
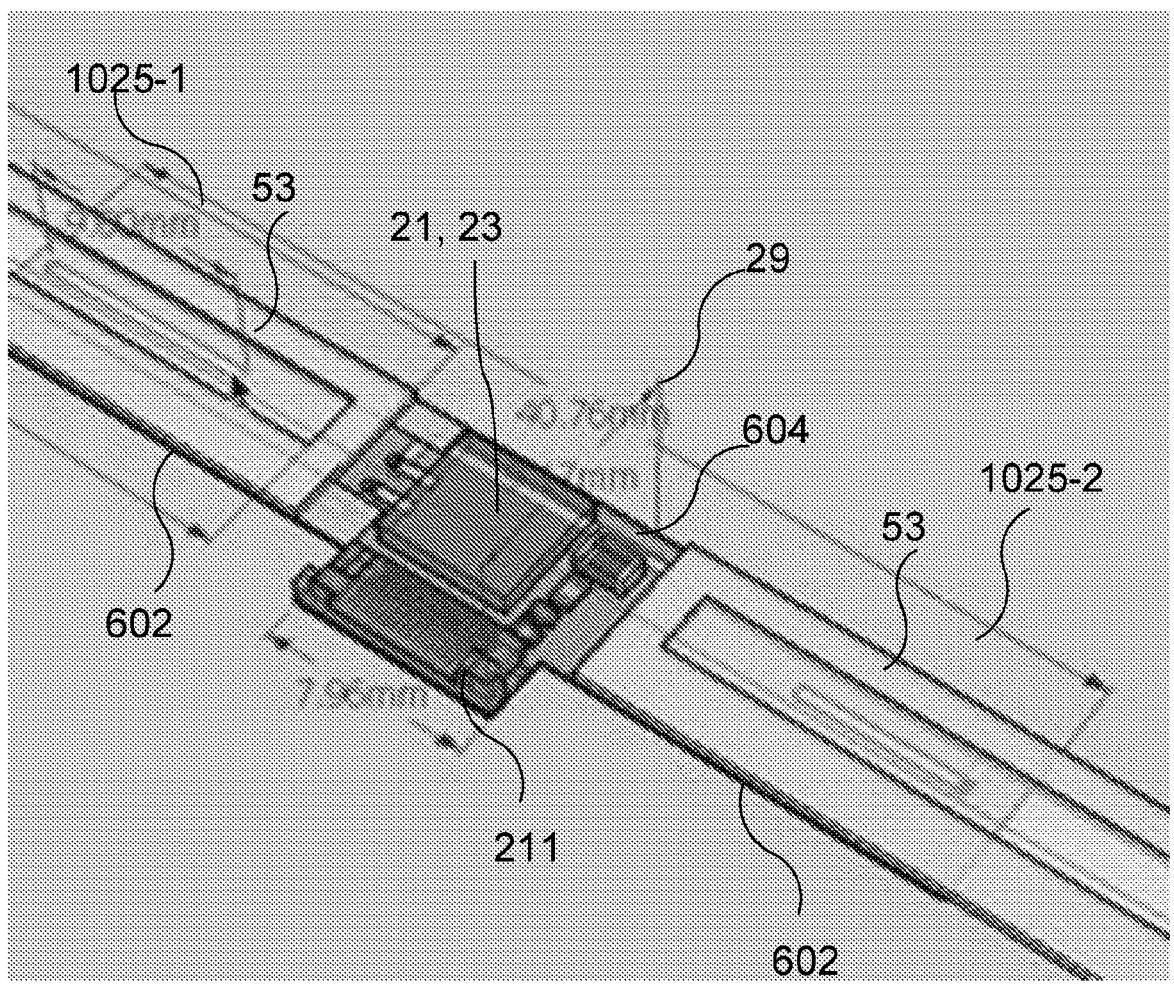
Figure 11:
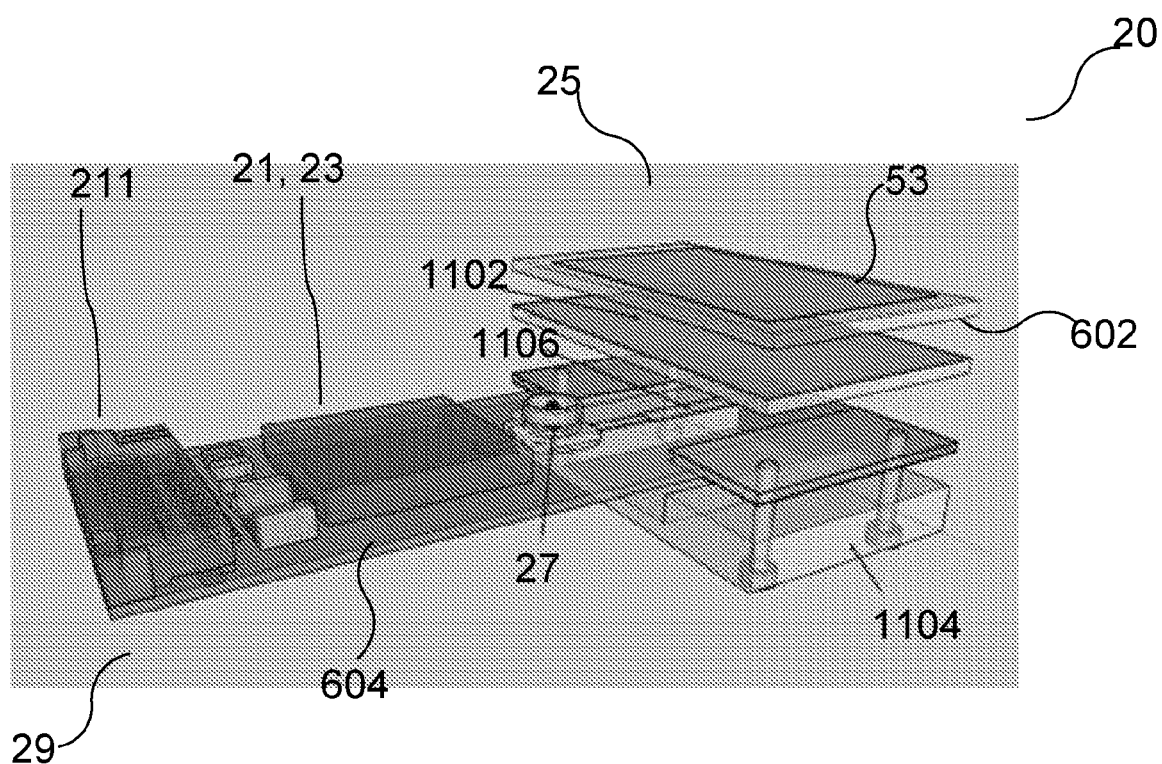

The substrate or layer connection structures 702, 704 according to various aspects may facilitate a multi-feed support, e.g. using two or more separate antennas or array antennas (see FIG. 10). Alternatively or in addition, the substrate or layer connection structures 702, 704 may facilitate a improved impedance matching. Alternatively or in addition, the substrate or layer connection structures 702, 704 may facilitate a reduced electrical length for discontinuity in comparison to a dual connector solution. The substrate or layer connection structures 702, 704 may facilitate methods to improve impedance matching when using a printed circuit board for at least one of the antenna substrate or layer 602 or the RF substrate or layer 604. As an example, in common connectors, shapes and fills may not be possible. The substrate or layer connection structures 702, 704 may facilitate an easy scaling for increased pin count, e.g. when using control signals for the antenna 53 or using an antenna array as antenna 53.

The substrate or layer connection structures 702, 704 may facilitate a coplanar arrangement of the substrate or layer s 602, 604 that may increase mechanical stability of the distributed radiohead circuitry 20. Alternatively or in addition, the substrate or layer connection structures 702, 704 may facilitate a sealing of the conductor tracks of the RF signal interface 27 in the socket of a plug-socket-connection. Thus, mechanical protection and RF shielding regarding RF interferences of the RF signal interface 27 is increased.

In various aspects, an conductive, e.g. electrically conductive connection of antenna circuit 25 and of the radio frequency circuit 29 is realized by mechanical substrate or layer connection structures formed at least partially by the substrate or layer s 602, 604, e.g. a frictional connection or a form closure. A frictional connection may be a spring-type connection and a form closure may be a plug-socket connection. However, a connection may be combination of frictional connection and form closure, e.g. a plug-socket connection including a spring segment.

The connection of antenna circuit 25 and of the radio frequency circuit 29 may be releasable, e.g. reversible, e.g. in case of a plug-socket connection. However, the connection may also be non-releasable in various aspects, e.g. irreversible. A non-releasable connection may only be separated by destroying the connecting means, e.g. by destroying the spring segment.

In the connected state, the substrate or layer connection structure 702 of the antenna circuit 5 (also denoted as antenna substrate or layer connection structure) and the RF substrate or layer connection structure 704 form or facilitate a radio frequency signal interface 27.

In various aspects, at least one of the substrate or layer s 602, 604 of the antenna circuit 25 and the RF circuit 29 may be a printed circuit board, e.g. when using mechanical substrate or layer connection structures 702, 704 for connecting the antenna circuit 25 with the RF circuit 29.

In various aspects, the RF substrate or layer connection structure 704 may include at least one of a frictional connection or a form closure and the RF substrate or layer connection structure 704 is at least partially integrated in the RF substrate or layer 604. As an example, a section of the RF substrate or layer 604 is formed as a part of a plug or socket.

Figure 8A:
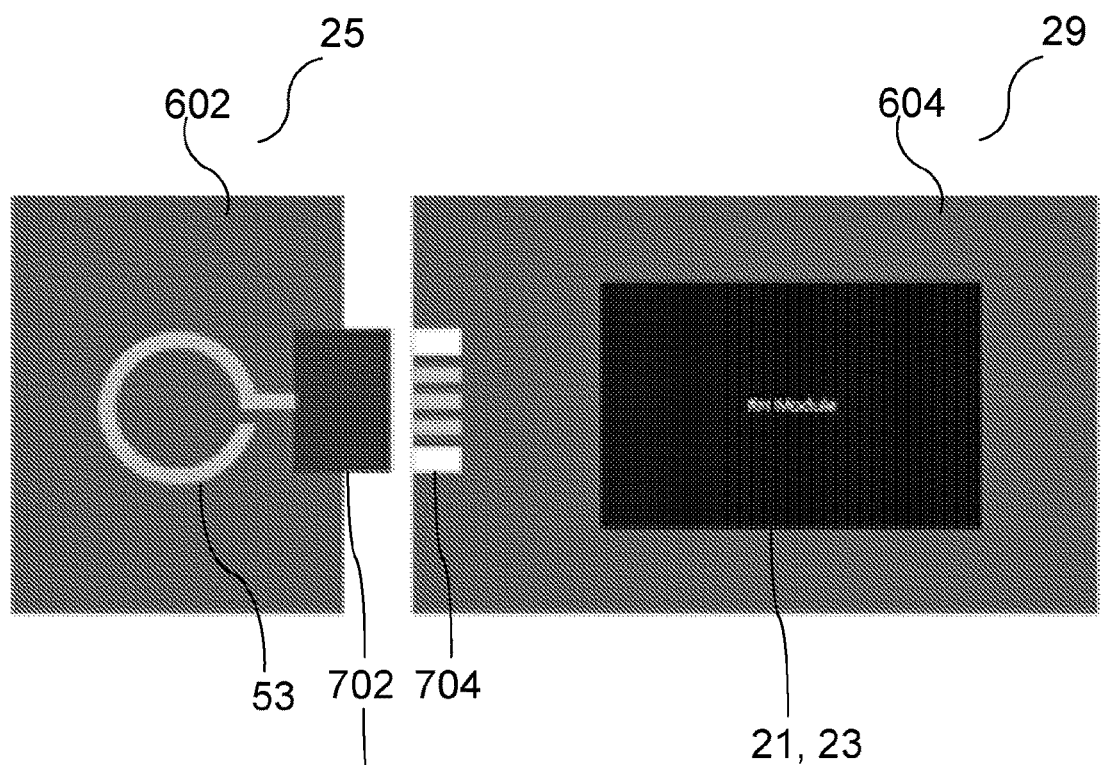
FIGS. 8A to 11 exemplarily show illustrative examples of the distributed radiohead circuitry of FIG. 7A and FIG. 7B in accordance with various aspects of the present disclosure.
Figure 8B:
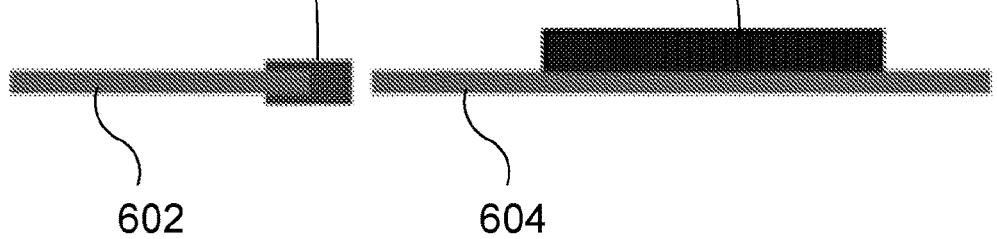
Figure 9:
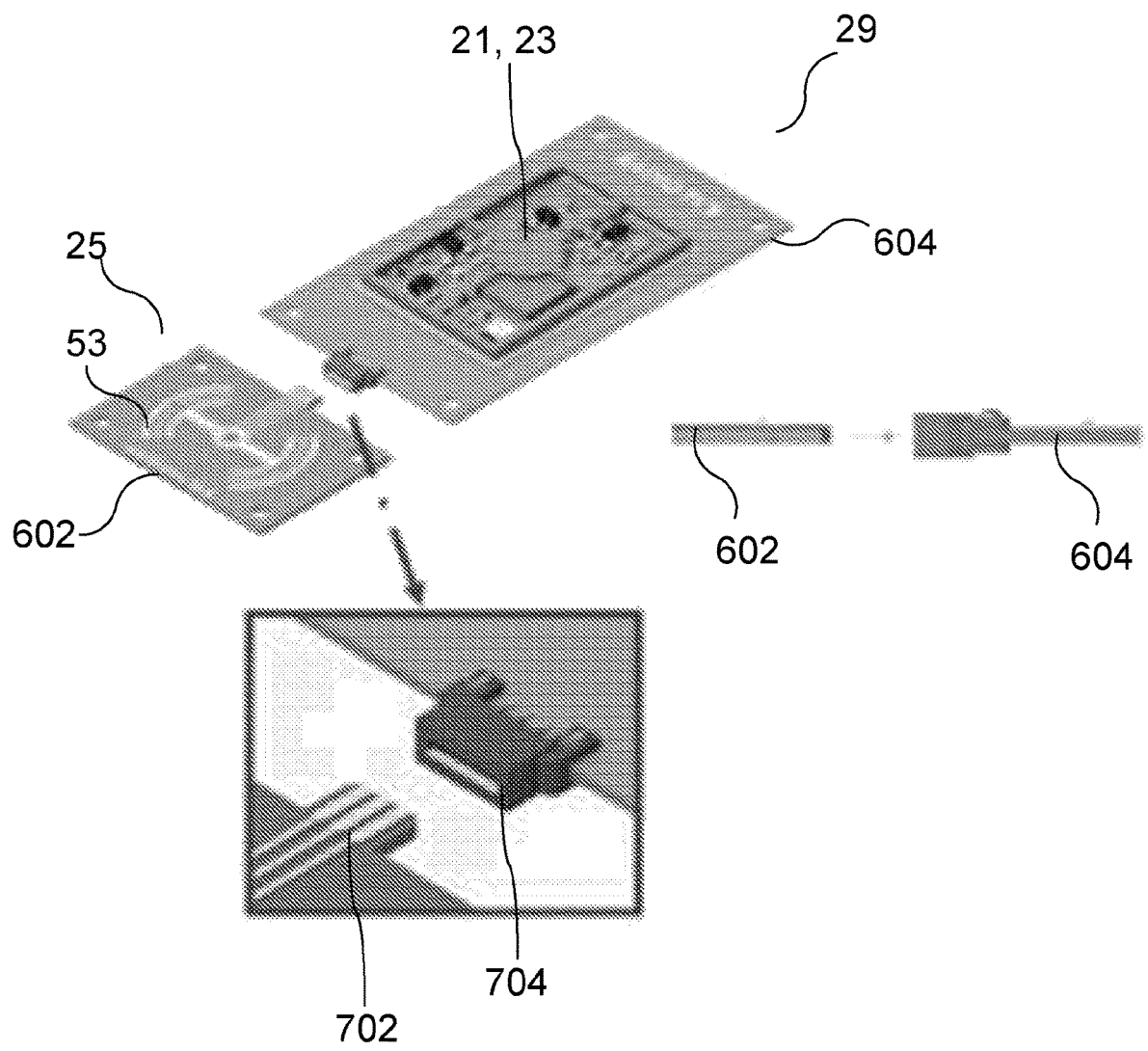

In various aspects, the RF substrate or layer connection structure 704 is configured, in a coupled state, to form a coplanar arrangement with the substrate or layer-external antenna circuit 25. As an example, the RF substrate or layer connection structure 704 is formed at or in a side surface of the RF substrate or layer 604. As an example, the RF substrate or layer 604 may include a recess or protrusion in the edge region and the RF substrate or layer connection structure 704 is positioned or disposed or formed in the recess or protrusion. In various aspects, the RF substrate or layer 604 forms a plug (optionally including conductor tracks for direct electrical coupling) in the recess or protrusion, as illustrated in FIG. 7A, FIG. 7B and FIG. 9. Alternatively, the RF substrate or layer 604 forms a socket or is configured to host a socket in the recess or protrusion, as illustrated in FIG. 8A and FIG. 8B. In various aspects, the RF substrate or layer connection structure 704 may include at least one of a plug, a socket and/or a spring-type connector.

In various aspects, the RF substrate or layer 604 may include at least one corner and the RF substrate or layer connection structure 704 is formed at the corner. In other words, an antenna circuit 25 is connected via one or more corners of the RF substrate or layer 604 to the radio frequency circuit 29 in various aspects.

In various aspects, the RF substrate or layer connection structure 704 is configured such that a distance is formed between the substrates 602, 604 when the radio frequency circuit 29 and the antenna circuit 25 are in a connected state. Illustratively, the antenna substrate or layer connection structure 702 and the RF substrate or layer connection structure 704 connect the antenna substrate or layer 602 with the RF substrate or layer 604. However, other than this connection, there is no direct contact between the substrates 602, 604. Thus, a gap, e.g. an air gap, is formed between the substrates 602, 604 and the gap defines a (lateral) distance between the substrates 602, 604. The gap may reduce the RF interference at the radio frequency circuit 29. Alternatively, the RF substrate or layer connection structure 704 is configured such that a direct contact is formed between the substrates 602, 604 when the radio frequency circuit 29 and the antenna circuit 25 are in a connected state (illustrated in FIG. 7B).

In various aspects, the RF substrate or layer connection structure 704 is configured to form an electrically insulated connection between the substrates 602, 604. In other words, the substrate or layer connection structures 702, 704 facilitate a mechanical connection. Thus, the radio frequency circuit 29 and the antenna circuit 25 are field coupled in a connected state (illustrated in FIG. 11). Here, the antenna 53 of the antenna circuit 25 is field coupled via a slot antenna 1102 with a conductor track 1106 of the RF circuit 29 (as described in more detail below). In other words, a field coupling connects radio frequency circuit 29 with the antenna circuit 25 in the mechanically connected state in various aspects.

Further, the RF signal interface 27 may include a switch connector facilitating a coupling or decoupling of the antenna circuit 25 from the RF circuit 29. The antenna circuit 29 may further include a back-short bracket 1104, e.g. a back-short aluminum bracket, for heat dissipation and/or RF shielding.

As illustrated in FIG. 10, the radio frequency circuit 29 may include at least one further RF FE-to-Ant connector. The further RF FE-to-Ant connector may include a further conductor track structure and a further RF substrate or layer connection structure 704 coupled to the further conductor track structure. The further RF FE-to-Ant connector is electrically isolated from the RF FE-to-Ant connector (described before). The further RF substrate or layer connection structure 704 is positioned or disposed or formed in an edge region different from the edge region of the RF substrate or layer connection structure 704. The further RF substrate or layer connection structure 704 may include at least one of a frictional connection or a form closure. In various aspects, the RF substrate or layer connection structure 704 is at least partially integrated in the substrate or layer. The further RF substrate or layer connection structure 704 is configured to form at least one radio frequency signal interface with a further antenna circuit 25 connection structure of a further substrate or layer-external antenna circuit. Illustratively, the RF circuit 29 is configured to host a first antenna circuit 1025-1 and a second 1025-2 utilizing the RF FE-to-Ant connector and the further RF FE-to-Ant connector.

The RF substrate or layer 604 may include the radio frequency front-end to antenna (RF FE-to-Ant) connector 235 (as described above). The RF FE-to-Ant connector includes the RF substrate or layer connection structure 704. In various aspects, the RF FE-to-Ant connector further includes a conductor track structure coupled to the RF substrate or layer connection structure 704 (see FIG. 9 illustrating a conductor track structure of three separated conductor tracks). However, the RF substrate or layer connection structure 704 may include more or less conductor tracks than the three conductor tracks illustrated in FIG. 9 depending on the layout of the antenna 53, e.g. 1, 2, 4, 5 or more. As an example, the antenna 53 may be an antenna array including a plurality of array antennas (also referred to as array antenna elements) and each array antenna may require a dedicated conductor track. However, array antenna may be grouped or controlled in a time-multiplex manner and, thus, there may be less conductor tracks than array antennas. The radio frequency front-end circuitry 23 and/or the radio frequency integrated circuit circuitry 21 may be coupled to the conductor track structure. As an example, the radio frequency front-end circuitry 23 may be directly coupled to the conductor track structure and the radio frequency integrated circuit circuitry 21 may be coupled directly to the radio frequency front-end circuitry 23. Thus, the radio frequency integrated circuit circuitry 21 may be indirectly coupled to the conductor track structure.

The radio frequency FE-to-Ant connector may form at least one radio frequency signal interface 27 together with an antenna substrate or layer connection structure 702 of the Ant-to-radio frequency FE connector.

The antenna circuit 25 is configured similar to an aspect as described before. However, in various aspects, the antenna substrate or layer connection structure 702 may include at least one of a frictional connection or a form closure and the antenna substrate or layer connection structure 702 is at least partially integrated in the antenna substrate or layer 602. The antenna substrate or layer connection structure 702 is configured to correspond to the antenna substrate or layer connection structure 702 of the antenna substrate or layer 602-external radio frequency circuit as described above.

Thus, in various aspects, the antenna substrate or layer connection structure 702 may be configured, in a coupled state, to form a coplanar arrangement with the substrate-external antenna circuit.

Analog to the RF substrate or layer connection structure 704, the antenna substrate or layer 602 may include a recess or protrusion in the edge region and the antenna substrate or layer connection structure 702 is positioned or disposed or formed in the recess or protrusion. In other words, the antenna substrate or layer 602 may be configured to at least partially form at least one of a plug, a socket or a spring-type connector that is the antenna substrate or layer connection structure 702.

In various aspects, the antenna substrate or layer 602 may include at least one corner and the antenna substrate or layer connection structure 702 is formed at the corner.

As an illustrative example, the distributed radiohead circuitry 20 may include the RF substrate or layer 604 that may include a radio frequency front-end to antenna (RF FE-to-Ant) connector the RF FE-to-Ant connector may include a first (RF) substrate or layer connection structure 704. In various aspects, the RF substrate or layer connection structure 704 may be coupled to a conductor track structure formed on or integrated in the RF substrate or layer 604. The RF substrate or layer 604 may include an edge region. The first substrate or layer connection structure 704 is positioned or disposed or formed in the edge region. The RF substrate or layer 604 may include radio frequency front-end circuitry 23 integrated in or positioned or disposed on the RF substrate or layer 604.

The second (antenna) substrate or layer 602 may include an antenna 53 and an antenna to RF front-end (Ant-to-RF FE) connector coupled to the antenna 53. The Ant-to-RF FE connector may include a second (antenna) substrate or layer connection structure 702. The antenna substrate or layer 602 may include an edge region and the second substrate or layer connection structure 702 is positioned or disposed or formed in the edge region. Thus, the antenna circuit 25 and the RF circuit 29 may be positioned or disposed adjacent to each other in a common plane (regarding the substrates 602, 04) (also denoted as coplanar). A slim dispersed radiohead circuitry 20 is realized. Alternatively or in addition, RF interference may be reduced or minimized at the RF circuit 29.

In various aspects, the first and second substrate or layer connection structures 702, 704 are at least one of a frictional connection or a form closure. The first and second substrate or layer connection structures 702, 704 are configured corresponding to each other. In the connected state, the first and second substrate or layer connection structures 702, 704 form an RF signal interface 27. The first substrate or layer connection structure 704 is at least partially integrated in the RF substrate or layer 604. The second substrate or layer connection structure 702 is at least partially integrated in the antenna substrate or layer 602.

At least one of the antenna substrate or layer 602 and the RF substrate or layer 604 may include a recess or protrusion in the edge region. A substrate or layer connection structure 702, 704 may be positioned or disposed or formed in the recess or protrusion of the substrates 602, 604. As an example, at least one of the first and second substrate or layer connection structures 702, 704 may include at least one of a plug, a socket or a spring-type connector. In various aspects, the first and/or second substrates include at least one corner and the substrate or layer connection structures 702, 704 are formed at the corner. Thus, a ground plane between RF substrate or layer 604 and antenna substrate or layer 602 may be extended.

A gap or (lateral) distance may be formed between the antenna substrate or layer 602 and the RF substrate or layer 604 in various aspects. Alternatively, a direct contact may be formed between the antenna substrate or layer 602 and the RF substrate or layer 604.

The first and second substrate or layer connection structures 702, 704 may be configured to form an electrically insulated connection between the antenna substrate or layer 602 and the RF substrate or layer 604. In this case, the antenna circuit 25 and the RF circuit 29 are field coupled, as an example (see FIG. 11).

The RF substrate or layer 604 may include at least one further RF FE-to-Ant connector may include a further conductor track structure and a further substrate or layer connection structure 211 coupled to the further conductor track structure (see FIG. 10). The further RF FE-to-Ant connector is electrically isolated from the RF FE-to-Ant connector. The further substrate or layer connection structure 211 is positioned or disposed or formed in an edge region different from the edge region of the substrate or layer connection structure. The further substrate or layer connection structure 211 may include at least one of a frictional connection or a form closure. In various aspects, the substrate or layer connection structure is at least partially integrated in the RF substrate or layer 604. In various aspects, the further substrate or layer connection structure 211 is configured to form at least one radio frequency signal interface with a further antenna circuit 1025-2 different from the antenna circuit 1025-1 coupled to the RF FE-to-Ant connector.

The electronic components implemented on the different substrates may be coupled using different technologies, e.g. using one or more wires or cables, a capacitive coupling or an inductive coupling, which will be described in more detail below.

Figure 12A:
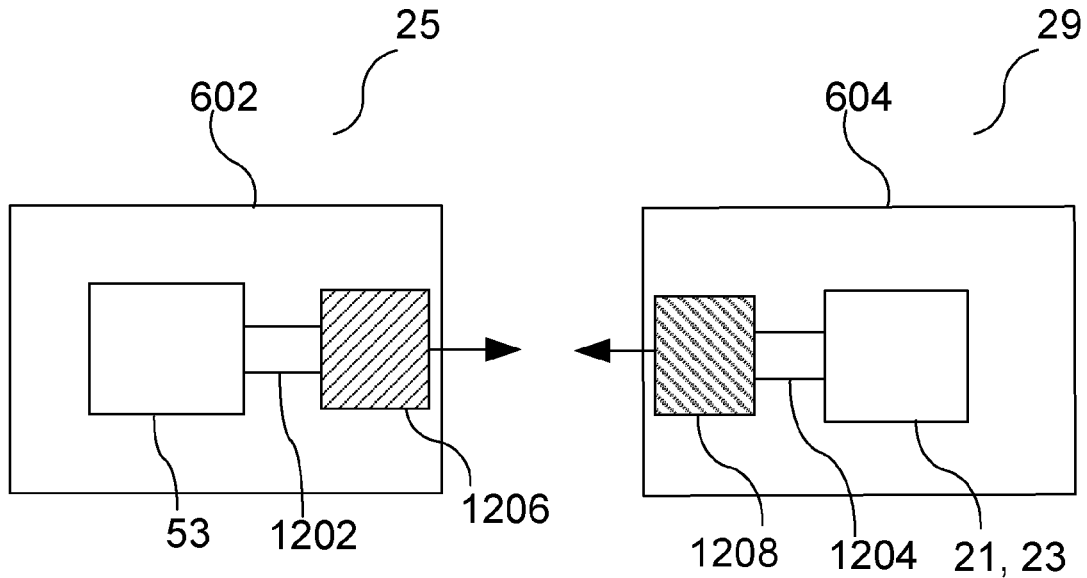
FIG. 12A exemplarily shows a schematic cross-sectional view of an antenna circuit and a radio frequency circuit of a distributed radiohead circuitry before forming a connection in accordance with various aspects of the present disclosure.
Figure 12B:
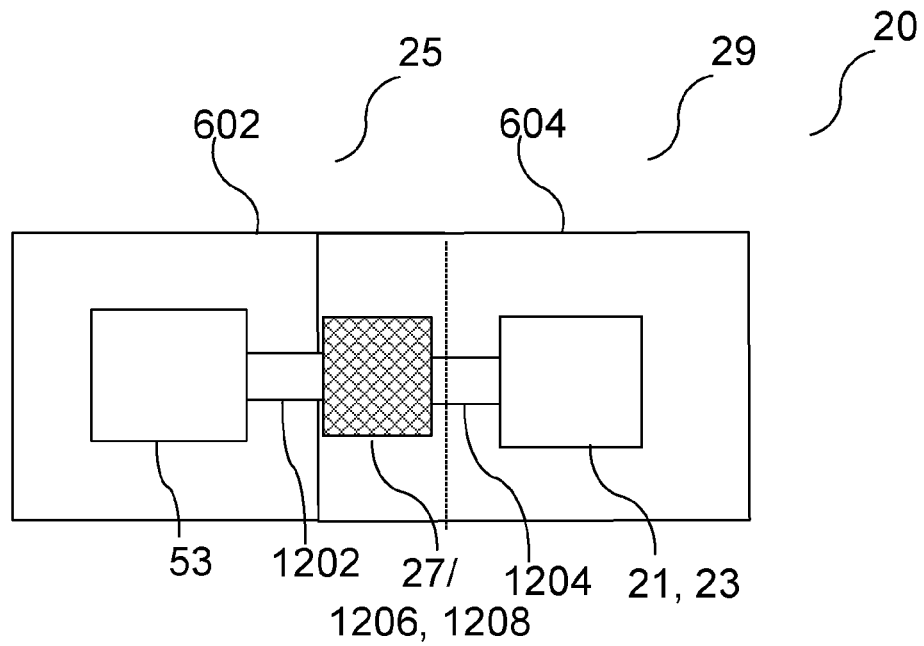
FIG. 12B exemplarily shows a schematic cross-sectional view of an antenna circuit and a radio frequency circuit of a distributed radiohead circuitry after forming a connection in accordance with various aspects of the present disclosure.
Figure 13:
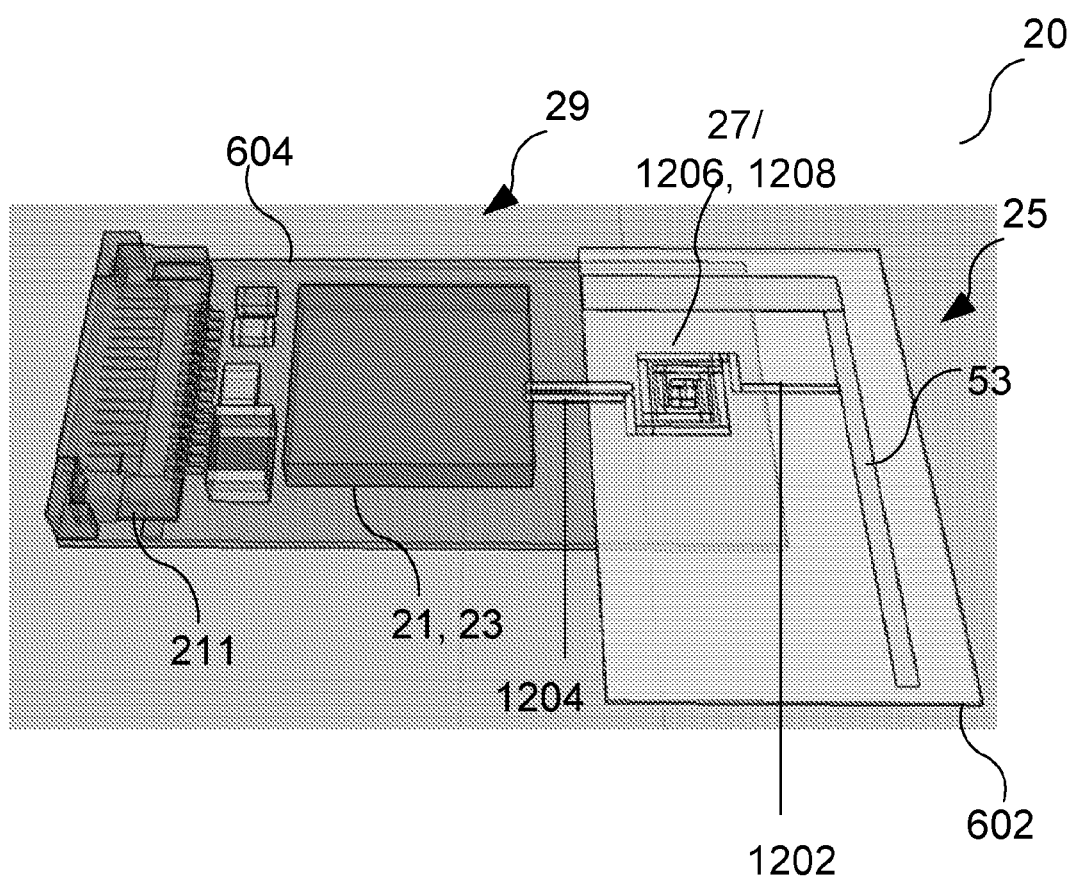
FIG. 13 exemplarily shows an illustrative example of the distributed radiohead circuitry of FIG. 12A and FIG. 12B in accordance with various aspects of the present disclosure.

The antenna circuit 25 and the radio frequency circuit 29 may be configured according to one of the aspects described above. The antenna circuit 25 and the radio frequency circuit 29 may be electrically coupled through an inductively coupled circuit, as illustrated in FIG. 12A to FIG. 13. FIG. 12A illustrates the antenna circuit 25 and the radio frequency circuit 29 in a separated state and FIG. 12B illustrates the antenna circuit 25 and the radio frequency circuit 29 in a connected state. FIG. 13 illustrates an illustrative example of a distributed radiohead circuitry 20 including an antenna circuit 25 inductively coupled to a radio frequency circuit 29.

In various aspects, the RF FE-to-Ant connector of the radio frequency circuit 29 is configured as a first (RF) planar spiral conductor track 1208. The first RF planar spiral conductor track 1208 may be formed on the RF substrate 604 (e.g. as a conductor track structure on a printed circuit board) or may be monolithically integrated in the RF substrate 604. The first RF planar spiral conductor track 1208 may be connected to the radio frequency front-end circuitry 23 through a (linear) conductor track 1204. Thus, the distance between the RF planar spiral conductor track 1208 and the radio frequency front-end circuitry 23 is increased. Thus, the increased distance reduces RF interference at the radio frequency front-end circuitry 23. Alternatively or in addition, the increased distance may facilitate a mounting area for mounting an antenna circuit 25 on the RF substrate 604.

Further, the Ant-to-RF FE connector coupled to the antenna 53 may be configured as a second (antenna) planar spiral conductor track 1206. The second antenna planar spiral conductor track 1206 may be formed on the antenna substrate 602 or may be monolithically integrated into the antenna substrate 602. The second antenna planar spiral conductor track 1206 may be connected to the antenna 53 through a (linear) conductor track 1202. Thus, the distance between the antenna planar spiral conductor track 1206 and the antenna 53 is increased. Thus, RF interference at the radio frequency front-end circuitry 23 in a connected state (FIG. 12B) is reduced and/or a mounting area for mounting the antenna circuit 25 on the RF substrate 604 is facilitated. The first RF planar spiral conductor track 1208 may include an arbitrary number of windings, e.g. one, two, three, four or even more, depending on the desired electrical characteristics and layout. The second antenna planar spiral conductor track 1206 may also include an arbitrary number of windings, e.g. one, two, three, four or even more, depending on the desired electrical characteristics and layout.

The RF substrate 604 may include an edge region and a center region. As an example, the radio frequency front-end circuitry 23 is positioned or disposed in the center region. The RF planar spiral conductor track 1208 may be positioned or disposed in the edge region. The antenna substrate 602 may be mounted at the edge region of the RF substrate 604. The antenna substrate 602 may be fixed to antenna substrate 604 via an adhesive or mechanical clamping. The RF planar spiral conductor track 1208 and the antenna planar spiral conductor track 1206 are configured to form an inductively coupled circuit in a connected state (see FIG. 12B). The inductively coupled circuit may be a BALUN circuit, as an example. Thus, the antenna substrate 602 and the RF substrate 604 may be mounted or fixed by a connecting structure different from the planar spiral conductor tracks 1206, 1208. Hence, the connecting structure may be electrically insulating. As an example, the connection means may be an adhesive or an electrically non-conductive mechanical substrate connection structure as described above.

In various aspects, the antenna circuit 25, may include the antenna substrate 602 that in turn may include an antenna 53 and an antenna to RF front-end (Ant-to-RF FE) connector coupled to the antenna 53 and configured as a planar spiral conductor track 1206. The planar spiral conductor track 1206 may be configured to form at least one radio frequency signal interface 27 with a radio frequency circuit connection structure 1208 of a substrate-external radio frequency circuit 29. The radio frequency circuit connection structure 1208 may include another planar spiral conductor track 1208 and the radio frequency signal interface 27 may be an inductively coupled circuit. The inductively coupled circuit may be a BALUN circuit. The antenna substrate 602 may include an edge region and a center region, wherein the antenna 53 may be positioned or disposed in the center region and the antenna planar spiral conductor track 1206 may be positioned or disposed in the edge region. The edge region may be configured to mount the antenna substrate-external radio frequency circuit 29 at the edge region of the antenna substrate 602.

The antenna circuit 25 and the radio frequency circuit 29 are operably coupled by means of the planar spiral conductor tracks 1206, 1208 having electrical conductivity to each other in such a manner that signals received at an antenna 53 of the antenna circuit 25 are submitted through planar spiral conductor tracks 1206, 1208 forming the inductively coupled circuit that is a radio frequency signal interface 27 according to various aspects, to the radio frequency circuit 29. The radio frequency circuit 29 may process the received radio frequency signals. Alternatively or in addition, the radio frequency circuit 29 may generate or process signals to be sent via the distributed radiohead circuitry 20 and transmitted through the radio frequency signal interface 27 to the antenna circuit 25 the antenna 53 of the antenna circuit 25 may send the processed signals to the outside of the distributed radiohead circuitry 20.

Illustratively, the antenna circuit 25 and the radio frequency circuit 29 are connected with each other without using a coaxial cable connection or any other cable that serves this purpose as radio frequency signal interface 27 but instead using the inductively coupled circuit. Thus, the electrical coupling of the antenna circuit 25 and radio frequency circuit 29 may be independent from the physical coupling of the substrates 602, 604 of the antenna circuit 25 and of the radio frequency circuit 29. Thus, the radio frequency circuit 29 and the antenna circuit 25 may be positioned or disposed substantially adjacent to each other with only little overlap. Thus, radio frequency interference at the radio frequency circuit 29 may be reduced or even minimized.

Further, cable and connector losses, e.g. by copper and mismatch, are reduced. Eliminating cable losses improves total RF performance of the distributed radiohead circuitry 20. In addition, overall cost of the distributed radiohead circuitry 20 can be reduced since a cable assembly and connectors, e.g. of a coaxial cable, are not required.

In various aspects, the RF planar spiral conductor track 1208 may be standardized. Thus, a plurality of different antenna circuits 25 may be connected to the radio frequency circuit 29 and any antenna circuit 25 may be connected to the radio frequency circuit 29 by a vendor. Thus, the distributed radiohead circuitry 20 does not rely on the antenna circuit 25 on board (on the same RF substrate 604) of the radio frequency circuit 29. Thus, in various aspects, different types of antenna 53 may be used other than e.g. GSG. As an example, a radio frequency circuit 29 may be provided enabling multi-port antenna for SMC, single antenna MIMO/diversity, TBDC, etc. using the RF planar spiral conductor track 1208.

The planar spiral conductor tracks 1206, 1208 according to various aspects may facilitate a multi-feed support, e.g. using two or more separate antennas or array antennas. Alternatively or in addition, the planar spiral conductor tracks 1206, 1208 according to various aspects may facilitate methods to improve impedance matching. As an example, the inductively coupled circuit may be a BALUN circuit and the BALUN circuit may be configured for impedance matching. In various aspects, the BALUN circuit formed from the RF signal interface 27 may make an additional BALUN in the front end circuitry optional. In various aspects, the BALUN circuit may be configured to include one or more RF transformers.

In various aspects, planar spiral conductor tracks 1206, 1208 may include a conductor track formed on a substrate or integrated in the substrate. The planar spiral conductor tracks 1206, 1208 may be formed in a single plane, e.g. metallization layer of a printed circuit substrate. The planar spiral conductor tracks 1206, 1208 may be configured as a single loop, as an example. However, a planar spiral conductor track 1206, 1208 may also be configured as including a plurality of windings, e.g. in a planar spiral shape or a meander shape. A first end of the planar spiral conductor tracks 1206, 1208 may be directly connected to the RF FE circuitry 23 or the antenna circuit 25. However, there may be formed a further conductor track, e.g. a linear conductor track 1202, 1204, between the planar spiral conductor track 1206, 1208 and the RF FE circuit or antenna, as illustrated in FIG. 12A. A second end of the planar spiral conductor tracks 1206, 1208 may be directly connected to a reference potential or may be floating.

In various aspects, the planar spiral conductor tracks 1206, 1208 are arranged in a coaxially stacked manner to form the inductively coupled circuit. The shape of the planar spiral conductor tracks 1206, 1208 may be used for impedance matching, e.g. in an inductively coupled circuit that is a BALUN circuit.

As an example, the planar spiral conductor tracks 1206, 1208 may be configured to include different number of windings, different material composition and/or conductor tracks of different cross-sectional area. As an example, the RF circuit (29) and the antenna circuit (25) may have or may be manufactured using different PCB material, number of copper layers and thickness etc.

A physical connection member of the antenna circuit 25 and of the radio frequency circuit 29, e.g. a mechanical substrate connection structure (e.g. a plug-socket connection, a mechanical (e.g., plastic) clamping, an adhesive connection, a solder connection or a welding connection, may facilitate a mounting of the antenna circuit 25 at the RF circuit 29, e.g. independent from the electrical connection. Thus, a degree of freedom in the design and layout of the distributed radiohead circuitry 20 may be increased.

The radio frequency FE-to-Ant connector (e.g. RF planar spiral conductor track 1208) may form at least one radio frequency signal interface 27 together with the Ant-to-radio frequency FE connector (e.g. antenna planar spiral conductor track 1206).

Another way of operably, e.g. electrically, coupling of the electronic components of the substrates 602, 604 is by directly ohmically coupling using one or more conductor tracks as will be described in more detail below.

The antenna circuit 25 and the radio frequency circuit 29 may be configured according to one of the aspects described above. However, in various aspects, the antenna circuit 25 and the radio frequency circuit 29 may be electrically coupled through a direct feed, as illustrated in FIG. 14A to FIG. 16G.

Figure 14A:
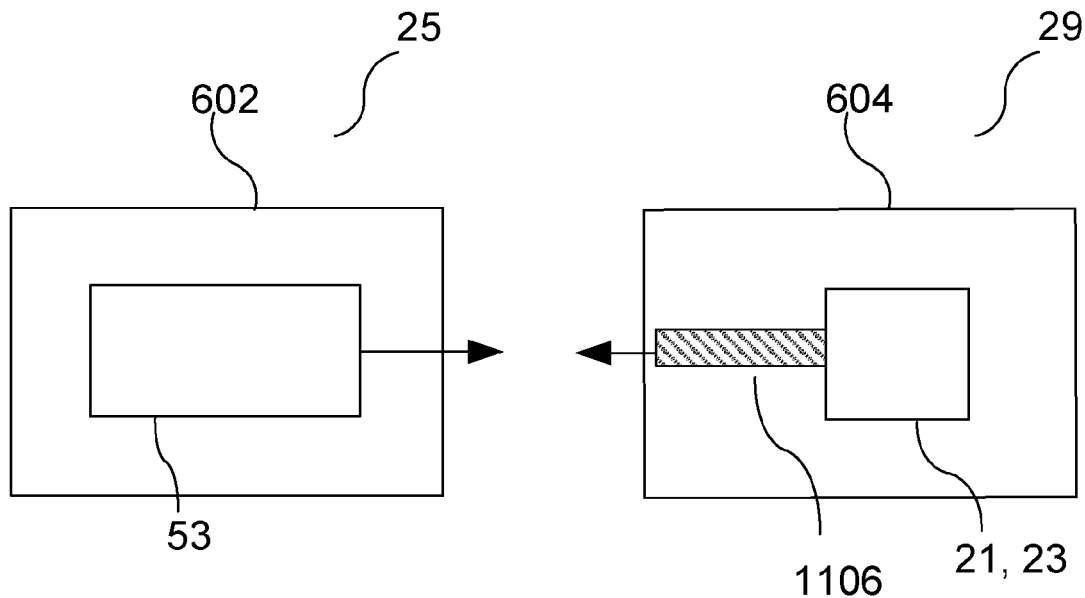
FIG. 14A exemplarily shows a schematic cross-sectional view of an antenna circuit and a radio frequency circuit of a distributed radiohead circuitry before forming a connection in accordance with various aspects of the present disclosure FIG. 14B exemplarily shows a schematic cross-sectional view of an antenna circuit and a radio frequency circuit of a distributed radiohead circuitry after forming a connection in accordance with various aspects of the present disclosure.
Figure 14B:
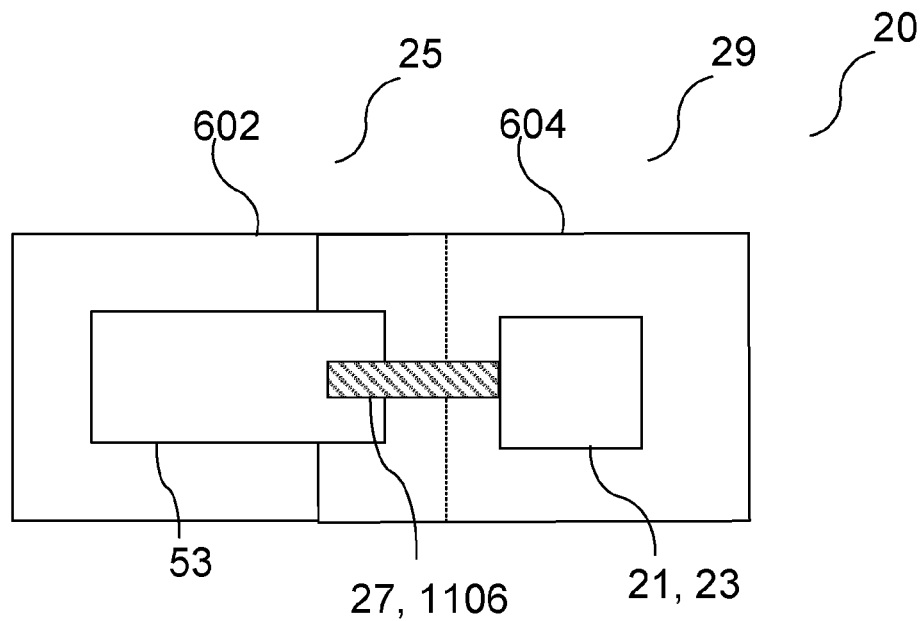
Figure 15:
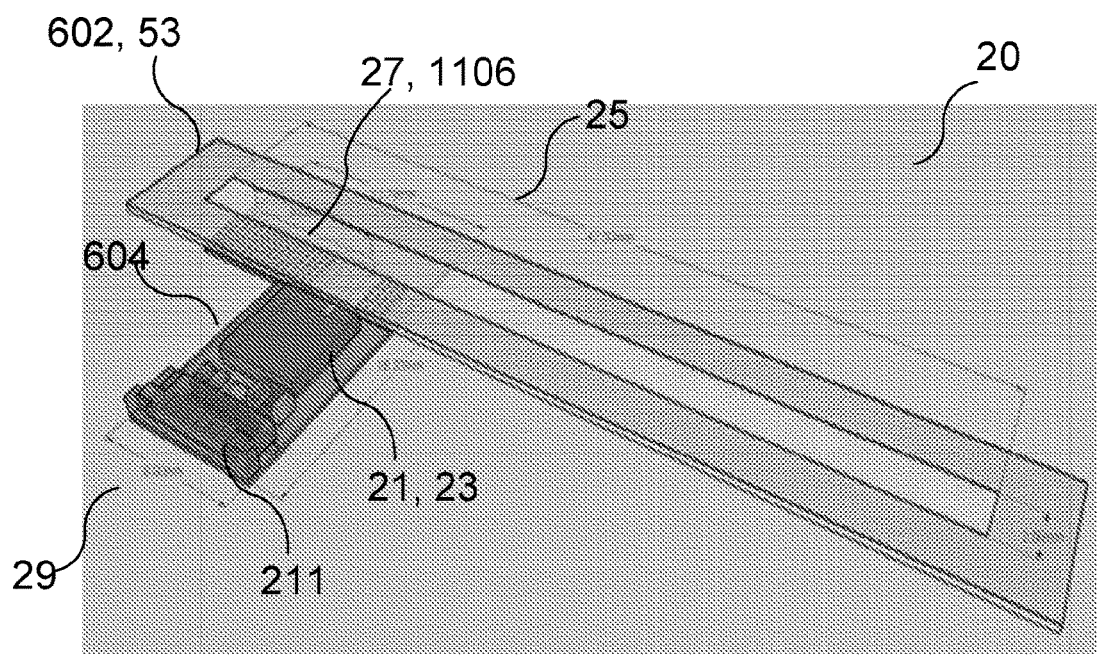
FIGS. 15 and 16A to FIG. 16G exemplarily show illustrative examples of the distributed radiohead circuitry of FIG. 14A and FIG. 14B in accordance with various aspects of the present disclosure.

The direct feed may be implemented by one or more RF conductor tracks 1106 that are directly coupled to the antenna. FIG. 14A illustrates the antenna circuit 25 and the radio frequency circuit 29 in a separated state and FIG. 14B illustrates the antenna circuit 25 and the radio frequency circuit 29 in a connected state. FIG. 15 and FIG. 16A to FIG. 16G illustrate illustrative examples of a distributed radiohead circuitry 20 including an antenna circuit 25 inductively coupled to a radio frequency circuit 29 using a direct feed.

The antenna circuit 25 and the radio frequency circuit 29 are operably, e.g. electrically, connected through the direct feed to each other in such a manner that the antenna 53 receives signals and induces the received signals into the one or more RF conductor tracks 1106 and the radio frequency circuit 29 then processes these signals. Alternatively or in addition, the radio frequency circuit 29 may be configured to generate and process signals to be sent via the distributed radiohead circuitry 20 and to transmit them through the one or more RF conductor tracks 1106 to the inductively coupled antenna 53 and, thus, send to the outside of the distributed radiohead circuitry 20.

Illustratively, the antenna circuit 25 and the radio frequency circuit 29 are connected with each other without using a coaxial cable connection as radio frequency signal interface 27 but instead using the direct feed. Thus, the electrical coupling of the antenna circuit 25 and radio frequency circuit 29 may be independent from the physical coupling of the substrates 602, 604 of the antenna circuit 25 and of the radio frequency circuit 29. Thus, the radio frequency circuit 29 and the antenna circuit 25 may be positioned or disposed substantially adjacent to each other with only little overlap. Thus, radio frequency interference at the radio frequency circuit 29 may be reduced or even minimized.

As illustrated in FIG. 14A and FIG. 14B, in various aspects, the RF FE-to-Ant connector may be configured as one or more RF conductor tracks 1106. The radio frequency front-end circuit 23 may be coupled to the one or more RF conductor tracks 1106. The one or more RF conductor tracks 1106 may be positioned or disposed in the edge region of the RF substrate 604. The one or more RF conductor tracks 1106 may be configured to be field coupled with the antenna 53. As an example, the antenna may be fixed adjacent to the one or more RF conductor tracks 1106 to the RF circuit. In various aspects, the antenna 53 may at least partially surround the one or more RF conductor tracks 1106. In various aspects, the antenna substrate 602 may be fixed to the RF substrate 604 such that the one or more RF conductor tracks 1106 are field coupled with the antenna 53. The field-coupled conductor tracks 1106 may facilitate a reduction of RF interference at the radio frequency front-end circuitry 23. By way of example, the length of the conductor may adjust the distance regarding the RF circuit. Alternatively or in addition, the distance between the conductor tracks 1106 and the RF circuit may facilitate a mounting area for mounting an antenna circuit 25 on the RF substrate 604.

In various aspects, the antenna 53 may be configured in a closed loop-shape and the one or more RF conductor tracks 1106 may be directly coupled to the antenna 53 (e.g. in contrast to planar spiral conductor track structure described above), as illustrated in FIG. 15. In various aspect, the antenna 53 may be identical to the antenna substrate 602 and vice versa. As an example, the antenna 53 may be configured as a conductor loop.

The antenna substrate 602 may be mounted at the edge region of the RF substrate 604. As an example, the antenna substrate 602 may be fixed to the RF substrate 604 via an adhesive or mechanical clamping.

Figure 16A:
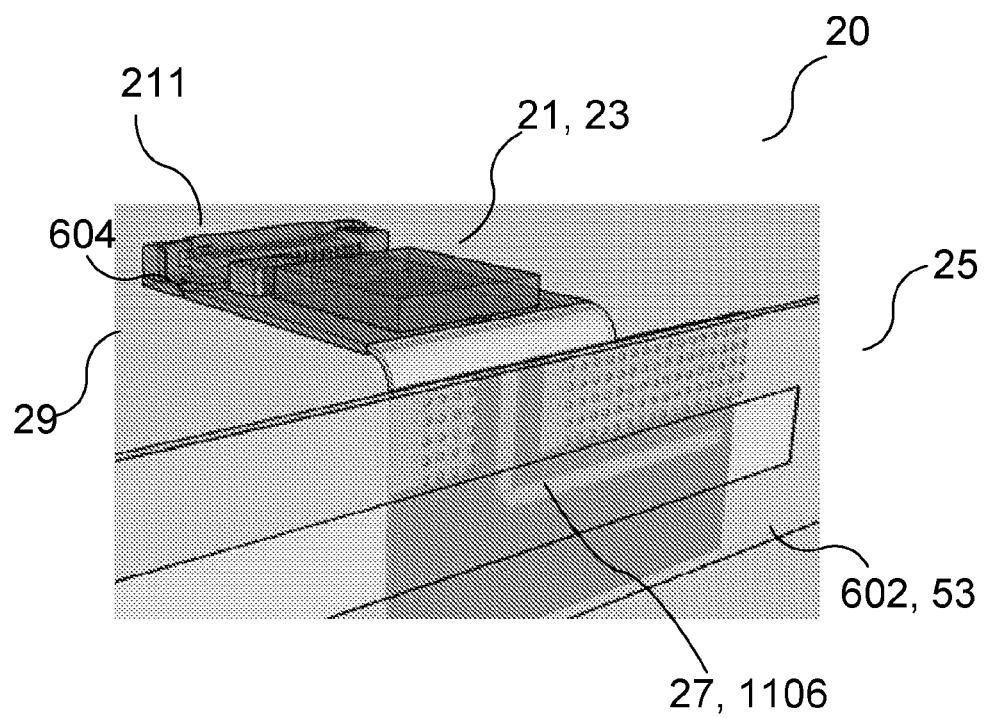

In various aspects, the antenna circuit 25 may be arranged in an angle to the RF substrate 604, as illustrated in FIG. 16A. Further illustrated in FIG. 16A, in various aspects, the one or more RF conductor tracks 1106 may include a first part and a second part. The first part may be arranged in an angle to the second part and wherein the antenna 53 may be arranged at least partially parallel to the second part.

Further, cable and connector losses, e.g. by copper and mismatch, may be reduced. Eliminating cable losses improves total RF performance of the distributed radiohead circuitry 20. In addition, overall cost of the distributed radiohead circuitry 20 can be reduced since a cable assembly and connectors, e.g. of a coaxial cable, are not required.

In various aspects, the one or more RF conductor tracks 1106 may be standardized. Thus, a plurality of different antenna circuits 25 may be connected to the radio frequency circuit 29 and any antenna circuit 25 may be connected to the radio frequency circuit 29 by a vendor. This way, the distributed radiohead circuitry 20 does not rely on an antenna circuit 25 on board (on the same RF substrate 604) of the radio frequency circuit 29. Thus, in various aspects, different types of antenna 53 may be used other than e.g. GSG. As an example, a radio frequency circuit 29 may be provided enabling multi-port antenna for SMC, single antenna MiMo/diversity, TBDC, etc. using the one or more RF conductor tracks 1106.

The one or more RF conductor tracks 1106 according to various aspects may facilitate a multi-feed support, e.g. using two or more separate antennas or array antennas. Alternatively or in addition, the RF one or more RF conductor tracks 1106 according to various aspects may facilitate methods to improve impedance matching. As an example, the one or more RF conductor tracks 1106 may include one or more stub or tap lines configured for impedance matching.

In various aspects, a direct feed may include one or more RF conductor tracks formed on a substrate or integrated in the substrate. The one or more RF conductor tracks may be formed in a single plane, e.g. metallization layer of a printed circuit substrate. The one or more RF conductor tracks may be configured as one or more linear conductor tracks. A first end of each of the one or more RF conductor tracks may be directly connected to the RF FE circuitry. However, there may be formed one or more further conductor tracks, e.g. one or more stub or tap lines, between the one or more RF conductor tracks 1106 and the RF FE circuit. A second end of each of the one or more RF conductor tracks 1106 may be floating.

The antenna 53 may be arranged in a predetermined distance to the one or more RF conductor tracks 1106. The predetermined distance corresponds to the frequency of the signals to be received or send using the antenna 53.

A physical connection member of the antenna circuit 25 and of the radio frequency circuit 29, e.g. a mechanical substrate connection structure (e.g. a plug-socket connection, an adhesive connection, a solder connection or a welding connection) may facilitate a mounting of the antenna circuit 25 at the RF circuit 29, e.g. independent from the electrical connection. Thus, a design freedom of the distributed radiohead circuitry 20 is increased according to various aspects.

The radio frequency FE-to-Ant connector (e.g. one or more RF conductor tracks 1106) may form together with the Ant-to-radio frequency FE connector (e.g. antenna planar spiral conductor track 1206) at least one radio frequency signal interface 27.

Figure 16B:
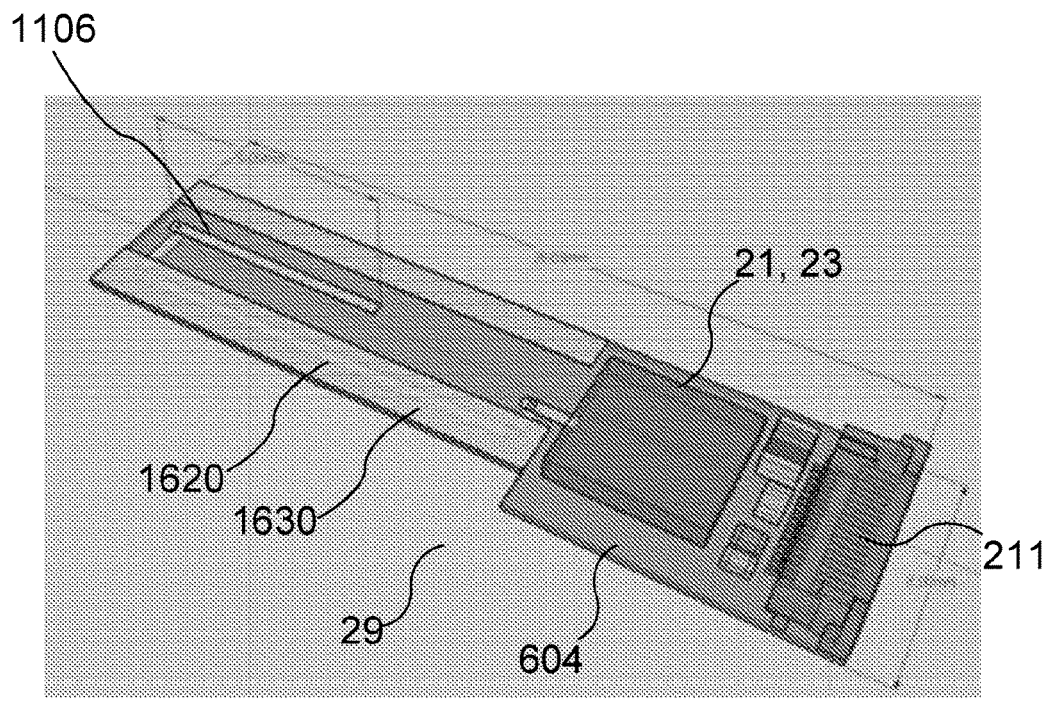
Figure 16C:
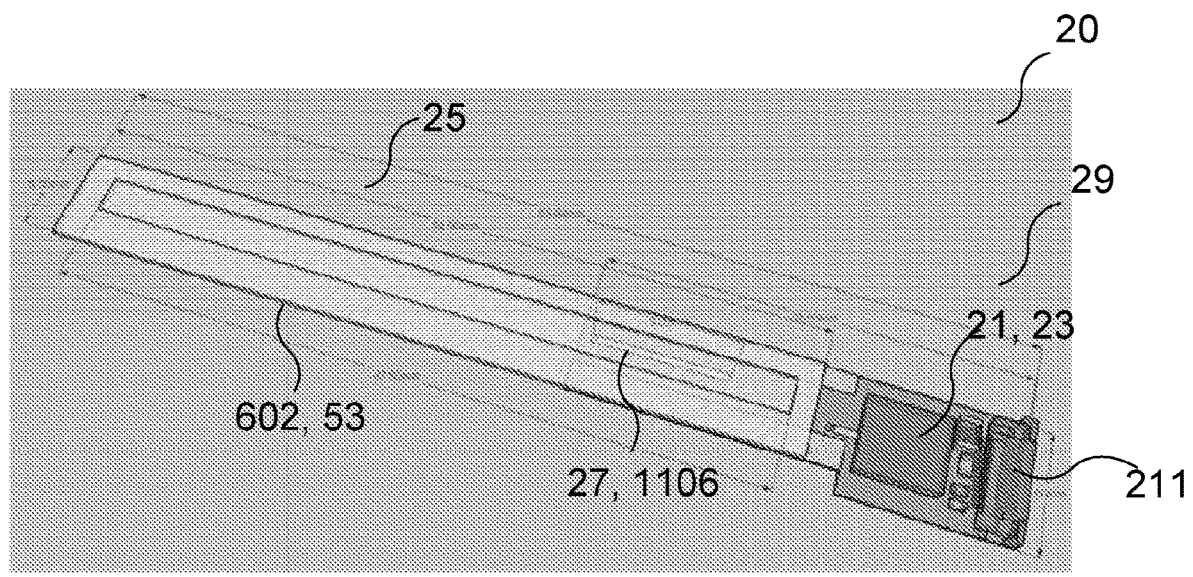

In various aspects, the conductor track 1106 is located at the output of the RF FE circuitry. The conductor track 1106 is used as a direct feed (also denoted as exciter feed) to a antenna 53, as illustrated in FIG. 16B and FIG. 16C. Here, FIG. 16B illustrates the RF circuit 29 and FIG. 16C illustrates the distributed radiohead circuitry 20 having the RF circuit 29 illustrated in FIG. 16B and an antenna circuit 25. The antenna circuit 25 includes an antenna 53 in the shape of a slot antenna that is directly coupled to the conductor track 1106. Illustratively, a single conductor track 1106 facilitates a distributed radiohead circuitry 20 having a single feed.

In various aspects, the conductor track 1106 may be coupled to a further conductor track 1620 that is coupled to the RF FE circuit. The further conductor track 1620 may be embedded (also denoted as buried) in the substrate 604. As an example, the substrate 604 may be a printed circuit board having at least two metallization planes and the conductor track 1106 and the further conductor track 1620 may be formed in different metallization planes of the printed circuit board and may be connected by VIAs. Thus, the connection of the conductor track 1106 with the RF FE circuit may be shielded regarding RF interferences. In addition, the conductor track may be positioned or disposed in a larger distance from the RF FE circuit and, thus, the RF interference at the RF FE circuit may be reduced.

In various aspects, the substrate 604 may include a radio frequency (RF) shielding structure 1630 configured to shield the further conductor track 1620 from RF interferences of the antenna 53. As an example, the RF shielding structure 1630 may be configured as a metal stripe that is formed between the antenna 53 and the further conductor track 1620, as illustrated in FIG. 16B and FIG. 16C.

In various aspects, adhesive ground pads (not illustrated) may fix (also denoted as mount) the antenna circuit 25 to the RF circuit 29. Thus, cable and connector losses may be reduced, e.g. copper and mismatch, and total RF performance is improved. In addition, this way, cost, e.g. total solution costs, and system complexity may be reduced. Further, a better integration of the distributed radiohead circuitry 20 into platforms, e.g. mobile communication devices, may be facilitated this way.

Figure 16D:
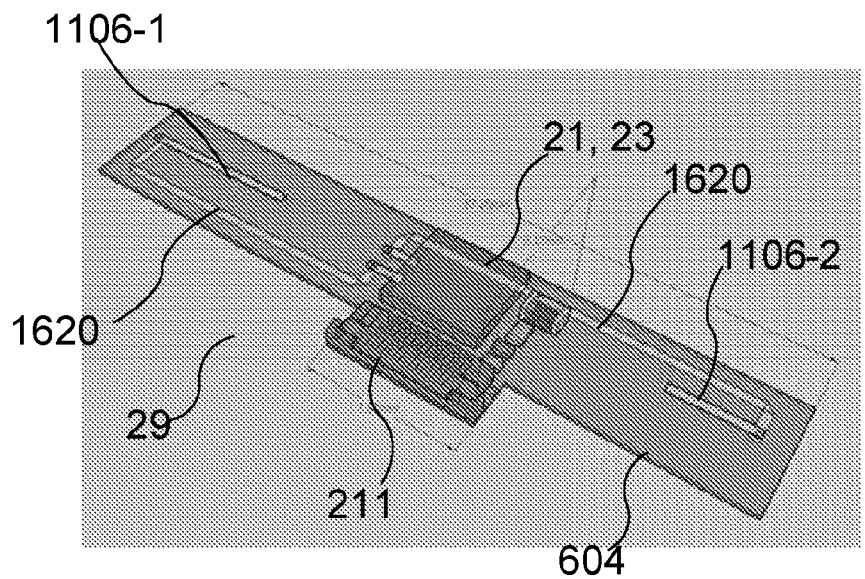
Figure 16E:
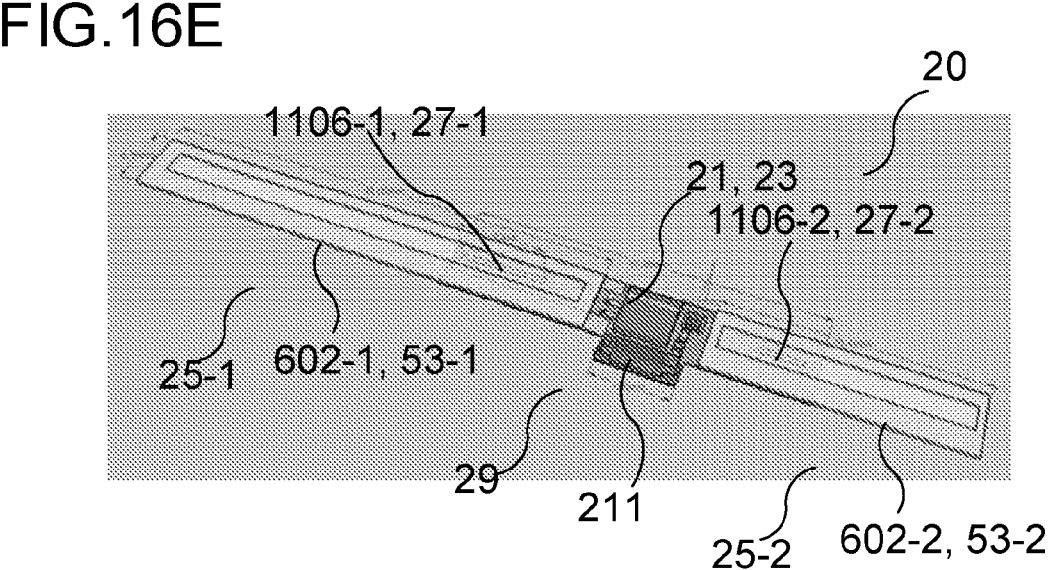
Figure 16F:
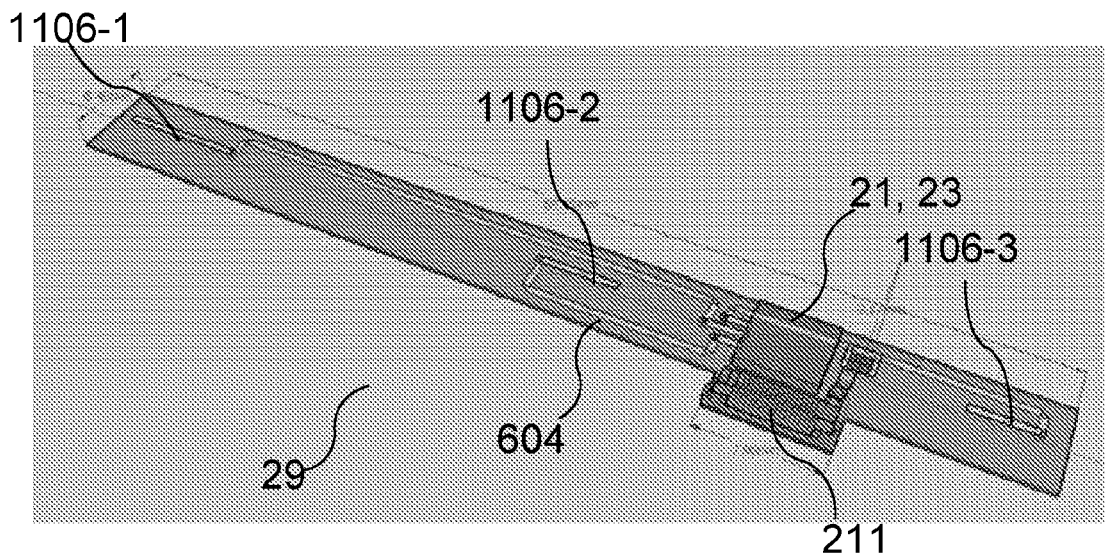
Figure 16G:
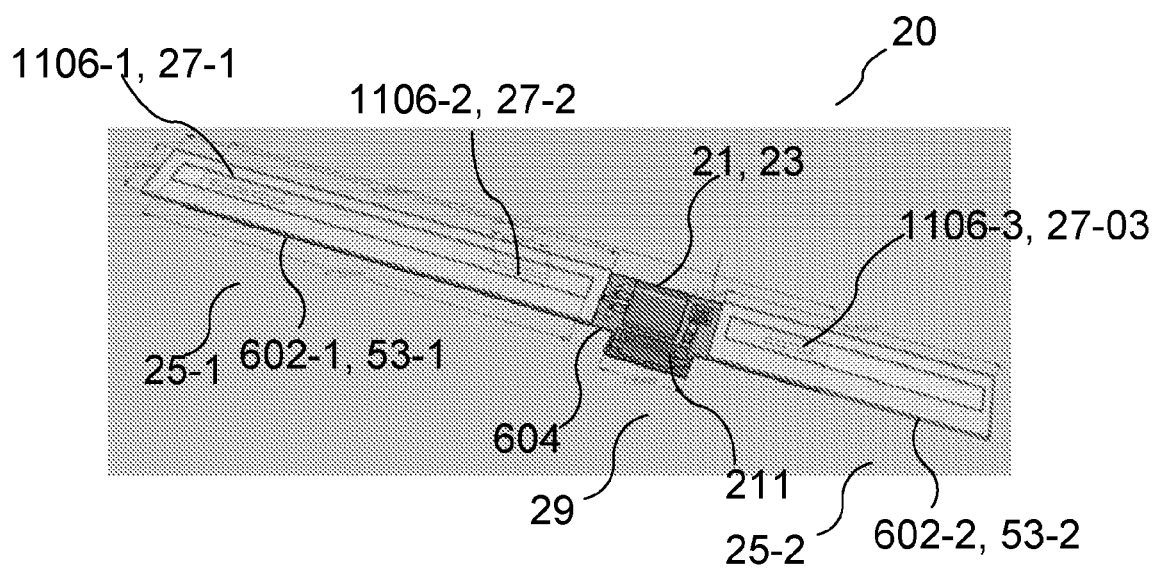

In various aspects, the RF circuit 29 may include at least a first conductor track 1106-1 configure to form a first RF signal interface 27-1 with a first antenna 53-1 and a second conductor track 1106-2 configure to form a second RF signal interface 27-2 with a second antenna 53-2, as illustrated in FIG. 16D and FIG. 16E. The first and second antennas 53-1, 53-2 may be configured for different frequency bands, as an example. Thus, a dual feed module may be facilitated. As described above, adhesive ground pads (not illustrated) may be used to fix the first and second antennas 53-1, 53-2 to the substrate 604 of the RF circuit 29. T However, in various aspects, more than two antennas 53 may be coupled to the RF circuit, as illustrated in FIG. 16F and FIG. 16G. Here, a first antenna 53-1, a second antenna 53-2 and a third antenna 53-3 are coupled to a RF FE circuit to form a first RF signal interface 27-1, a second RF signal interface 27-2 and a third RF signal interface 27-3. A first conductor track, a second conductor track and a third conductor track 1106-1, 1106-2, 1106-3 may be used to couple the first antenna, the second antenna and the third antenna 53-1, 53-2, 53-3 to the RF FE circuit independently from each other. The first antenna, the second antenna and the third antenna 53-1, 53-2, 53-3 may be different from each other, e.g. configured for different frequency bands, e.g. LB, BB and MB. Alternatively, one or more antennas may be configured for the same frequency band but for different polarizations and/or separated from each other to avoid multi-path and/or local interference signal loss.

Another important issue in positioning the radiohead circuitry 20 in proximity to the antenna 53 is the packaging of the circuitries. The packaging is challenging with respect to various aspects like size signal interference and others.

Figure 17:
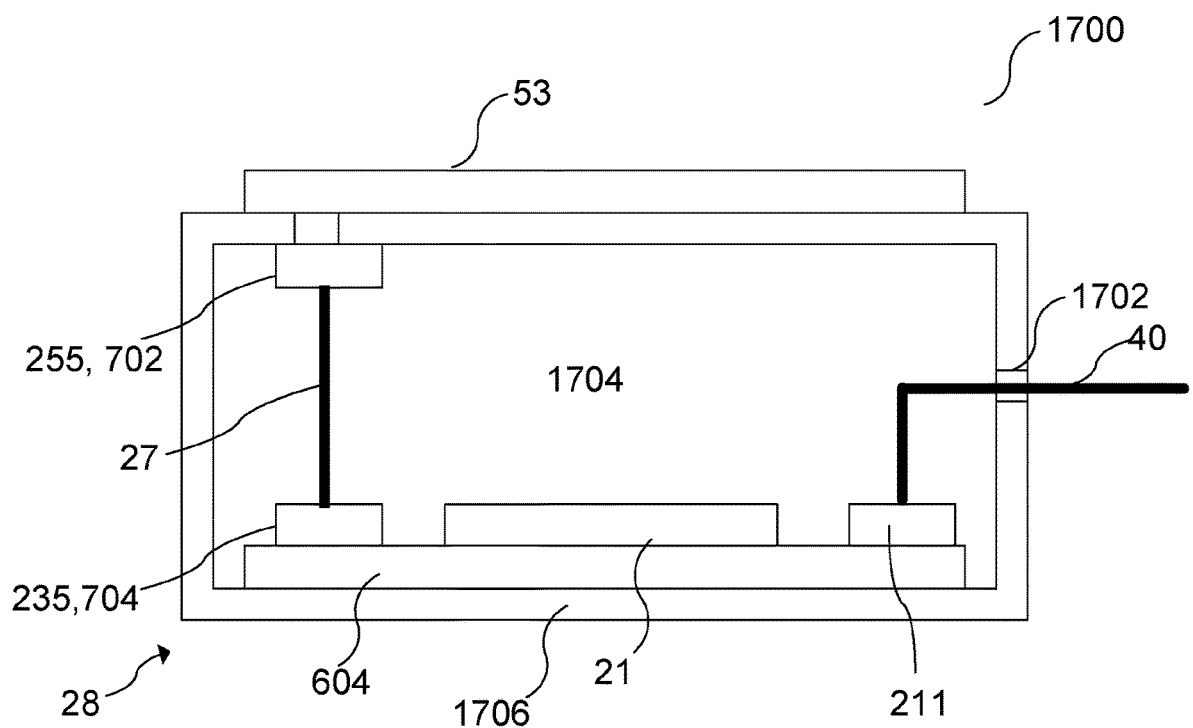
FIG. 17 exemplarily shows a schematic cross-sectional view of a distributed radiohead device including an enclosure including the distributed radiohead circuitry in accordance with various aspects of the present disclosure.
Figure 18:
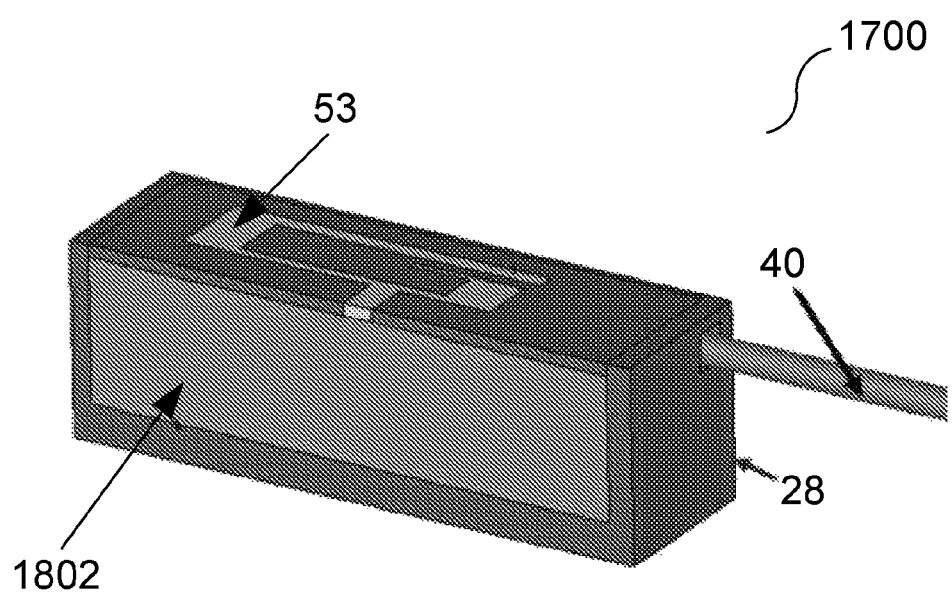
FIGS. 18 and 19 exemplarily show illustrative examples of the enclosure of FIG. 17 in accordance with various aspects of the present disclosure.
Figure 19:
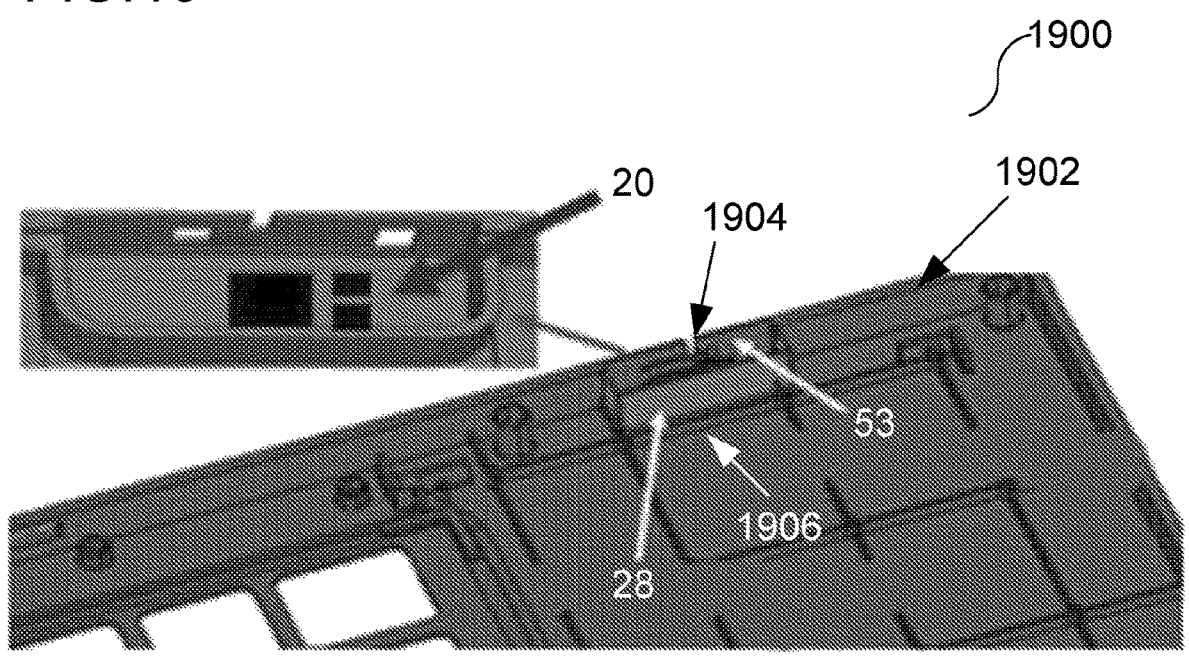

The antenna circuit 25 and the radio frequency circuit 29 may be configured according to one of the aspects described above and may be positioned or disposed in an enclosure 28, as illustrated in FIG. 17 to FIG. 19. FIG. 17 illustrates a schematic cross-sectional view of a distributed radiohead device 1700 including an enclosure 28 including the antenna circuit 25 and the RF circuit. FIG. 18 and FIG. 19 illustrate illustrative examples.

The enclosure 28 may be at least partially formed of a conductive, e.g. electrically conductive structure 1706 formed in or on electrically insulating material, such as e.g. mold material or any other suitable electrically insulating encapsulating material, and enclosing a cavity structure 1704 such that the cavity structure 1704 is substantially free (in other words shielded) from radio frequency signals from the outside of the distributed radiohead device 20. The RF substrate 604 and the Ant-to-RF FE connector 235 may be arranged in the cavity structure 1704 and the antenna 53 may be at least partially arranged on the conductive, e.g. electrically conductive structure 1706 of the enclosure 28 outside of the cavity structure 1704.

In other words, the enclosure 28 may include a cavity structure 1704. The cavity structure 1704 may be surrounded by a conductive, e.g. electrically conductive structure 1706 and an electrically insulating structure 1802 (also denoted as dielectric structure 1802, as an example of the encapsulating material). The enclosure 28 may be configured such that the cavity structure 1704 may be substantially free from radio frequency signals from the outside of the distributed radiohead device 1700 e.g. a Faraday cage structure. Illustratively, the design of the enclosure 28 promotes a common RF shield for the RF circuit and the antenna circuit. In other words, the distributed radiohead device 1700 is configured in various aspects such that the RF circuit and the antenna 53 share a common RF shield and, thus, are substantially free of RF interferences. This way, the distributed radiohead device 1700 may be minimized and the length of the interconnect between the antenna and the RF circuit may be minimized.

The antenna design with conductive, e.g. electrically conductive structure 1706 of the enclosure 28 forms a box kind of structure surrounding the cavity structure 1704. The RF circuit may be placed in the cavity structure 1704. The enclosure 28 may work as RF shield to protect the RF circuit from system noise. In various aspects, conductive, e.g. electrically conductive sides of the enclosure 28 may be configured to have metal surfaces. This way, a better radiation performance in Lid close and tablet mode may be realized. Further, no additional place may be required to place the RF circuit as the RF circuit is arranged in the cavity structure 1704 inside the enclosure 28. Thus, the RF circuit in the cavity structure 1704 of the enclosure 28 may be placed in a radio frequency interference immune location. In various aspects, the enclosure 28 may provide a compact and robust design for a distributed radiohead device 1700.

The enclosure 28 may include at least one trough hole 1702 and the RF substrate 604 further may include a further substrate connection structure 211. A digital connection structure 40 (e.g. a digital signal interface 40) may be coupled to the further substrate connection structure 211 passing through the trough hole 1702 to connect the RF IC circuitry 23 to the outside of the distributed radiohead device 20. In other words, the enclosure 28 may include at least one trough hole 1702. A connector, e.g. a cable, e.g. a flat cable, 40, may be coupled with a first end to a terminal or pad of the RF circuit. A second end of the connector may be coupled with an electronic device outside of the distributed radiohead device 1700, e.g. a baseband circuit. The connector may pass through the trough hole 1702 to the outside of the distributed radiohead device 1700.

In various aspects, the antenna 53 may be in direct contact with the enclosure 28.

The conductive, e.g. electrically conductive structure 1706 may include one or more metal walls. As an example, the enclosure 28 may be formed in the shape of a box. Alternatively or in addition, the conductive, e.g. electrically conductive structure 1706 may include one or more metal or metal-coated sheets. As an example, the enclosure 28 may be formed in the shape of an envelope. The enclosure 28 may be substantially formed from metal and thus may provide a thin and light system design.

The enclosure 28 may include a first part and a second part in direct contact with the first part. The RF substrate 604 may be arranged on the second part. Alternatively, the enclosure 28 may include a bottom part and a top part opposite of the bottom part. The RF substrate 604 may be arranged on the bottom part. The top part may be arranged in a distance to the bottom part. The distance may correspond to a length associated with a frequency of a RF signal transmitted by the antenna 53.

The enclosure 28 may further include a dielectric structure 1802 at least partially surrounding the cavity structure 1704, as illustrated in FIG. 18. The dielectric structure 1802 may be a radio frequency window.

The enclosure 28 may be configured as a built-in module for a smartphone, a tablet computer or a laptop. As an illustrative example, a mobile communication device 1900 (e.g. a smartphone, a tablet computer or a laptop) may include a housing 1902 that may include an opening 1904, a mounting structure 1906 adjacent to the opening 1904 and a distributed radiohead device 20 in the mounting structure 1906. The distributed radiohead device 20 may be configured according to any one of the described aspects, e.g. as illustrated FIG. 17 and FIG. 18. The enclosure 28 may include the dielectric structure 1802 at least partially surrounding the cavity structure 1704 and the dielectric structure 1802 may be a radio frequency window. The radio frequency window may be positioned or disposed to face the opening 1904 of the housing 1902.

As already mentioned above, a challenge in housing and/or encapsulating the antenna circuitry and the radiohead circuitry 20 is the reduction or avoidance of interferences.

A platform may include circuits or circuitry that are susceptible to interference or prone to causing interference in other circuits or circuitry. For example, a platform may include RF circuitry (e.g., RFICs) that provide emission in a RF range and additional circuits (e.g., a Radiohead circuit) that are susceptible to interference in the RF range. In addition, interfaces between antenna circuitry and other devices (e.g., the radiohead circuitry) may provide emissions in the RF range that may cause interference within the RF circuitry, the radiohead circuitry, or the other circuits or circuitry.

The platform may include an enclosure to shield the circuits or circuitry from interference from external devices. In addition, the platform may include an RF window to permit transmissions from the antenna circuitry to exit the enclosure. However, the platform may not shield the circuits or circuitry from interference from internal devices (e.g., the antenna circuitry, the RF circuitry, the radiohead circuitry, etc.). This may be due to the antenna circuitry, the RF circuitry, the radiohead circuitry, etc. being positioned or disposed inside the platform.

Some aspects described in the present disclosure may isolate the circuits or circuitry from interference due to both external devices and the internal devices (e.g., the antenna circuitry, the RF circuitry, the radiohead circuitry, etc.). The circuits or circuitry may be isolated from both external devices and internal due to the circuits or circuitry (e.g., the antenna circuitry, the RF circuitry, the radiohead circuitry, etc.) being positioned or disposed outside the platform. In some aspects, the antenna circuitry and the other devices (e.g., the RF circuitry, the radiohead circuitry, the antenna circuitry, or some combination thereof) may be isolated from the platform and external devices using an enclosure that defines at least one volume. The RF circuitry, the radiohead circuitry, the antenna circuitry, or some combination thereof may be physically positioned or disposed within the at least one volume to shield the RF circuitry, the radiohead circuitry, the antenna circuitry, or some combination thereof from interference due to the platform.

Therefore, some aspects described in the present disclosure may provide RF shielding that is shared between the RF circuitry, the radiohead circuitry, the antenna circuitry, or some combination thereof. In addition, some aspects described in the present disclosure may mitigate interference between the antenna circuitry, the RF circuitry, and the radiohead circuitry. In addition, at least one aspect described in the present disclosure may provide increased thermal regulation of the RF circuitry using thermal interface material (TIM). In addition, at least one aspect described in the present disclosure may reduce a length of an interface device between the Radiohead circuit and the antenna circuitry.

Figure 20:
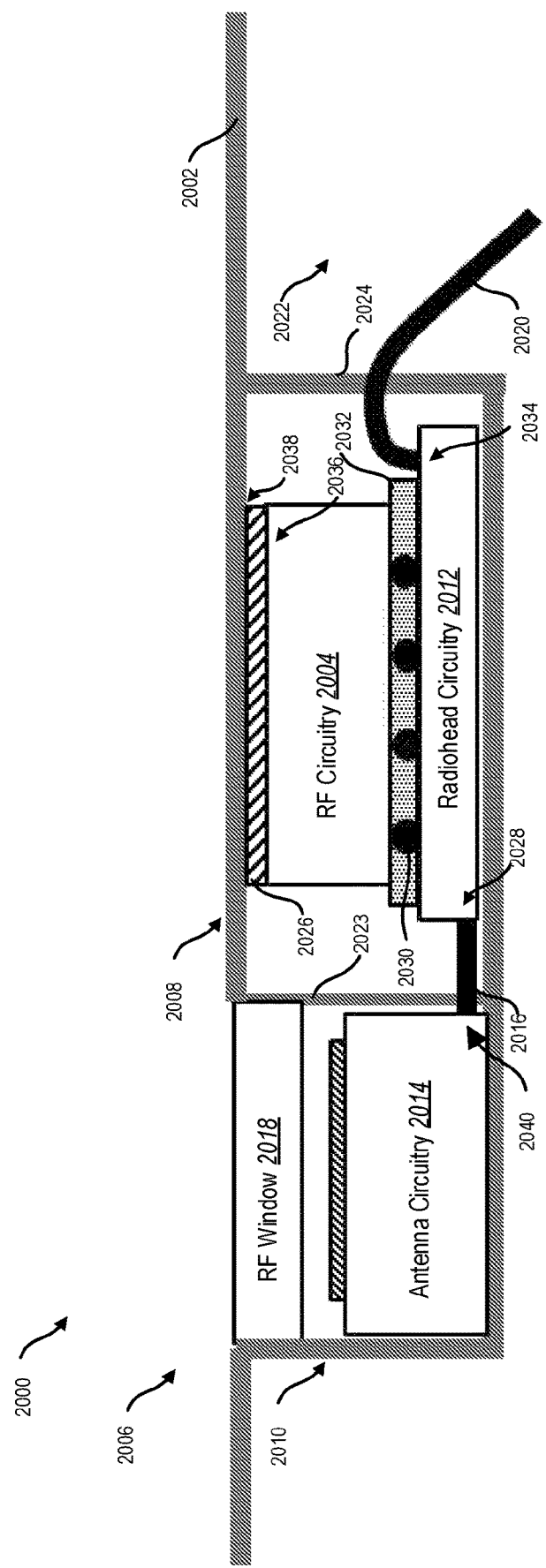
FIG. 20 exemplarily shows a partial view of a radio device platform in accordance with various aspects of the present disclosure.

FIG. 20 illustrates a partial view of an example radio device platform 2000, in accordance with at least one aspect described in the present disclosure. The radio device platform 2000 may include a housing 2002, an enclosure 2006, a Radiohead circuit 2012, RF circuitry 2004, and antenna circuitry 2014. The radio device platform 2000 may be implemented with any other appropriate system described in the present disclosure. The Radiohead circuit 2012 may be the same as or similar to other Radiohead circuits described in the present disclosure (e.g., distributed radiohead unit 20). The RF circuitry 2004 may be the same as or similar to other RF circuits or RF circuitry described in the present disclosure (e.g., RF IC circuitry 21). The antenna circuitry 2014 may be the same as or similar to other antenna circuitry described in the present disclosure (e.g., antenna circuit 25).

The enclosure 2006 may define a first volume 2008 and a second volume 2010. As illustrated in FIG. 20, the radiohead circuitry 2012 and the RF circuitry 2004 may be physically positioned or disposed within the first volume 2008 and the antenna circuitry 2014 may be physically positioned or disposed within the second volume 2010. Alternatively, the radiohead circuitry 2012, the RF circuitry 2004, and the antenna circuitry 2014 may be physically positioned or disposed within different volumes than illustrated in FIG. 20. In addition, the radio device platform 2000 may include a RF window 2018 that defines a portion of the second volume 2010. Further, the radiohead circuitry 2012, the RF circuitry 2004, and the antenna circuitry 2014 may be mechanically coupled to the enclosure 2006.

The radio device platform 2000 may include TIM 2026. In some aspects, the TIM 2026 may mechanically couple the RF circuitry 2004 to the enclosure 2006. In these and other aspects, the TIM 2026 may be mechanically coupled to a surface 2036 of the RF circuitry 2004 and to a surface 2038 of the enclosure 2006. In addition, the TIM 2026 may extend from the surface 2036 of the RF circuitry 2004 to the surface 2038 of the enclosure 2006.

Further, the radio device platform 2000 may include a first shielded interface device 2016. The first shielded interface device 2016 may be electrically coupled to a terminal 2028 of the radiohead circuitry 2012 and a terminal 2040 of the antenna circuitry 2014. In some aspects, the first shielded interface device 2016 may extend between the radiohead circuitry 2012 and the antenna circuitry 2014 via a sidewall 2023 of the enclosure 2006. In other words, the first shielded interface device 2016 may electrically couple the radiohead circuitry 2012 to the antenna circuitry 2014 through the sidewall 2023.

The radio device platform 2000 may include a second shielded interface device 2020. The second shielded interface device 2016 may be electrically coupled to another terminal 2034 of the radiohead circuitry 2012. In some aspects, the second shielded interface device 2020 may extend from the radiohead circuitry 2012 to an external volume 2022 through a sidewall 2024 of the enclosure 2006. In these and other aspects, the second shielded interface device 2020 may also be electrically coupled to an external device (not illustrated) to provide signals between the external device and the radiohead circuitry 2012. For example, the external device may provide control signals or signals to be transmitted.

The RF circuitry 2004 may include a ball grid array (BGA) 2030 and an underfill layer 2032. In some aspects, the BGA 2030 may electrically couple the RF circuitry 2014 to the radiohead circuitry 2012. In these and other aspects, the BGA 2030, the underfill layer 2032, or some combination thereof may mechanically couple the RF circuitry 2014 to the radiohead circuitry 2012.

The enclosure of a platform may shield RF circuitry and a radiohead circuitry from interference due to antenna circuitry 25. For example, the enclosure may define a first volume in which the RF circuitry and the radiohead circuitry are physically positioned or disposed and a second volume in which the antenna circuitry is physically positioned or disposed. In addition, the enclosure may shield the RF circuitry, the radiohead circuitry, and the antenna circuitry from interference due to external devices or other devices within the platform.

In some aspects, the platform may include a RF window that modifies one or more radio signals transmitted by the antenna circuitry. For example, the RF window may permit the radio signals transmitted by the antenna circuitry to exit the second volume in a predefined direction. In some aspects, the RF window may include a transparent material. In other aspects, the RF window may include a lens. In these and other aspects, the RF window may include a material that creates impedance to cause loss in the radio signals transmitted by the antenna circuitry. In addition, the RF window creating impedance may prevent radio signals from external devices from entering the second volume via the RF window due to the loss caused by the material.

In some aspects, a distance between the antenna circuitry and the RF window may be based on the material of the RF window, the frequency of the radio signals to be transmitted by the antenna circuitry, the amplitude of the radio signals transmitted by the antenna circuitry, or some combination thereof. In these and other aspects, the distance between the antenna circuitry and the RF window may prevent reflections of the transmitted radio signals from occurring.

In some aspects, the TIM may operate as a heat sink to transfer heat from the RF circuitry to the housing of the platform. In these and other aspects, the TIM may also electrically isolate or electrically insulate the RF circuitry from the housing of the enclosure. Alternatively, the TIM may also electrically couple the RF circuitry to the housing of the enclosure to ground a portion of the RF circuitry.

In some aspects, the TIM may be physically positioned or disposed between the radiohead circuitry and the enclosure. The TIM may mechanically couple the radiohead circuitry to the enclosure. In addition, the TIM may operate as a heat sink to transfer heat from the radiohead circuitry to the housing of the platform. In some aspects, the TIM may be physically positioned or disposed between the antenna circuitry and the enclosure. The TIM may mechanically couple the antenna circuitry to the enclosure. In addition, the TIM may operate as a heat sink to transfer heat from the antenna circuitry to the housing of the platform. In these and other aspects, the TIM may also electrically isolate or electrically insulate the radiohead circuitry, the antenna circuitry, or some combination thereof from the housing of the enclosure.

If the antenna circuitry was not shielded from the RF circuitry and the radiohead circuitry by the enclosure, a distance between the antenna circuitry and radiohead circuitry, the RF circuitry, or some combination thereof may be increased which may increase a length of a first shielding interface. The length of the first shielding interface may be reduced due to the antenna circuitry being shielded from the RF circuitry and the radiohead circuitry by the enclosure. The first shielding interface, the second shielding interface, or some combination thereof may include a metal wrap, braided strands of metal, spiral windings of metal, or some combination thereof. In some aspects, the first shielding interface, the second shielding interface, or some combination thereof may include a ferrite bid on a coaxial cable, grounding points of an outer conductor, a flexible PCB (e.g., flexible printed circuitry (FPC)) that includes coppers layers, or some combination thereof. The ferrite bid on the coaxial cable may reduce or otherwise remove outer conductor current of the first shielding interface or the second shielding interface within the enclosure. The grounding points of the outer conductor may be routed from the enclosure inside the platform to reduce or remove outer conductor current radiation of the first shielding interface or the second shielding interface within the enclosure. In some aspects, the flexible PCB may include microstrip traces, striplines, or some combination thereof. The flexible PCB may include the copper layers, for example, two to three copper layers, to implement single side solid ground referencing of the microstrip traces or top and bottom double side ground contacts to shield the housing (e.g., enclosures) of the RF circuitry, the antenna circuitry, or some combination thereof. In some aspects, the radiohead circuitry may receive control signals, signals to be transmitted, or some combination thereof via the second shielded interface device.

In some aspects, the enclosure may define a single opening in which the antenna circuitry, the RF circuitry, and the radiohead circuitry are physically positioned or disposed. In these and other aspects, the RF circuitry may include a shielding device configured to prevent the RF circuitry from providing interference. In addition, the shielding device may prevent the RF circuitry from being exposed to interference. In some aspects, the radiohead circuitry may include a Radiohead shielding device to shield the radiohead circuitry from interference of the RF circuitry, the antenna circuitry, or some combination thereof.

In some aspects, the enclosure may include a metal material to shield the radiohead circuitry, the RF circuitry, and the antenna circuitry from interference. In addition, the metal material of the enclosure may create a faraday cage around the radiohead circuitry, the RF circuitry, the antenna circuitry, or some combination thereof to shield these circuits or circuitry or to prevent these circuits or circuitry from interfering with other circuits or circuitry within the platform.

A radiofrequency circuit may conventionally be connected to one or more antennas for transmission and/or reception of wireless signals. In a multi-band context, it is common to connect a radiofrequency circuitry to a plurality of antennas. Each antenna is configured for operation in a different radiofrequency band and/or with a different wireless technology (e.g. a first antenna configured to transmit one or more Bluetooth signals and a second antenna configured to transmit one or more Wi-Fi signals). In this configuration, coaxial cables are conventionally used to carry the electrical signal between the radiofrequency circuit and the antennas.

Figure 21:
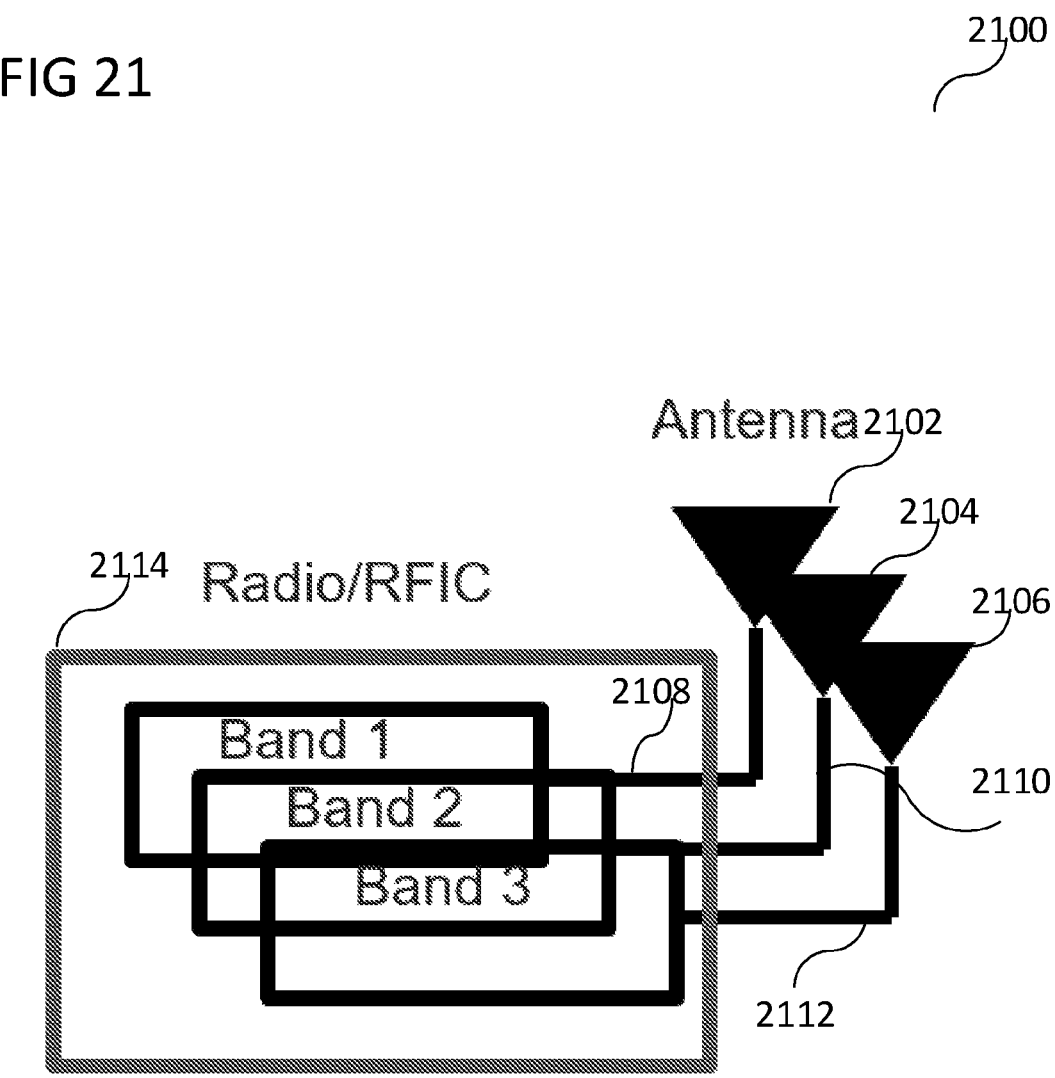
FIG. 21 exemplarily shows a conventional configuration of a radiofrequency circuitry.

FIG. 21 shows a conventional configuration 2100 of a radiofrequency circuitry 2114, connected to one or more antennas 2102, 2104, 2106 via coaxial cables 2108, 2110, 2112. In this configuration, the radiofrequency circuit 2114 is configured to transmit and/or receive wireless signals on any of three different bands. The radiofrequency circuitry 2114 is electrically conductively connected to three different antennas 2102, 2104, 2106, said connections being established via three coaxial cables 2108, 2110, 2112, each coaxial cable 2108, 2110, 2112 connecting a terminal of the radiofrequency circuitry 2114 to a terminal of one of the plurality of antennas 2102, 2104, 2106.

This conventional approach may have any of several disadvantages. First, coaxial cables may be expensive and thus may add unnecessary or unacceptable costs to a radiofrequency device. Second, coaxial cables may be bulky and may thus be undesirable in some implementations, such as where compactness or miniaturization are particularly important. Third, the use of coaxial cables is associated with insertion loss. This may be due, for example, to a length of the coaxial cable, loss occurring due to the connector between the radiofrequency circuit and the coaxial cable, or between the coaxial cable and the antenna, or otherwise. Finally, coaxial cables require connection between the radiofrequency circuit and the one or more antennas, thereby increasing complexity of manufacturing and/or set up. In light of the foregoing, it may be desired to connect the radiofrequency circuit to the one or more antennas without coaxial cables.

A radiofrequency circuit and one or more antennas may be integrated together in a combined package. This may include having the radiofrequency circuit and at least one antenna on a common substrate. The common substrate may be or include a common printed circuit board.

Figure 22:
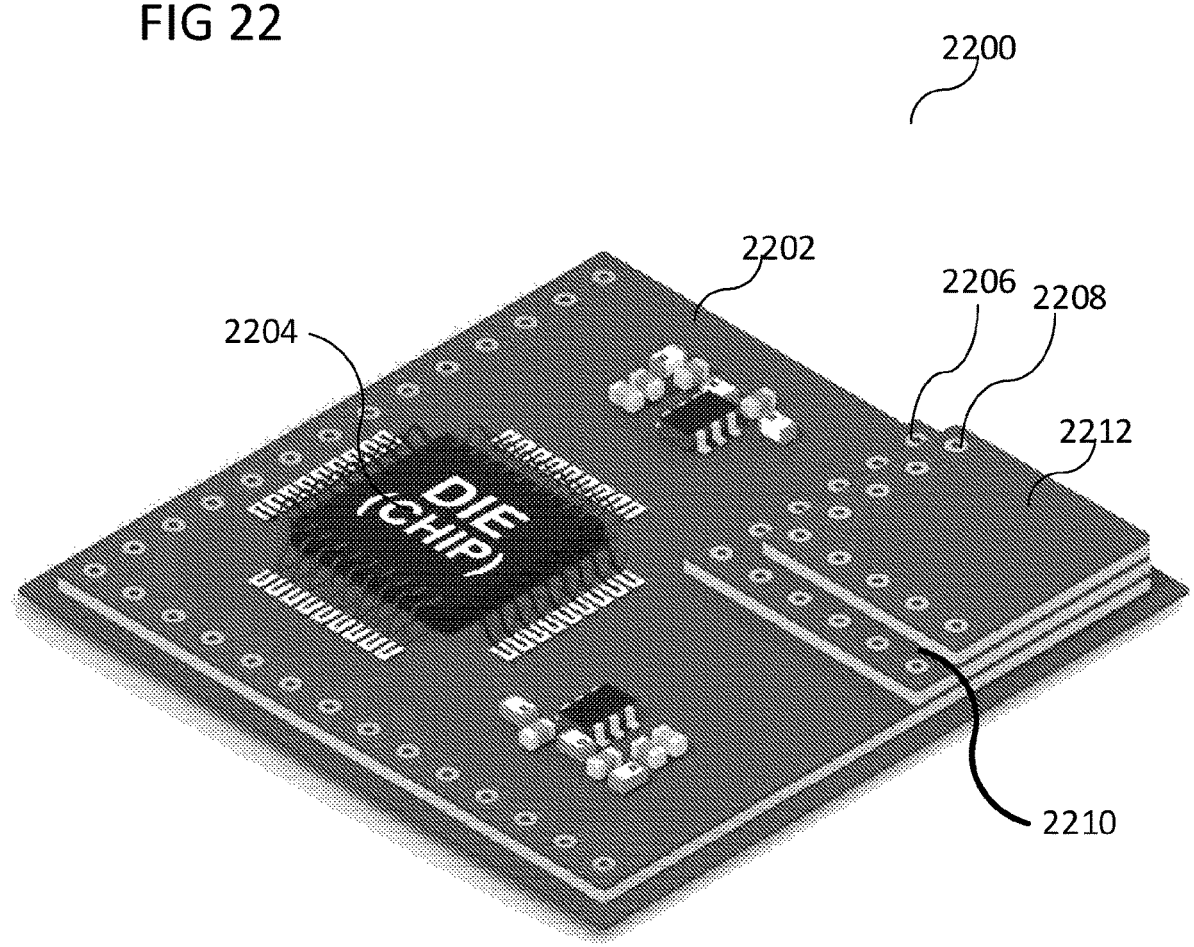
FIG. 22 exemplarily shows a radiofrequency circuit and antenna package in accordance with various aspects of the present disclosure.

FIG. 22 depicts a radiofrequency circuit and antenna package 2200, according to an aspect of the disclosure. In this figure, the radiofrequency circuit antenna package 2200 includes a base substrate 2202, a radiofrequency circuitry 2204, and a plurality of antennas, including a first antenna 2206 (e.g. mounted on or formed in a first antenna substrate 2210) and a second antenna 2208 (e.g. mounted on or formed in a second antenna substrate 2210). The radiofrequency circuitry 2204 is mounted on the base substrate 2202. The radiofrequency circuitry 2204 may be configured to operate in any of a plurality of frequency bands. The radiofrequency circuitry 2204 may include a plurality of transceivers, which may each be configured to receive and/or transmit in any of a plurality of wireless communication frequency bands, such that the radiofrequency circuitry 2204 can simultaneously or concurrently transmit and/or receive in a plurality of radiofrequency bands.

The first antenna substrate 2210 may be mounted on the base substrate 2202 and the first antenna 2206 may be configured to operate in a first wireless frequency band. The second antenna substrate 2212 may be mounted on the first antenna substrate 2210 and the second antenna 2208 may be configured to operate in a second wireless frequency band (which may be different from, e.g. non-overlapping or only partially overlapping with the first wireless frequency band). The second antenna substrate 2212 is depicted herein as being mounted on the first antenna substrate 2210, although other configurations are also possible. For example, the second antenna substrate 2212 may be mounted on an upper side (e.g. a side on which the radiofrequency circuitry 2204 is mounted) of the base substrate 2202, or on an underside (e.g. a side opposite the side on which the radiofrequency circuit 2204 is mounted) of the base substrate 2202.

The base substrate 2206 (as well as the first antenna substrate 2210 and/or the second antenna substrate 2212) may be, for example, a printed circuit board. In such a configuration, it may be possible to select from a variety of printed circuit board types, and the specific type of circuit board should not be understood as limiting. Possible types of circuit boards for the radiofrequency and antenna package described herein include, but are not limited to, single layer printed circuit boards, multiple layer printed circuit boards, laminated circuit boards, or otherwise.

The one or more antennas may be configured as one or more substrate integrated waveguide antennas. A substrate integrated waveguide antenna may include one or more rows of narrowly placed metallic connectors (e.g. vias) within a substrate. These metallic connections may emulate a thin rectangular waveguide and may function as an antenna. The details of how to design a substrate integrated waveguide antenna for a particular frequency or frequency band will be understood by the skilled person, and therefore such details will not be recited herein.

Figure 23:
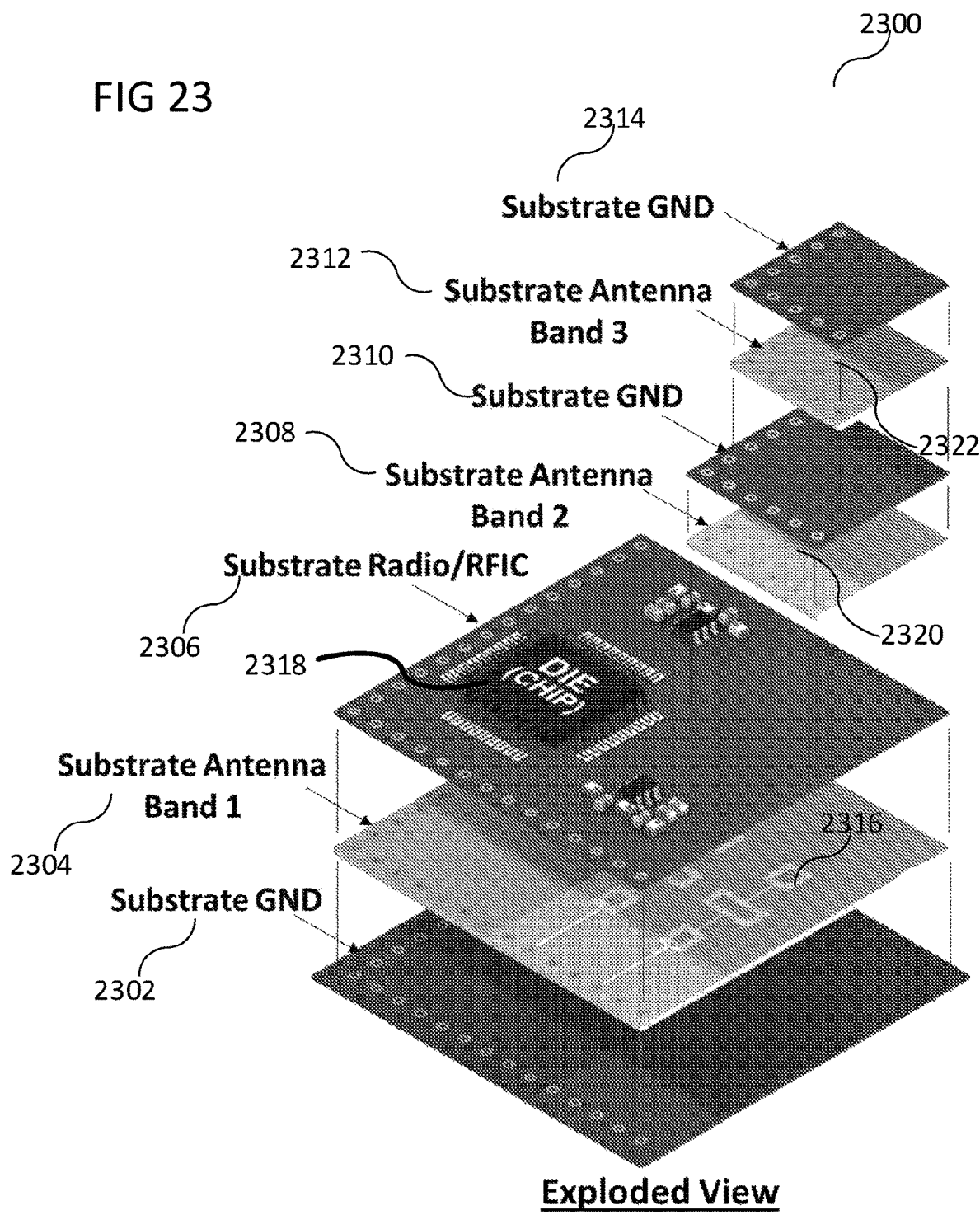
FIG. 23 exemplarily shows the radiofrequency circuit and antenna package of FIG. 22 in exploded view.

FIG. 23 depicts a radiofrequency circuitry and antenna package 2300, according to various aspects of the disclosure. In this figure, the radiofrequency circuitry and antenna package 2300 includes a plurality of substrates 2302, 2304, 2306, 2308, 2310, 2312, 2314, e.g.

- a first grounding substrate 2302 providing a first grounding potential terminal and a first grounding potential for a first antenna 2316 configured to operate in a first wireless frequency band;
- a first antenna substrate 2304 (e.g. mounted on the first grounding substrate 2302); the first antenna 2316 may be formed on and/or in the first antenna substrate 2304;
- a radiofrequency circuitry substrate 2306 (e.g. mounted on the first antenna substrate 2304); the radiofrequency circuitry 2318 may be mounted on the radiofrequency circuitry substrate 2306;
- a second antenna substrate 2308 (e.g. mounted on the radiofrequency circuitry substrate 2306); a second antenna 2320 configured to operate in a second wireless frequency band (which may be different from, e.g. non-overlapping or only partially overlapping with the first wireless frequency band) may be formed on and/or in the second antenna substrate 2308;
- a second grounding substrate 2310 (e.g. mounted on the second antenna substrate 2308) providing a second grounding potential terminal and a second grounding potential for the second antenna 2320;
- a third antenna substrate 2312 (e.g. mounted on the second grounding substrate 2310); a third antenna 2322 configured to operate in a third wireless frequency band (which may be different from, e.g. non-overlapping or only partially overlapping with the first wireless frequency band and/or with the second wireless frequency band) may be formed on and/or in the third antenna substrate 2312; and a third grounding substrate 2314 (e.g. mounted on the third antenna substrate 2312) providing a third grounding potential terminal and a third grounding potential for the third antenna 2322.

Due to the nature of the antennas 2316, 2320, 2322, and/or in order to provide sufficient isolation between the antennas 2316, 2320, 2322, it may be provided to implement one or more grounding substrates 2302, 2308, 2312 on the outside of the antennas 2316, 2320, 2322. For example, as described above, the first antenna substrate 2304 (including the first antenna 2316) may be positioned or disposed between the first grounding substrate 2302 and the radiofrequency circuitry substrate 2306 (including the radiofrequency circuitry 2318); the second antenna substrate 2308 may be between the radiofrequency circuitry substrate 2306 and the second grounding substrate 2310; and the third antenna substrate 2312 may be between the second grounding substrate 2310 and the third grounding substrate 2314. The radiofrequency (integrated) circuitry 2306 may include a plurality of terminals. At least some of the terminals are electrically conductively connected to one or more of the first antenna substrate 2304 (and the first antenna 2316), the second antenna substrate 2308 (and the second antenna 2320), and the third antenna substrate 2312 (and the third antenna 2322).

Figure 24:
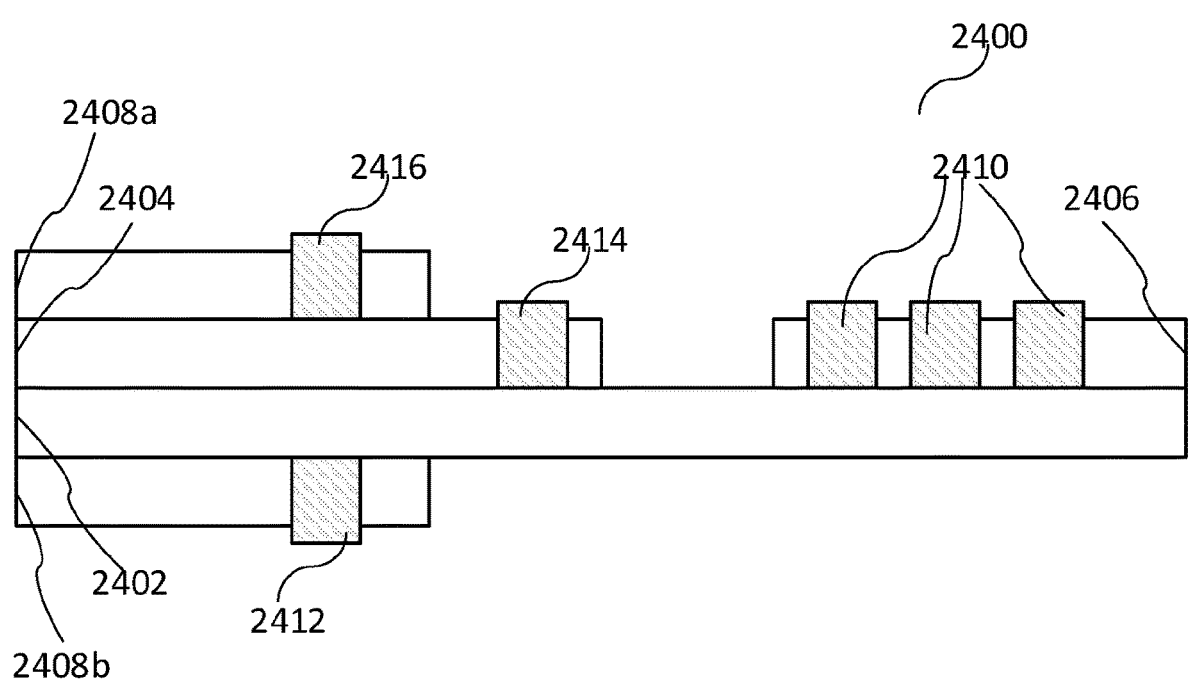
FIG. 24 exemplarily shows a radiofrequency circuit and antenna package in accordance with various aspects of the present disclosure.

FIG. 24 depicts a radiofrequency circuitry and antenna package 2400, according to another aspect of the disclosure. In this example, the radiofrequency circuitry and antenna package 2400 includes a base substrate 2402, and a radiofrequency circuitry substrate 2406 (including one or more radiofrequency circuitries) mounted on the base substrate 2402. The radiofrequency circuitry and antenna package 2400 may include one or more waveguide antenna substrates (each including one or more waveguide antennas), which are depicted herein as a first waveguide antenna substrate 2404, and a second waveguide antenna substrate, which may be positioned or disposed on the first waveguide antenna substrate 2404 (as shown in reference number 2408a) or directly on the base substrate 2402 (as shown in reference number 2408b) on a side opposite to the radiofrequency circuitry substrate 2404. In this case, to the extent that the second waveguide antenna substrate is depicted as being placed on the first waveguide antenna substrate 2404, as in 2408b, the second waveguide antenna substrate may be placed on top of the waveguide antenna substrate 2404 (and thus over the base substrate 2402 or on the bottom of the base substrate 2402, as desired. Considerations for placement may include, but are not limited to, substrate surface availability, maximum component height/depth, interference from other devices, or otherwise.

The radiofrequency circuitry 2406 may include one or more terminals 2410, each of which may be electrically conductively connected to a terminal of the one or more antennas 2412, 2414, 2416. The number of antennas 2412, 2414, 2416, and thus the number of terminals, may vary depending on the implementation. According to an aspect of the disclosure, each antenna 2412, 2414, 2416 may be configured with at least one terminal, said at least one terminal being connected to a terminal of the radiofrequency circuitry 2406. The number of terminals of the radiofrequency circuitry 2406 may be, for example, greater than or equal to the number of antennas 2412, 2414, 2416. Although each antenna 2412, 2414, 2416 requires a connection to the radiofrequency circuitry 2406 for operation, the radiofrequency circuitry 2406 may be configured with additional (e.g. unused) terminals relative to the number of antennas 2412, 2414, 2416 used in the particular implementation.

The radiofrequency circuitry and antenna package 2400 of FIG. 24 may be configured as a device including the base substrate 2402; an antenna circuitry, including a first substrate integrated waveguide antenna 2404, including a first terminal and mounted in or on one or more layers of the base substrate 2402. The first substrate integrated waveguide is configured to operate in a first radiofrequency band; and a radiofrequency circuitry (not separately labeled), including: a first digital transceiver circuit (one example of the radiofrequency circuitry 2406), including a second terminal electrically coupled to the first terminal. The first digital transceiver circuit is mounted on the base substrate 2402. The first digital transceiver circuit is configured to receive and/or transmit a wireless signal via the first substrate integrated waveguide antenna.

According to an aspect of the disclosure, the antenna circuitry may include a second substrate integrated waveguide antenna, which may include a third terminal that is electrically conductively connected to a fourth terminal of the radiofrequency circuitry 2406. According to an aspect of the disclosure, the radiofrequency circuitry 2406 may include one or more digital transceiver circuits, such that a first digital transceiver circuit is configured to operate within the first radiofrequency band, and a second digital transceiver circuit is configured to operate within the second radiofrequency band. Each of the digital transceiver circuits may include a terminal that is electrically conductively connected to a terminal of one of the substrate integrated waveguide antennas.

As described above, the first substrate integrated waveguide antenna may be mounted directly on the base substrate 2402, whether on an upper surface of the substrate or a lower surface of the base substrate 2402. If a second substrate integrated waveguide antenna is used, the second substrate integrated waveguide antenna may be mounted directly on the base substrate 2402 (whether on the upper surface of the substrate or the lower surface of the substrate), or the second substrate integrated waveguide antenna may be mounted on the first substrate integrated waveguide antenna. As an extension of this concept, if a third substrate integrated waveguide antenna is used, the third substrate integrated waveguide antenna may be mounted on the substrate (whether on the upper surface or the lower surface of the substrate) or on the first substrate integrated waveguide antenna or the second substrate integrated waveguide antenna. The third substrate integrated waveguide antenna, when used, may include a fifth terminal, which may be electrically conductively connected to a sixth terminal located within a third digital transceiver circuit, as part of the radiofrequency circuitry 2406.

The multiple antennas and multiple digital transceiver circuits as described herein allow the radiofrequency circuitry to send and/or receive wireless signals on a plurality of antennas using a plurality of (different, e.g. non-overlapping) frequency bands.

Some multi-radio devices may include multiple single feed antenna circuits. Each antenna circuit may be configured to operate within distinct frequency ranges. For example, a first antenna circuit may operate within a low band (LB) frequency range (e.g., a 2.4 gigahertz (GHz) band), a second antenna circuit may operate within a high band (HB) frequency range (e.g., a five GHz band), and a third antenna circuit may operate within an ultra-high band (MB) frequency range (e.g., a six GHz band).

Some multi-radio devices according to aspects described in the present disclosure may implement multi-feed antenna circuits with separate feeds for radio signals within different frequency ranges. In some aspects, the multi-feed antenna circuits may include isolation to reduce rejection settings of associated filters.

The multi-radio device described in the present disclosure may include a first radio circuit that provides a first radio signal within a first frequency range and a second radio circuit that provides at least one of a second radio signal within a second frequency range and a third radio signal within a third frequency range. The multi-radio device may also a first antenna circuit electrically coupled to the first radio circuit and a second antenna circuit electrically coupled to the second radio circuit. The first antenna circuit may receive the first radio signal and transmit a first wireless signal representative of the first radio signal. The second antenna circuit may receive the second radio signal and the third radio signal and may transmit a second wireless signal representative of at least one of the second radio signal and the third radio signal concurrent with the first antenna circuit transmitting the first wireless signal.

Some aspects described in the present disclosure may permit a radiohead circuitry to be collocated with the antenna circuits. The collocation of the radiohead circuitry with the antenna circuits may permit connection types other than coaxial connection types to be implemented. The other connection types may include RF traces on printed circuit boards. In addition, collocation of the Radiohead circuit with the antenna circuits may reduce a cost of implementing triple band dual concurrency (TBDC), mm-wave WiFi, or other communication types.

Figure 25:
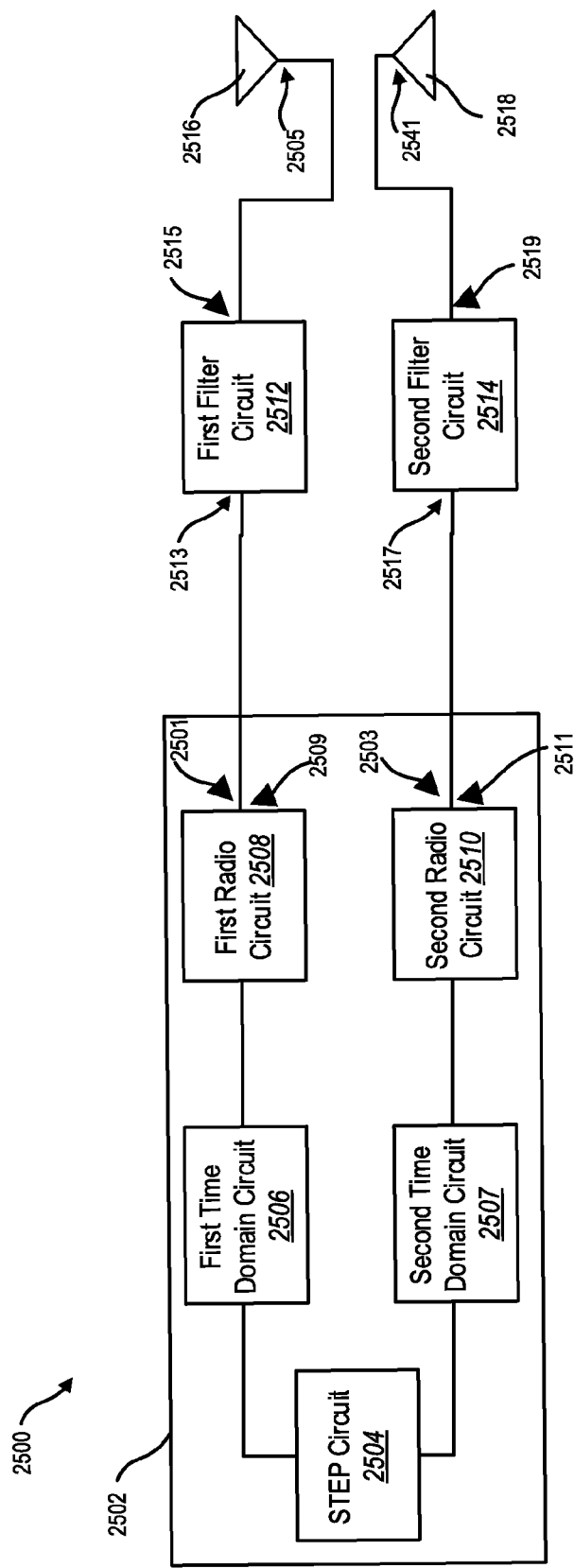
FIG. 25 exemplarily shows a block diagram of an example multi-radio device in accordance with various aspects of the present disclosure.

FIG. 25 illustrates a block diagram of an example multi-radio device 2500, in accordance with at least one aspect described in the present disclosure. The multi-radio device 2500 may be the same as or similar to communication device 100, described above in relation to FIG. 1B. The multi-radio device 2500 may include radiohead circuitry 2502, a first filter circuit 2512, a second filter circuit 2514, a first antenna circuit 2516, and a second antenna circuit 2518. The radiohead circuitry 2502 may include a STEP circuit 2504, a first time domain circuit 2506, a second time domain circuit 2507, a first radio circuit 2508, and a second radio circuit 2510.

The radiohead circuitry 2502 may be the same as or similar to other radiohead circuitries described in the present disclosure (e.g., distributed radiohead unit 20). The first antenna circuit 2516 and the second antenna circuit 2518 may be the same as or similar to other antenna circuits described in the present disclosure (e.g., antenna circuit 25).

The STEP circuit 2504 may be electrically coupled to the first time domain circuit 2506 and the second time domain circuit 2507. The first time domain circuit 2506 may be electrically coupled to the first radio circuit 2508. The second time domain circuit 2507 may be electrically coupled to the second radio circuit 2510.

The first radio circuit 2508 may include a first terminal 2501 and a fifth terminal 2509. The second radio circuit 2510 may include a second terminal 2503 and a sixth terminal 2511. The first antenna circuit 2516 may include a third terminal 2505 and the second antenna circuit 2518 may include a fourth terminal 2541. The first filter circuit 2512 may include a seventh terminal 2513 and an eighth terminal 2515. The second filter circuit 2514 may include a ninth terminal 2517 and a tenth terminal 2519.

The first terminal 2501 may be electrically coupled to the seventh terminal 2513. In addition, the seventh terminal 2513 may be electrically coupled to the fifth terminal 2509. The second terminal 2503 may be electrically coupled to the ninth terminal 2517. In addition, the ninth terminal 2517 may be electrically coupled to the sixth terminal 2511. The eighth terminal 2515 may be electrically coupled to the third terminal 2505. In addition, the tenth terminal 2519 may be electrically coupled to the fourth terminal 2541.

The STEP circuit 2504 may include a serial interface that is communicatively coupled to additional electronic devices (e.g., a SOC) (not illustrated in FIG. 25). For example, the STEP circuit 2504 may be communicatively coupled to a WiFi digital signal processor (DSP) of the SOC. The STEP circuit 2504 may generate a first STEP signal and a second STEP signal. The STEP circuit 2504 may receive signals from the SOC in a first time domain, a second time domain, or some combination thereof. The STEP circuit 2504 may generate the first STEP signal and the second STEP signal in the first time domain, the second time domain, or some combination thereof. The first time domain circuit 2506 may generate a first time domain signal based on the first STEP signal. In some aspects, the first time domain circuit 2506 may generate the first time domain signal by manipulating the first STEP signal in the corresponding time domain. The second time domain circuit 2507 may generate a second time domain signal based on the second STEP signal. In some aspects, the second time domain circuit 2507 may generate the second time domain signal by manipulating the second STEP signal in the corresponding time domain.

The first radio circuit 2508 may provide a first radio signal within a first frequency range based on the first time domain signal. In addition, the second radio circuit 2510 may provide at least one of a second radio signal within a second frequency range and a third radio signal within a third frequency range based on the second time domain signal. In some aspects, each of the first frequency range, the second frequency range, and the third frequency range may include different frequency ranges.

The first filter circuit 2512 may receive and filter out portions of the first radio signal that are outside the first frequency range. The second filter circuit 2514 may receive and filter out portions of the second radio signal that are outside the second frequency range. In addition, the second filter circuit 2514 may receive and filter out portions of the third radio signal that are outside of the third frequency range.

The first antenna circuit 2516 may receive the first radio signal. In addition, the first antenna circuit 2516 may transmit a first wireless signal within the first frequency range representative of the first radio signal. The second antenna circuit 2518 may receive the second radio signal and the third radio signal. In addition, the second antenna circuit 2518 may transmit a second wireless signal representative of at least one of the second radio signal and the third radio signal. The second antenna circuit 2518 may transmit the second wireless signal concurrent with the first antenna circuit 2516 transmitting the first wireless signal. The second antenna circuit 2518 may transmit the second wireless signal within the second frequency range if the second wireless signal is representative of the second radio signal. Alternatively, the second antenna circuit 2518 may transmit the second wireless signal within the third frequency range if the second wireless signal is representative of the third radio signal.

The first antenna circuit 2516 may provide a first receive radio signal within the first frequency range to the first radio circuit 2508. In some aspects, the first antenna circuit 2516 may provide the first receive radio signal to the first radio circuit 2508 via the first filter circuit 2512 and the fifth terminal 2509. The second antenna circuit 2518 may provide a second receive radio signal within the second frequency range or the third frequency range to the second radio circuit 2510. In some aspects, the second antenna circuit 2518 may provide the second receive radio signal to the second radio circuit 2510 via the second filter circuit 2514 and the sixth terminal 2511. The second antenna circuit 2518 may provide the second receive signal concurrent with the first antenna circuit 2516 providing the first receive signal.

Figure 26:
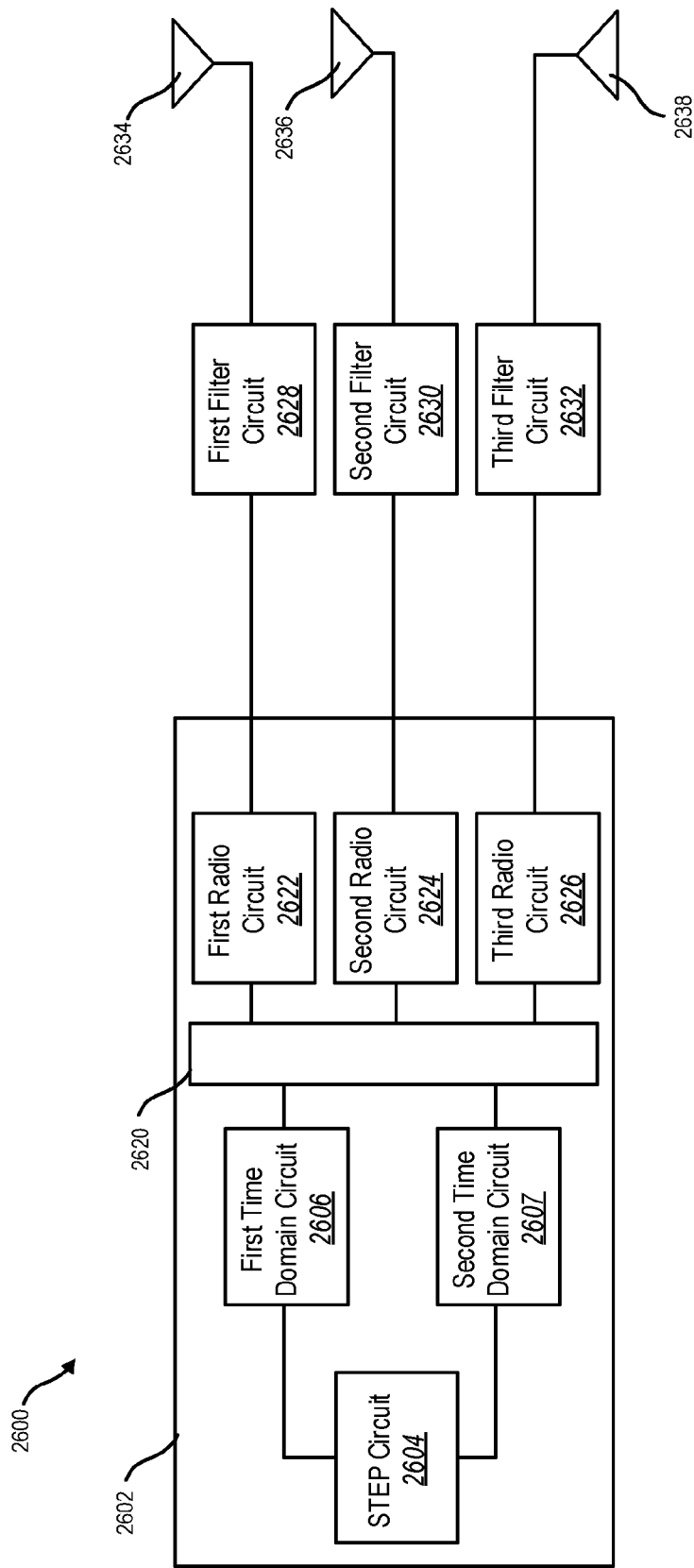
FIG. 26 exemplarily shows a block diagram of another example multi-radio device in accordance with various aspects of the present disclosure.

FIG. 26 illustrates a block diagram of another example multi-radio device 2600, in accordance with at least one aspect described in the present disclosure. The multi-radio device 2600 may be the same as or similar to communication device 100, described above in relation to FIG. 1B. The multi-radio device 2600 may include radiohead circuitry 2602, a first filter circuit 2628, a second filter circuit 2630, a third filter circuit 2632, a first antenna circuit 2634, a second antenna circuit 2636, and a third antenna circuit 2638. The radiohead circuitry 2602 may be the same as or similar to other radiohead circuitries described in the present disclosure (e.g., distributed radiohead unit 20). The first antenna circuit 2634, the second antenna circuit 2636, and the third antenna circuit 2638 may be the same as or similar to other antenna circuits described in the present disclosure (e.g., antenna circuit 25).

The radiohead circuitry 2602 may include a STEP circuit 2604, a first time domain circuit 2606, a second time domain circuit 2607, a crossbar/switch circuit 2620, a first radio circuit 2622, a second radio circuit 2624, and a third radio circuit 2626. The STEP circuit 2604 may be electrically coupled to the first time domain circuit 2606 and the second time domain circuit 2607. The first time domain circuit 2606 and the second time domain circuit 2607 may be electrically coupled to the crossbar/switch 2620. The crossbar/switch may be electrically coupled to the first radio circuit 2622, the second radio circuit 2624, and the third radio circuit 2626.

The first filter circuit 2628 may be electrically coupled between the first radio circuit 2622 and the first antenna circuit 2634. The second filter circuit 2630 may be electrically coupled between the second radio circuit 2624 and the second antenna circuit 2636. The third filter circuit 2632 may be electrically coupled between the third radio circuit 2626 and the third antenna 2638.

The STEP circuit 2604 may include a serial interface that is communicatively coupled to additional electronic devices (e.g., a SOC) (not illustrated in FIG. 26). For example, the STEP circuit 2604 may be communicatively coupled to a WiFi DSP of the SOC. The STEP circuit 2604 may generate a first STEP signal and a second STEP signal. The STEP circuit 2604 may receive signals from the SOC in a first time domain, a second time domain, or some combination thereof. The STEP circuit 2604 may generate the first STEP signal and the second STEP signal in the first time domain, the second time domain, or some combination thereof. The first time domain circuit 2606 may generate a first time domain signal based on the first STEP signal. In some aspects, the first time domain circuit 2606 may generate the first time domain signal by manipulating the first STEP signal in the corresponding time domain. The second time domain circuit 2607 may generate a second time domain signal based on the second STEP signal. In some aspects, the second time domain circuit 2607 may generate the second time domain signal by manipulating the second STEP signal in the corresponding time domain. The crossbar/switch 2620 may route the first time domain signal, the second time domain signal, or some combination thereof to the first radio circuit 2622, the second radio circuit 2624, the third radio circuit 2626, or some combination thereof.

The first radio circuit 2508 may provide a first radio signal within a first frequency range based on the first time domain signal, the second time domain signal, or some combination thereof. In addition, the second radio circuit 2510 may provide a second radio signal within a second frequency range based on the first time domain signal, the second time domain signal, or some combination thereof. The third radio circuit 2626 may provide a third radio signal within a third frequency range based on the first time domain signal, the second time domain signal, or some combination thereof. In some aspects, the first frequency range, the second frequency range, and the third frequency range may each include different frequency ranges.

The first filter circuit 2628 may receive and filter out portions of the first radio signal that are outside the first frequency range. The second filter circuit 2630 may receive and filter out portions of the second radio signal that are outside the second frequency range. The third filter circuit 2632 may receive and filter out portions of the third radio signal that are outside of the third frequency range.

The first antenna circuit 2634 may receive the first radio signal. In addition, the first antenna circuit 2634 may transmit a first wireless signal within the first frequency range representative of the first radio signal. The second antenna circuit 2636 may receive the second radio signal. In some aspects, the second antenna circuit 2636 may transmit a second wireless signal within the second frequency range representative of the second radio signal. The second antenna circuit 2630 may transmit the second wireless signal concurrent with the first antenna circuit 2634 transmitting the first wireless signal.

The third antenna circuit 2638 may receive the third radio signal. In addition, the third antenna circuit 2638 may transmit a third wireless signal within the third frequency range representative of the third radio signal. The third antenna circuit 2638 may transmit the third wireless signal concurrent with the first antenna circuit 2634 transmitting the first wireless signal, the second antenna circuit 2636 transmitting the second wireless signal, or some combination thereof.

The first antenna circuit 2634 may provide a first receive radio signal within the first frequency range to the first radio circuit 2622 via the first filter circuit 2628. The second antenna circuit 2636 may provide a second receive radio signal within the second frequency range to the second radio circuit 2624 via the second filter circuit 2630. The second antenna circuit 2636 may provide the second receive signal concurrent with the first antenna circuit 2634 providing the first receive signal. The third antenna circuit 2638 may provide a third receive radio signal within the third frequency range to the third radio circuit 2626 via the third filter circuit 2632. The third antenna circuit 2638 may provide the third receive signal concurrent with the first antenna circuit 2634 providing the first receive signal, the second antenna circuit 2636 providing the second receive signal, or some combination thereof.

Figure 27:
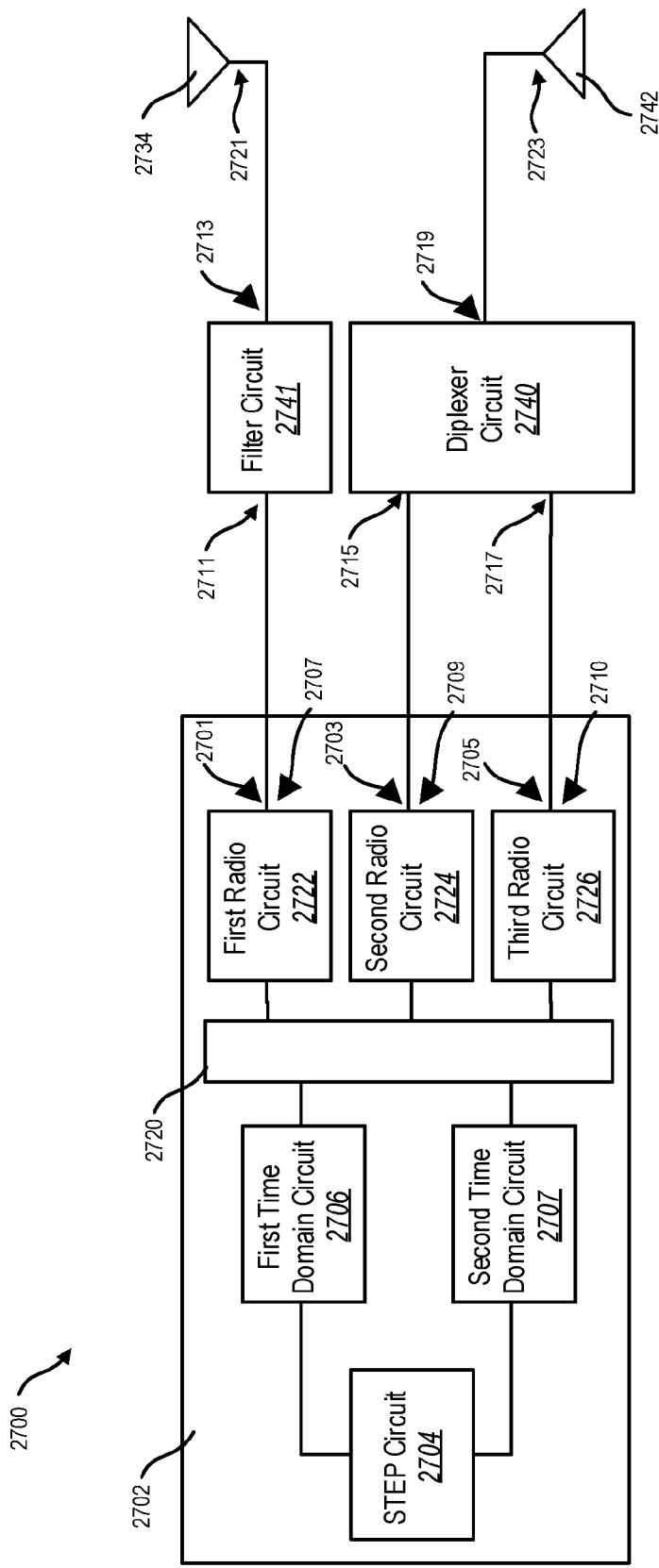
FIG. 27 exemplarily shows a block diagram of yet another example multi-radio device in accordance with various aspects of the present disclosure.

FIG. 27 illustrates a block diagram of yet another example multi-radio device 2700, in accordance with at least one aspect described in the present disclosure. The multi-radio device 2700 may be the same as or similar to communication device 100, described above in relation to FIG. 1B. The multi-radio device 2700 may include the radiohead circuitry 2602, a filter circuit 2741, a diplexer circuit 2740, a first antenna circuit 2734, a second antenna circuit 2742, or some combination thereof.

The first radio circuit 2622 may include a first terminal 2701 and a sixth terminal 2707. The second radio circuit 2624 may include a second terminal 2703 and a seventh terminal 2709. The third radio circuit may include a third terminal 2705 and an eighth terminal 2710. The first antenna circuit 2734 may include a fourth terminal 2721 and the second antenna circuit 2742 may include a fifth terminal 2723. The filter circuit 2741 may include a ninth terminal 2711 and a tenth terminal 2713. The diplexer circuit 2740 may include an eleventh terminal 2715, a twelfth terminal 2717, and a thirteenth terminal 2719.

The first terminal 2701 may be electrically coupled to the ninth terminal 2711. In addition, the sixth terminal 2707 may be electrically coupled to the ninth terminal 2711. The second terminal 2703 may be electrically coupled to the eleventh terminal 2715. In addition, the seventh terminal 2709 may be electrically coupled to the eleventh terminal 2715. The third terminal 2705 may be electrically coupled to the twelfth terminal 2717. In addition, the eighth terminal 2710 may be electrically coupled to the twelfth terminal 2717. The tenth terminal 2713 may be electrically coupled to the fourth terminal 2721. The thirteenth terminal 2719 may be electrically coupled to the fifth terminal 2723.

The filter circuit 2741 may receive and filter out portions of the first radio signal that are outside the first frequency range. The diplexer circuit 2740 may receive and multiplex the second radio signal and the third radio signal. For example, the diplexer circuit 2740 may multiplex the second radio signal and the third radio signal on to the thirteenth terminal 2719. The diplexer circuit 2740 may generate a multiplex radio signal representative of the second radio signal, the third radio signal, or some combination thereof. The diplexer circuit 2740 may generate the multiplex radio signal within the second frequency range or the third frequency range based on whether the multiplex radio signal is representative of the second radio signal or the third radio signal.

The first antenna circuit 2734 may receive the first radio signal. In addition, the first antenna circuit 2734 may transmit a first wireless signal within the first frequency range representative of the first radio signal. The second antenna circuit 2742 may receive the multiplex radio signal. In addition, the second antenna circuit 2742 may transmit a second wireless signal representative of the multiplex radio signal. The second antenna circuit 2742 may transmit the second wireless signal concurrent with the first antenna circuit 2734 transmitting the first wireless signal. The second antenna circuit 2742 may transmit the second wireless signal within the second frequency range if the multiplex radio signal is representative of the second radio signal. Alternatively, the second antenna circuit 2742 may transmit the second wireless signal within the third frequency range if the multiplex radio signal is representative of the third radio signal.

The first antenna circuit 2734 may provide a first receive radio signal within the first frequency range to the first radio circuit 2722 via the fifth terminal 2721. The second antenna circuit 2742 may provide a second receive radio signal within the second frequency range or the third frequency range to the second radio circuit 2724 or the third radio circuit 2726 via the fifth terminal 2723 and the diplexer circuit 2740. In addition, in some aspects, the second antenna circuit 2742 may provide the second receive radio signal to the third radio circuit 2726 via the fifth terminal 2723 and the diplexer circuit 2740. The second antenna circuit 2742 may provide the second receive signal concurrent with the first antenna circuit 2734 providing the first receive signal.

Figure 28:
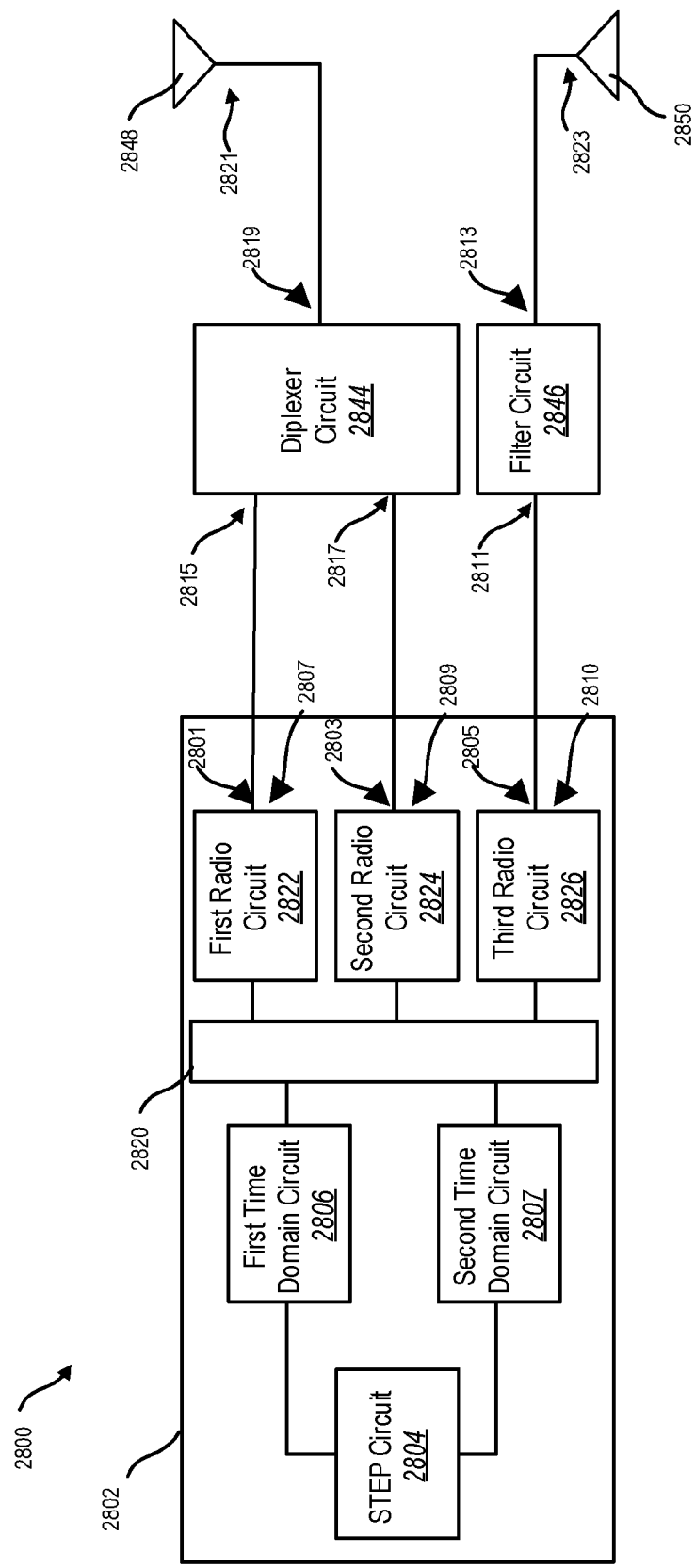
FIG. 28 exemplarily shows a block diagram of an example multi-radio device in accordance with various aspects of the present disclosure.

FIG. 28 illustrates a block diagram of an example multi-radio device 2800, in accordance with at least one aspect described in the present disclosure. The multi-radio device 2800 may be the same as or similar to communication device 100, described above in relation to FIG. 1B. The multi-radio device 2800 may include the Radiohead circuitry 2602, a filter circuit 2846, a diplexer circuit 2844, a first antenna circuit 2848, a second antenna circuit 2850, or some combination thereof.

The first antenna circuit 2848 may include a fourth terminal 2821 and the second antenna circuit 2850 may include a fifth terminal 2823. The filter circuit 2846 may include a ninth terminal 2811 and a tenth terminal 2813. The diplexer circuit 2844 may include an eleventh terminal 2815, a twelfth terminal 2817, and a thirteenth terminal 2819.

The first terminal 2701 may be electrically coupled to the eleventh terminal 2815. In addition, the sixth terminal 2707 may be electrically coupled to the eleventh terminal 2815. The second terminal 2703 may be electrically coupled to the twelfth terminal 2817. In addition, the seventh terminal 2709 may be electrically coupled to the twelfth terminal 2817. The third terminal 2705 may be electrically coupled to the ninth terminal 2811. In addition, the eighth terminal 2710 may be electrically coupled to the ninth terminal 2811. The tenth terminal 2813 may be electrically coupled to the fifth terminal 2823. The thirteenth terminal 2819 may be electrically coupled to the fourth terminal 2821.

The diplexer circuit 2844 may receive and multiplex the first radio signal and the second radio signal. For example, the diplexer circuit 2844 may multiplex the first radio signal and the second radio signal on to the thirteenth terminal 2819. The diplexer circuit 2844 may generate a multiplex radio signal representative of the first radio signal, the second radio signal, or some combination thereof. The diplexer circuit 2844 may generate the multiplex radio signal within the first frequency range or the second frequency range based on whether the multiplex radio signal is representative of the first radio signal or the second radio signal. The filter circuit 2846 may receive and filter out portions of the third radio signal that are outside the third frequency range.

In some aspects, the first antenna circuit 2848 may receive the multiplex radio signal. In addition, the first antenna circuit 2848 may transmit a first wireless signal representative of the multiplex radio signal. The first antenna circuit 2848 may transmit the first wireless signal within the first frequency range if the multiplex radio signal is representative of the first radio signal. Alternatively, the first antenna circuit 2848 may transmit the first wireless signal within the second frequency range if the multiplex radio signal is representative of the second radio signal. The second antenna circuit 2850 may receive the third radio signal. In addition, the second antenna circuit 2850 may transmit a second wireless signal within the third frequency range representative of the third radio signal. The second antenna circuit 2850 may transmit the second wireless signal concurrent with the first antenna circuit 2848 transmitting the first wireless signal.

The first antenna circuit 2848 may provide a first receive radio signal within the first frequency range or the second frequency range to the first radio circuit 2622 or the second radio circuit 2624 via the fourth terminal 2821 and the diplexer circuit 2844. The second antenna circuit 2850 may provide a second receive radio signal within the third frequency range to the third radio circuit 2626 via the fifth terminal 2823 and the filter circuit 2846. The second antenna circuit 2850 may provide the second receive signal concurrent with the first antenna circuit 2848 providing the first receive signal.

A multi-radio device may include Radiohead circuitry that includes a first radio that provides a first radio signal with a first frequency range. The Radiohead circuitry may also include a second radio circuit that provides at least one of a second radio signal within a second frequency range and a third radio signal within a third frequency range. The multi-radio device may also include antenna circuitry that includes a first antenna circuit electrically coupled to the first radio circuit and a second antenna circuit electrically coupled to the second radio circuit. The first antenna circuit may receive the first radio signal and transmit a first wireless signal within the first frequency range representative of the first radio signal. The second antenna circuit may receive the second radio signal and the third radio signal and transmit a second wireless signal representative of at least one of the second radio signal and the third radio signal concurrent with the first antenna circuitry transmitting the first wireless signal. The second antenna circuit may transmit the second wireless signal within the second frequency range or the third frequency range based on whether the second wireless signal is representative of the second radio signal or the third radio signal.

The multi-radio device may include a first BPF circuit electrically coupled between the first radio circuit and the first antenna circuit. The first BPF circuit may filter out portions of the first radio signal outside the first frequency range. In addition, the multi-radio device may include a second BPF circuit electrically coupled between the second radio circuit and the second antenna circuit. The second BPF circuit may filter out portions of the second radio signal outside the second frequency range and to filter out portions of the third radio signal outside the third frequency range.

A multi-radio device may include Radiohead circuitry that includes a first radio circuit that provides a first radio signal within a first frequency range, a second radio circuit that provides a second radio signal within a second frequency range, and a third radio circuit that provides a third radio signal within a third frequency range. The multi-radio device may also include antenna circuitry that includes a first antenna circuit electrically coupled to the first radio circuit and a second antenna circuit electrically coupled to the second radio circuit and the third radio circuit. The first antenna circuit may receive the first radio signal and transmit a first wireless signal representative of the first radio signal. The second antenna circuit may receive the second radio signal and the third radio signal. The second antenna circuit may transmit a second wireless signal representative of at least one of the second radio signal and the third radio signal concurrent with the first antenna circuit transmitting the first wireless signal.

The multi-radio device may also include a BPF circuit electrically coupled between the first radio circuit and the first antenna circuit. The BPF circuit may filter out portions of the first radio signal outside the first frequency range. The multi-radio device may also include a diplexer circuit electrically coupled between the second antenna circuit and between the second antenna circuit and the third radio circuit. The diplexer circuit may multiplex the first radio signal and the second radio signal to provide a fourth radio signal representative of at least one of the second radio signal and the third radio signal to the second antenna circuit. The second antenna circuit may transmit the second wireless signal representative of the fourth radio signal.

In some aspects, the first frequency range may include a LB frequency range, the second frequency range may include a HB frequency range, and the third frequency range may include an UHB frequency range. In other aspects, the first frequency range may include the HB frequency range, the second frequency range may include the LB frequency range, and the third frequency range may include the MB frequency range. In other aspects, the first frequency range may include the UHB frequency range, the second frequency range may include the LB frequency range, and the third frequency range may include the HB frequency range.

In some aspects, the radio circuits may include one or more power amplifiers (PAs). In other aspects, the PAs may be external to the radio circuits. The filter circuits described in the present disclosure may include a low pass filter, a bandpass filter, a high pass filter, or any other appropriate type of filter. The multi-radio device may include a diplexer circuit electrically coupled to radio circuits that provide radio signals within the LB and UHB. The multi-radio device may also include a filter circuit between the radio circuits and the diplexer circuit.

The multi-radio device may also include a first filter circuit electrically coupled between the second radio circuit and the diplexer and a second filter circuit electrically coupled between the third radio circuit and the diplexer. The first filter circuit and the second filter circuit may filter out portions of the corresponding radio signals that are outside a corresponding frequency range.

Radiofrequency circuits may include two or more digital transceivers that are configured to transmit and/or receive in different radiofrequency bands and/or according to different radiofrequency technologies. For example, it is conventional to configure a radiofrequency circuit with two digital transceivers. The first transceiver is configured to transmit and/or receive a Bluetooth signal, and the second transceiver is configured to transmit and/or receive a Wi-Fi signal.

Conventional configurations for this arrangement may include a low band (LB)/High Band (BB) Diplexer with the 45 dB rejection required to support lossless Concurrent Dual Band (CDB) operation. A 45 dB rejection may be required for a HB/UHB Diplexer to enable HB+UHB concurrent operation.

In these conventional configurations, each digital transceiver typically includes a transmit and receive feed that are connected to a switch, which selectively connects either the transmit feed or the receive feed to an antenna. For example, Wi-Fi and Bluetooth designs often include a Tx/Rx switch integrated in silicon in order to reduce overall size and cost. This Tx/Rx switch introduces insertion loss and various tradeoffs between Tx and Rx optimization.

Figure 29:
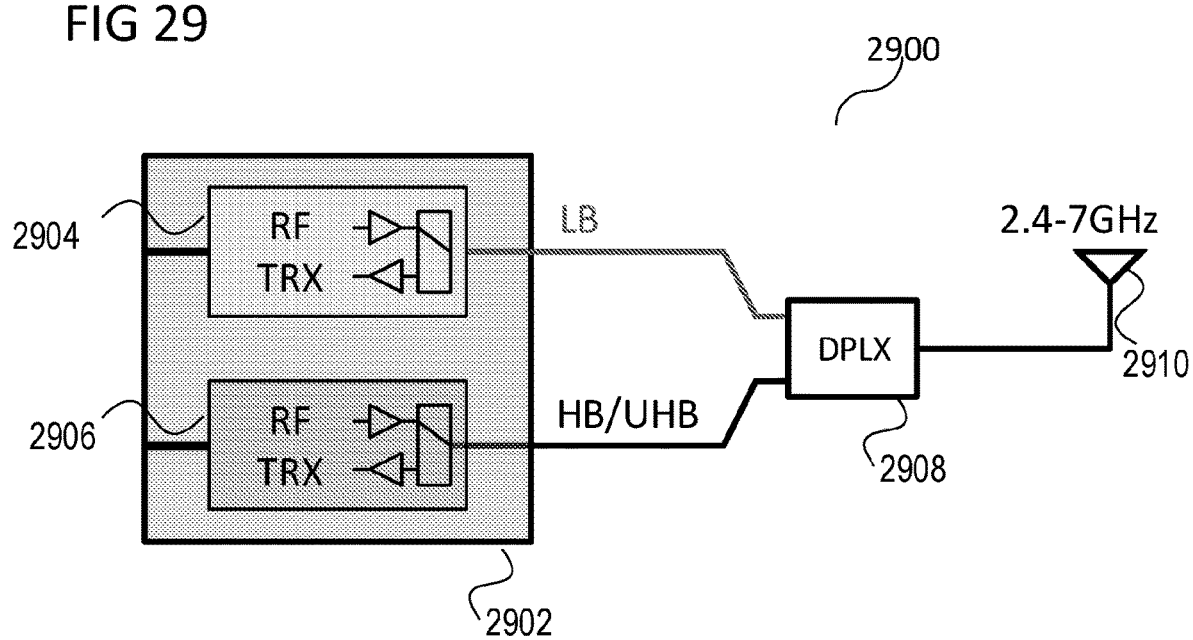
FIG. 29 exemplarily shows a conventional configuration of a radiofrequency circuitry.

FIG. 29 depicts a conventional configuration 2900 of such a radiofrequency circuitry that is configured to operate on two or more frequency bands or using two or more wireless technologies (e.g. Bluetooth and Wi-Fi). In this figure, the radiofrequency circuitry 2902 includes a first digital transceiver circuit 2904 and a second digital transceiver circuit 2906, each of which includes a transmit feed and a receive feed (indicated as "TRX" and "RF", respectively), in FIG. 29. In this example, the first digital transceiver circuit 2904 includes an LB signal that is routed to a duplexer 2908, and the second digital transceiver circuit 2906 includes a HB/UHB signal that is routed to the duplexer 2908. The duplexer 2908 selectively connects the signal from the first digital transceiver circuit 2904 to the antenna, the signal from the second digital transceiver circuit 2906 to the antenna 2910, or the signal from both the first digital transceiver circuit 2904 and the signal from the second digital transceiver circuit 2906 to the antenna. Of note, and because the transmit and receive feeds of each digital transceiver are selected in the digital transceiver circuit, only the transmit feed or the receive feed is connected with the duplexer 2908. This configuration may be associated with unwanted insertion loss, which may be undesirable.

According to an aspect of the disclosure, these disadvantages may be reduced or eliminated by removing the switch within the digital transceiver between the Rx and Tx feeds, and by utilizing one or more matching networks in the manner described herein to appropriate a route the signals to or from a multifeed antenna. This configuration will be described below, according to various aspects of the disclosure. In addition to the elements in configurations described below with respect to this configuration of digital transceiver and multifeed antenna, the device described herein may include any of the elements disclosed in FIG. 1 through FIG. 5, including, but not limited to, one or more amplifiers 231, 232, one or more tuners or filters 233, one or more digital to analog converters 213, one or more analog-to-digital converters 214, or otherwise.

Figure 30:
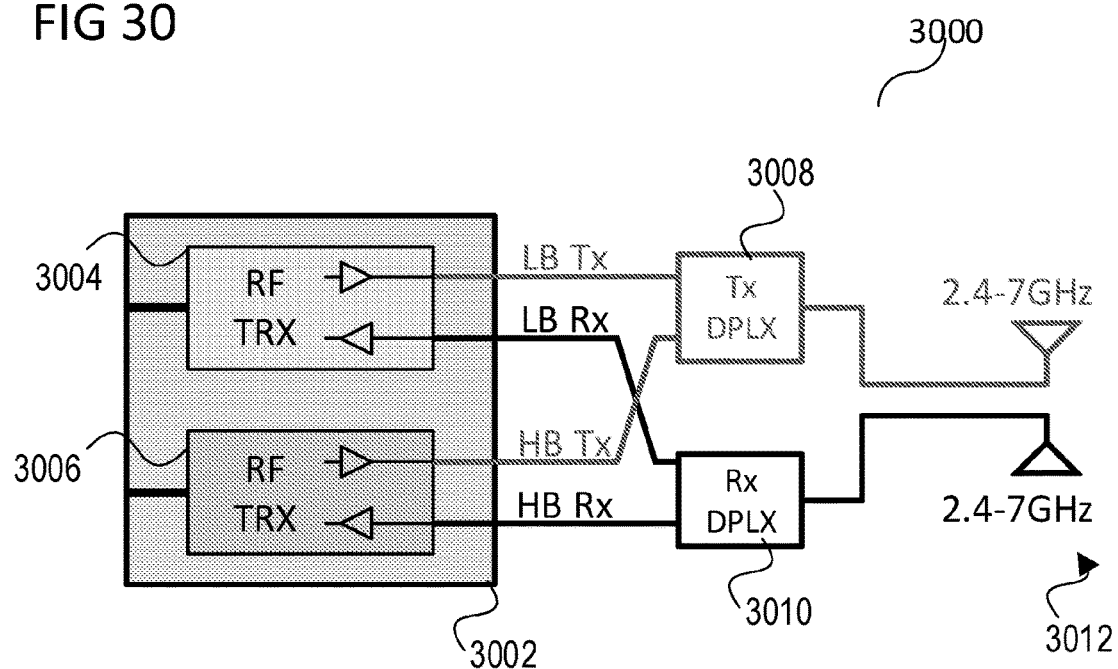
FIG. 30 exemplarily shows a configuration of a radiofrequency circuitry in accordance with various aspects of the present disclosure.

FIG. 30 depicts a configuration 3000 of a radiofrequency circuitry 3002 configured to operate in at least two radio frequency bands, according to an aspect of the disclosure. In this figure, the radiofrequency circuitry 3002 includes a first digital transceiver circuit 3004 and a second digital transceiver circuit 3006, each of which include a transmit feed and a receive feed. In this example, the first digital transceiver circuit 3004 again includes a low band signal that is routed to a matching network 3008 (in this example, configured as a duplexer), and the second digital transceiver circuit 3006 includes an HB/UHB signal that is routed to the matching network 3008.

In contrast to the configuration 2900 as depicted in FIG. 29, the configuration 3000 in FIG. 30 does not include a separate switch within a respective digital transceiver circuit to switch between the transmit feed and the receive feed. Rather, the configuration as depicted in FIG. 30 includes two matching networks 3008 and 3010, which may be configured as a transmission duplexer 3008 and a receive duplexer 3010.

The transmission duplexer 3008 may receive as an input the two transmission feeds (the transmission feed from the first digital transceiver circuit 3004 and the transmission feed from the second digital transceiver circuit 3006), and the transmission duplexer 3008 may output either the transmission feed from the first digital transceiver circuit 3004, or the transmission feed from the second digital transceiver circuit 3006. Conversely, the receive duplexer 3010 may receive as an input a signal from the antenna 3012, and the receive duplexer 3010 may output the signal as either the receive feed to the first digital transceiver circuit 3004, or the receive feed to the second digital transceiver circuit 3006.

Both the receive duplexer 3010 and the transmit duplexer 3008 may be connected to a multifeed antenna via the matching network 3008, 3010. According to an aspect of the disclosure, the multifeed antenna may be configured to receive and/or transmit on two different radiofrequency bands and/or for two different radiofrequency technologies (e.g. Bluetooth and Wi-Fi).

In this manner, each duplexer 3008, 3010 may be configured to selectively connect a single transmission feed (e.g. a transmission feed from a single digital transceiver) or a single receive feed (e.g. a receive feed from a single digital transceiver) to the multifeed antenna.

Figure 31:
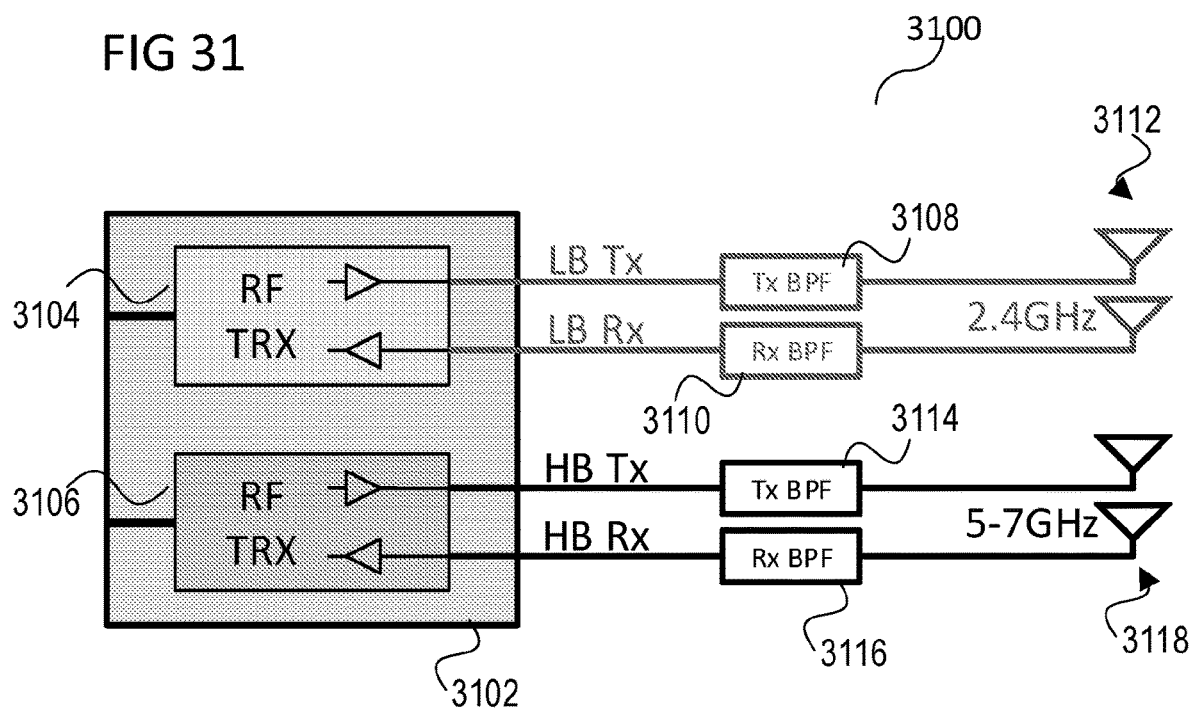
FIG. 31 exemplarily shows a configuration of a radiofrequency circuitry in accordance with various aspects of the present disclosure.

FIG. 31 depicts a configuration 3100 of digital transceivers and multifeed antennas, according to another aspect of the disclosure. In this figure, a radiofrequency circuitry 3102 includes a first digital transceiver circuit 3104 and a second digital transceiver circuit 3106. The first digital transceiver circuit 3104 may be configured for low band operation and includes a low band transmission feed and a low band reception feed. The low band transmission feed is connected to a transmission bandpass filter 3108, and the low band reception feed is connected to a reception bandpass filter 3110. The transmission bandpass filter 3108 may be configured to receive the low band transmission feed and to output a filtered low band transmission feed to a first multifeed antenna 3112. The receive bandpass filter 3110 may be configured to receive a signal from the first multifeed antenna 3112 and to output a filtered signal as the low band reception feed to the first digital transceiver circuit 3104. The second digital transceiver circuit 3106 may include a high band transmission feed and a high band reception feed. The second digital transceiver circuit 3106 may be connected to a transmission bandpass filter 3114 via the high band transmission feed and may be connected to a reception bandpass filter 3116 via the high band reception feed. The transmission bandpass filter 3114 may be configured to receive the high band transmission feed and to output a filtered high band transmission feed to a second multifeed antenna 3118. The reception bandpass filter 3116 may be configured to receive a signal from the second multifeed antenna 3118 and to output a filtered signal to the second digital transceiver circuit 3106 as the high band reception feed. In this manner, the first multifeed antenna 3112 may be configured to operate within a first radiofrequency band (e.g. 2.4 GHz) and the second multifeed antenna 3118 may be configured to operate within a second radiofrequency band (e.g. 5-7 GHz). The resulting configuration eliminates the switch between the transmission feed and receive feed, as depicted in FIG. 29, thereby improving efficiency and reducing insertion loss.

Figure 32:
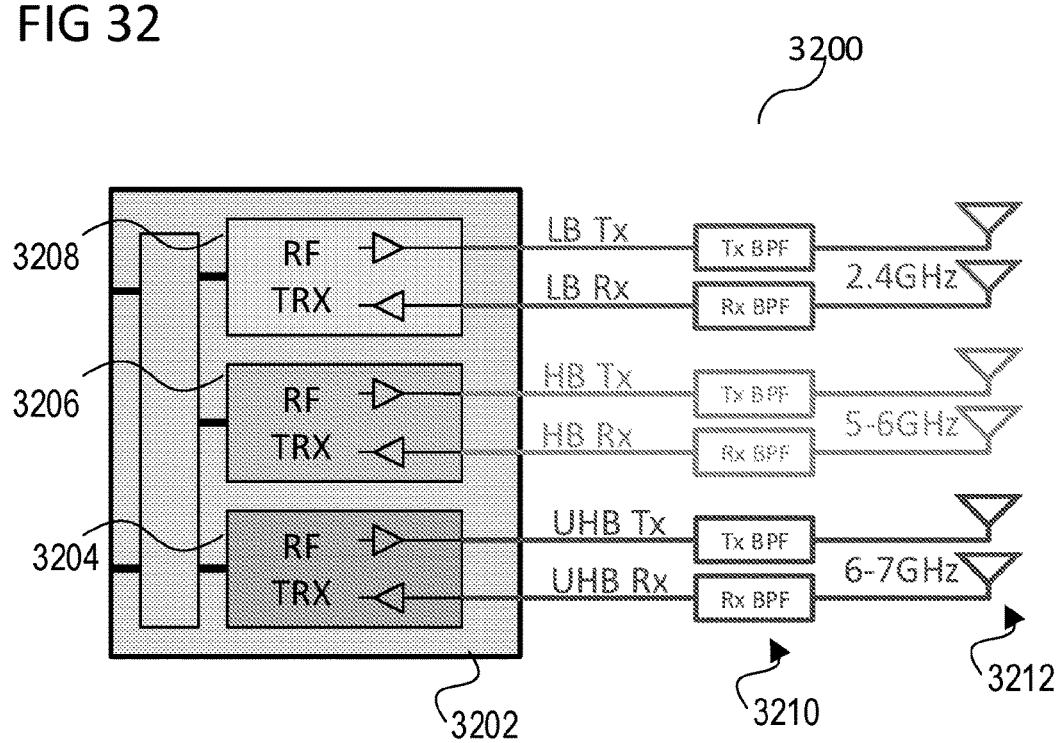
FIG. 32 exemplarily shows a configuration of digital transceivers and multifeed antennas in accordance with various aspects of the present disclosure.

FIG. 32 depicts a configuration of digital transceivers and multifeed antennas according to an additional aspect of the disclosure. In this example, a radiofrequency circuitry 3202 may include a plurality of digital transceivers. This example will be described with three digital transceivers; however, a greater or smaller number of digital transceivers may be used. In this case, a first digital transceiver circuit 3204 may be configured to operate within a first radiofrequency band (e.g. 6-7 GHz); a second digital transceiver circuit 3206 may be configured to operate within a second radiofrequency band (e.g. 5-6 GHz); and a third digital transceiver circuit 3208 may be configured to operate within a third radiofrequency band (e.g. 2.4 GHz). Each digital transceiver circuit 3204, 3206, 3208 includes a transmission feed and a reception feed. The transmission feed of each digital transceiver circuit 3204, 3206, 3208 is connected to a transmission bandpass filter, and the reception feed of each digital transceiver circuit 3204, 3206, 3208 is connected to a reception bandpass filter, shown collectively as 3210. Each transmission bandpass filter 3210 may be configured to receive the transmission feed from the respective digital transceiver circuit 3204, 3206, 3208, and may be configured to output a filtered version of the receive signal to its respective multifeed antenna, shown collectively as 3212. Each reception bandpass filter 3210 may be configured to receive a signal from its respective multifeed antenna 3212 and to output a filtered version of the receive signal to the respective digital transceiver circuit 3204, 3206, or 3208 as the respective reception feed. In this manner, a plurality of digital transceiver circuits 3204, 3206, 3208 may be incorporated into a radiofrequency circuitry 3202 such that each of the plurality of digital transceiver circuits 3204, 3206, 3208 is configured to operate within a different frequency band, or according to a different radiofrequency technology, and using a separate multifeed antenna. In so doing, the switch between the transmission feed and reception feed as depicted in FIG. 29 can be avoided, thereby improving efficiency and reducing insertion loss.

Figure 33:
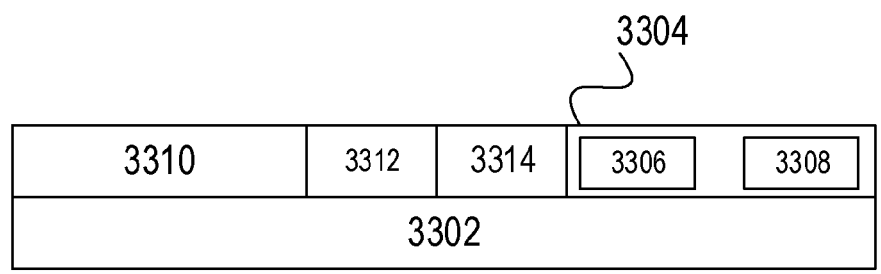
FIG. 33 exemplarily shows a multiband wireless device in accordance with various aspects of the present disclosure.

FIG. 33 depicts a multiband wireless device, according to an aspect of the disclosure. The multiband wireless device may include an antenna 3310, electrically conductively connected to a first radio circuit 3306 and a second radio circuit 3308 of a radiofrequency integrated circuitry 3304; the radiofrequency integrated circuitry 3304 including the first radio circuit 3306, configured to output to a first matching network 3312 a first electrical signal representing a wireless signal to be transmitted in a first frequency band, and to receive from a second matching network 3314 a second electrical signal representing a wireless signal received in the first frequency band; and the second radio circuit 3308, configured to output to the first matching network 3312 a third electrical signal representing a wireless signal to be transmitted in a second frequency band, and to receive from the second matching network 3314 a fourth electrical signal representing a wireless signal received in the second frequency band; and the first matching network 3312, configured to selectively output either the first electrical signal or the third electrical signal to the antenna 3310; and the second matching network, configured to receive an electrical signal from the antenna 3310 and to selectively output the received electrical signal either as the second electric signal to the first radio circuit 3306 or as the fourth electrical signal to the second radio circuit 3308.

According to an aspect of the disclosure, the multiband wireless device may include a substrate 3302. Any of the components described herein, including, but not limited to, the antenna 3310, the matching networks 3312 and 3314, and the radiofrequency integrated circuitry 3304 may be mounted on or in any one or more layers of the substrate 3302.

According to an aspect of the disclosure, the antenna may be a substrate integrated waveguide antenna. The substrate integrated waveguide antenna may be located on or in any layer or layers of the substrate 3302. The substrate integrated waveguide antenna may be configured in accordance with any of the other examples of substrate integrated waveguide antennas described herein.

The structures described in FIG. 30 through FIG. 34 may include one or more antennas that are configured to operate within a plurality of radiofrequency bands; one or more antennas that are each configured to operate within a single radiofrequency band; or a combination thereof. According to one aspect of the disclosure, the antenna or antennas of the radiofrequency device disclosed herein may be configured to operate within radiofrequency bands between 2.4 GHz and 7 GHz. This may include, for example, 2.4 GHz, 5 to 6 GHz, 6 to 7 GHz, or any combination thereof.

Figure 34:
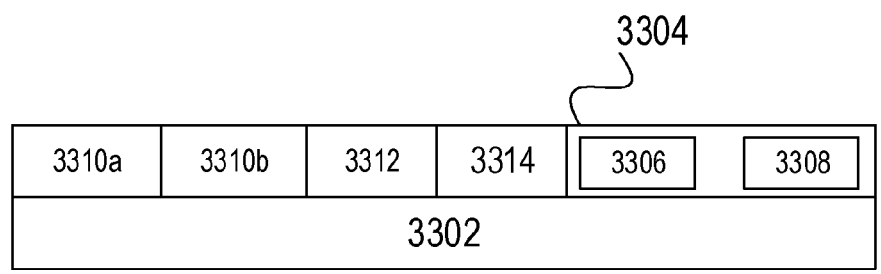
FIG. 34 exemplarily shows a multiband wireless device in accordance with various aspects of the present disclosure.

FIG. 34 depicts a multiband wireless device according to another aspect of the disclosure, the multiband wireless device including a substrate 3302; a first antenna 3310a, in or on one or more layers of the substrate; a second antenna 3310b, in or on one or more layers of the substrate; a radiofrequency integrated circuit 3304, mounted on the substrate, including a first radio circuit 3306, configured to output a first electrical signal representing a wireless signal to be transmitted in a first frequency band, and to receive a second electrical signal, representing a wireless signal received in the first frequency band; and a second radio circuit 3308, configured to output a third electrical signal representing a wireless signal to be transmitted in a second frequency band, and to receive a fourth electrical signal representing a wireless signal received in the second frequency band; and a first band pass filter network 3312, configured to receive the first electrical signal from the first radio circuit; perform one or more filtering operations on the first electrical signal; and output a filtered first electrical signal to the first antenna 3310a. The first band pass filter network 3312 is further configured to receive an electrical signal from the first antenna 3310a; perform one or more filtering operations on the received electrical signal from the first antenna 3310a, and output to the first radio circuit a filtered received signal from the first antenna 3310a as the second electrical signal; a second band pass filter network 3314, configured to receive the third electrical signal; perform one or more filtering operations on the third electrical signal; and to output a filtered third electrical signal to the second antenna 3310b. The second band pass filter network 3314 is further configured to receive a signal from the second antenna 3310b; perform one or more filtering operations on the received signal from the second antenna 3310b; and to output to the second radio circuit 3308 a filtered received signal from the second antenna 3310b as the fourth electrical signal.

According to an aspect of the disclosure, the first antenna may be configured to operate at any of 2.4 GHz; 5 GHz to 6 GHz; 6 GHz to 7 GHz; or 5 GHz to 7 GHz, and the second antenna may be configured to operate at any one of 2.4 GHz; 5 GHz to 6 GHz; 6 GHz to 7 GHz; or 5 GHz to 7 GHz. The second antenna is configured to operate in a frequency band different from a frequency band of the first antenna.

The matching networks described herein may be or include duplexers and/or multiplexers. For example, and as depicted in FIG. 30, a matching network may be configured as a single duplexer 3004, that may be configured to receive transmission feeds from a plurality of digital transceiver circuits, or a duplexer 3002 that is configured to output to reception feeds of a plurality of digital transceivers. This concept is not limited to the use of duplexers, but may also utilize one or more multiplexers, such as when a multiplexer is used for three or more digital transceivers. Alternatively, the matching networks may be configured as multiplexers, even when only two digital transceivers are utilized.

The matching networks described herein may be configured as bandpass filters. In this manner, the bandpass filters may be configured to filter out any extraneous frequencies unrelated to the desired transmission or reception frequencies. For example, the bandpass filter may be configured to receive a signal from the multifeed antenna and to filter out any frequencies other than the frequency of the radiofrequency band that the relevant digital transceiver is configured to receive.

According to an aspect of the disclosure, one or more of the radio circuits may be configured to operate according to one or more wireless network protocols of the Wi-Fi Alliance. Alternatively or additionally, one or more of the radio circuits may be configured to operate according to one or more wireless protocols of the Bluetooth Special Interest Group.

The principles and methods described herein may enable improved multi-radio functionality by using a multi-feed antenna (as a non-limiting example, a dual-feed antenna with separate feeds for LB and for HB/UHB) with isolation in the antenna to reduce the rejection requirements from the bandpass filters replacing the Diplexer. They may use the multifeed antenna to separate between the Tx and Rx radiofrequency signal paths, for example, by using two duplexers.

The devices disclosed herein are believed to enable Dual-Radio performance with reduced FE filter insertion loss, thereby improving Tx power and Rx sensitivity; enable Dual-Radio filter implementation; reduce cost; enable removal of the integrated Tx/Rx switch; reduce insertion loss and improve Tx power and Rx sensitivity. Additionally they are expected to improve design tradeoffs between Tx and Rx paths and enable optimization of each separately; enable separate design of Tx and Rx filters/diplexers; and reduce Rx insertion loss; improve Rx sensitivity.

Figure 35:
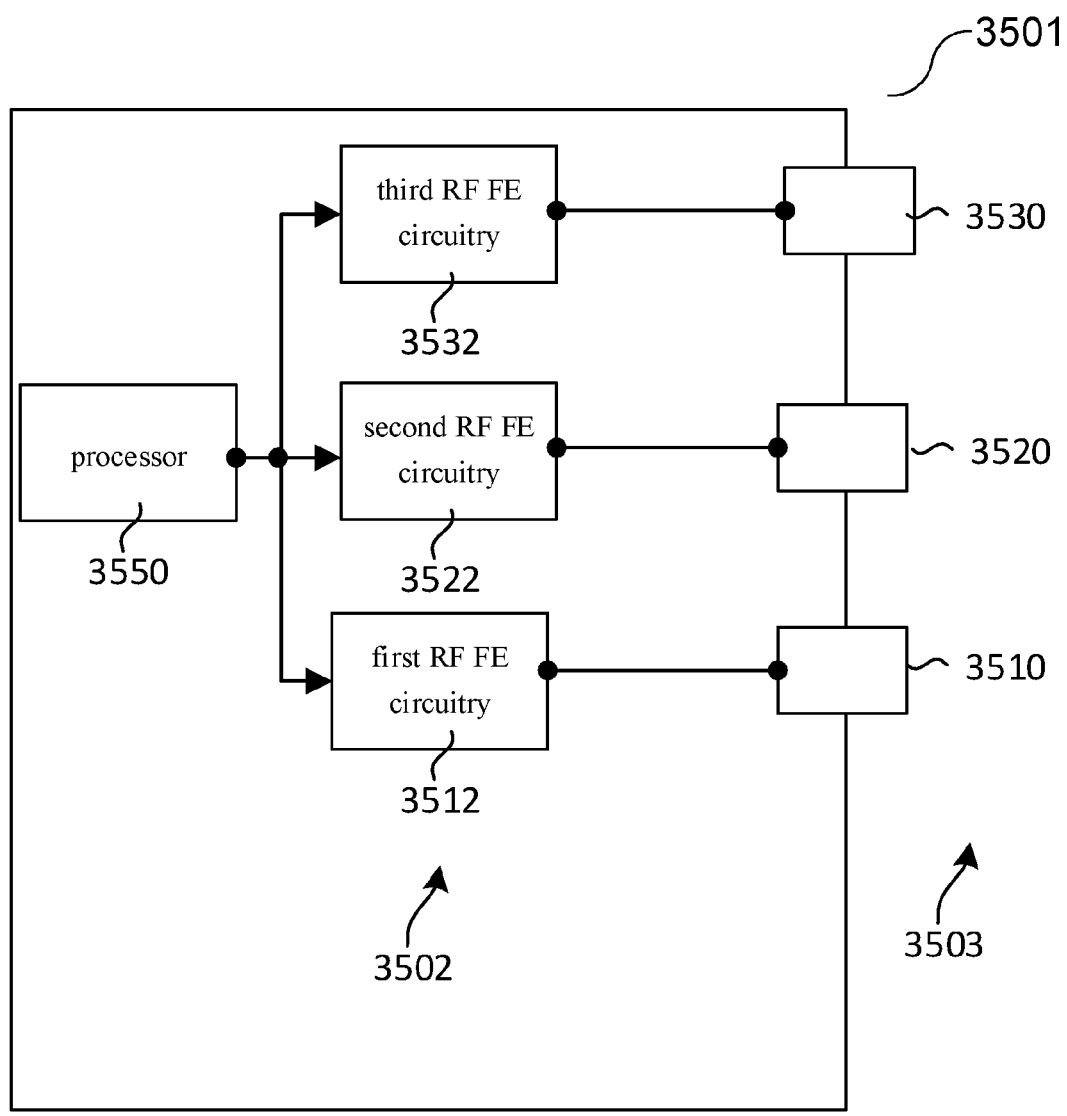
FIG. 35 exemplarily shows a block diagram of a radiohead circuitry in accordance with various aspects of the present disclosure.

FIG. 35 illustrates a block diagram of a radiohead circuitry 3501 according to various aspects. The radiohead circuitry 3501 may include multiple multifeed antenna terminals 3501, e.g., two or more multifeed antenna terminals, and one or more radio frequency front-end circuitries 3502. In some aspects, the one or more radio frequency front-end circuitries 3502 may include multiple radio frequency front-end circuitries 3502 (also referred to as RF FE circuitries), e.g., two or more RF FE circuitries.

For example, the multiple multifeed antenna terminals 3501 may be part of the RF electrical signal interface 27. According to various aspects, the radiohead circuitry 3501 may be implemented on a single silicon die or circuit board or on a plurality of silicon dies or circuit boards. In some aspects, the radiohead circuitry 3501 may be disposed on a single silicon die or circuit board. In other aspects, the radiohead circuitry 3501 may be distributed over a plurality of silicon dies or circuit boards. In some aspects, various components of the radio head may be connected to each other as described later in detail, e.g., on die level, via a chip package internal connection or on circuit board level, e.g., via an electrical line of the circuit board (also referred to as signal trace or trace).

The multiple multifeed antenna terminals 3503 may include a first multifeed antenna terminal 3510, a second multifeed antenna terminal 3520 and/or a third multifeed antenna terminal 3530. For example, the multiple multifeed antenna terminals 3503 may include at least one multifeed antenna terminal per RF FE circuitry of the multiple RF FE circuitries 3502.

Each of the multiple multifeed antenna terminals 3503 may be configured to be connected to a feed port (also referred to as antenna feed port) of a multifeed antenna, as described later in detail, for signal transmission. Each of the multiple multifeed antenna terminals 3503 may be electrically conductively connected to a corresponding feed port (also referred to as antenna feed port) of a multifeed antenna, as described later in detail, for signal transmission. During operation, the multiple RF FE circuitries 3502 may exchange electrical power with the multiple multifeed antenna terminals 3503, e.g., to communicate via the multifeed antenna.

In some aspects, the multiple RF FE circuitries 3502 may include a first RF FE circuitry 3512, a second RF FE circuitry 3522 and/or a third RF FE circuitry 3532. Each of the multiple RF FE circuitries 3502 may be coupled to at least one of the multiple multifeed antenna terminals 3501 (e.g., via connector 235 as described above). For example, the first RF FE circuitry 3512, if present, may be coupled to the first multifeed antenna terminal 3510. For example, the second RF FE circuitry 3522, if present, may be coupled to the second multifeed antenna terminal 3520. For example, the third RF FE circuitry 3532, if present, may be coupled to the third multifeed antenna terminal 3530.

Each of the multiple RF FE circuitries 3502 may be configured to communicate via the respective multifeed antenna terminal, e.g., by transmitting and/or receiving an analog signal within a respective component carrier frequency range (also referred to as frequency block or as communication channel) via the multifeed antenna terminal. In RF communication, the available frequency spectrum may be divided into multiple bands, wherein each band may be subdivided into multiple frequency blocks (also referred to as subband), which may not overlap each other. For example, the 802.11 standard may provide several distinct radio frequency bands for use in Wi-Fi communications, for example, a so called 900 MHz band, a 2.4 GHz band, a 3.6 GHz band, a 4.9 GHz band, a 5 GHz band, a 5.9 GHz band and the like (denoted according to the lower frequency limit).

A communication channel may have a certain capacity for transmitting information, often measured by its bandwidth (also referred to as channel bandwidth) in hertz (Hz) or its data rate in bits per second. The bandwidth (BW) is the continuous band of frequencies occupied by a modulated carrier signal and denotes the difference between the upper frequency limit and lower frequency limit of the communication channel. The maximum possible data rate per user is increased the more communication channels are assigned to the wireless mobile device, e.g., a respective communication conducted by the wireless mobile device (e.g., on software-level).

For example, the first RF FE circuitry 3512 may be configured for a communication having a first component carrier frequency range (also referred to as first communication channel). The first communication channel, e.g., its lower frequency limit, may be disposed above about 2.5 GHz (Gigahertz) or more (also referred to as high band frequency range), e.g., above about 3.5 GHz or more, e.g., above about 5 GHz or more, e.g., in the range of about 5 GHz to 7 GHz, e.g., in the range of about 5.15-5.895 GHz (also referred to as high band frequency) and 5.935-7.125 GHz (also referred to as ultra-high band frequency). For example, the first communication channel may have a first bandwidth of about 160 MHz (Megahertz) or less, e.g., about 80 MHz or less.

For example, the second RF FE circuitry 3522 may be configured for a communication having a second component carrier frequency range (also referred to as second communication channel). The second communication channel, e.g., its lower frequency, may be disposed above about 2.5 GHz (Gigahertz) or more, e.g., above about 3.5 GHz or more, e.g., above about 5 GHz or more, e.g., in the range of about 5 GHz to 7 GHz. For example, the second communication channel may have a second bandwidth of about 160 MHz or less, e.g., about 80 MHz or less.

For example, the third RF FE circuitry 3532 may be configured for a communication having a third component carrier frequency range (also referred to as third communication channel). The third communication channel, e.g., its upper frequency, may be below the first communication channel, e.g., its lower frequency, and/or below the second communication channel, e.g., its lower frequency.

The radiohead circuitry 3501 may further include one or more processors 3550 configured to implement a carrier aggregation. The carrier aggregation may be based on two or more component carrier frequency ranges (also referred to as aggregated communication channels) of: the first, second and/or third component carrier frequency ranges. Illustratively, the two or more component carrier frequency ranges may be aggregated and assigned to a single wireless mobile device, e.g., a respective communication conducted by the wireless mobile device (e.g., on software-level).

For example, the carrier aggregation may be based, e.g., in a first aggregation mode, on the first component carrier frequency range and the second component carrier frequency range. For example, the carrier aggregation may be based, e.g., in a second aggregation mode, on the first component carrier frequency range and the third component carrier frequency range.

Depending on the positions of the respective component carrier frequency ranges in the available frequency spectrum, the carrier aggregation may be a so called intra-band contiguous carrier aggregation, a so called intra-band non-contiguous carrier aggregation or a so called inter-band carrier aggregation. The intra-band contiguous carrier aggregation may be based on two or more component carrier frequency ranges that are contiguous in the same frequency band. The intra-band non-contiguous carrier aggregation may be based on two or more component carrier frequency ranges that are in the same frequency band but are separated from each other by a frequency gap (e.g., by a none used communication channel). The inter-band carrier aggregation may be based on two or more component carrier frequency ranges that differ from each other in the band, in which they are positioned or disposed.

In general, the one or more processors 3550 may be configured to implement a non-contiguous carrier aggregation or a contiguous carrier aggregation.

In the following, reference is made to WiFi as exemplarily mobile network communication protocol that may or may not be defined by various standards. For example, the communication via the respective multifeed antenna terminal may be in accordance with WiFi, e.g., WiFi 7. WiFi 7 may be configured to support one or more communication channels with up to 320 MHz (e.g., contiguous) channel BW (also referred to as 320 MHz communication channel). It may be understood that the references made to WiFi, e.g., WiFi 7, may apply analogously to other mobile network communication protocols.

Generally, the number of available communication channels having a high channel BW (e.g., of 320 MHz) is limited, e.g., depending on the regional regulations. For example, the United States of America may allow a maximum of three 320 MHz communication channels, the European Union may allow a maximum of a single 320 MHz communication channel. However, the number of available communication channels having a lower channel BW, e.g., of 160 MHz (also referred to as 160 MHz communication channel), available in 5-7 GHz band may be higher. In such a scenario, the radiohead circuitry 3501 may perform a carrier aggregation based on at least one lower BW to allow a higher data rate.

For example, the carrier aggregation may be based on the first communication channel having a BW of about 160 MHz and on the second communication channel having a BW of about 160 MHz (also referred to as 160+160 MHz carrier aggregation). This may allow for a support of a contiguous 320 MHz Rx through 160+160 MHz carrier aggregation. In some aspects, this may allow for an improvement of the signal-to-noise-ratio and/or the robustness of the quadrature amplitude modulation (QAM), e.g., of the 4096-quadrature amplitude modulation (4K-QAM). 4096-QAM provides 12 bits/symbol. For example, the carrier aggregation may allow a 5 Gbps WiFi (5.76 Gbps peak PHY rate) over many possible 160+160 MHz communication channel combinations. It may be understood that the carrier aggregation may be based also on other communication channel combinations, which do not necessarily have to be identical in their BW (also referred to as symmetrical carrier aggregation) and/or be limited to 160 MHz.

The one or more processors 3550 may be configured to control the communication through and/or within the radiohead circuitry 3501. For example, the one or more processors 3550 may be configured to control the communication received and/or transmitted via the multiple multifeed antenna terminals 3503.

According to various aspects, a logical communication on software-level may be conducted through the radiohead circuitry 3501. For example, the logical communication on software-level may include to stream data (e.g., download or upload data) via the radiohead circuitry 3501, e.g., to or from a wireless network. The radiohead circuitry 3501 may be configured to output one or more analog signals (also referred to as antenna signals) via the multiple multifeed antenna terminals 3503 to establish one or more wireless communication via the multifeed antenna. For example, a first wireless communication may be based on one communication channel of the two or more aggregated communication channels and a second wireless communication may be based on another communication channel of the two or more aggregated channels.

According to various aspects, the communication on software-level may include to receive a digital signal by the radiohead circuitry 3501, e.g., via the digital interface 40. The digital signal may transmit one or more data streams, of which each is to be transmitted to the wireless network (also referred to as upload data). The one or more processors may assign one or more first portions of the digital signal to the first wireless communication and one or more second portions of the digital signal to the second wireless communication. Illustratively, the one or more processors 3550 may be configured to distribute the upload data to the two or more multiple RF FE circuitries of the multiple RF FE circuitries 3502, which are used for the carrier aggregation. Reciprocally, the one or more processors 3550 may be configured to merge the data received from the two or more multiple RF FE circuitries of the multiple RF FE circuitries 3502, which are used for the carrier aggregation, to generate the digital signal.

In general, the implementation of the carrier aggregation may include one or more of the following functions: negotiate and/or determine the communication channels to be aggregated (in some aspects the communication channels to be used for the carrier aggregation), distribute data (e.g., upload data) to each of the two or more aggregated communication channels, merge data (e.g., download data) received via each of the two or more aggregated communication channels. According to various aspects, some, but not all of said functions may be implemented by the one or more processors 3550 or may be provided externally from the radiohead circuitry 3501.

According to various aspects, the one or more processors 3550 may be configured to determine, if a carrier aggregation is available (also referred to as availability check), e.g., by determining one or more communication channels free of use and/or negotiating the communication channels to be aggregated, e.g., with a access point of the wireless network. In response to the carrier aggregation being determined as available, the one or more processors 3550 may select two or more communication channels to be aggregated based on a result of the availability check and enable the aggregation of the two selected communication channels (in this case also referred to as aggregated communication channels). Reciprocally, the one or more processors 3550 may be configured to disable the carrier aggregation, e.g., when the communication ended and/or when an event is determined, which terminates the availability of the carrier aggregation. For example, the radiohead circuitry may implement various transmission modes to enable of disable the carrier aggregation. For example, the communication may start via a single 160 MHz communication channel or a 20 MHz-in-160 MHz communication channel and negotiate the carrier aggregation based on a 160+160 MHz communication channel combination with the access point. For example, the communication may start via a single 320 MHz communication channel and, if the availability of the 320 MHz communication channel ends, negotiate the carrier aggregation based on a 160+160 MHz communication channel combination with the access point.

Figure 36:
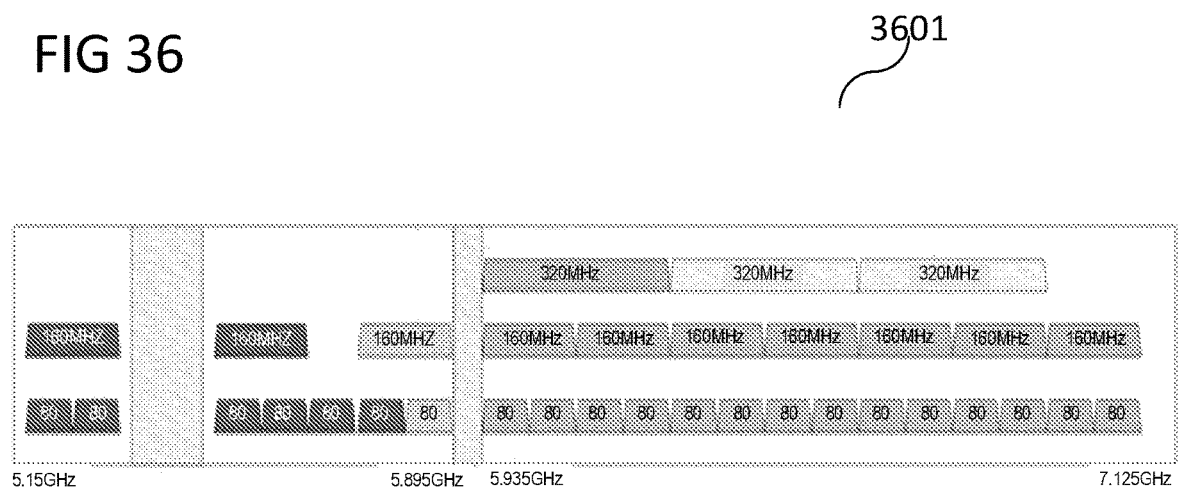
FIG. 36 exemplarily shows a block diagram of an exemplarily available frequency spectrum between 5 GHz and 7 GHz in accordance with various aspects of the present disclosure.

FIG. 36 illustrates a block diagram of an exemplarily available frequency spectrum between 5 GHz and 7 GHz, including up to three 160 MHz communication channels and up to seven 80 MHz communication channels in the band between 5.15 GHz and 5.895 GHz (also referred to as high band); and including up to three 320 MHz communication channels and up to seven 160 MHz and up to fourteen 80 MHz communication channels in the band between 5.935 GHz and 7.125 GHz (also referred to as ultra-high band).

According to various aspects, any non-contiguous communication channel combination may be used for the carrier aggregation, and specifically 160+160 MHz communication channel combinations. The 160+160 MHz communication channel combinations allows the same data rate (illustratively, throughput) as a single contiguous 320 MHz communication channel, but over many more possible channel combinations (in some aspects increasing flexibility).

In general, more than two (e.g., non-contiguous) communication channels may be aggregated. Accordingly, the number of RF FE, circuitries, transmitters and/or receivers, as well as antenna feed ports may be increased.

Figure 37:
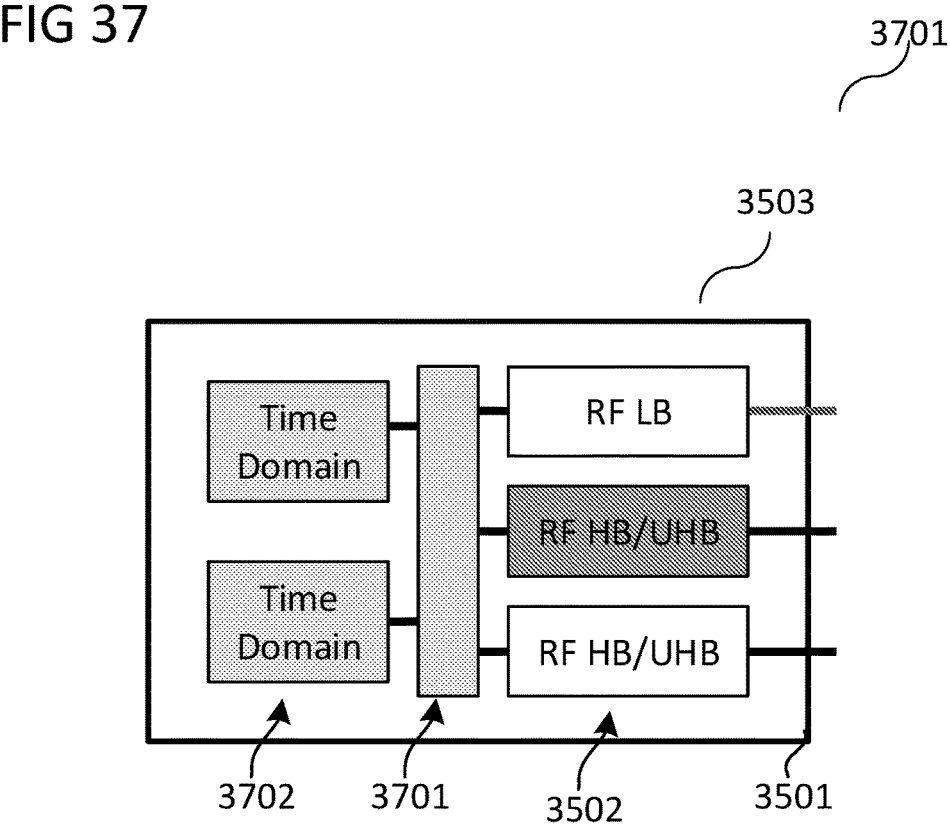
FIG. 37 exemplarily shows a block diagram of the radiohead circuitry in accordance with various aspects of the present disclosure.

FIG. 37 illustrates a block diagram of a radiohead circuitry 3501 according to various aspects 3701. The radiohead circuitry 3501 may include a multiplexer 3701 coupled to the multiple RF FE circuitries 3502, e.g., a time-domain multiplexer 3701. The multiplexer 3701 (also referred to as MUX) may include one or more first input/output nodes (also referred to as MUXin) and one or more second input/output nodes (also referred to as MUXout). Each MUXout may be coupled to one of the multiple RF FE circuitries 3502. The multiplexer 3701 may be configured to selectively couple a selected MUXin to a selected MUXout, e.g., in accordance with the carrier aggregation.

The radiohead circuitry 3501 may further include one or more baseband circuits 3702, of which each baseband circuit may include a time-domain processing physical (TD PHY) portion. Each of the one or more baseband circuits 3702 may be coupled to one of the RF FE circuitries 3502, e.g., selectively via the multiplexer 3701. For example, each of the one or more baseband circuits 3702 may be coupled to one MUXin.

Figure 38:
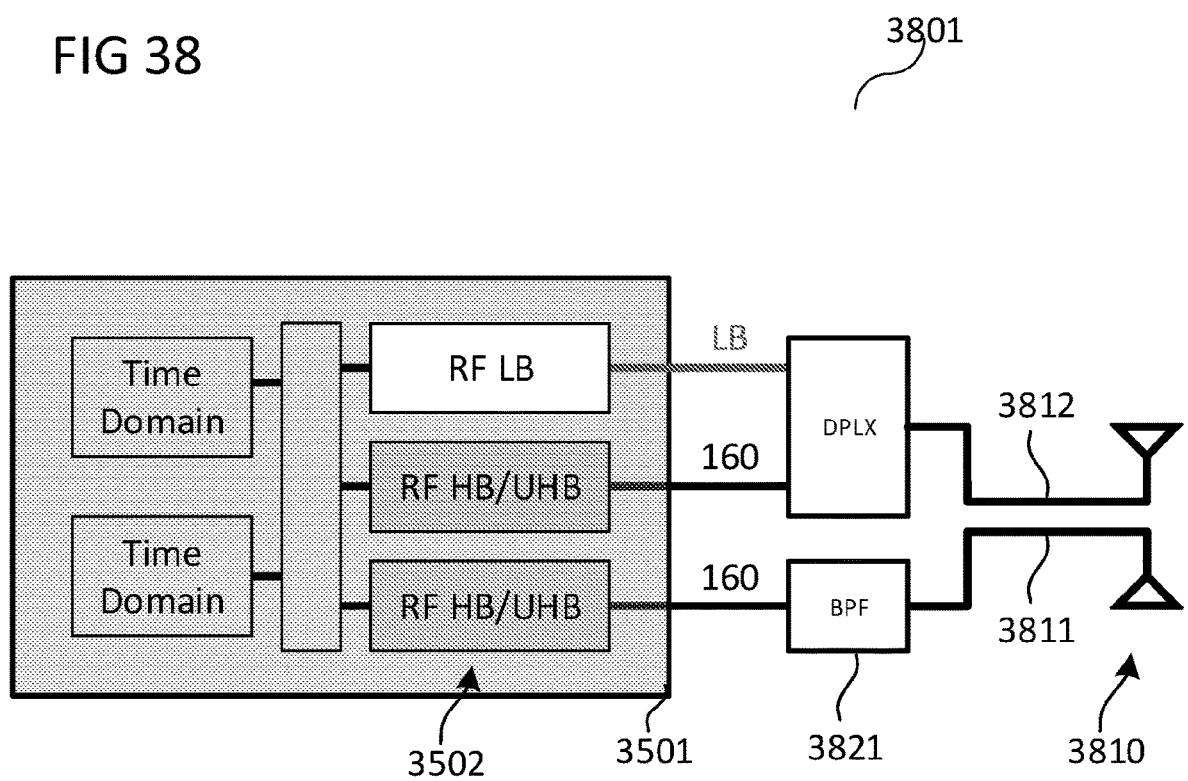
FIG. 38 exemplarily shows a block diagram of a circuitry in accordance with various aspects of the present disclosure.

FIG. 38 illustrates a block diagram of a circuitry 3801. The circuitry 3801 may include the radiohead circuitry 3501 and a multifeed antenna 3810. The multifeed antenna 3810 may include a first pair of ports including a first feed port 3811 and a first ground port, which are connected to each other by a first antenna portion (e.g., a first trace portion). The multifeed antenna 3810 may include a second pair of ports including a second feed port 3812 and a first ground port, which are connected to each other by a second antenna portion (e.g., a second trace portion). The first antenna portion and the second antenna portion may at least partially physically overlap with each other (e.g., sharing the same material) and/or may be monolithic.

The first feed port 3811 may be coupled with the first multifeed antenna terminal 3510, e.g., by a bandpass filter circuit 3821. The bandpass filter circuit 3821 may be configured in accordance with the first bandwidth, e.g., with about 80 MHz or 160 MHz.

The second feed port 3812 may be coupled with one or more of the following: the second multifeed antenna terminal 3520 and/or the third multifeed antenna terminal 3530. For example, the second feed port 3812 may be coupled selectively with the second multifeed antenna terminal 3520 or the third multifeed antenna terminal 3530, e.g., by a duplexer circuit 3822.

The duplexer circuit 3822 may be configured in accordance with the second bandwidth, e.g., with about 80 MHz or 160 MHz. If the third RF FE circuitry 3532 is used for the carrier aggregation, the duplexer circuit 3822 may be configured in accordance with the bandwidth of the third RF FE circuitry 3532.

According to various aspects, the circuitry 3801 may include one or more circuit boards. The multifeed antenna 3810 and the radiohead circuitry 3501 may be disposed (e.g. mounted on, formed directly on, at least partially integrated in or over) on and/or in the one or more circuit boards. For example, the multifeed antenna 3810 and the radiohead circuitry 3501 may be disposed (e.g. mounted on, formed directly on, at least partially integrated in or over) on the same circuit board, e.g., disposed to the same monolithic substrate of the circuit board. This achieves a more compact architecture and facilitates the signal transmission, e.g., for the integration in a wireless mobile device.

According to various aspects, the multifeed antenna 3810 may include a (e.g., monolithic) trace or one or more trace portions disposed in or over the circuit board. This achieves a more compact architecture and facilitates the signal transmission, e.g., for the integration in a wireless mobile device. Said more generally, the multifeed antenna 3810 may include or be formed from a patterned conductive, e.g. electrically conductive layer, e.g., a circuit board trace.

For example, the usage of the multifeed antenna 3810 may take advantage of the radiohead circuitry that may be, in various aspects, collocated with the multifeed antenna as described later in detail. For example, the carrier aggregation over a single multifeed antenna 3810 reduces the size (e.g., compared to two separate antennas) and may be regarded by the host platform as a single antenna, therefore easier to integrate and provide support.

According to various aspects, the multifeed antenna 3810 may be isolated in the range of 10 dB to 15 dB (especially with DTX— Digital Tx). Such an isolation level may be achieved by a compact multifeed antenna 3810 design.

The principles and methods described herein may enable improved multi-radio functionality by using a multi-feed antenna (as a non-limiting example, a dual-feed antenna with separate feeds for LB and for HB/UHB) with isolation in the antenna to reduce the rejection requirements from the bandpass filters replacing the Diplexer. They may use the multifeed antenna to separate between the Tx and Rx radiofrequency signal paths, for example, by using two duplexers. They may use a multifeed antenna to support symmetrical DL/UL noncontiguous carrier aggregation, including, but not limited to, 160+160 MHz.

WiFi7 supports up to 320 MHz (contiguous) channel bandwidth; however, there is a limited number of non-overlapping 320 MHz channels, while there are many more 160 MHz channels available in 5 to 7 GHz band. Thus, it may be desired to configure a radiofrequency circuitry to operate within a plurality of radiofrequency bands, and to do so with increased efficiency and reduced insertion loss.

At least some of the devices disclosed herein enable Dual-Radio performance with reduced FE insertion loss, thereby improving Tx power and Rx sensitivity; enable Dual-Radio filter implementation; reduce cost; enable removal of the integrated Tx/Rx switch. Additionally at least some of the devices disclosed herein improve design tradeoffs between Tx and Rx paths and enable optimization of each separately; enable separate design of Tx and Rx filters/diplexers/triplexers/multiplexers; reduce Rx and/or Tx insertion loss; improve Rx sensitivity and Tx power; enable Wi-Fi channel aggregation over many possible 160+ 160 MHz, 160+80 MHz, or any other valid Wi-Fi channel combinations; and support contiguous 320 MHz Rx through contiguous 160+160 MHz, improving best SNR and 4K-QAM robustness.

At least some of the devices disclosed herein enable Dual-Radio performance with reduced FE filter insertion loss, thereby improving Tx power and Rx sensitivity; enable Dual-Radio filter implementation; reduce cost; enable removal of the integrated Tx/Rx switch; reduce insertion loss and improve Tx power and Rx sensitivity. Additionally at least some of the devices disclosed herein improve design tradeoffs between Tx and Rx paths and enable optimization of each separately; enable separate design of Tx and Rx filters/diplexers; reduce Rx insertion loss; improve Rx sensitivity; enable 5 Gbps WiFi (5.76 Gbps peak PHY rate) over many possible 160+160 MHz channel combinations; and support contiguous 320 MHz Rx through 160+160 MHz, improving best SNR and 4K-QAM robustness.

Figure 39:
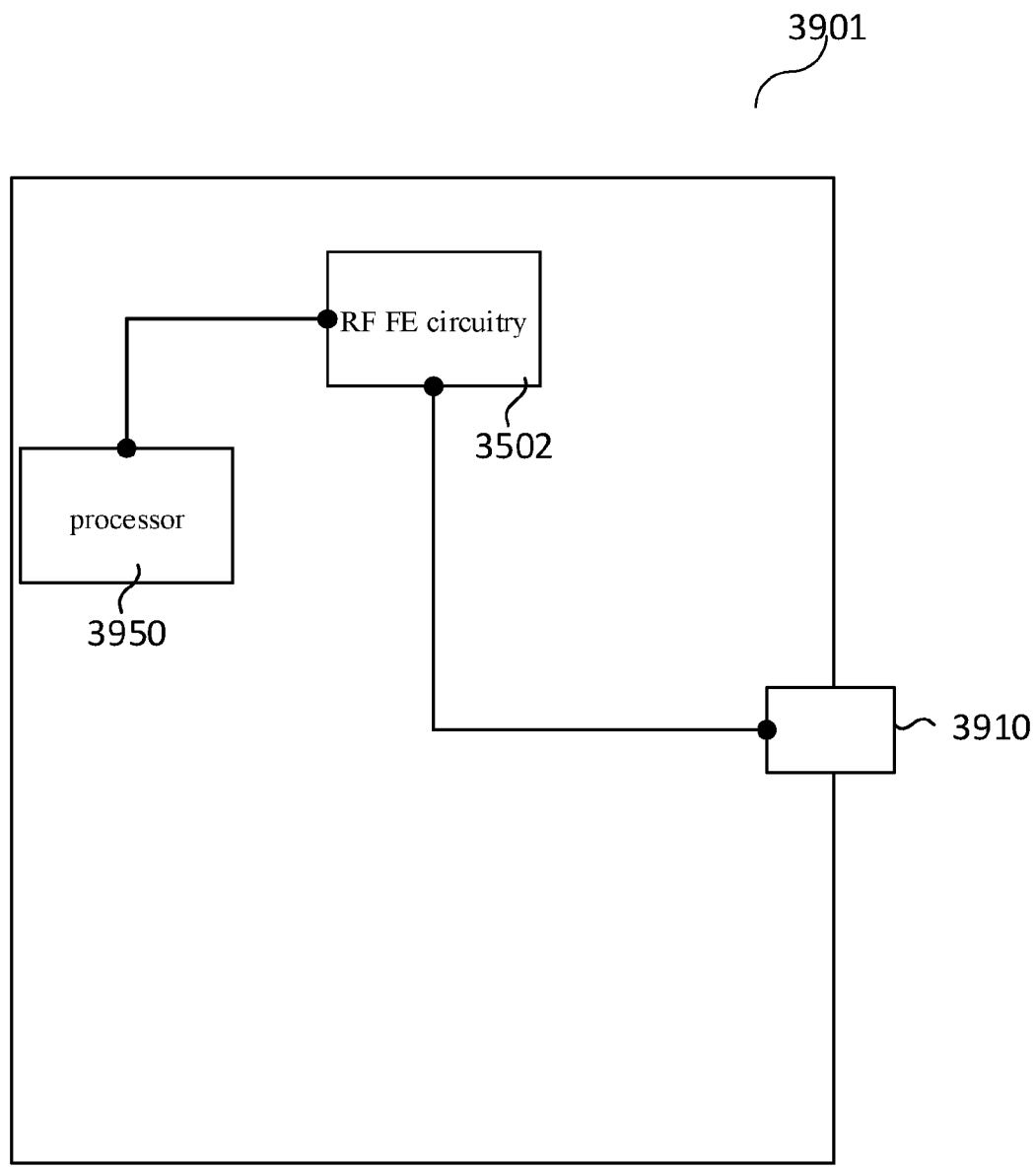
FIG. 39 exemplarily shows a block diagram of a radiohead circuitry in accordance with various aspects of the present disclosure.

FIG. 39 illustrates a block diagram of a radiohead circuitry 3901 according to various aspects. The radiohead circuitry 3901 may include one or more antenna terminals 3910 (e.g., connector 235) to operate and/or sense an antenna. As an example, the one or more antenna terminals 3910 may include one or more multifeed antenna terminals 3510 as detailed herein. The radiohead circuitry 3901 may further include one or more RF FE circuitries 3502, each of which is coupled to one of the one or more antenna terminals 3910. Each of the one or more RF FE circuitries 3502 may be configured to transmit and/or receive a signal (also referred to as antenna signal) via the antenna terminal.

The radiohead circuitry 3901 may further include one or more processors 3950 configured to determine an operation point of the antenna (also referred to as operation point determination).

According to various aspects, the operation point determination may be based on the antenna signal as received at or via the one or more antenna terminals 3910 (also referred to as received antenna signal). For example, the operation point determination may include to sense the received antenna signal, e.g., its frequency, amplitude, BW, electrical power, etc. For example, the radiohead circuitry 3901 may include one or more sensors configured to sense the received antenna signal. This enables to consider one or more parameters representing an impedance of the antenna, such as VSWR and/or scattering parameter.

Examples of the received antenna signal may be based on a wireless communication received via the antenna (e.g., the RX signal). Examples of the received antenna signal may be based on a response to an antenna signal transmitted (also referred to as transmitted antenna signal) via the antenna terminal 3910 (e.g., including a reflection of transmitted antenna signal), e.g., including a response of the antenna to the transmitted antenna signal.

According to various aspects, the operation point determination may be based on the antenna signal as transmitted at or via the one or more antenna terminals 3910. For example, the operation point determination may include to sense the antenna signal as transmitted at or via the antenna terminal, e.g., its frequency, BW, amplitude, electrical power, etc. For example, the radiohead circuitry 3901 may include one or more sensors configured to sense the transmitted antenna signal. This enables to consider one or more physical parameters of the wireless communication via the antenna, e.g., frequency, BW, electrical power and the like.

According to various aspects, the operation point determination may be based on the operation point of the transceiver chain 10a, e.g., of one or more components of the radiohead circuitry 3901. For example, the operation point determination may include to sense the operation point of the RF FE circuitry 3502 and/or to sense the operation point of one or more baseband circuits 3502. This enables to consider the one or more physical and/or logical parameters of the wireless communication, e.g., traffic, spectral efficiency, peer, type of wireless communication, and the like.

Examples of the operation point (e.g., of sensed operation parameters) may include: the standing wave ratio (VSWR), the carrier signal frequency (e.g., the WiFi RF frequency), the communication channel (e.g., the WiFi RF frequency range), the channel BW (e.g., the WiFi RF BW), the return loss and/or the peer (e.g., the access point) of the wireless communication.

For example, the operation point determination may include to determine a change of the operation point of the antenna. According to various aspects, the operation point determination may include determining (e.g., sensing) one or more of the following changes in the operation point: one or more changes in VSWR, one or more changes in the WiFi RF frequency, one or more changes in WiFi signal bandwidth or one or more changes in the communication channel (also referred to as airlink channel) and/or peer.

The radiohead circuitry 3901 facilitates to (e.g., precisely) control the antenna properties, e.g., such as the VSWR, frequency response and the communication channel versus (e.g., as function of) the peer. Also, the radiohead circuitry 3901 allows to estimate the complex return loss and the VSWR with high quality.

According to various aspects, the one or more processors 3950 may be configured to determine an impedance adaption value (e.g., an impedance set point or an impedance change) based on the operation point. For example, the one or more processors 3950 may be configured to generate an impedance control signal based on the determined impedance adaption value. For example, the impedance control signal may include an analog signal or a digital signal including the impedance adaption value.

For example, one or more of the following parameters may be adapted (e.g., optimized) based on the determined operation point: VSWR, e.g., for maximizing Tx power; a system scattering parameter (also referred to as S-params) versus (e.g., as function of) a channel frequency, e.g., for the used WiFi RF frequency and bandwidth for optimizing the airlink utilization; a system channel matrix versus (e.g., as function of) the peer, e.g., for performance (e.g., including a higher magnitude and/or lower correlation).

As another example, a high quality body proximity sensor circuit may be implemented based on the determined operation point, as described later in detail.

Figure 40:
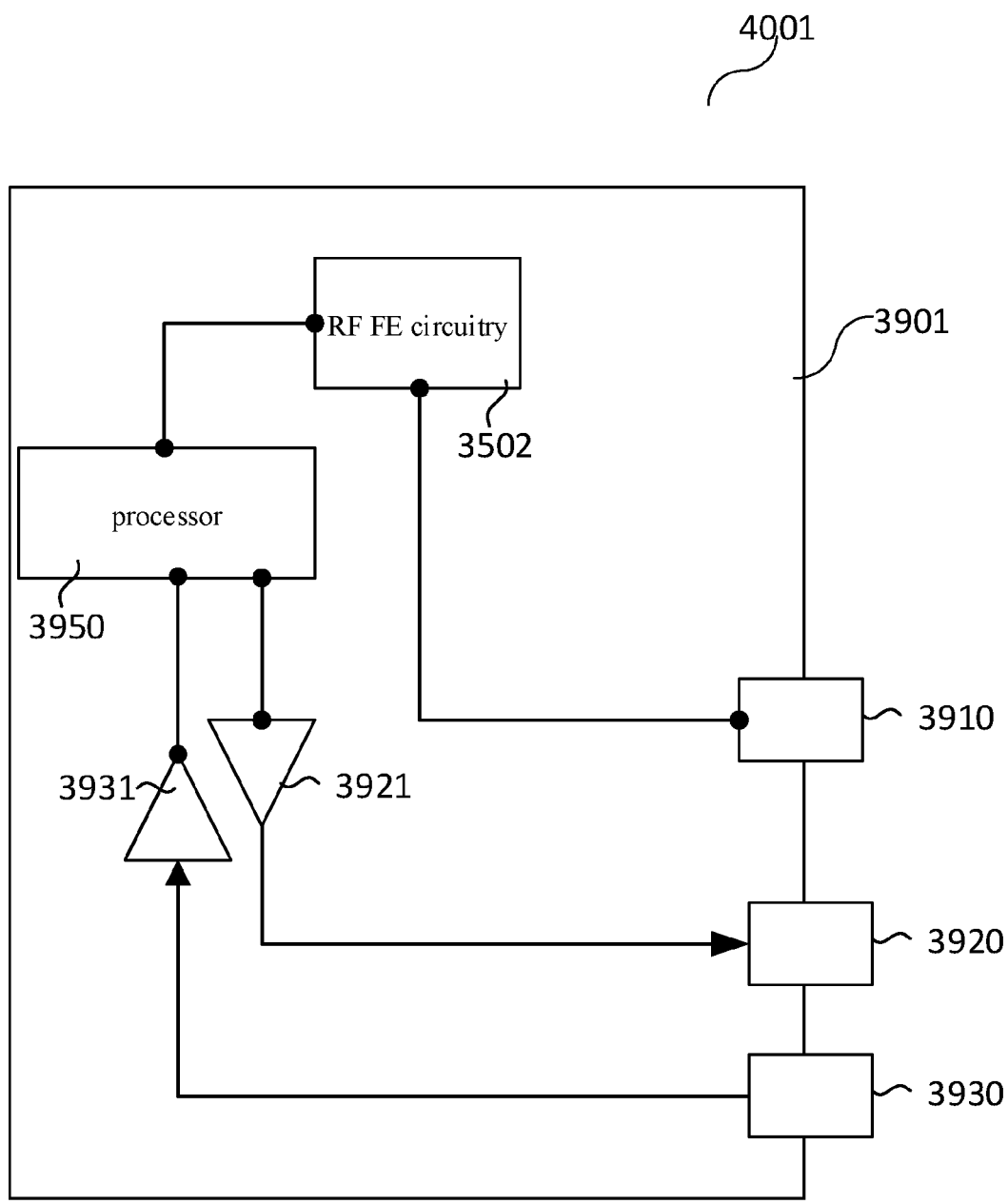
FIG. 40 exemplarily shows a block diagram of a radiohead circuitry in accordance with various aspects of the present disclosure.

FIG. 40 illustrates a block diagram of a radiohead circuitry 3901 according to various aspects 4001. The radiohead circuitry 3901 may further include a control terminal 3920 and/or a pair of antenna terminals 3910, 3930.

The one or more processors may be further configured to generate the impedance control signal based on the determined operation point, e.g., including an instruction (also referred to as impedance control instruction) for generating the analog impedance control signal. The impedance control signal may be output at the control terminal 3920.

For example, the radiohead circuitry 3901 may include a signal generator 3921 (e.g., including a digital-to-analog converter), which is configured to generate the analog impedance control signal, e.g., when receiving the impedance control instruction from the one or more processors 3950. For example, the impedance control instruction may include the determined impedance adaption value. According to various aspects, the signal generator 3921 may be external from the radiohead circuitry 3901. Alternatively, the radiohead circuitry 3901 may include the signal generator 3921.

According to various aspects, the radiohead circuitry 3901 may include one pair of antenna terminals 3910, 3930, e.g., per antenna. The pair of antenna terminals 3910, 3930 may include a first antenna terminal 3910 (also referred to as TX antenna terminal) and a second antenna terminal 3930 (also referred to as sensing terminal 3930 or RX antenna terminal 3930).

The radiohead circuitry 3901, e.g., the RF FE circuitry 3502, may be configured to output a first antenna signal (also referred to as transmitted antenna signal, as TX antenna signal, or as transmitted signal) via the TX antenna terminal. The TX antenna signal may control the operation of the antenna, e.g., by including the upload data (also referred to as TX traffic).

The radiohead circuitry 3901 may be configured to receive a second antenna signal (also referred to as received antenna signal or as returning signal) via the sensing terminal. The received antenna signal may include download data (also referred to as Rx traffic) or may include a reflection of the TX antenna signal.

Optionally, the radiohead circuitry 3901 may include a sensor circuit 3931, which is configured to sense the received antenna signal. In this case, the one or more processors 3950 may be configured to receive a sensing signal from the sensor circuit 3931. Alternatively, the one or more processors 3950 may be configured to process the received antenna signal. As result of processing the received antenna signal or the sensing signal, the one or more processors 3950 may generate the impedance control signal, e.g., including the impedance control instruction.

Figure 41:
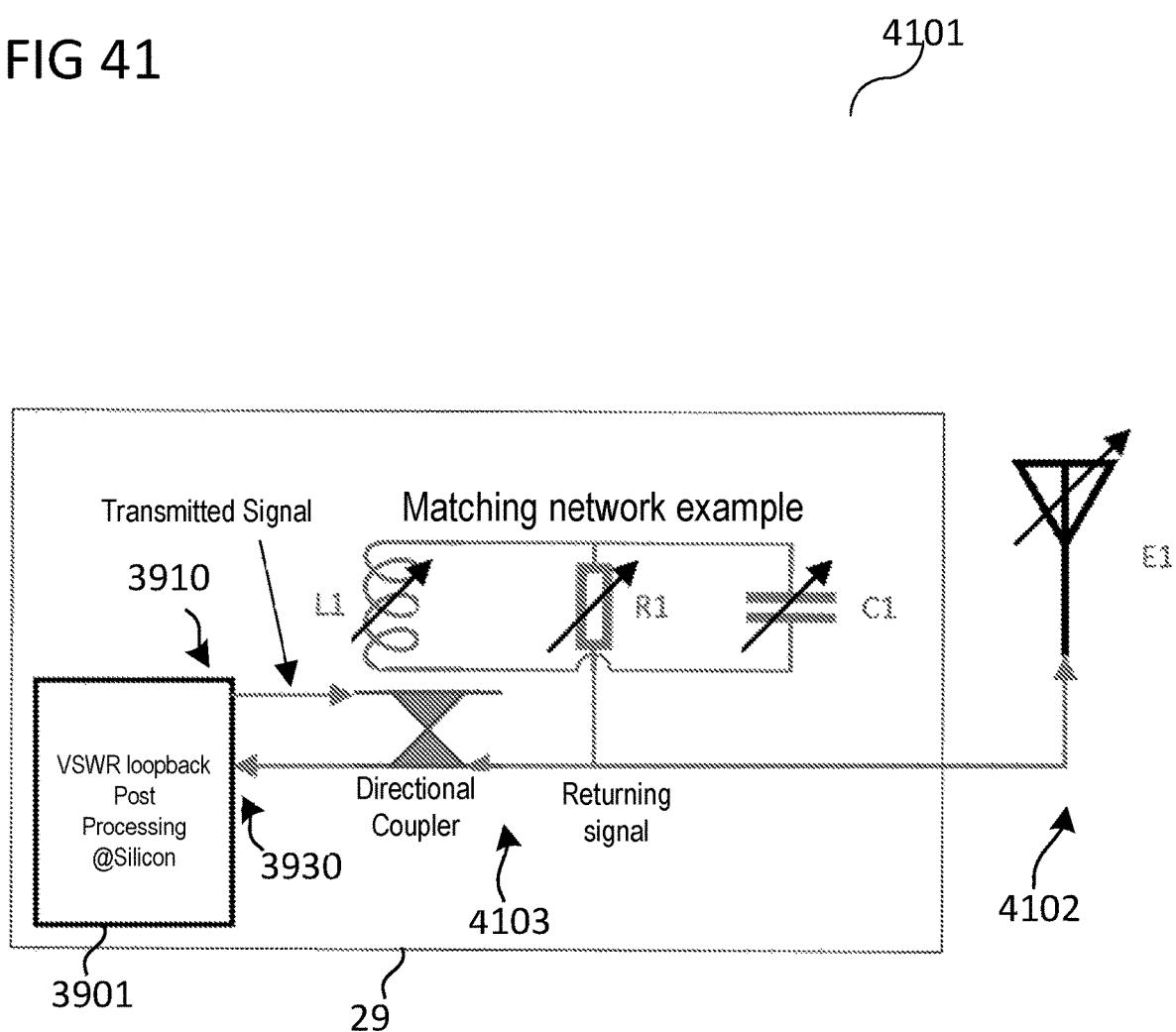
FIG. 41 exemplarily shows a block diagram of a circuitry in accordance with various aspects of the present disclosure.

FIG. 41 illustrates a block diagram of a circuitry 4101 according to various aspects, including the radiohead circuitry 3901 and at least one of: one or more antennas 4102, e.g., one or more multifeed antennas 3810, and/or a matching network circuit 4102.

The matching network circuit 4102 (also referred to as matching circuit or matching network) may be coupled to the antenna terminal 3920 and/or to the one or more antennas 4102. The matching network circuit 4102 may include a variable impedance. The variable impedance may be provided by one or more variable (e.g., controllable) circuit elements. Generally speaking, the matching network circuit 4102 may be an analog matching network circuit 4102 and/or a RF matching network circuit 4102.

As examples, the variable impedance may be provided by one or more of the following variable (e.g., controllable) circuit elements: one or more variable coils of the matching network circuit 4102, one or more variable resistors of the matching network circuit 4102, one or more switches of the matching network circuit 4102 and/or one or more variable capacitors of the matching network circuit 4102.

The radiohead circuitry 3901 (e.g., the one or more processors 3950) may be configured to control the variable impedance, e.g., by the impedance control signal. For example, the radiohead circuitry 3901 may supply the impedance control signal to the matching network circuit 4102. In this configuration, the radiohead circuitry 3901 is configured to provide for an impedance control. In some aspects, the impedance control may be implemented by one or more processors, which may be part of the radiohead circuitry 3901. In some other aspects, the impedance control or at least some functions of the impedance control may be implemented by one or more processors, which may be external from the radiohead circuitry 3901, as detailed later.

Examples of the functions of the impedance control may include: the operation point determination, generate an impedance control signal based on the operation point, output the control signal to the matching network circuit.

The matching network circuit 4102 may be configured to change the variable impedance in accordance with the impedance control signal, e.g., according to the determined impedance adaption value as represented by the impedance control signal.

Each of the one or more antennas 4102 may be coupled to one antenna terminal of the one or more antenna terminals 3910. For example, the radiohead circuitry 3901 may include one of the two antenna terminals 3910 per antenna 4102 connected to the antenna 4102.

Optionally, the circuitry 4101 may include a directional coupler circuit 4103, which couples the antenna 4102 with the radiohead circuitry 3901. For example, the directional coupler circuit 4103 may couple the radiohead circuitry 3901 with the matching network circuit 4102. According to various aspects, the directional coupler circuit 4103 may be external from the radiohead circuitry 3901. Alternatively, the radiohead circuitry 3901 may include the directional coupler circuit 4103.

The directional coupler circuit 4103 may be configured to supply a signal (also referred to as returning signal) from the antenna 4102 to the radiohead circuitry 3901, e.g., to the sensing terminal 3930. The directional coupler circuit 4103 may be further configured to supply a signal (also referred to as transmitted signal) from the radiohead circuitry 3901, e.g., from the TX antenna terminal 3910, to the antenna 4102. Speaking more generally, the directional coupler circuit 4103 may be configured to selectively couple the sensing terminal 3930 or the TX antenna terminal 3910 to the radiohead circuitry 3901, e.g., as function of the direction of the antenna signal (illustratively, the direction of the communication via the one or more one or more antenna terminals).

According to various aspects, the transmitted signal and/or the returning signal may be influenced by the matching network circuit 4102, e.g., by the actual value of the variable impedance of the matching network circuit 4102. This provides for a more precise control of the operation point, e.g., by controlling the variable impedance by the one or more processors 3950.

According to various aspects, at least two of: the antenna 4102, the radiohead circuitry 3901 and/or the matching network circuit 4102 may be disposed (e.g. mounted on, formed directly on, at least partially integrated in or over) on the same circuit board, e.g., disposed to the same monolithic substrate of the circuit board. This achieves a more compact architecture and facilitates the signal transmission, e.g., for the integration in a wireless mobile device.

According to various aspects, the antenna 4102 may include a (e.g., monolithic) trace or one or more trace portions disposed in or over the circuit board. This achieves a more compact architecture and facilitates the signal transmission, e.g., for the integration in a wireless mobile device. Said more generally, the antenna 4102 may include or be formed from a patterned conductive, e.g. electrically conductive layer, e.g., a circuit board trace.

According to various aspects, a joint tuning of an (e.g., analog and/or RF) matching network circuit 4102 at the radiohead circuitry 3901 and of the antenna 4102 is provided for optimizing the airlink utilization. Also, a high quality estimation of the complex return loss and the VSWR is provided.

As exemplary implementation, the radiohead circuitry 3901 (e.g., radiohead module) may be disposed near (e.g., proximate) the antenna 4102 and may be configured to change the variable impedance connected to the antenna 4102, e.g., when one or more of the following changes is determined: a VSWR change, a WiFi RF frequency change, a WiFi signal bandwidth change or an air-link channel versus (e.g., as function of) the peer change.

Exemplary algorithms implemented by the radiohead circuitry 110101, e.g., by the one or more processors 3950, may include: slow tracking of the operation point (e.g., the matching configuration) for maximal Rx spectral efficiency and/or Tx spectral efficiency; slow tracking of the operation point (e.g., the matching configuration) for maximal Rx spectral efficiency in scenarios with mainly Rx traffic, e.g., with alternate jammers; slow tracking of the operation point (e.g., the matching configuration) for maximal Rx spectral efficiency in scenarios with mainly Rx traffic, e.g., without alternate jammers; slow tracking of the operation point (e.g., the matching configuration) for maximal Tx spectral efficiency in system scenarios with mainly Tx traffic; slow tracking of the operation point (e.g., the matching configuration) for minimal absolute value of the return loss and/or with that maximal Tx power.

Exemplary algorithms implemented by the radiohead circuitry 3901, e.g., by the one or more processors 3950, may include a proximity determination. The proximity determination may include to determine a proximity of human tissue, e.g., upon determining a difference between the sensed return loss and a reference return loss (e.g., the return loss sensed in the production line, without such proximity). In general, the proximity determination may be based on a comparison of the sensed return loss and the reference return loss. For example, the reference return loss may be stored by the radiohead circuitry 3901, e.g., by a memory of the radiohead circuitry 3901. For example, the reference return loss may be read out from a memory by the one or more processors 3950. The reference return loss may correspond to the return loss sensed in a proximity-free environment of the antenna 4102.

An implementation of the proximity determination is described in more detail in the following.

Figure 42:
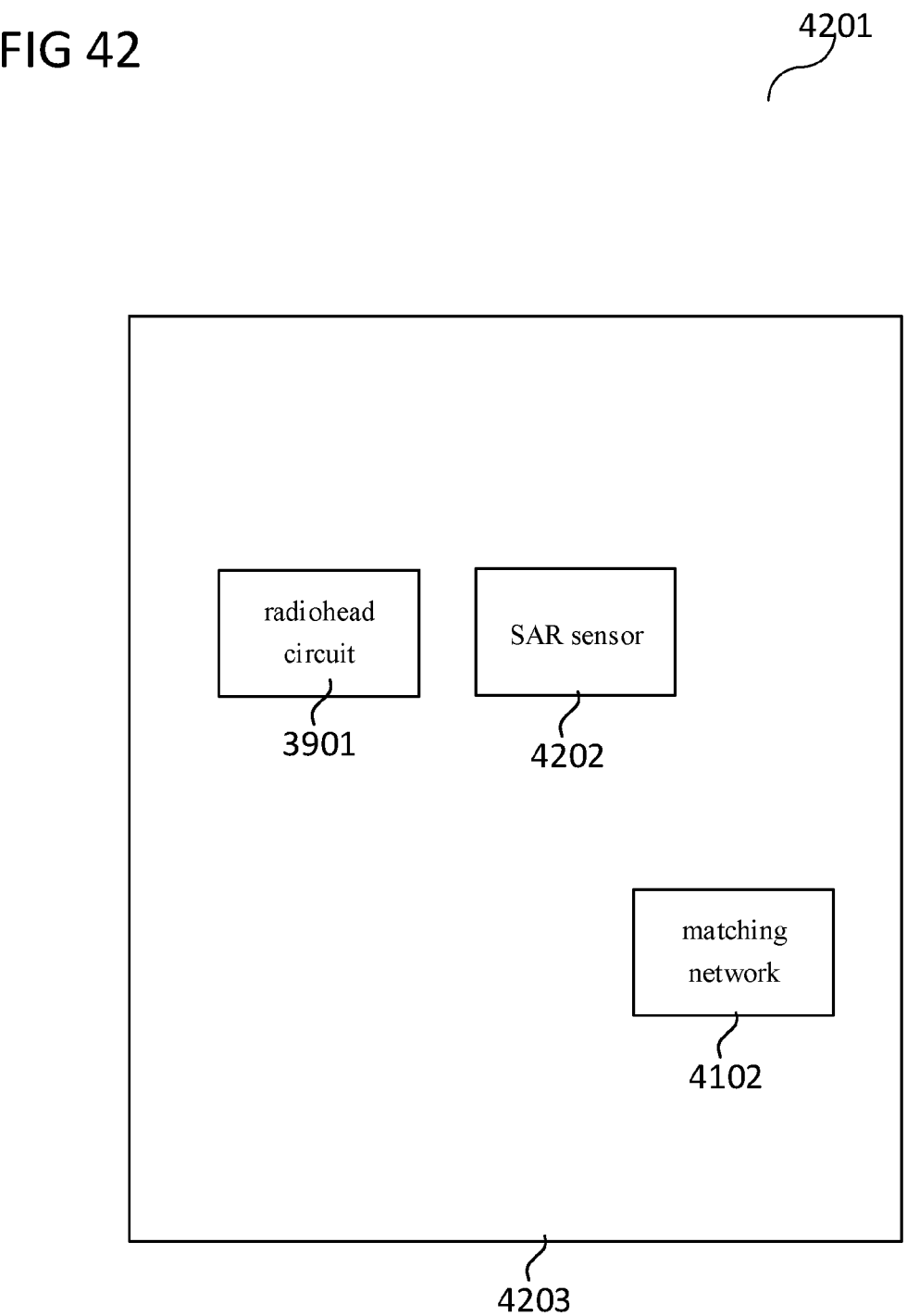
FIG. 42 exemplarily shows a block diagram of a circuitry in accordance with various aspects of the present disclosure.

FIG. 42 illustrates a block diagram of a circuitry 4201 according to various aspects, including the radiohead circuitry 3901. Further, the circuitry 4201 may include a specific absorption rate (SAR) sensor circuit 4202 (also referred to as SAR sensor circuit) and/or a matching network circuit 4202.

According to various aspects, a sensor circuit, e.g., the SAR sensor circuit 4202, may implement a measurement chain. The measurement chain may be partially or completely implemented by the circuitry 4201. In some aspects, the measurement chain includes a corresponding infrastructure (e.g. including one or more of: a processor, a signal generator, a storage medium and/or a bus system, etc.) to implement various functions of the measurement process. Examples of the measurement process include: the specific absorption rate determination, a proximity determination and the operation point determination. Examples of the functions of the measurement process include: initiating a sensing process, controlling the sensing process, processing the quantity sensed by the sensing process as an input variable, transducing the quantity sensed by the sensing process into an output variable, and/or providing an electrical signal (also referred to as sensing signal) as output variable. The sensing signal may be based on the input variable at the time of the sensing process. The sensing signal may be an analog or digital signal.

In some aspects, one or more functions of the SAR determination may be implemented by one or more processors of the SAR sensor circuit 4202 or by one or more processors external from the SAR sensor circuit 4202, e.g., external from the circuitry 4201. It may be understood that the references made to the SAR determination may analogously apply to the SAR sensor circuit 4202 and/or the one or more processors.

The SAR sensor circuit 4202 may include or be formed from one or more integrated chips (IC), e.g., provided in a single chip package. According to various aspects, the SAR sensor circuit 4202 may be provided as a single IC (then also referred to as sensor IC 4202), which reduces production and mounting costs. It may be understood that the references made to the sensor IC 4202 may apply analogously to the SAR sensor circuit 4202 provided in another configuration.

According to various aspects, the SAR sensor circuit 4202 may be disposed proximate the SAR sensor circuit. Disposing the SAR sensor circuit 4202 proximate the radiohead circuitry 3901 reduces the signal travelling distance from one or more sensing pads and also reduces the costs of the cable and routing space in the system. For example, a separate circuit board for the radiohead circuitry 3901 may not be necessary.

Herein, the term "proximate" may be used with respect to various electrical components, such as circuits, circuitries, antennas, sensing pads, etc., to describe their positional relationship. For example, the term "proximate" may be representative for their spatial positioning and/or electrical connection to each other. In some aspects, two or more electrical components, which are disposed proximate to each other (also referred to as group of proximate components), may be understood to be positioned or disposed close to each other, e.g., having a small spatial distance from each other and/or being on the same circuit board. In some aspects, the group of proximate components may be understood to be coupled to each with by a short signal path (e.g., including a wire, a signal trace and/or another conductor), e.g., having a small impedance.

According to various aspects, the group of proximate components may provide a more compact design, may be provided within a single module and/or may reduce the costs and effort of wiring. Further, a group of proximate components, which are electrically coupled to each other, may provide for a higher signal quality, e.g., signal-to-noise-ratio, and reduce the detrimental influence of the signal path (e.g., its impedance, attenuation, internal reflection, scattering, etc.) on the exchange of information. Examples of the group of proximate components, which are electrically coupled to each other, may include: components, which communicate with other, components, which sense each other, etc.

Exemplarily implementations of the group of proximate components may include: two or more electrical components disposed on and/or in the same circuit board; and/or two or more electrical components having a distance from each other less than a spatial reference (e.g., less than 50% or 25%, or 10% of the spatial reference). In some aspects, the spatial reference may be an extension of the wireless mobile device (e.g., of the its housing), e.g., the width and/or the thickness of the wireless mobile device. This provides for a compact architecture for mobile applications, e.g., increasing the available space. According to various aspects, the spatial reference may be an extension of one component of the group of proximate components. According to various aspects, the spatial reference may be an extension of an antenna coupled to the radiohead circuitry 3901. According to various aspects, the spatial reference may be a distance between the antenna and the radiohead circuitry 3901. According to various aspects, the spatial reference may be 5 cm (Centimeter) or less, e.g., 3 cm or less, e.g., 1 cm or less.

Disposing the group of proximate components on the same circuit board may allow for reducing the signal path impedance and/or spatial distance of the group of proximate components from each other and/or providing a compact module including the group of proximate components. The circuit board may include a substrate (e.g., a foil, plate or the like) over or in which the group of proximate components may be disposed, e.g., integrated and/or mounted. For example, the substrate may be a monolithic substrate and/or an electrical isolating substrate. For example, the substrate may carry the group of proximate components and/or one or more signal traces coupling the group of proximate components with each other. For example, the substrate may include or be formed from a polymer.

Illustratively, the closer the group of proximate components is disposed relative to each other, the less impedance the signal path may have. In an exemplarily implementation of the group of proximate components, the signal path (e.g., including wire, a signal trace and/or another conductor) coupling the group of proximate components with each other may have an impedance less than one or both of the components. Additionally or alternatively, the impedance of the signal path may be less than an impedance of the antenna and/or a sensing pad.

In the illustrated example, the group of proximate components includes the radiohead circuitry 3901 and the SAR sensor circuit 4202. The radiohead circuitry 3901 and the SAR sensor circuit 4202 may but do not need to be disposed (e.g. mounted on, formed directly on, at least partially integrated in or over) on and/or in the same circuit board 4203. More examples of the group of proximate components are detailed later.

The radiohead circuitry 3901 may be configured to control a wireless communication, e.g., via an antenna coupled to the radiohead circuitry 3901. In some aspects, the radiohead circuitry 3901 may be configured to transmit and/or receive the antenna signal as described above, e.g., via one or more antenna terminals. The SAR sensor circuit 4202 may be configured to implement a SAR determination of the wireless communication, e.g., when the wireless communication is controlled by the radiohead circuitry 3901.

The specific absorption rate (SAR) may be understood as a measure of the rate, at which energy is absorbed per unit mass by the environment of the antenna (e.g., by human tissue, e.g., by a human body), when exposed to a radio frequency (RF) electromagnetic field of the wireless communication. Generally, the SAR determination may be based on a sensed quantity (also referred to as SAR representing quantity) of the environment of the SAR sensor circuit 4202. Examples of the SAR representing quantity may include an electrical capacitance, a return loss and/or a response to the wireless communication, e.g., a response to the transmitted RF electromagnetic field.

Examples of functions of the SAR determination may include: sensing the SAR representing quantity; determining the SAR (e.g., its value) based on the sensed SAR representing quantity. The SAR representing quantity may be sensed via a so called sensing pad, as detailed later. Illustratively, the sensing pad transduces the SAR representing quantity into an electrical signal, which is sensed by the SAR sensor circuit 4202. For example, the response to the wireless communication may be received via the sensing pad. For example, the electrical capacity may be sensed by sensing a phase shift of a test signal transmitted to and returned by the sensing pad. For example, the return loss may be sensed by sensing a electrical power loss of a test signal transmitted to and returned by the sensing pad.

Further examples of functions of the SAR determination may include: comparing the sensed SAR representing quantity (e.g., the return loss) to a reference SAR representing quantity. The reference SAR representing quantity (e.g., a reference return loss) may correspond to the SAR representing quantity sensed in a reference (e.g., free) environment of the antenna 4102. For example, the reference SAR representing quantity may be stored by a storage medium (e.g., a memory) of the circuitry 4201 and/or external from the circuitry 4201. For example, the reference SAR representing quantity may be read out from the storage medium by one or more processors of the circuitry 4201 and/or external from the circuitry 4201. The one or more processors may be configured to compare the sensed reference SAR representing quantity (e.g., a return loss of the antenna) to a reference SAR representing quantity.

In some aspects, in which the SAR is correlated to the presence of human tissue, the SAR sensor circuit 4202 may implement a corresponding proximity determination (in this case, the SAR sensor circuit 4202 is also referred to as proximity sensor circuit 4202). Illustratively, the proximity of human tissue may be determined based on the SAR determination. In some aspects, this allows for determination of a human proximity based on the sensed SAR representing quantity. By the SAR determination and/or the proximity determination, a human proximity from the laptop may be sensed. The sensing may be used to reduce RF emission and/or Tx power. In various aspects, at least one SAR sensing pad is disposed each of both sides of the antenna.

As detailed in the following, one or more SAR sensing pads and the SAR sensor circuit 4202 (e.g., a sensor IC) may be disposed on the same (e.g., printed and/or flexible) circuit board and/or may be communicatively coupled to each other by a cable. Additionally or alternatively, the antenna may be used as SAR sensing pad. In some aspects, the SAR sensor circuit 4202 may be disposed on or in a main board.

Figure 43:
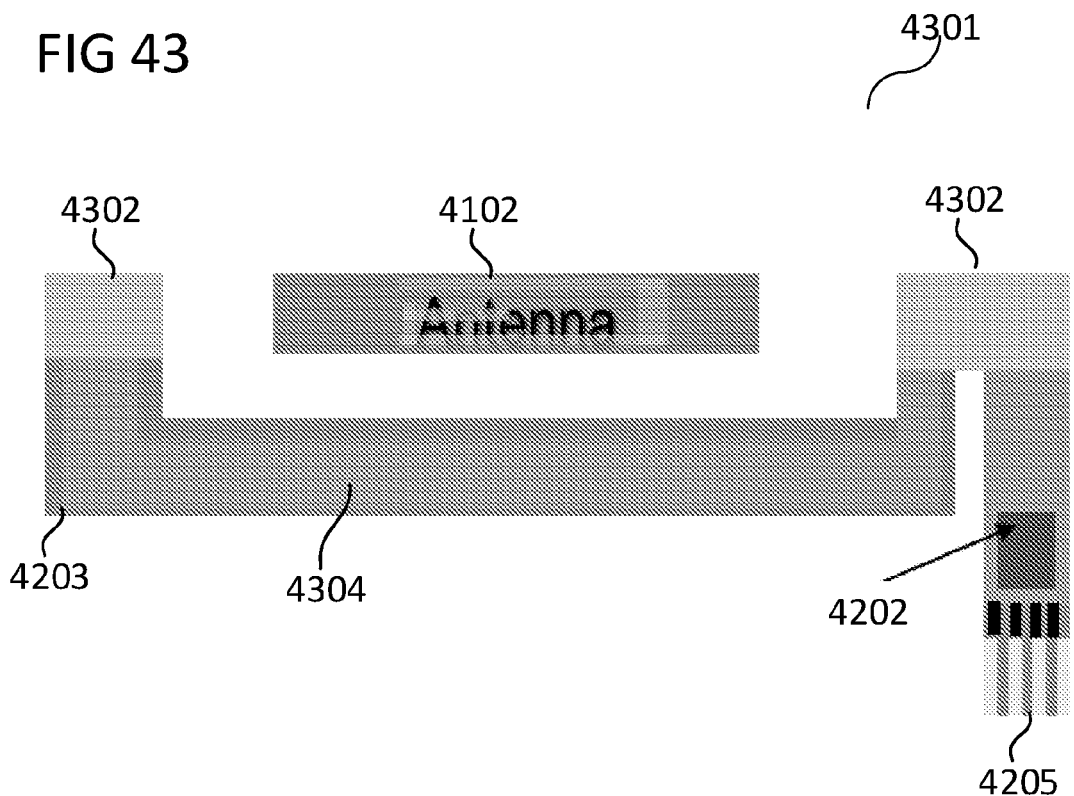
FIG. 43 exemplarily shows a block diagram of a circuitry in accordance with various aspects of the present disclosure.

FIG. 43 illustrates a block diagram of a circuitry 4201 according to various aspects 4301, further including one or more sensing pads 4302 and/or an antenna 4102.

According to various aspects, at least two electrical components of the following components may be disposed proximate to each other: at least one of the one or more sensing pads 4302, the SAR sensor circuit 4202 and/or the antenna 4102. This improves the correlation of the SAR representing quantity and the proximity of human tissue near the antenna 4102. For example, the one or more sensing pads 4302 may be disposed proximate the antenna 4102. This reduces scattering and other influences on the response to the wireless transmission. For example, at least one of the one or more sensing pads 4302 may be disposed proximate the SAR sensor circuit 4202. This reduces the detrimental influence of the electrical path 4304 coupling the SAR sensor circuit 4202 with the at least one sensing pad 4302.

In the illustrated example, the one or more sensing pads 4302 and the SAR sensor circuit 4202 are disposed (e.g. mounted on, formed directly on, at least partially integrated in or over) on and/or in the same circuit board 4203. The one or more sensing pads 4302 may be electrically coupled with the SAR sensor circuit 4202, e.g., by a signal trace 4304 of the circuit board 4203 or (if they are on separate circuit boards) by a wire and/or an connector.

According to various aspects, an impedance of the antenna 4102 may be more than an impedance of the first signal trace 4304. This allows for a more precise sensing.

According to various aspects, the circuit board 4203 may include or be formed from a flexible Printed Circuit Board (FPC) or a mother board. For example, the SAR sensor circuit 4202 may be disposed on or in a flexible Printed Circuit Board (FPC) or a mother board.

Generally, the circuit board 4203 may include a connector 4205 coupled to the SAR sensor circuit 4202. The connector 4205 may include one or more connector pads. Readily mounted, the one or more connectors 4205 may be coupled to one or more circuits disposed external from the circuit board 4203. This allows for connecting the circuit board 4203 to external components of the circuitry 4201, if present. It may be understood that the references made herein to signal traces may analogously apply the electric conductors of another type, e.g., if the communicatively coupled components are disposed on or in different circuit boards.

According to various aspects, an electric conductors may include one or more coaxial wires, one or more multifilament wires, one or more connectors, one or more signal traces, etc.

In the illustrated example, the antenna 4102 is disposed on another circuit board, e.g., being separate from the circuit board 4203.

The SAR sensor circuit 4202 may be configured to implement the specific absorption rate determination using the one or more sensing pads 4302. For example, the specific absorption rate determination may include to sense the SAR representing quantity via the one or more sensing pads 4302.

According to various aspects, the one or more sensing pads 4302 may include two or more sensing pads 4302, between which the antenna 4102 is disposed. This allows for a more precise proximity determination.

Figure 44:
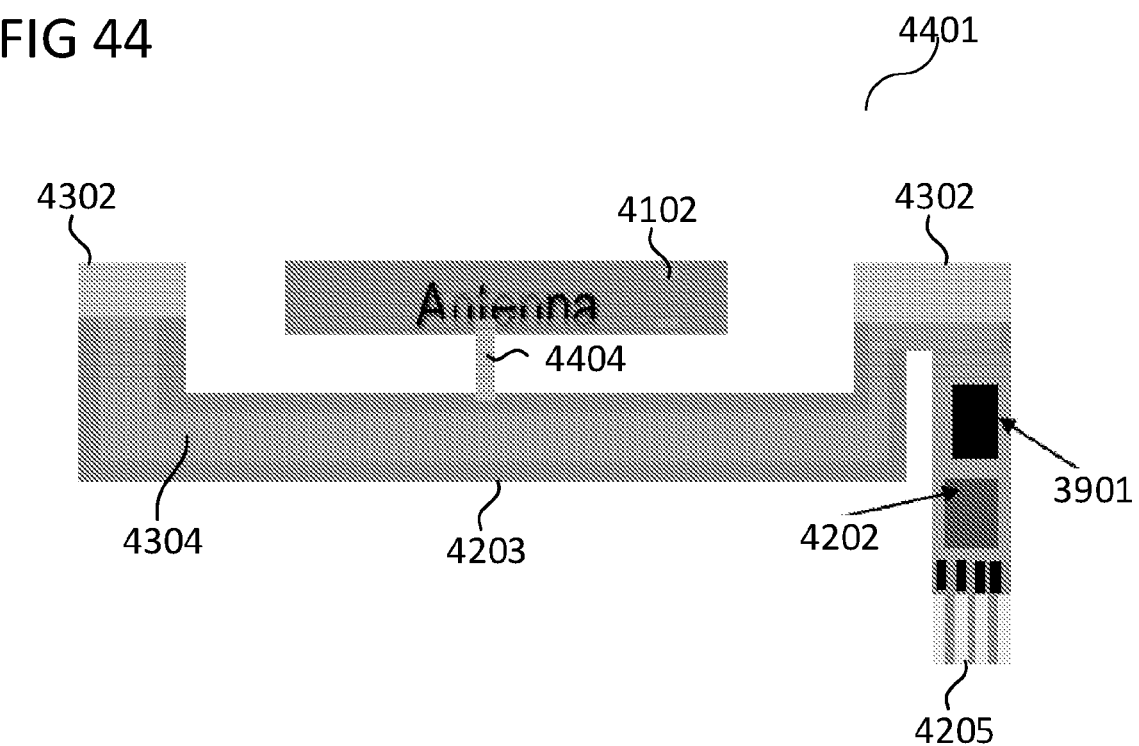
FIG. 44 exemplarily shows a block diagram of a circuitry in accordance with various aspects of the present disclosure.

FIG. 44 illustrates a block diagram of a circuitry 4201 according to various aspects 4401, further including the radiohead circuitry 3901 disposed together with the SAR sensor circuit 4202 on the same circuit board 4203. The circuit board 4203 may include a first signal trace 4304 coupling the SAR sensor circuit 4202 with the one or more sensing pads 4302. The circuit board 4203 may include a second signal trace 4404 coupling the radiohead circuitry 3901 with the antenna 4102.

According to various aspects, an impedance of the antenna 4102 may be more than an impedance of one or more of the following: the first signal trace 4304 and/or the second signal trace 4404 (if present).

In the illustrated example, the antenna 4102 is disposed together with the SAR sensor circuit 4202 on the same circuit board 4203. For example, the antenna may be fabricated (e.g., made on) and/or directly connect to the circuit board, on or in which the radiohead circuitry 3901 is disposed. In some aspects, the antenna 4102 may be also disposed on a separate circuit board, which may be connected to the circuit board 4203 via one or more connectors 4205.

According to various aspects, the SAR sensor circuit 4202 and the radiohead circuitry 3901 may be disposed proximate to each other (e.g., forming a group of proximate components). For example, a distance from the SAR sensor circuit 4202 to the radiohead circuitry 3901 may be less than a distance from the radiohead circuitry 3901 to one or more of the following: the antenna 4102 and/or the one or more sensing pads 4302 (also referred to as sensor pads). Additionally or alternatively, a distance from the SAR sensor circuit 4202 to the radiohead circuitry 3901 may be less than a distance from the SAR sensor circuit 4202 to one or more of the following: the antenna 4102 and/or the one or more sensing pads 4302 (also referred to as sensor pads). For example, the extension of the antenna 4102 may be more than a distance from the antenna 4102 to one or more of the following: the SAR sensor circuit 4202 and/or the radiohead circuitry 3901.

In the illustrated example, the radiohead circuitry 3901 may be disposed between the SAR sensor circuit 4202 and one or more of the following: the antenna 4102 and/or the one or more sensing pads 4302. In other aspects, the SAR sensor circuit 4202 may be disposed between the radiohead circuitry 3901 and one or more of the following: the antenna 4102 and/or the one or more sensing pads 4302.

Figure 45:
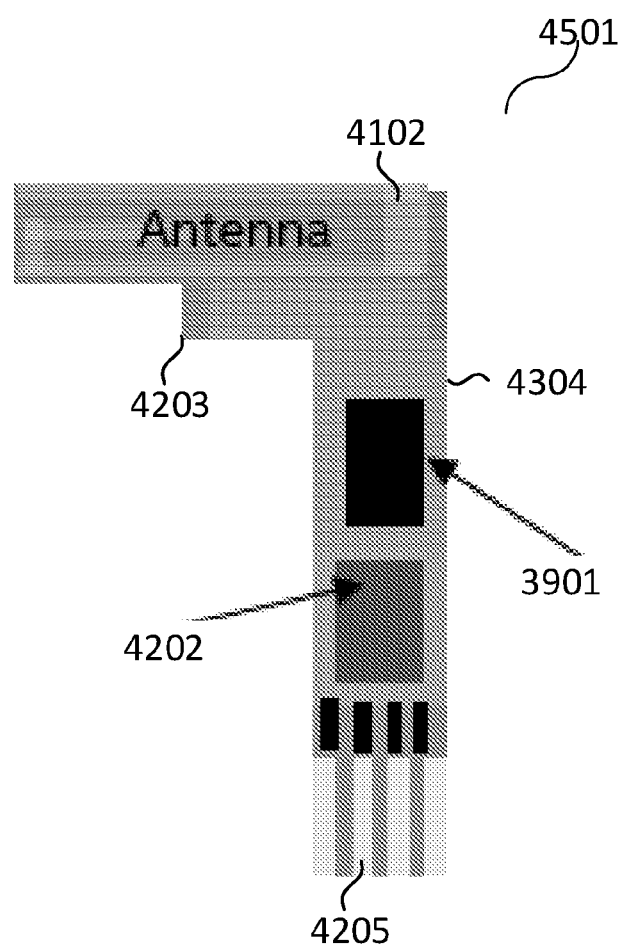
FIG. 45 exemplarily shows a block diagram of a circuitry in accordance with various aspects of the present disclosure.

FIG. 45 illustrates a block diagram of a circuitry 4201 according to various aspects 4501, in which the SAR sensor circuit 4202 uses the antenna 4102 (e.g., at least a portion of the antenna 4102) as sensing pad. Using the antenna 4102 as sensing pad may include to sense the SAR representing quantity via the antenna 4102.

In the illustrated example, the SAR sensor circuit 4202, the radiohead circuitry 3901 and the antenna 4102 are disposed on or in the same circuit board 4203. In this case, the circuit board 4203 may include one or more signal traces 4304 coupling the antenna 4102 with the SAR sensor circuit 4202 and/or with the radiohead circuitry 3901.

According to various aspects, an impedance of the antenna 4102 may be more than an impedance of each first signal trace 4304. This allows for a more precise sensing using the antenna 4102 as sensing pad.

Figure 46:
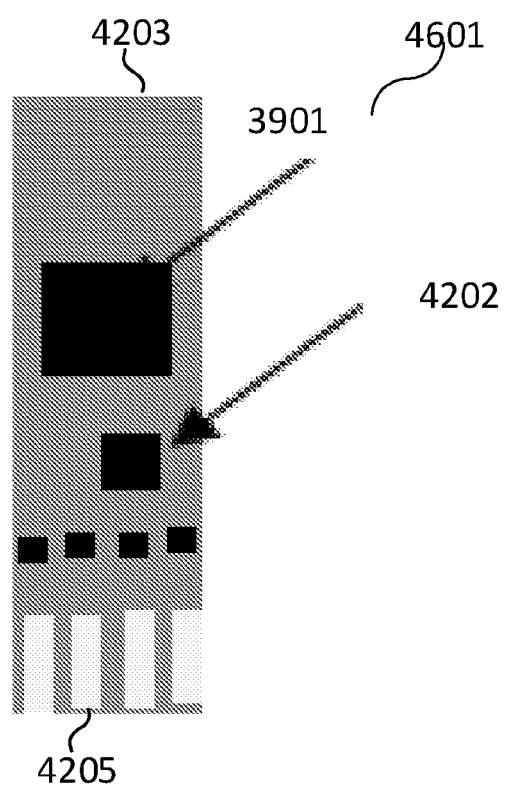
FIG. 46 exemplarily shows a block diagram of a circuitry in accordance with various aspects of the present disclosure.

FIG. 46 illustrates a block diagram of a circuitry 4201 according to various aspects 4601, in which the SAR sensor circuit 4202 and the radiohead circuitry 3901 are disposed on circuit board 4203. The one or more sensing pads 4302 and/or the antenna 4102 may be disposed on another circuit board, which, e.g., in an operational state, may be coupled to the connector 4205.

Generally speaking, the circuit board 4203 may include one or more connectors 4205, by which the SAR sensor circuit 4202 may be coupled to the one or more sensing pads 4302 and/or to the antenna 4102. Analogously, the one or more connectors 4205 may allow for coupling the radiohead circuitry 3901 with the antenna 4102.

Figure 47:
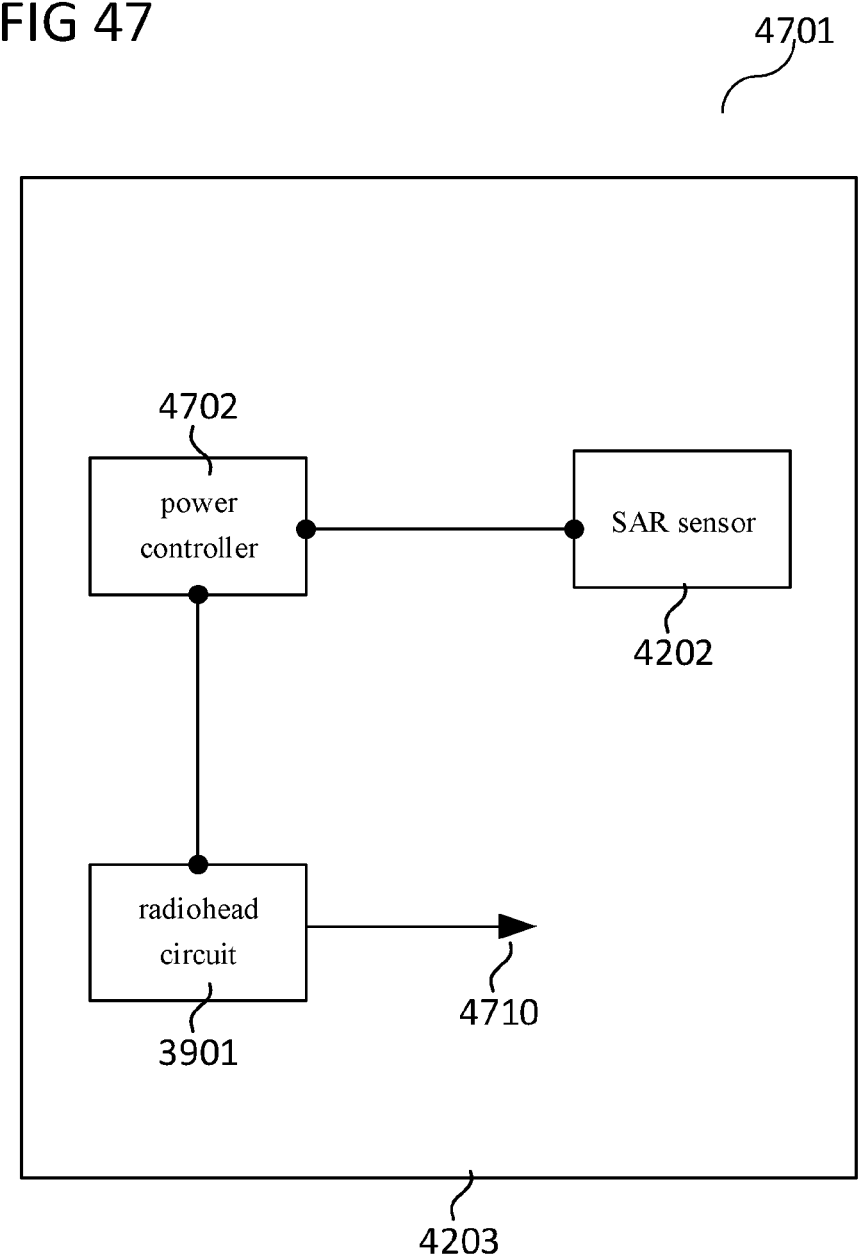
FIG. 47 exemplarily shows a block diagram of a circuitry in accordance with various aspects of the present disclosure.

FIG. 47 illustrates a block diagram of a circuitry 4201 according to various aspects 4701, in which the circuitry 4201 further includes a power controller 4702. The power controller 4702 may be configured to control an electrical power (e.g., measured in Watts) of the wireless communication (e.g., transmitted and/or received by the antenna) based on a result of the specific absorption rate determination. In some aspects, the power controller 4702 may be configured to control an electrical power of the antenna signal 4810 output at the antenna terminal of the radiohead circuitry 3901. In some aspects, the power controller 4702 may be coupled to the radiohead circuitry 3901 to control the electrical power of the antenna signal output by the radiohead circuitry 3901. In some other aspects, the power controller 4702 may be part of the radiohead circuitry 3901. The antenna signal 4810 may be supplied from the radiohead circuitry 3901 to the antenna, as described previously.

According to various aspects, the power controller 4702 may be coupled to the SAR sensor circuit 4202 to receive a sensing signal from the SAR sensor circuit 4202. The sensing signal may represent the result of the specific absorption rate determination, e.g., the determined SAR representing quantity. For example, the determined SAR representing may include a SAR value and/or a proximity value.

In some aspects, the power controller 4702 may implement a (e.g., open-loop or closed loop) control of the SAR, e.g., based on the sensed SAR representing quantity. In some other aspects, the power controller 4702 implements a (e.g., open-loop or closed loop) control of the electrical power of the antenna signal 4810 and/or the wireless communication, e.g., based on the sensed SAR representing quantity.

According to various aspects, the power controller 4702 may be implemented by one or more processors as detailed in the following.

Figure 48:
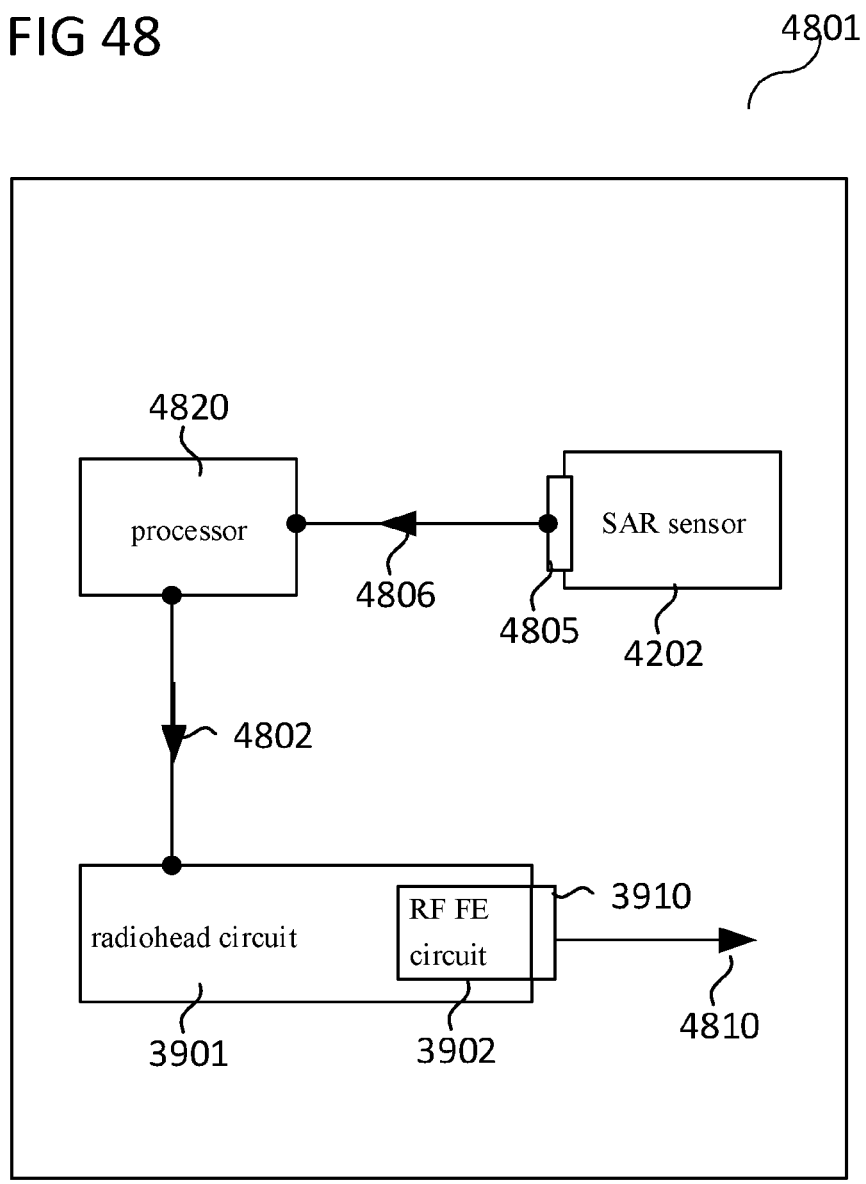
FIG. 48 exemplarily shows a block diagram of a circuitry in accordance with various aspects of the present disclosure.

FIG. 48 illustrates a block diagram of a circuitry 4201 according to various aspects 4801, in which the circuitry 4201 includes the one or more processors 4820. As described previously, the radiohead circuitry 3901 may include the one or more RF FE circuits 3502. The one or more RF FE circuitries 3502 may be configured to operate an antenna based on a control signal 4802. For example, each RF FE circuitry 3502 may be configured to output or receive the antenna signal 4810 via an antenna terminal 3910 of the radiohead circuitry 3901. The electrical power of the antenna signal 4810 transmitted via an antenna terminal 3910 may be based on the control signal 4802.

The SAR sensor circuit 4202 may include a sensing terminal 4805. the SAR sensor circuit 4202 may be configured to sense the SAR representing quantity and to provide the sensing signal 4806 at the sensing terminal 4805 based on the sensed SAR representing quantity. The SAR representing quantity may be sensed via the one or more sensing pads 4302 and/or via the antenna as detailed above.

Further, the circuitry 4201 may include the circuit board 4203, wherein the radiohead circuitry 3901 and the SAR sensor circuit 4202 are disposed on and/or in the circuit board 4203. Optionally, the one or more processors 4820 and/or the antenna may be disposed on and/or in the circuit board 4203.

The one or more processors 4820 may be coupled to the sensing terminal 4805 and to the radiohead circuitry 3901, e.g., to the one or more RF FE circuitries 3502 (e.g., to its amplifier). The one or more processors 130720 may be configured to receive the sensing signal 4806; determine a human proximity based on the sensing signal 4806; generate the control signal 4802 based on the human proximity; and output the control signal 4802 to the radiohead circuitry 3901.

Figure 49:
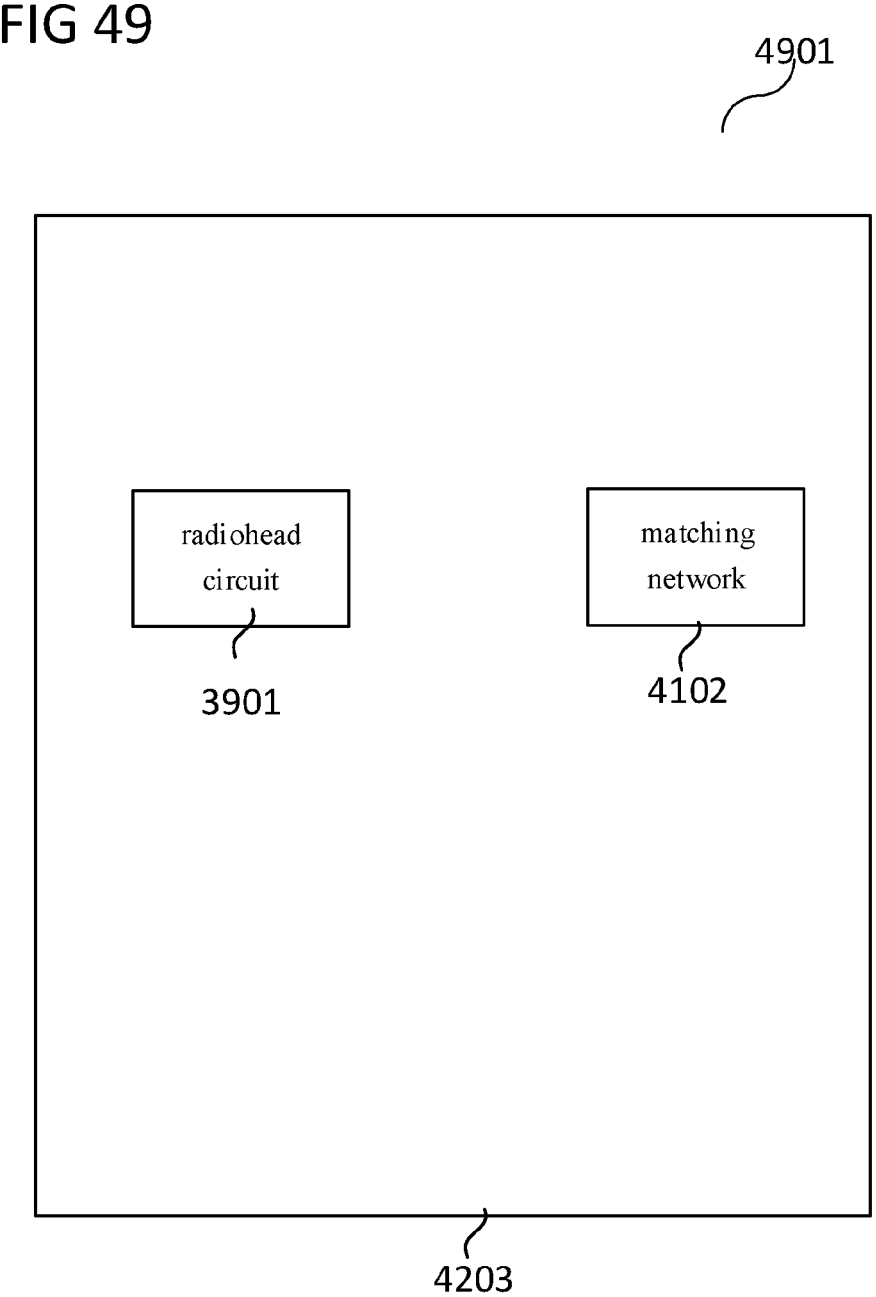
FIG. 49 exemplarily shows a block diagram of a circuitry in accordance with various aspects of the present disclosure.

FIG. 49 illustrates a block diagram of a circuitry 4901 according to various aspects, including the radiohead circuitry 3901 and the matching network circuit 4102 (also referred to as antenna tuner circuit). Generally speaking, the matching network circuit 4102 may be an analog matching network circuit 4102 and/or a RF matching network circuit 4102.

As detailed above, the radiohead circuitry 3901 may be configured to exchange electrical power (e.g., measured in Watts) with the antenna to control a wireless communication transmitted by an antenna. The electrical power may be exchanged with the antenna by the antenna signal.

In operation or being operational, the matching network circuit 4102 may be coupled to the radiohead circuitry 3901 (e.g., the antenna terminal 3920) and/or to one or more antennas (not illustrated). The matching network circuit 4102 may include a variable impedance. The variable impedance may be provided by one or more variable (e.g., controllable) circuit elements.

As examples, the variable impedance may be provided by one or more of the following variable (e.g., controllable) circuit elements: one or more variable coils of the matching network circuit 4102, one or more variable resistors of the matching network circuit 4102, one or more switches of the matching network circuit 4102 and/or one or more variable capacitors of the matching network circuit 4102.

The matching network circuit 4102 may be configured to influence the exchange of electrical power, e.g., to influence one or more electrical quantities of the antenna signal. Examples of the one or more electrical quantities of the antenna signal may include: the amplitude of the antenna signal, the phase of the antenna signal, the damping of the antenna signal, etc.

Analogously to the references made for the SAR sensor circuit 4202, the matching network circuit 4102 may be disposed proximate to the radiohead circuitry 3901.

According to various aspects, the circuitry 4101 enables a tunable antenna for WLAN, e.g., as for WIFI-6E, which has an additional 6 GHz band. For example, the matching network circuit 4102 may provide for a miniaturized antenna with better performance in all the bands. Illustratively, disposing the matching network circuit 4102 proximate the radiohead circuitry 3901 may resolve the complexity of the matching network circuit 4102 and/or the radiohead circuitry 3901 placement in the system. Additionally or alternatively, cable routing from the modem or CPU may be reduced. Disposing the matching network circuit 4102 proximate the radiohead circuitry 3901 may facilitate tuning the antenna to improve the performance by band switching or impedance tuning.

According to various aspects, the matching network circuit 4102 and the radiohead circuitry 3901 may be disposed in or on the same circuit board 4203. For example, the circuit board 4203 may include or be formed from a Printed Circuit Board (PCB), e.g., a flexible Printed Circuit Board (FPCB).

According to various aspects, the matching network circuit 4102 and/or the radiohead circuitry 3901 may be disposed proximate the antenna. Additionally or alternatively, the antenna may be disposed on or in the same circuit board 4203 as the matching network circuit 4102 and/or as the radiohead circuitry 3901.

For example, the antenna, the radiohead circuitry 3901 and the matching network circuit 4102 may be disposed on or in the same circuit board 4203. For example, the antenna, the radiohead circuitry 3901, the SAR sensor circuit 4202 and the matching network circuit 4102 may be disposed on or in the same circuit board 4203. Such a disposal on the same circuit board 4203 (e.g., a FPCB) may provide an all in one module, which facilitates to control and/or reduce antenna performance related issues.

Disposing the matching network circuit 4102 proximate the radiohead circuitry 3901 may enable to multiplex one or more interfaces (also referred to as matching control interfaces) used to control the matching network circuit 4102, e.g., by the radiohead circuitry 3901. Examples of the one or more matching control interfaces may include a power rail, a mobile industry processor interface (MIPI) interface and/ or a general purpose input/output (GPIO) interface.

According to various aspects, the matching network circuit 4102 may include or be formed from one or more integrated chips (IC), e.g., provided in a single chip package. According to various aspects, the matching network circuit 4102 may be provided as a single IC (then also referred to as tuner IC 4102), which reduces production and mounting costs. It may be understood that the references made to the tuner IC 4102 may apply analogously to matching network circuit 4102 provided in another configuration.

In the following, other aspects of the circuitry 4101 are detailed. It may be understood that the references made above for various electrical components (e.g., of the circuitry 3510, 120101 and/or 4201) may analogously apply to the circuitry 4101, if the circuitry 4201 includes the respective electrical components.

Figure 50:
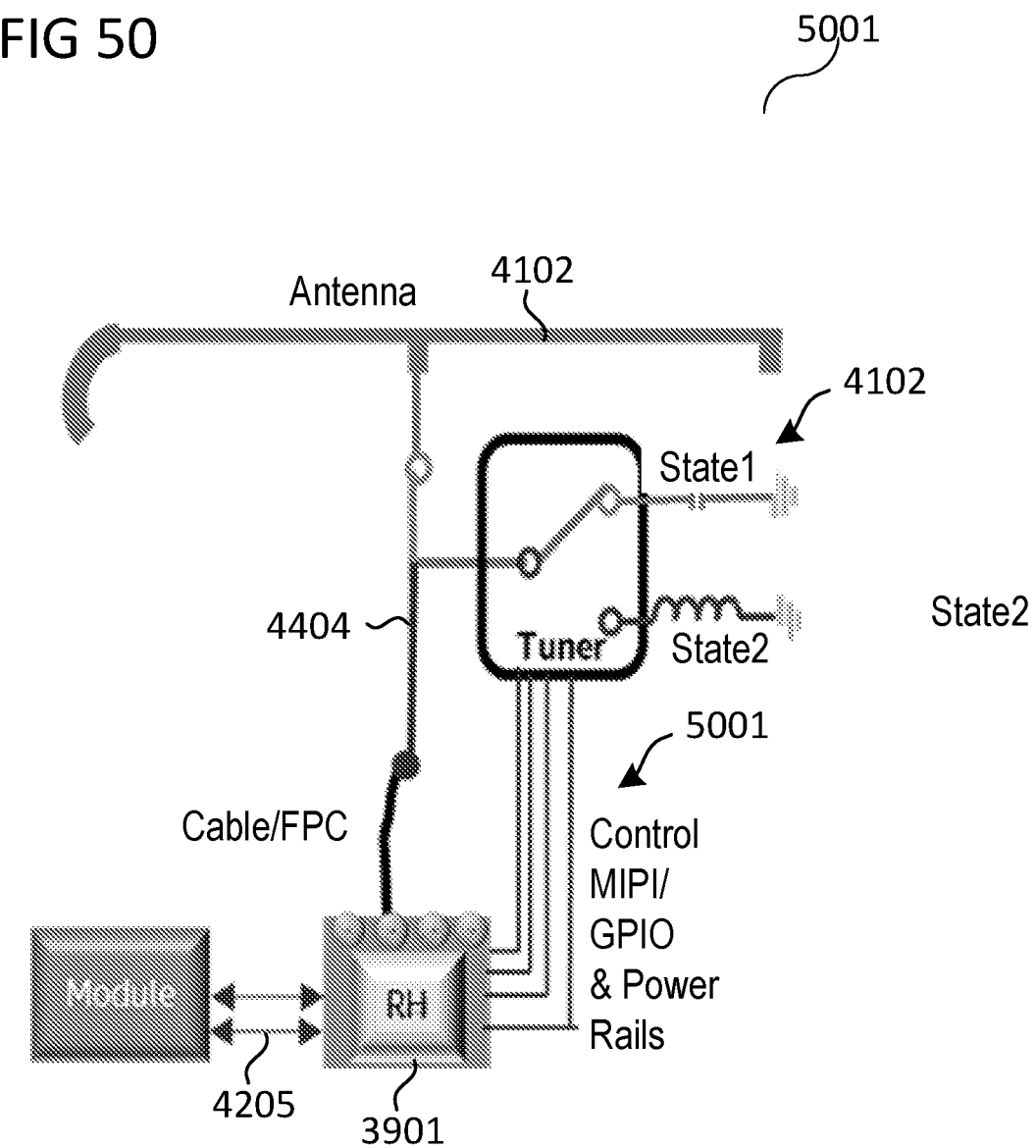
FIG. 50 exemplarily shows a block diagram of a circuitry in accordance with various aspects of the present disclosure.

FIG. 50 illustrates a block diagram of a circuitry 4201 according to various aspects 5001, in which the matching network circuit 4102 and the radiohead circuitry 3901 are coupled to each other, e.g., by one or more matching control interfaces 5001. Examples of the one or more matching control interfaces may include a power rail, a mobile industry processor interface (MIPI) interface and/or a general purpose input/output (GPIO) interface.

The circuitry 4201 may include one or more processors configured to implement a matching control process. The matching control process may include controlling the matching network circuit 4102, e.g., via the one or more matching control interfaces 5001.

In some aspects, controlling the matching network circuit 4102 may include supplying a control signal (also referred to as matching control signal) to the matching network circuit 4102 and/or to the one or more matching control interfaces 5001. The matching network circuit 4102 may be configured to change the variable impedance (e.g., its value) based on the matching control signal received via the one or more matching control interfaces 5001.

In some aspects, controlling the matching network circuit 4102 may include determining an operation point of the antenna 4102, as detailed above. The matching control signal may be based on the operation point of the antenna 4102.

In some aspects, the one or more processors, which are configured to implement the matching control process, may be part of the radiohead circuitry 3901 and/or may be external from the matching network circuit 4102. In some aspects, the one or more processors, which are configured to implement the matching control process, may be provided as part of the matching network circuit 4102 and/or may be external from the radiohead circuitry 3901.

Figure 51:
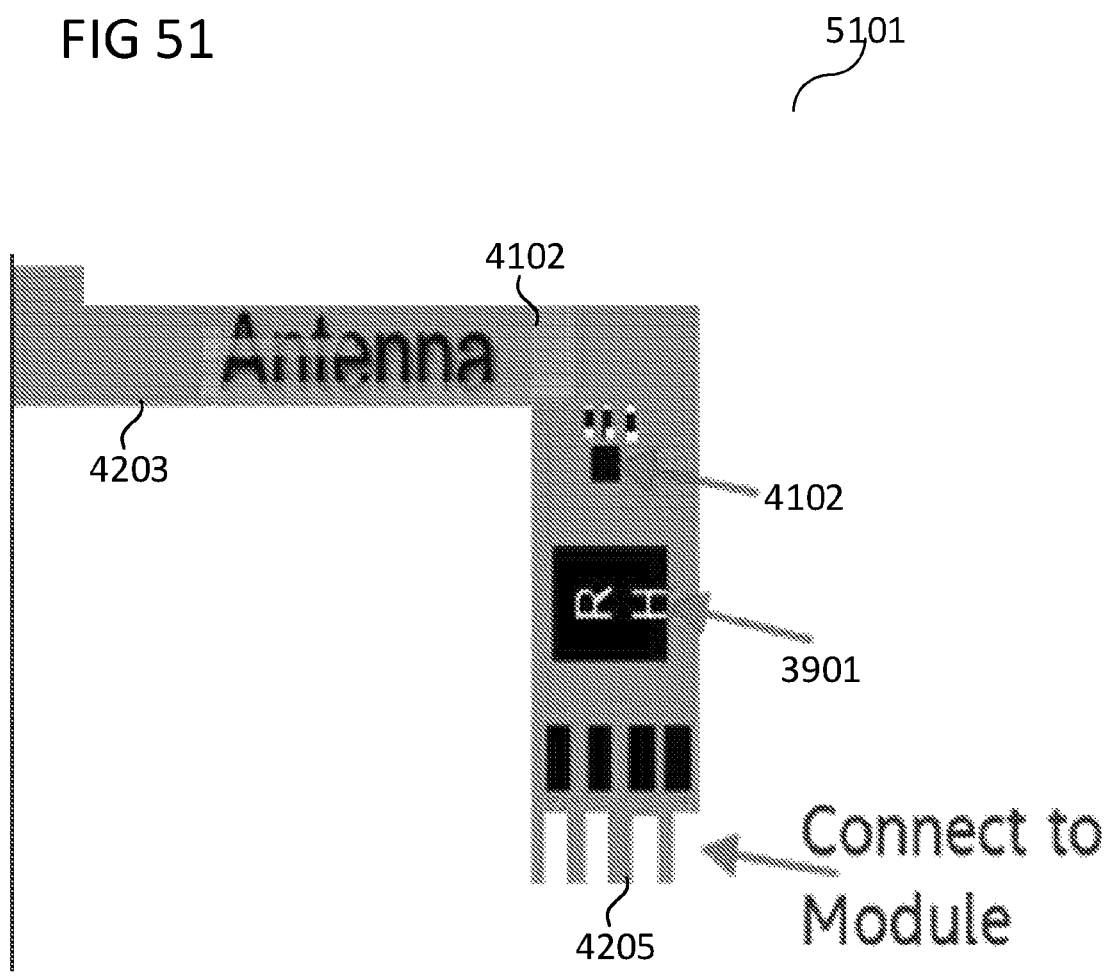
FIG. 51 exemplarily shows a block diagram of a circuitry in accordance with various aspects of the present disclosure.

FIG. 51 illustrates a block diagram of a circuitry 4201 according to various aspects 5101, in which the antenna 4102, the radiohead circuitry 3901 and the matching network circuit 4102 may be disposed on or in the same circuit board 4203. This increases the signal quality and the impedance matching.

Figure 52:
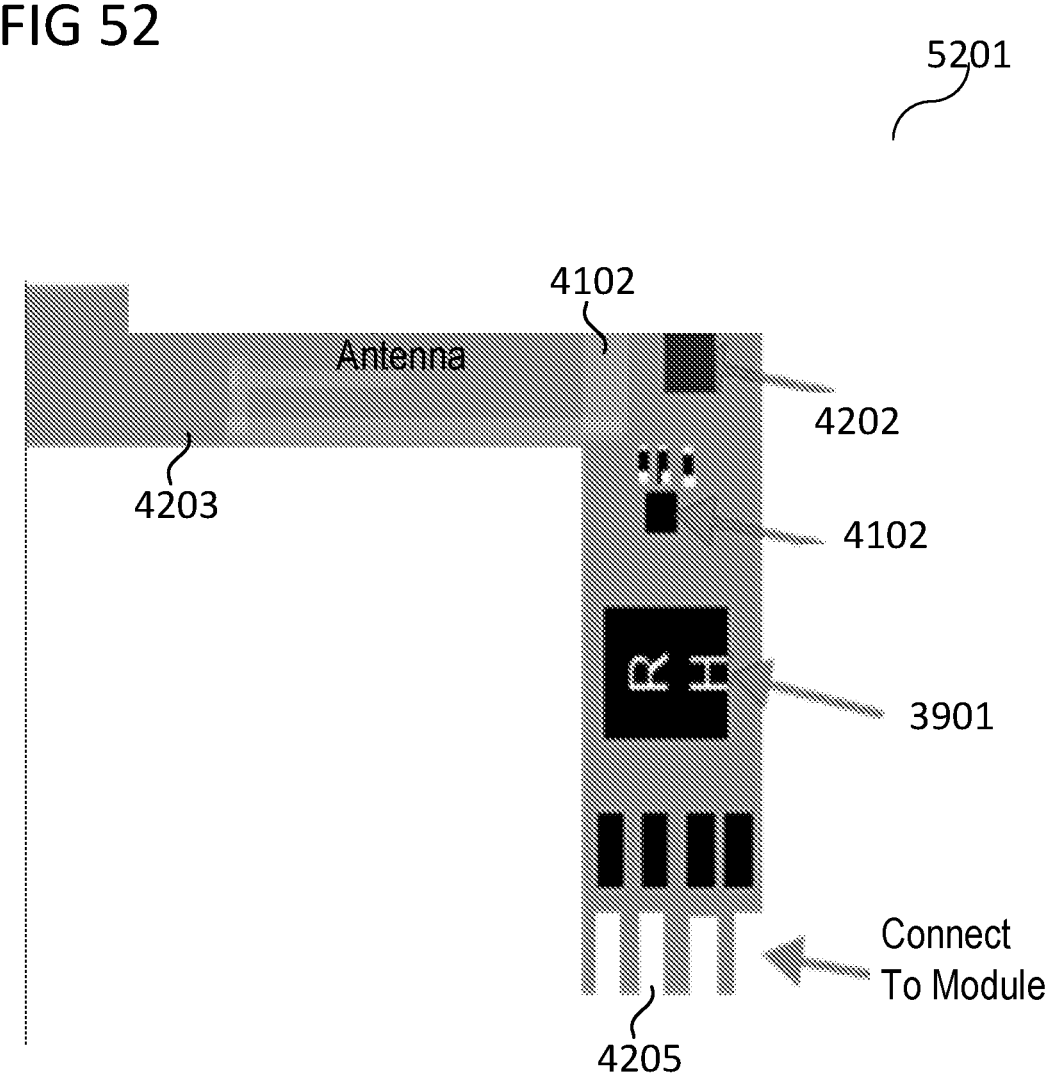
FIG. 52 exemplarily shows a block diagram of a circuitry in accordance with various aspects of the present disclosure.

FIG. 52 illustrates a block diagram of a circuitry 4201 according to various aspects 5201, in which the antenna 4102, the radiohead circuitry 3901, the SAR sensor circuit 4202 and the matching network circuit 4102 may be disposed on or in the same circuit board 4203. This reduces the complexity of the circuitry 4201. For example, the SAR sensor circuit 4202 may be configured to use the antenna 4102 as sensing one or more sensing pads 4302.

Generally speaking, function of the controlling the matching network circuit 4102 may be implemented by one or more processors as detailed in the following.

Figure 53:
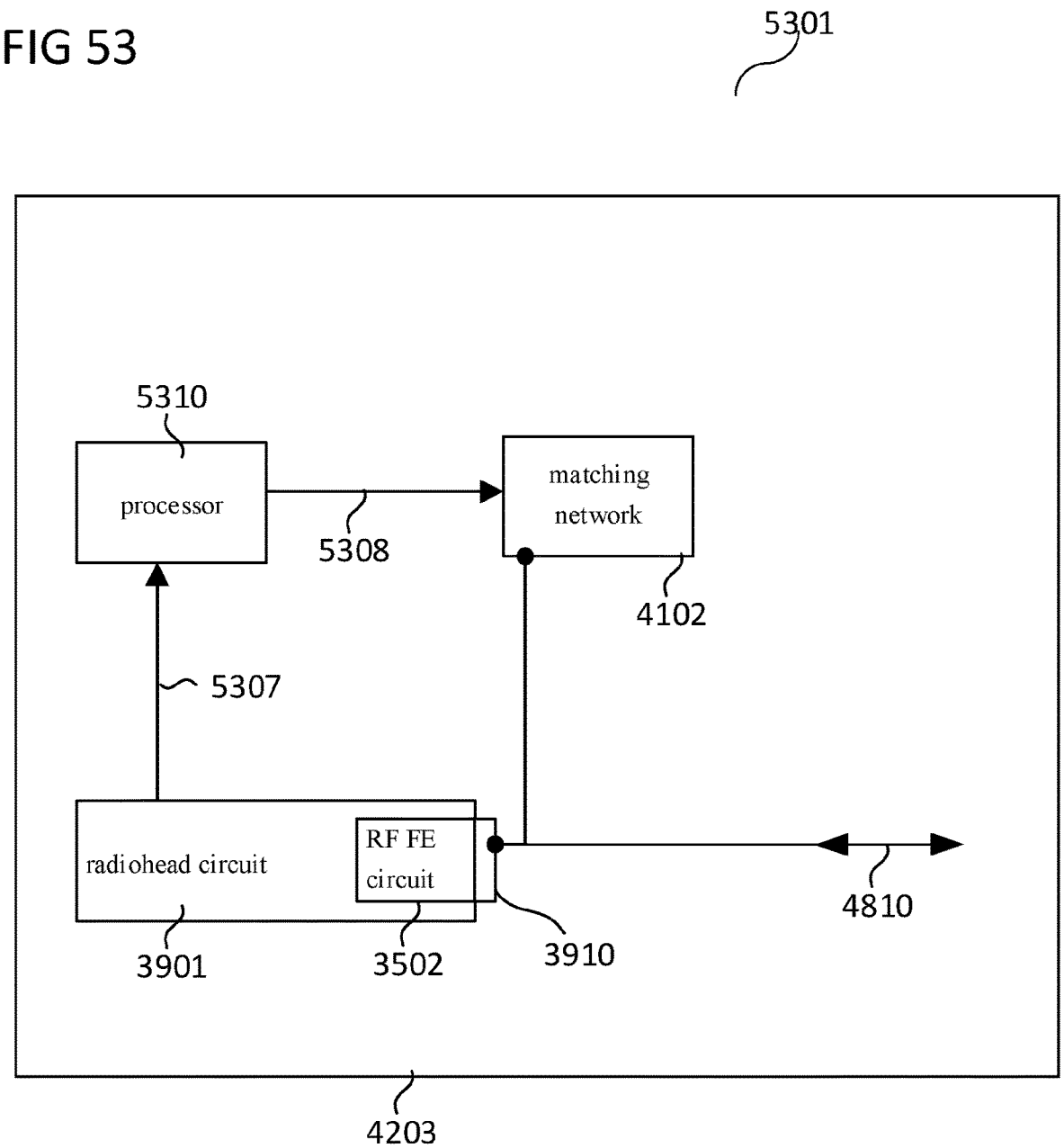
FIG. 53 exemplarily shows a block diagram of a circuitry in accordance with various aspects of the present disclosure.

FIG. 53 illustrates a block diagram of a circuitry 4201 according to various aspects 5301, in which the circuitry 4201 includes the one or more processors 5310. The circuitry 4201 may include the radiohead circuitry 3901. The radiohead circuitry 3901 may include one or more RF FE circuitries 3502 configured to operate an antenna. Each RF FE circuitry 3502 may include the antenna terminal 3910 and may be configured to output or receive the antenna signal 4810 at the antenna terminal 3910.

The circuitry 4201 may further include the matching network circuit 4102 including the variable impedance. The matching network circuit 4102 (e.g., the variable impedance) may be coupled to the antenna terminal 3910, e.g., to receive and/or influence the antenna signal 4810. Further, the matching network circuit 4102 may be configured to change the variable impedance based on a control signal (also referred to as impedance control signal).

The circuitry 4201 may further include the circuit board 4203. According to various embodiments, the radiohead circuitry 3901 and the matching network circuit 4102 may be disposed on and/or in the circuit board 4203. Optionally, the one or more processors 5310 and/or the antenna may be disposed on and/or in the circuit board 4203.

The one or more processors 5310 may be coupled to the one or more RF FE circuitries 3502 and/or to the matching network circuit 4102. As detailed above, the one or more processors 5310 may be part of the radiohead circuitry 3901 or be external from the radiohead circuitry 3901.

The one or more processors 5310 may be configured to determine the operation point of the antenna (also referred to as operation point determination). In some aspects, the operation point determination may be based on the antenna signal 4810 or on the operation point of the transceiver chain 10*a* as detailed above.

For example, the operation point determination may be based on the antenna signal 4810 as received or as output at the antenna terminal 3910 (also referred to as received antenna signal). The operation point determination may include sensing the antenna signal, e.g., its frequency, amplitude, BW, power, etc. For example, the one or more processors 5310 may be configured to receive a sensor signal 5307 from the radiohead circuitry 3901, e.g., from the RF FE circuitry 3502. For example, the radiohead circuitry 3901, e.g., the RF FE circuitry 3502, may include a sensor circuit configured to sense the antenna signal 4810 and configured to output the sensor signal.

The one or more processors 5310 may be further configured to generate the impedance control signal 5308 based on the operation point and output the impedance control signal 5308 to the matching network circuit 4102.

Beamforming techniques permit beams of electromagnetic signals to be directed along one or more planes, such that a transceiver may transmit a beam in a desired direction and/or with a desired dimension (e.g. width, height). Beamforming devices may operate by controlling phase and/or amplitude of signals from an antenna array, such that the resulting signals create destructive interference in some directions and constructive interference and one or more other directions, thereby effectively directing the beam.

In some implementations, it may be desired to perform beamforming along an azimuthal plane. That is, an antenna array may transmit a beam along an azimuthal plane, and the resulting beam may be transmitted in a desired direction and/or in a desired dimension (e.g. width). This may be conventionally achieved using a vertical antenna array, such as an array of sectoral patch antennas. The resulting antenna configuration may exhibit a relatively high profile form factor, which may be undesirable in some implementations. Furthermore, such conventional antenna arrays may require the use of a phase shifter for beamforming, which may increase complexity or expense of a beamforming implementation.

According to an aspect of the disclosure, the one or more predefined beamforming parameters may include parameters to control a beamforming pattern of the wireless signal along an azimuthal plane. Said azimuthal plane may be, for example, understood as corresponding to the plane on which the plurality of antennas are arranged. In this manner, the one or more codewords may determine a direction and/or a width of the resulting beamformed beam.

Some examples may be used in various wireless communication devices, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a hybrid device, a vehicular device, a non-vehicular device, a wireless communication station, a wireless Access Point (AP), a wireless router, a wireless modem, a video device, an audio device, an audio-video (A/V) device.

Some examples may be used for "peer to peer (PTP) communication", which may relate to device-to-device communication over a wireless link ("peer-to-peer link") between devices. The PTP communication may include, for example, a Wi-Fi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), a Wi-Fi Aware communication, a Vehicle-to-Anything (V2X) communication, an IoT communication, or the like. Other aspects may be implemented for any other additional or alternative communication scheme and/or technology.

Some examples may be used in devices operating in accordance with existing IEEE 802.11 standards (including IEEE 802.11-2016 (IEEE 802.11-2016, IEEE Standard for Information technology—Telecommunications and information exchange between systems local and metropolitan area networks—Specific requirements Part 11: Wireless LAN Medium Access Control (MAC) and Physical Layer (PHY) Specifications, Dec. 7, 2016)), and/or future versions and/or derivatives thereof (e.g., wireless local area network stations (WLAN STAs) or WiFi stations (WiFi STAs)), including any device that contains an IEEE 802.11-conformant media access control (MAC) and physical layer (PHY) interface to the wireless medium (WM).

Some examples may be used in conjunction with a WLAN, e.g., a WiFi network. Other aspects may be used in conjunction with any other suitable wireless communication network, for example, a wireless area network, a "piconet", a WPAN, a WVAN and the like.

Some examples may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

Some examples may be used in devices operating in accordance with existing existing cellular specifications and/or protocols, e.g., 3rd Generation Partnership Project (3GPP) Long Term Evolution (LTE), 3GPP 5G, and/or future versions and/or derivatives thereof, units and/or devices which are part of the above networks, and the like.

Some examples may be used for one way and/or two-way radio communication systems, cellular radio-telephone communication systems, a cellular telephone, a WLAN telephone, a Personal Communication Systems (PCS) device, a device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

In the following, various aspects of the present disclosure will be illustrated:

Example 1a is a radio frequency circuit. The radio frequency circuit may include a substrate that may include a radio frequency front-end to antenna (RF FE-to-Ant) connector. The RF FE-to-Ant connector may include a conductor track structure and a substrate connection structure coupled to the conductor track structure. The substrate may include radio frequency front-end circuitry monolithically integrated in the substrate. The substrate connection structure may include at least one of a solderable structure, a weldable structure, or an adherable structure. The substrate connection structure may be configured to form at least one radio frequency signal interface with an antenna circuit connection structure of a substrate-external antenna circuit.

The substrate may include an edge region. The substrate connection structure may be positioned or disposed in the edge region.

In Example 2a, the subject matter of Example 1a can optionally include that the substrate connection structure may include a solder bump or conductive, e.g. electrically conductive adhesive.

In Example 3a, the subject matter of any one of Examples 1a or 2a can optionally include that the substrate connection structure may include at least a first port configured to be coupled to a first port of the antenna circuit to form a first radio frequency signal interface and a second port configured to be coupled to a second port of the antenna circuit to form a second radio frequency signal interface.

In Example 4a, the subject matter of any one of Examples 1a to 3a can optionally include that the substrate further may include a radio frequency integrated circuit circuitry. The radio frequency front-end circuitry and the radio frequency integrated circuit circuitry may be coupled to the conductor track structure.

In Example 5a, the subject matter of any one of Examples 1a to 4a can optionally include that the radio frequency integrated circuit circuitry and/or the radio frequency front-end circuitry may be coupled to the substrate via a solder structure.

In Example 6a, the subject matter of any one of Examples 1a to 5a can optionally include that a total thickness may be less than about 1 mm.

In Example 7a, the subject matter of any one of Examples 4a to 6a, can optionally further include a further substrate connection structure on the substrate and coupled to the radio frequency integrated circuit circuitry. The further substrate connection structure may include at least one of a solderable structure, a weldable structure, or an adherable structure. The further substrate connection structure may be configured to form at least one radio frequency signal interface with a cable, e.g. a flat cable, of a substrate-external digital interface.

In Example 8a, the subject matter of Example 7a can optionally include that the further substrate connection structure may be of the same kind as the substrate connection structure.

Example 9a is a radio frequency circuit. The radio frequency circuit may include a substrate may include a radio frequency front-end to antenna (RF FE-to-Ant) connector, the RF FE-to-Ant connector may include a conductor track structure and a first substrate connection structure coupled to the conductor track structure. The first substrate connection structure may include at least one of a solderable structure, a weldable structure, or an adherable structure. The first substrate connection structure may be configured to form at least one radio frequency signal interface with an antenna circuit connection structure of a substrate-external antenna circuit. The substrate may include radio frequency front-end circuitry monolithically integrated in the substrate and a second substrate connection structure coupled to the radio frequency front-end circuitry, the second substrate connection structure may include at least one of a solderable structure, a weldable structure, or an adherable structure and the second substrate connection structure may be configured to form at least one radio frequency signal interface with a cable, e.g. a flat cable, of a substrate-external digital interface.

In Example 10a, the subject matter of Example 9a can optionally include that the substrate may include a first edge region and a second edge region. The first substrate connection structure may be positioned or disposed in the first edge region and the second substrate connection structure may be positioned or disposed in the second edge region.

In Example 11a, the subject matter of Example 10a can optionally include that the first and second edge regions may be at opposite sides of the substrate.

In Example 12a, the subject matter of any one of Examples 9a to 11a can optionally include that the second substrate connection structure may be of the same kind as the first substrate connection structure.

In Example 13a, the subject matter of any one of Examples 9a to 12a can optionally include that the first and/or second substrate connection structures may include a solder bump or conductive, e.g. electrically conductive adhesive.

In Example 14a, the subject matter of any one of Examples 9a to 13a can optionally include that the first substrate connection structure may include at least a first port configured to be coupled to a first port of the antenna circuit to form a first radio frequency signal interface and a second port configured to be coupled to a second port of the antenna circuit to form a second radio frequency signal interface.

In Example 15a, the subject matter of any one of Examples 9a to 14a can optionally include that the substrate further may include a radio frequency integrated circuit circuitry. The radio frequency front-end circuitry and the radio frequency integrated circuit circuitry may be coupled to the conductor track structure.

In Example 16a, the subject matter of any one of Examples 9a to 15a can optionally include that the radio frequency integrated circuit circuitry may be coupled to the substrate via a solder structure.

In Example 17a, the subject matter of any one of Examples 15a or 16a can optionally include that the radio frequency front-end circuitry may be coupled to the substrate via a solder structure.

In Example 18a, the subject matter of any one of Examples 9a to 17a can optionally include that a total thickness may be less than about 1 mm.

In Example 19a, the subject matter of any one of Examples 1a to 18a can optionally include that the substrate may be a semiconductor substrate.

In Example 20a, the subject matter of any one of Examples 1a to 19a can optionally include that the substrate may include silicon.

Example 21a is an antenna circuit. The antenna circuit may include a substrate that may include an antenna and an antenna to RF front-end (Ant-to-RF FE) connector coupled to the antenna. The Ant-to-RF FE connector may include a substrate connection structure that may be at least one of a solderable structure, a weldable structure, or an adherable structure. The substrate connection structure may be configured to form at least one radio frequency signal interface with a radio frequency circuit connection structure of a substrate-external radio frequency circuit. The substrate may include an edge region. The substrate connection structure may be positioned or disposed in the edge region.

In Example 22a, the subject matter of Example 21a can optionally include that the antenna may be monolithically integrated in the substrate.

In Example 23a, the subject matter of Examples 21a or 22a can optionally include that the antenna may be selected from the group of: GSG, GSGSG, a multiport antenna, a MIMO antenna, a TBDC.

In Example 24a, the subject matter antenna of any one of Examples 21a to 23a can optionally include that the substrate connection structure may include a solder bump or conductive, e.g. electrically conductive adhesive.

In Example 25a, the subject of any one of Examples 21a to 24a can optionally include that the substrate connection structure may include at least a first port configured to be coupled to a first port of the radio frequency circuit to form a first radio frequency signal interface and a second port configured to be coupled to a second port of the radio frequency circuit.

In Example 26a, the subject matter of any one of Examples 21a to 25a can optionally include that the substrate connection structure may be of the same kind as the substrate connection structure as of the substrate-external radio frequency circuit.

In Example 27a, the subject matter of any one of Examples 21a to 26a can optionally include that a total thickness may be less than about 1 mm.

In Example 28a, the subject matter of any one of Examples 21a to 27a can optionally include that the substrate may be a semiconductor substrate.

In Example 29a, the subject matter of any one of Examples 21a to 24a can optionally include that the substrate may include silicon.

Example 30a is a distributed radiohead circuitry. The distributed radiohead circuitry may include a first substrate that may include a radio frequency front-end to antenna (RF FE-to-Ant) connector, the RF FE-to-Ant connector may include a conductor track structure and a first substrate connection structure coupled to the conductor track structure. The first substrate may include an edge region and the first substrate connection structure may be positioned or disposed in the edge region. The first substrate may include radio frequency front-end circuitry monolithically integrated in the first substrate. The distributed radiohead circuitry may further include a second substrate that may include an antenna and an antenna to RF front-end (Ant-to-RF FE) connector coupled to the antenna. The Ant-to-RF FE connector may include a second substrate connection structure. The second substrate may include an edge region. The second substrate connection structure may be positioned or disposed in the edge region. The first and second substrate connection structures may be at least one of a soldered structure, a welded structure, or an adhesive structure. The first and second substrate connection structures may be configured to form at least one radio frequency signal interface.

In Example 31a, the subject matter of Example 30a can optionally include that at least a first radio frequency signal interface and a second radio frequency signal interface may be formed between the antenna circuit and the radio frequency circuit.

In Example 32a, the subject matter of Examples 30a or 31a can optionally include that the first substrate further may include a radio frequency integrated circuit circuitry. The radio frequency front-end circuitry and the radio frequency integrated circuit circuitry may be coupled to the conductor track structure.

In Example 33a, the subject matter of any one of Examples 30a to 32a can optionally include that the antenna may be selected from the group of: GSG, GSGSG, a multiport antenna, a MIMO antenna, a TBDC.

In Example 34a, the subject matter of any one of Examples 32a to 33a can optionally include that the radio frequency integrated circuit circuitry and/or the radio frequency front-end circuitry may be coupled to the substrate via a solder structure.

In Example 35a, the subject matter of any one of Examples 30a to 34a can optionally include that a total thickness may be less than about 1 mm.

In Example 36a, the subject matter of any one of Examples 32a to 35a can optionally further include that the first substrate may include a further substrate connection structure, the further substrate connection structure coupled to the radio frequency integrated circuit circuitry. The further substrate connection structure may include at least one of a solderable structure, a weldable structure, or an adherable structure. The further substrate connection structure may be configured to form at least one radio frequency signal interface with a cable, e.g. a cable, e.g. a flat cable, of a substrate-external digital interface.

In Example 37a, the subject matter of Example 36a can optionally further include that the further substrate connection structure may be of the same kind as the first substrate connection structure.

In Example 38a, the subject matter of any one of Examples 30a to 37a can optionally include that the first and/or second substrates may be a semiconductor substrate.

In Example 39a, the subject matter of any one of Examples 30a to 38a can optionally include that the first and/or second substrates may include silicon.

Example 1b is a radio frequency circuit. The radio frequency circuit may include a substrate including a radio frequency front-end to antenna (RF FE-to-Ant) connector. The RF FE-to-Ant connector includes a conductor track structure and a substrate connection structure coupled to the conductor track structure. The substrate includes radio frequency front-end circuitry monolithically integrated in the substrate. The substrate includes an edge region and the substrate connection structure is positioned or disposed in the edge region. The substrate connection structure includes at least one of a frictional connection or a form closure and the substrate connection structure is at least partially integrated in the substrate. The substrate connection structure is configured to form at least one radio frequency signal interface with an antenna circuit connection structure of a substrate-external antenna circuit.

In Example 2b, the subject matter of Example 1b can optionally include that the substrate connection structure is configured, in a coupled state, to form a coplanar arrangement with the substrate-external antenna circuit.

In Example 3b, the subject matter of any one of Examples 1b or 2b can optionally include that the substrate includes a recess in the edge region. The substrate connection structure is positioned or disposed in the recess.

In Example 4b, the subject matter of any one of Examples 1b to 3b can optionally include that the substrate connection structure includes at least one of a plug, a socket or a spring-type connector.

In Example 5b, the subject matter of any one of Examples 1b to 3b can optionally include that the substrate includes at least one corner and that the substrate connection structure is formed at the corner.

In Example 6b, the subject matter of any one of Examples 1b to 5b can optionally include that the substrate connection structure is configured such that a distance is formed between the substrate and the antenna circuit in a connected state.

In Example 7b, the subject matter of any one of Examples 1b to 6b can optionally include that the substrate connection structure is configured such that a direct contact is formed between the substrate and the antenna circuit in a connected state.

In Example 8b, the subject matter of any one of Examples 1b to 7b can optionally include that the substrate connection structure is configured to form an electrically insulated connection between the substrate and the antenna circuit in a connected state.

In Example 9b, the subject matter of Example 8b can optionally include that the radio frequency circuit and the antenna circuit are field coupled in a connected state.

In Example 10b, the subject matter of any one of Examples 1 b to 9b can optionally include that the radio frequency circuit further includes at least one further RF FE-to-Ant connector including a further conductor track structure and a further substrate connection structure coupled to the further conductor track structure. The further RF FE-to-Ant connector is electrically isolated from the RF FE-to-Ant connector. The further substrate connection structure is positioned or disposed in an edge region different from the edge region of the substrate connection structure. The further substrate connection structure includes at least one of a frictional connection or a form closure and wherein the substrate connection structure is at least partially integrated in the substrate. The further substrate connection structure is configured to form at least one radio frequency signal interface with a further antenna circuit connection structure of a further substrate-external antenna circuit.

In Example 11 b, the subject matter of any one of Examples 1b to 10b can optionally include that the substrate connection structure includes at least a first port configured to be coupled to a first port of the antenna circuit to form a first radio frequency signal interface and a second port configured to be coupled to a second port of the antenna circuit to form a second radio frequency signal interface.

In Example 12b, the subject matter of any one of Examples 1b to 11b can optionally include that the substrate further includes a radio frequency integrated circuit circuitry. The radio frequency front-end circuitry and the radio frequency integrated circuit circuitry are coupled to the conductor track structure.

In Example 13b, the subject matter of any one of Examples 1b to 12b can optionally include that the substrate is a semiconductor substrate.

In Example 14b, the subject matter of any one of Examples 1b to 13b can optionally include that the substrate includes silicon.

In Example 15b, the subject matter of any one of Examples 1b to 12b can optionally include that the substrate is a printed circuit board.

Example 16b is an antenna circuit. The antenna circuit may include a substrate including an antenna and an antenna to RF front-end (Ant-to-RF FE) connector coupled to the antenna. The Ant-to-RF FE connector includes a substrate connection structure. The substrate includes an edge region and the substrate connection structure is positioned or disposed in the edge region. The substrate connection structure includes at least one of a frictional connection or a form closure and the substrate connection structure is at least partially integrated in the substrate. The substrate connection structure is configured to form at least one radio frequency signal interface with a radio frequency circuit connection structure of a substrate-external radio frequency circuit.

In Example 17b, the subject matter of Example 16b can optionally include that the antenna is monolithically integrated in the substrate;

In Example 18b, the subject matter of any one of Examples 16b or 17b can optionally include that the antenna is selected from the group of: GSG, GSGSG, a multiport antenna, a MIMO antenna, a TBDC.

In Example 19b, the subject matter of any one of Examples 16b to 18b can optionally include that the substrate connection structure corresponds to the substrate connection structure of the substrate-external radio frequency circuit.

In Example 20b, the subject matter of any one of Examples 16b to 19b can optionally include that the substrate connection structure is configured, in a coupled state, to form a coplanar arrangement with the substrate-external antenna circuit.

In Example 21b, the subject matter of any one of Examples 16b to 20b can optionally include that the substrate includes a recess in the edge region. The substrate connection structure is positioned or disposed in the recess.

In Example 22b, the subject matter of any one of Examples 16b to 21b can optionally include that the substrate connection structure includes at least one of a plug, a socket or a spring-type connector.

In Example 23b, the subject matter of any one of Examples 16b to 22b can optionally include that the substrate includes at least one corner and that the substrate connection structure is formed at the corner.

In Example 24b, the subject matter of any one of Examples 16b to 23b can optionally include that the substrate connection structure is configured such that a distance is formed between the substrate and that the antenna circuit in a connected state.

In Example 25b, the subject matter of any one of Examples 16b to 24b can optionally include that the substrate connection structure is configured such that a direct contact is formed between the substrate and the antenna circuit in a connected state.

In Example 26b, the subject matter of any one of Examples 16b to 25b can optionally include that the substrate connection structure is configured to form an electrically insulated connection between the substrate and that the antenna circuit in a connected state.

In Example 27b, the subject matter of Example 26b can optionally include that the radio frequency circuit and the antenna circuit are field coupled in a connected state.

In Example 28b, the subject matter of any one of Examples 16b to 27b can optionally include that the substrate connection structure includes at least a first port configured to be coupled to a first port of the antenna circuit to form a first radio frequency signal interface and a second port configured to be coupled to a second port of the antenna circuit to form a second radio frequency signal interface.

In Example 29b, the subject matter of any one of Examples 16b to 28b can optionally include that the substrate is a semiconductor substrate.

In Example 30b, the subject matter of any one of Examples 16b to 29b can optionally include that the substrate includes silicon.

In Example 31b, the subject matter of any one of Examples 16b to 30b can optionally include that the substrate is a printed circuit board.

Example 32b is a distributed radiohead circuitry. The distributed radiohead circuitry may include a first substrate including a radio frequency front-end to antenna (RF FE-to-Ant) connector, the RF FE-to-Ant connector including a conductor track structure and a first substrate connection structure coupled to the conductor track structure. The first substrate includes an edge region and the first substrate connection structure is positioned or disposed in the edge region. The first substrate includes radio frequency front-end circuitry monolithically integrated in the first substrate. The distributed radiohead circuitry may further include a second substrate including an antenna and an antenna to RF front-end (Ant-to-RF FE) connector coupled to the antenna. The Ant-to-RF FE connector includes a second substrate connection structure. The second substrate includes an edge region. The second substrate connection structure is positioned or disposed in the edge region. The first and second substrate connection structures are at least one of a frictional connection or a form closure. The first substrate connection structure is at least partially integrated in the first substrate and the second substrate connection structure is at least partially integrated in the second substrate. The first and second substrate connection structures are configured to form at least one radio frequency signal interface between the radio frequency circuit and the antenna circuit.

In Example 33b, the subject matter of Example 32b can optionally include that at least a first radio frequency signal interface and a second radio frequency signal interface are formed between the antenna circuit and the radio frequency circuit.

In Example 34b, the subject matter of any one of Examples 32b or 33b can optionally include that the first substrate further includes a radio frequency integrated circuit circuitry. The radio frequency front-end circuitry and the radio frequency integrated circuit circuitry are coupled to the conductor track structure.

In Example 35b, the subject matter of any one of Examples 32b to 34b can optionally include that the antenna is selected from the group of: GSG, GSGSG, a multiport antenna, a MIMO antenna, a TBDC.

In Example 36b, the subject matter of any one of Examples 32b to 35b can optionally include that the first and second substrates are positioned or disposed coplanar.

In Example 37b, the subject matter of any one of Examples 32b to 36b can optionally include that at least one of the first and second substrates includes a recess in the edge region. The substrate connection structure is positioned or disposed in the recess.

In Example 38b, the subject matter of any one of Examples 32b to 37b can optionally include that at least one of the first and second substrate connection structures includes at least one of a plug, a socket or a spring-type connector. The first and second substrate connection structures are configured corresponding to each other.

In Example 39b, the subject matter of any one of Examples 32b to 38b can optionally include that the first and/or second substrates include at least one corner and that the substrate connection structure is formed at the corner.

In Example 40b, the subject matter of any one of Examples 32b to 39b can optionally include that a distance is formed between the first and second substrates.

In Example 41b, the subject matter of any one of Examples 32b to 40b can optionally include that a direct contact is formed between the first and second substrates.

In Example 42b, the subject matter of any one of Examples 32b to 41b can optionally include that the first and second substrate connection structures are configured to form an electrically insulated connection between the first and second substrates.

In Example 43b, the subject matter of Example 42b can optionally include that the radio frequency circuit and the antenna circuit are field coupled.

In Example 44b, the subject matter of any one of Examples 32b to 43b can optionally include that the first substrate includes at least one further RF FE-to-Ant connector including a further conductor track structure and a further substrate connection structure coupled to the further conductor track structure. The further RF FE-to-Ant connector is electrically isolated from the RF FE-to-Ant connector. The further substrate connection structure is positioned or disposed in an edge region different from the edge region of the substrate connection structure. The further substrate connection structure includes at least one of a frictional connection or a form closure and the substrate connection structure is at least partially integrated in the substrate. The further substrate connection structure is configured to form at least one radio frequency signal interface with a further antenna circuit connection structure of a further substrate-external antenna circuit.

In Example 45b, the subject matter of any one of Examples 32b to 44b can optionally include that at least one of the first and second substrates is a semiconductor substrate.

In Example 46b, the subject matter of any one of Examples 32b to 45b can optionally include that at least one of the first and second substrates includes silicon.

In Example 47b, the subject matter of any one of Examples 32b to 46b can optionally include that at least one of the first and second substrates is a printed circuit board.

Example 1c is a distributed radiohead circuitry. The distributed radiohead circuitry may include a radio frequency circuit including a first substrate including a radio frequency front-end to antenna (RF FE-to-Ant) connector and a radio frequency front-end circuitry coupled to the RF FE-to-Ant connector. The RF FE-to-Ant connector is configured as a first planar spiral conductor track. The distributed radiohead circuitry may further include an antenna circuit including a second substrate including an antenna and an antenna to RF front-end (Ant-to-RF FE) connector coupled to the antenna and configured as a second planar spiral conductor track. The first planar spiral conductor track and the second planar spiral conductor track form an inductively coupled circuit.

In Example 2c, the subject matter of Example 1c can optionally include that the first substrate further includes a radio frequency integrated circuit circuitry that is coupled to the planar spiral conductor track of the radio frequency circuit.

In Example 3c, the subject matter of any one of Examples 1c or 2c can optionally include that the antenna is selected from the group of: GSG, GSGSG, a multiport antenna, a MIMO antenna, a TBDC.

In Example 4c, the subject matter of any one of Examples 1c to 3c can optionally include that the inductively coupled circuit is a BALUN circuit.

In Example 5c, the subject matter of any one of Examples 1c to 4c can optionally include that the first substrate includes an edge region and a center region. The radio frequency front-end circuitry is positioned or disposed in the center region and the first planar spiral conductor track is positioned or disposed in the edge region.

In Example 6c, the subject matter of any one of Examples 1c to 5c can optionally include that the second substrate is mounted at the edge region of the first substrate.

In Example 7c, the subject matter of any one of Examples 1c to 6c can optionally include that the second substrate is fixed to first substrate via an adhesive.

In Example 8c, the subject matter of any one of Examples 1c to 7c can optionally include that at least one of the first and second substrates is a semiconductor substrate.

In Example 9c, the subject matter of any one of Examples 1c to 8c can optionally include that at least one of the first and second substrates comprises silicon.

In Example 10c, the subject matter of any one of Examples 1c to 9c can optionally include that at least one of the first and second substrates is a printed circuit board.

Example 11c is an antenna circuit. The antenna circuit may include a substrate including an antenna and an antenna to RF front-end (Ant-to-RF FE) connector coupled to the antenna and configured as a planar spiral conductor track. The planar spiral conductor track is configured to form at least one radio frequency signal interface with a radio frequency circuit connection structure of a substrate-external radio frequency circuit. The radio frequency circuit connection structure includes another planar spiral conductor track and the radio frequency signal interface is an inductively coupled circuit.

In Example 12c, the subject matter of Example 11c can optionally include that the antenna is selected from the group of: GSG, GSGSG, a multiport antenna, a MIMO antenna, a TBDC.

In Example 13c, the subject matter of any one of Examples 11c or 12c can optionally include that the inductively coupled circuit is a BALUN circuit.

In Example 14c, the subject matter of any one of Examples 11c to 13c can optionally include that the substrate includes an edge region and a center region. The antenna is positioned or disposed in the center region and the planar spiral conductor track is positioned or disposed in the edge region.

In Example 15c, the subject matter of Example 14c can optionally include that the edge region is configured to mount the substrate-external radio frequency circuit at the edge region of the substrate.

In Example 16c, the subject matter of any one of Examples 11c to 15c can optionally include that the antenna monolithically integrated in the substrate;

In Example 17c, the subject matter of any one of Examples 11c to 16c can optionally include that the substrate is a semiconductor substrate.

In Example 18c, the subject matter of any one of Examples 11c to 17c can optionally include that the substrate comprises silicon.

In Example 19c, the subject matter of any one of Examples 11c to 18c can optionally include that the substrate is a printed circuit board.

Example 1d is a distributed radiohead circuitry. The distributed radiohead circuitry may include a radio frequency circuit including a first substrate including a radio frequency front-end to antenna (RF FE-to-Ant) connector and a radio frequency front-end circuitry coupled to the RF FE-to-Ant connector. The RF FE-to-Ant connector is configured as a conductor track. The distributed radiohead circuitry may further include an antenna circuit including a second substrate including an antenna and an antenna to RF front-end (Ant-to-RF FE) connector coupled to the antenna. The conductor track is configured to be field coupled with the antenna. The second substrate is fixed to the first substrate such that the conductor track is field coupled with the antenna.

In Example 2d, the subject matter of Example 1d can optionally include that the first substrate further includes a radio frequency integrated circuit circuitry that is coupled to the conductor track of the radio frequency circuit.

In Example 3d, the subject matter of any one of Examples 1d or 2d can optionally include that the antenna is selected from the group of: GSG, GSGSG, a multiport antenna, a MIMO antenna, a TBDC.

In Example 4d, the subject matter of any one of Examples 1d to 3d can optionally include that the antenna is configured in a closed loop-shape.

In Example 5d, the subject matter of any one of Examples 1d to 4d can optionally include that the first substrate includes an edge region and a center region. The radio frequency front-end circuitry is positioned or disposed in the center region and the first conductor track is positioned or disposed in the edge region.

In Example 6d, the subject matter of Example 5d can optionally include that the second substrate is mounted at the edge region of the first substrate.

In Example 7d, the subject matter of any one of Examples 1d to 6d can optionally include that the second substrate is fixed to first substrate via an adhesive.

In Example 8d, the subject matter of any one of Examples 1d to 7d can optionally include that at least one of the first and second substrates is a semiconductor substrate.

In Example 9d, the subject matter of any one of Examples 1d to 8d can optionally include that at least one of the first and second substrates includes silicon.

In Example 10d, the subject matter of any one of Examples 1d to 9d can optionally include that at least one of the first and second substrates is a printed circuit board.

In Example 11d, the subject matter of any one of Examples 1d to 10d can optionally include that the antenna is fixed adjacent to the conductor track to the RF circuit.

In Example 12d, the subject matter of any one of Examples 1d to 11d can optionally include that the antenna circuit at least partially surrounds the conductor track.

In Example 13d, the subject matter of any one of Examples 1d to 12d can optionally include that the antenna circuit is arranged in an angle to the first substrate.

In Example 14d, the subject matter of any one of Examples 1d to 13d can optionally include that the conductor track includes a first part and a second part. The first part is arranged in an angle to the second part and the antenna is arranged at least partially parallel to the second part.

Example 1e is a distributed radiohead device. The distributed radiohead device may include an enclosure at least partially formed of a conductive, e.g. electrically conductive structure enclosing a cavity structure such that the cavity structure is substantially free from radio frequency signals from the outside of the distributed radiohead device and a radio frequency circuit including a substrate including a radio frequency front-end to antenna (RF FE-to-Ant) connector and a radio frequency front-end circuitry coupled to the RF FE-to-Ant connector. The distributed radiohead device may further include an antenna circuit including an antenna and an antenna to radio frequency front-end (Ant-to-RF FE) connector coupled to the antenna and a radio frequency signal interface formed by a connection of the RF FE-to-Ant connector and the Ant-to-RF FE connector. The substrate and the Ant-to-RF FE connector are arranged in the cavity and the antenna is at least partially arranged on the conductive, e.g. electrically conductive structure of the enclosure outside of the cavity.

In Example 2e, the subject matter of Example 1e can optionally include that the enclosure includes at least one trough hole and the substrate further includes a substrate connection structure. A digital connection structure is coupled to the substrate connection structure passing through the trough hole to connect the radio frequency circuit to the outside of the distributed radiohead device.

In Example 3e, the subject matter of any one of Examples 1e or 2e can optionally include that the enclosure further includes a dielectric structure at least partially surrounding the cavity. The dielectric structure is a radio frequency window.

In Example 4e, the subject matter of any one of Examples 1e to 3e can optionally include that the enclosure is configured as a build-in module for a smartphone, a tablet computer or a laptop.

In Example 5e, the subject matter of any one of Examples 1e to 4e can optionally include that the antenna is selected from the group of: GSG, GSGSG, a multiport antenna, a MIMO antenna, a TBDC.

In Example 6e, the subject matter of any one of Examples 1e to 5e can optionally include that the antenna is in direct contact with the enclosure.

In Example 7e, the subject matter of any one of Examples 1e to 6e can optionally include that the conductive, e.g. electrically conductive structure includes one or more metal walls.

In Example 8e, the subject matter of any one of Examples 1e to 7e can optionally include that the enclosure is formed in the shape of a box.

In Example 9e, the subject matter of any one of Examples 1e to 8e can optionally include that the conductive, e.g. electrically conductive structure includes one or more metal or metal-coated sheets.

In Example 10e, the subject matter of any one of Examples 1e to 9e can optionally include that the enclosure is formed in the shape of an envelope.

In Example 11e, the subject matter of any one of Examples 1e to 10e can optionally include that the enclosure includes a bottom part and a top part opposite of the bottom part. The substrate of the RF circuit is arranged on the bottom part and the top part is arranged in a distance to the bottom part. The distance corresponds to a length associated with a frequency of a RF signal transmitted by the antenna.

In Example 12e, the subject matter of any one of Examples 1e to 11e can optionally include that the substrate is a semiconductor substrate.

In Example 13e, the subject matter of any one of Examples 1e to 12e can optionally include that the substrate includes silicon.

In Example 14e, the subject matter of any one of Examples 1e to 13e can optionally include that the substrate includes a printed circuit board.

Example 15e is a mobile communication device. The mobile communication device may include a housing including an opening, a mounting structure adjacent to the opening and a distributed radiohead device in the mounting structure. The distributed radiohead device may include an enclosure at least partially formed of a conductive, e.g. electrically conductive structure enclosing a cavity structure such that the cavity structure is substantially free from radio frequency signals from the outside of the distributed radiohead device and a radio frequency circuit including a substrate including a radio frequency front-end to antenna (RF FE-to-Ant) connector and a radio frequency front-end circuitry coupled to the RF FE-to-Ant connector. The mobile communication device may further include an antenna circuit including an antenna and an antenna to radio frequency front-end (Ant-to-RF FE) connector coupled to the antenna and a radio frequency signal interface formed by a connection of the RF FE-to-Ant connector and the Ant-to-RF FE connector. The substrate and the Ant-to-RF FE connector are arranged in the cavity and the antenna is at least partially arranged on the conductive, e.g. electrically conductive structure of the enclosure outside of the cavity. The enclosure further includes a dielectric structure at least partially surrounding the cavity. The dielectric structure is a radio frequency window the radio frequency window is positioned or disposed to face the opening of the housing.

In Example 16e, the subject matter of Example 15e can optionally include that the enclosure includes at least one trough hole and the substrate further includes a substrate connection structure. A digital connection structure is coupled to the substrate connection structure passing through the trough hole to connect the radio frequency circuit to the outside of the distributed radiohead device.

In Example 17e, the subject matter of any one of Examples 15e or 16e can optionally include that the mobile communication device is configured as a smartphone, a tablet computer or a laptop.

In Example 18e, the subject matter of any one of Examples 15e to 17e can optionally include that the antenna is selected from the group of: GSG, GSGSG, a multiport antenna, a MIMO antenna, a TBDC.

In Example 19e, the subject matter of any one of Examples 15e to 18e can optionally include that the antenna is in direct contact with the enclosure.

In Example 20e, the subject matter of any one of Examples 15e to 19e can optionally include that the conductive, e.g. electrically conductive structure includes one or more metal walls.

In Example 21e, the subject matter of any one of Examples 15e to 20e can optionally include that the enclosure is formed in the shape of a box.

In Example 22e, the subject matter of any one of Examples 15e to 21e can optionally include that the conductive, e.g. electrically conductive structure includes one or more metal or metal-coated sheets.

In Example 23e, the subject matter of any one of Examples 15e to 22e can optionally include that the enclosure is formed in the shape of an envelope.

In Example 24e, the subject matter of any one of Examples 15e to 23e can optionally include that the enclosure includes a bottom part and a top part opposite of the bottom part. The substrate of the RF circuit is arranged on the bottom part and the top part is arranged in a distance to the bottom part. The distance corresponds to a length associated with a frequency of a RF signal transmitted by the antenna.

In Example 25e, the subject matter of any one of Examples 15e to 24e can optionally include that the substrate is a semiconductor substrate.

In Example 26e, the subject matter of any one of Examples 15e to 25e can optionally include that the substrate includes silicon.

In Example 27e, the subject matter of any one of Examples 15e to 26e can optionally include that the substrate includes a printed circuit board.

Example 1f is a radio device platform. The radio device platform may include a radiohead circuitry, radio frequency (RF) circuitry electrically coupled to and mechanically coupled to the radiohead circuitry, and an enclosure defining a first volume and a second volume. The radiohead circuitry and the RF circuitry are physically positioned or disposed within the first volume and the second volume is configured to receive an antenna circuitry to shield the radiohead circuitry and the RF circuitry from RF interference of the antenna circuitry and to shield the antenna circuitry from RF interference of the RF circuitry and the radiohead circuitry.

In Example 2f, the subject matter of Example 1f can optionally include that the radio device platform further includes the antenna circuitry electrically coupled to the radiohead circuitry and physically positioned or disposed within the second volume.

In Example 3f, the subject matter of any one of Examples 1f or 2f can optionally include that the enclosure is further configured to shield the radiohead circuitry and the RF circuitry from RF interference of an external source.

In Example 4f, the subject matter of any one of Examples 1f to 3f can optionally include that the enclosure is further configured to shield the antenna circuitry from RF interference of an external source.

In Example 5f, the subject matter of any one of Examples 1f to 4f can optionally include that the radio device platform further includes an RF window defining a portion of the second volume, the RF window configured to permit one or more radio signals transmitted by the antenna circuitry to exit the second volume in a predefined direction.

In Example 6f, the subject matter of Example 5f can optionally include that the RF window is configured to modify the one or more radio signals transmitted by the antenna circuitry.

In Example 7f, the subject matter of any one of Examples 1f to 6f can optionally include that the radiohead circuitry further includes a Radiohead shielding device configured to shield the radiohead circuitry from RF interference of the RF circuitry.

In Example 8f, the subject matter of any one of Examples 1f to 7f can optionally include that the radio device platform further includes a first shielded interface that electrically couples the radiohead circuitry to the antenna circuitry and a second shielded interface electrically coupled to the radiohead circuitry and that extends from the radiohead circuitry to an external volume through a sidewall of the enclosure. The radiohead circuitry is configured to receive control signals via the second shielded interface.

In Example 9f, the subject matter of any one of Examples 1f to 6f can optionally include that the RF circuitry includes a shielding device configured to prevent the RF circuitry from providing RF interference.

In Example 10f, the subject matter of any one of Examples 1f to 9f can optionally include that the radio device platform further includes thermal interface material (TIM) mechanically coupled to the RF circuitry and the enclosure. The TIM is configured to operate as a heat sink for the RF circuitry.

In Example 11f, the subject matter of Example 10f can optionally include that the TIM is configured to transfer heat from the RF circuitry to the enclosure.

In Example 12f, the subject matter of any one of Examples 10f or 11f can optionally include that the TIM is configured to electrically isolate the RF circuitry from the enclosure.

In Example 13f, the subject matter of any one of Examples 1f to 12f can optionally include that the enclosure includes metal material configured to shield the radiohead circuitry, the RF circuitry, and the antenna circuitry from the RF interference.

Example 14f is a radio device platform. The radio device platform may include a radiohead circuitry including a terminal, radio frequency (RF) circuitry electrically coupled to the radiohead circuitry, antenna circuitry electrically coupled to the terminal of the radiohead circuitry, and an enclosure defining a first volume and a second volume. The radiohead circuitry and the RF circuitry are physically positioned or disposed within the first volume. The antenna circuitry is physically positioned or disposed within the second volume to shield the radiohead circuitry and the RF circuitry from RF interference of the antenna circuitry and to shield the antenna circuitry from RF interference of the RF circuitry and the radiohead circuitry; and the radiohead circuitry, the RF circuitry, and the antenna circuitry are mechanically coupled to the enclosure.

In Example 15f, the subject matter of Example 14f can optionally include that the RF circuitry includes a ball grid array, and the RF circuitry is electrically coupled to the radiohead circuitry via the ball grid array.

In Example 16f, the subject matter of any one of Examples 14 for 15f can optionally include that the RF circuitry is mechanically coupled to the radiohead circuitry via the ball grid array.

In Example 17f, the subject matter of any one of Examples 14f to 16f can optionally include that the radio device platform further includes a shielded interface electrically coupled to the terminal of the radiohead circuitry and a terminal of the antenna circuitry.

In Example 18f, the subject matter of any one of Examples 14f to 17f can optionally include that the radio device platform further includes a RF window defining a portion of the second volume and the RF window configured to permit one or more radio signals transmitted by the antenna circuitry to exit the second volume in a particular direction.

In Example 19f, the subject matter of any one of Examples 14f to 18f can optionally include that the radiohead circuitry further includes a radiohead shielding device configured to shield the radiohead circuitry from RF interference of the RF circuitry.

In Example 20f, the subject matter of any one of Examples 14f to 19f can optionally include that the radio device platform further includes a shielded interface electrically coupled to another terminal of the radiohead circuitry and that extends from the radiohead circuitry to an external volume through a sidewall of the enclosure. The radiohead circuitry is configured to receive control signals via the second shielded interface.

In Example 21f, the subject matter of Example 20f can optionally include that the RF circuitry includes a shielding device configured to prevent the RF circuitry from providing RF interference.

In Example 22f, the subject matter of any one of Examples 14f to 21f can optionally include that the radio device platform further includes thermal interface material (TIM) mechanically coupled to a surface of the RF circuitry and a surface of the enclosure and extending from the surface of the RF circuitry to the surface of the enclosure. The TIM is configured to operate as a heat sink to transfer heat from the RF circuitry to the enclosure.

In Example 23f, the subject matter of Example 22f can optionally include that the TIM is configured to electrically isolate the RF circuitry from the enclosure.

In Example 24f, the subject matter of any one of Examples 14f to 23f can optionally include that the enclosure includes metal material configured to shield the radiohead circuitry, the RF circuitry, and the antenna circuitry from the RF interference.

Example 1g is a device. The device may include a substrate, a first substrate integrated waveguide antenna, configured to operate in a first radiofrequency band. The first substrate integrated waveguide antenna is mounted in or on one or more layers of the substrate. The device may further include a radiofrequency integrated circuit electrically conductively connected to the first substrate integrated waveguide antenna and, mounted on the substrate and configured to receive and/or transmit a wireless signal via the first substrate integrated waveguide antenna.

In Example 2g, the subject matter of Example 1g can optionally include that the device further includes a second substrate integrated waveguide antenna configured to operate in a second radiofrequency band, different from the first radiofrequency band.

In Example 3g, the subject matter of Example 2g can optionally include that the second substrate integrated waveguide antenna is mounted in or on one or more layers of the substrate.

In Example 4g, the subject matter of Example 2g can optionally include that the second substrate integrated waveguide antenna is mounted on the first substrate integrated waveguide antenna.

In Example 5g, the subject matter of any one of Examples 2g to 4g can optionally include that the second substrate integrated waveguide antenna is electrically conductively connected to the radiofrequency integrated circuit.

In Example 6g, the subject matter of any one of Examples 2g to 5g can optionally include that the device further includes a third substrate integrated waveguide antenna, configured to operate in a third radiofrequency band, different from the first radiofrequency band and the second radiofrequency band.

In Example 7g, the subject matter of Example 6g can optionally include that the third substrate integrated waveguide antenna is mounted to the second substrate integrated waveguide antenna.

In Example 8g, the subject matter of any one of Examples 6g or 7g can optionally include that the third substrate integrated waveguide antenna is electrically conductively connected to the radiofrequency integrated circuit.

In Example 9g, the subject matter of any one of Examples 2g to 8g can optionally include that the first substrate integrated waveguide antenna includes a first dielectric layer having a first conductor pattern, and that the second substrate integrated waveguide antenna includes a second dielectric layer having a second conductor pattern. Each of the first conductor pattern and the second conductor pattern are different from one another.

In Example 10g, the subject matter of any one of Examples 2g to 9g can optionally include that the radiofrequency integrated circuit is configured to send and/or receive wireless signals via at least the first substrate integrated waveguide antenna on the first radiofrequency band and via the second substrate integrated waveguide antenna on the second radiofrequency band.

In Example 11g, the subject matter of any one of Examples 1g to 10g can optionally include that the first substrate integrated waveguide antenna is soldered to the substrate.

In Example 12g, the subject matter of any one of Examples 1g to 11 g can optionally include that the first substrate integrated waveguide antenna is monolithically connected to the substrate.

In Example 13g, the subject matter of any one of Examples 1g to 12g can optionally include that the substrate is a printed circuit board.

Example 14g is a device. The device may include a substrate and an antenna circuitry. The antenna circuitry may include a first substrate integrated waveguide antenna, including a first terminal and mounted in or on one or more layers of the substrate. The first substrate integrated waveguide is configured to operate in a first radiofrequency band. The device may further include a radiofrequency circuitry, which may include a first digital transceiver circuit. The first digital transceiver circuit may include a second terminal electrically coupled to the first terminal. The first digital transceiver circuit is mounted on the substrate. The first digital transceiver circuit is configured to receive and/or transmit a wireless signal via the first substrate integrated waveguide antenna.

In Example 15g, the subject matter of Example 14g can optionally include that the antenna circuitry further includes a second substrate integrated waveguide antenna, including a third terminal and mounted in or on one or more layers of the substrate. The second substrate integrated waveguide is configured to operate in a second radiofrequency band, different from the first radiofrequency band. The radiofrequency circuitry further includes a second digital transceiver circuit, including a fourth terminal electrically coupled to the third terminal. The second digital transceiver circuit is configured to operate in a second radiofrequency band.

In Example 16g, the subject matter of Example 15g can optionally include that the second substrate integrated waveguide antenna is mounted in or on one or more layers of the substrate.

In Example 17g, the subject matter of any one of Examples 15g or 16g can optionally include that the second substrate integrated waveguide antenna is mounted on the first substrate integrated waveguide antenna.

In Example 18g, the subject matter of any one of Examples 15g to 17g can optionally include that the antenna circuitry further includes a third substrate integrated waveguide antenna, including a fifth terminal and mounted in or on one or more layers of the substrate. The third substrate integrated waveguide is configured to operate in a third radiofrequency band, different from the first radiofrequency band and the second radiofrequency band. The radiofrequency circuitry further includes a third digital transceiver circuit, including a sixth terminal electrically coupled to the fifth terminal. The third digital transceiver circuit is configured to operate in the third radiofrequency band.

In Example 19g, the subject matter of Example 18g can optionally include that the third substrate integrated waveguide antenna is mounted to the second substrate integrated waveguide antenna.

In Example 20g, the subject matter of any one of Examples 15g to 19g can optionally include that the first substrate integrated waveguide antenna includes a first dielectric layer having a first conductor pattern, and the second substrate integrated waveguide antenna includes a second dielectric layer having a second conductor pattern. Each of the first conductor pattern and the second conductor pattern are different from one another.

In Example 21g, the subject matter of any one of Examples 15g to 20g can optionally include that the radiofrequency circuit is configured to send and/or receive wireless signals via at least the first substrate integrated waveguide antenna on the first radiofrequency band and via the second substrate integrated waveguide antenna on the second radiofrequency band.

In Example 22g, the subject matter of any one of Examples 14g to 21g can optionally include that the first substrate integrated waveguide antenna is soldered to the substrate.

In Example 23g, the subject matter of any one of Examples 14g to 22g can optionally include that the first substrate integrated waveguide antenna is monolithically connected to the substrate.

In Example 24g, the subject matter of any one of Examples 14g to 23g can optionally include that the substrate is a printed circuit board.

In Example 25g, the subject matter of any one of Examples 14g to 24g can optionally include that the radiofrequency circuitry is a radiofrequency integrated circuit.

Example 1h is a radio device. The radio device may include radiohead circuitry. The radiohead circuitry may include a first radio circuit configured to provide a first radio signal within a first frequency range, and a second radio circuit configured to provide at least one of a second radio signal within a second frequency range that is different than the first frequency range and a third radio signal within a third frequency range that is different than the first frequency range and the second frequency range. The radio device may further include antenna circuitry including a first antenna circuit electrically coupled to the first radio circuit and configured to receive the first radio signal within the first frequency range and transmit a first wireless signal within the first frequency range representative of the first radio signal, and a second antenna circuit electrically coupled to the second radio circuit and configured to receive the second radio signal within the second frequency range and the third radio signal within the third frequency range and transmit a second wireless signal representative of at least one of the second radio signal and the third radio signal concurrent with the first antenna circuit transmitting the first wireless signal. The second wireless signal is transmitted within the second frequency range or the third frequency range based on whether the second wireless signal is representative of the second radio signal or the third radio signal.

In Example 2h, the subject matter of Example 1h can optionally include that the radio device further includes a first bandpass filter (BPF) circuit electrically coupled between the first radio circuit and the first antenna circuit, the first BPF circuit configured to filter out portions of the first radio signal outside the first frequency range, and a second BPF circuit electrically coupled between the second radio circuit and the second antenna circuit, the second BPF circuit configured to filter out portions of the second radio signal outside the second frequency range and to filter out portions of the third radio signal outside the third frequency range.

In Example 3h, the subject matter of any one of Examples 1h or 2h can optionally include that the first frequency range is a low band (LB) radio frequency (RF) range, the second frequency range is a high band (HB) RF range, and the third frequency range is an ultra-high band (MB) RF range.

In Example 4h, the subject matter of any one of Examples 1h to 3h can optionally include that the first frequency range is a HB RF range, the second frequency range is a LB RF range, and the third frequency range is an MB RF range.

In Example 5h, the subject matter of any one of Examples 1h or 2h can optionally include that the first frequency range is an MB RF range, the second frequency range is a LB RF range, and the third frequency range is a HB RF range.

In Example 6h, the subject matter of Example 2h can optionally include that the antenna circuitry further includes an isolation device such that one or more settings of the BPF circuits are reduced compared to radio devices that implement diplexers.

Example 7h is a radio device. The radio device may include radiohead circuitry including a first radio circuit configured to provide a first radio signal within a first frequency range, a second radio circuit configured to provide a second radio signal within a second frequency range that is different than the first frequency range, and a third radio circuit configured to provide a third radio signal within a third frequency range that is different than the first frequency range and the second frequency range. The radio device may further include antenna circuitry including a first antenna circuit electrically coupled to the first radio circuit and configured to receive the first radio signal within the first frequency range and transmit a first wireless signal within the first frequency range representative of the first radio signal, and a second antenna circuit electrically coupled to the second radio circuit and configured to receive the second radio signal within the second frequency range and electrically coupled to the third radio circuit and configured to receive the third radio signal within the third frequency range and transmit a second wireless signal representative of at least one of the second radio signal and the third radio signal concurrent with the first antenna circuit transmitting the first wireless signal. The second wireless signal is transmitted within the second frequency range or the third frequency range based on whether the second wireless signal is representative of the second radio signal or the third radio signal.

In Example 8h, the subject matter of Example 7h can optionally include that the radio device further includes a bandpass filter (BPF) circuit electrically coupled between the first radio circuit and the first antenna circuit, the BPF circuit configured to filter out portions of the first radio signal outside the first frequency range, and a diplexer circuit electrically coupled between the second antenna circuit and the second radio circuit and between the second antenna circuit and the third radio circuit, the diplexer configured to multiplex the first radio signal and the second radio signal to provide a fourth radio signal representative of at least one of the second radio signal and the third radio signal to the second antenna circuit. The second wireless signal is representative of the fourth radio signal.

In Example 9h, the subject matter of any one of Examples 7h or 8h can optionally include that the first frequency range is a low band (LB) radio frequency (RF) range, the second frequency range is a high band (HB) RF range, and the third frequency range is an ultra-high band (MB) RF range.

In Example 10h, the subject matter of any one of Examples 7h or 8h can optionally include that the first frequency range is a HB RF range, the second frequency range is a LB RF range, and the third frequency range is an MB RF range.

In Example 11h, the subject matter of any one of Examples 7h or 8h can optionally include that the first frequency range is an MB RF range, the second frequency range is a LB RF range, and the third frequency range is a HB RF range.

In Example 12h, the subject matter of any one of Examples 7h to 11h can optionally include that the radio device further includes a first filter circuit electrically coupled between the second radio circuit and the diplexer, the first filter circuit configured to remove a portion of the second radio signal, and a second filter circuit electrically coupled between the third radio circuit and the diplexer, the second filter circuit configured to remove a portion of the third radio signal.

Example 13h is a radio device. The radio device may include radiohead circuitry including a first radio circuit including a first terminal, the first radio circuit configured to provide a first radio signal within a first frequency range, and a second radio circuit including a second terminal, the second radio circuit configured to provide at least one of a second radio signal within a second frequency range that is different than the first frequency range and a third radio signal within a third frequency range that is different than the first frequency range and the second frequency range. The radio device may further include antenna circuitry, including a first antenna circuit including a third terminal electrically coupled to the first terminal, the first antenna circuit configured to receive the first radio signal within the first frequency range and transmit a first wireless signal within the first frequency range representative of the first radio signal, and a second antenna circuit including a fourth terminal electrically coupled to the second terminal and configured to receive the second radio signal within the second frequency range and the third radio signal within the third frequency range and transmit a second wireless signal representative of at least one of the second radio signal and the third radio signal concurrent with the first antenna circuit transmitting the first wireless signal. The second wireless signal is transmitted within the second frequency range or the third frequency range based on whether the second wireless signal is representative of the second radio signal or the third radio signal.

In Example 14h, the subject matter of Example 13h can optionally include that the first radio circuit further includes a fifth terminal, and that the second radio circuit further includes a sixth terminal. The first antenna circuit is further electrically coupled to the fifth terminal via the third terminal, the first antenna circuit configured to provide a first receive radio signal within the first frequency range to the first radio circuit via the fifth terminal. The second antenna circuit is further electrically coupled to the sixth terminal via the fourth terminal, the second antenna circuit configured to provide a second receive signal within the second frequency range or the third frequency range via the sixth terminal concurrent with the first antenna circuit providing the first receive radio signal.

In Example 15h, the subject matter of Example 13h can optionally include that the radio device further includes a first bandpass filter (BPF) circuit including a seventh terminal electrically coupled to the first terminal and an eighth terminal electrically coupled to the third terminal, the first BPF circuit configured to filter out portions of the first radio signal outside the first frequency range, and a second BPF circuit including a ninth terminal electrically coupled to the second terminal and a tenth terminal electrically coupled to the fourth terminal, the second BPF circuit configured to filter out portions of the second radio signal outside the second frequency range and to filter out portions of the third radio signal outside the third frequency range.

In Example 16h, the subject matter of Example 15h can optionally include that the first radio circuit further includes a fifth terminal, and that the second radio circuit further includes a sixth terminal. The first antenna circuit is configured to provide a first receive radio signal within the first frequency range via the third terminal. The first BPF circuit is further electrically coupled to the fifth terminal and the first BPF circuit is configured to filter out portions of the first receive radio signal outside the first frequency range. The second antenna circuit is configured to provide a second receive signal within the second frequency range or the third frequency range via the fourth terminal concurrent with the first antenna circuit providing the first receive radio signal. The second BPF circuit is further electrically coupled to the sixth terminal and the second BPF circuit is configured to filter out portions of the second receive radio signal outside the second frequency range and to filter out portion of the second receive radio signal outside the third frequency range.

Example 17 is a radio device. The radio device may include radiohead circuitry including a first radio circuit including a first terminal, the first radio circuit configured to provide a first radio signal within a first frequency range, and a second radio circuit including a second terminal, the second radio circuit configured to provide a second radio signal within a second frequency range that is different than the first frequency range, and a third radio circuit including a third terminal, the third radio circuit configured to provide a third radio signal within a third frequency range that is different than the first frequency range and the second frequency range. The radio device may further include antenna circuitry including a first antenna circuit including a fourth terminal electrically coupled to the first terminal and configured to receive the first radio signal within the first frequency range and transmit a first wireless signal within the first frequency range representative of the first radio signal, and a second antenna circuit including a fifth terminal electrically coupled to the second terminal and the third terminal, the second antenna configured to receive the second radio signal within the second frequency range and the third radio signal within the third frequency range and to transmit a second wireless signal representative of at least one of the second radio signal and the third radio signal concurrent with the first antenna circuit transmitting the first wireless signal. The second wireless signal is transmitted within the second frequency range or the third frequency range based on whether the second wireless signal is representative of the second radio signal or the third radio signal.

In Example 18h, the subject matter of Example 17h can optionally include that the first radio circuit further includes a sixth terminal, and that the second radio circuit further includes a seventh terminal. The third radio circuit further includes an eighth terminal. The first antenna circuit is further electrically coupled to the sixth terminal via the fourth terminal, the first antenna circuit configured to provide a first receive radio signal within the first frequency range to the first radio circuit via the fifth terminal, and the second antenna circuit is further electrically coupled to the seventh terminal via the fifth terminal and to the eighth terminal via the fifth terminal, the second antenna circuit configured to provide a second receive signal within the second frequency range via the seventh terminal or within the third frequency range via the eighth terminal concurrent with the first antenna circuit providing the first receive radio signal.

In Example 19h, the subject matter of any one of Examples 17h or 18h can optionally include that the radio device further includes a bandpass filter (BPF) circuit including a ninth terminal electrically coupled to the first terminal and a tenth terminal electrically coupled to the fourth terminal, the BPF circuit configured to filter out portions of the first radio signal outside the first frequency range, and a diplexer circuit including an eleventh terminal electrically coupled to the second terminal, a twelfth terminal electrically coupled to the third terminal, a thirteenth terminal electrically coupled to the fifth terminal, the diplexer configured to multiplex the first radio signal and the second radio signal to provide a fourth radio signal representative of at least one of the second radio signal and the third radio signal to the second antenna circuit. The second wireless signal is representative of the fourth radio signal.

In Example 20h, the subject matter of Example 19h can optionally include that the radio device further includes a first filter circuit electrically coupled to the second terminal and the eleventh terminal, the first filter circuit configured to remove a portion of the second radio signal, and a second filter circuit electrically coupled to the third terminal and the twelfth terminal, the second filter circuit configured to remove a portion of the third radio signal.

In Example 21h, the subject matter of Example 20h can optionally include that the BPF circuit is further electrically coupled to the sixth terminal, the BPF circuit is configured to filter out portions of the first receive radio signal outside the first frequency range, and that the diplexer circuit is further electrically coupled to the seventh terminal and eighth terminal, the diplexer is configured to propagate the second receive signal within the second frequency range to the second radio circuit via the seventh terminal and the second receive signal within the third frequency range to the third radio circuit via the eighth terminal.

Example 1i is a multiband wireless device. The multiband wireless device may include an antenna, in or on one or more layers of the substrate. The antenna is electrically conductively connected to a first radio circuit and a second radio circuit of a radiofrequency integrated circuit. The multiband wireless device may further include the radiofrequency integrated circuit, which may include the first radio circuit configured to output to a first matching network a first electrical signal representing a wireless signal to be transmitted in a first frequency band, and to receive from a second matching network a second electrical signal representing a wireless signal received in the first frequency band; and the second radio circuit, configured to output to the first matching network a third electrical signal representing a wireless signal to be transmitted in a second frequency band, and to receive from the second matching network a fourth electrical signal representing a wireless signal received in the second frequency band; and the first matching network configured to selectively output either the first electrical signal or the third electrical signal to the antenna; and a second matching network configured to receive an electrical signal from the antenna and to selectively output the received electrical signal either as the second electric signal to the first radio circuit or as the fourth electrical signal to the second radio circuit.

In Example 2i, the subject matter of Example 1i can optionally include that the antenna is a substrate integrated waveguide antenna.

In Example 3i, the subject matter of any one of Examples 1i or 2i can optionally include that the antenna is configured to operate according to one or more frequencies from 2.4 GHz to 7 GHz.

In Example 4i, the subject matter of any one of Examples 1i to 3i can optionally include that the first matching network includes a duplexer or a multiplexer.

In Example 5i, the subject matter of any one of Examples 1i to 3i can optionally include that the first matching network includes a multiplexer.

In Example 6i, the subject matter of any one of Examples 1i to 5i can optionally include that the second matching network includes one of a duplexer.

In Example 7i, the subject matter of any one of Examples 1i to 5i can optionally include that the second matching network includes a multiplexer.

In Example 8i, the subject matter of any one of Examples 1i to 7i can optionally include that the first radio circuit is configured to operate according to one or more wireless network protocols of the Wi-Fi Alliance.

In Example 9i, the subject matter of any one of Examples 1i to 8i can optionally include that the second radio circuit is configured to operate according to one or more wireless protocols of the Bluetooth Special Interest Group.

In Example 10i, the subject matter of any one of Examples 1i to 9i can optionally include that the antenna is a multifeed antenna.

Example 11i is a multiband wireless device. The multiband wireless device may include a substrate; a first antenna, in or on one or more layers of the substrate; a second antenna, in or on one or more layers of the substrate; and a radiofrequency integrated circuit mounted on the substrate. The radiofrequency integrated circuit may include a first radio circuit, configured to output a first electrical signal representing a wireless signal to be transmitted in a first frequency band, and to receive a second electrical signal, representing a wireless signal received in the first frequency band; and a second radio circuit, configured to output a third electrical signal representing a wireless signal to be transmitted in a second frequency band, and to receive a fourth electrical signal representing a wireless signal received in the second frequency band; and a first band pass filter network, configured to receive the first electrical signal from the first radio circuit; perform one or more filtering operations on the first electrical signal; and output a filtered first electrical signal to the first antenna; wherein the first band pass filter network is further configured to receive an electrical signal from the first antenna; perform one or more filtering operations on the received electrical signal from the first antenna, and output to the first radio circuit a filtered received signal from the first antenna as the second electrical signal; a second band pass filter network, configured to receive the third electrical signal; perform one or more filtering operations on the third electrical signal; and to output a filtered third electrical signal to the second antenna. The second band pass filter network is further configured to receive a signal from the second antenna; perform one or more filtering operations on the received signal from the second antenna; and to output to the second radio circuit a filtered received signal from the second antenna as the fourth electrical signal.

In Example 12i, the subject matter of Example 11i can optionally include that the first antenna and the second antenna are a substrate integrated waveguide antennas.

In Example 13i, the subject matter of any one of Examples 11i or 12i can optionally include that the first antenna is configured to operate at any one of 2.4 GHz; 5 GHz to 6 GHz; 6 GHz to 7 GHz; or 5 GHz to 7 GHz.

In Example 14i, the subject matter of Example 13i can optionally include that the second antenna is configured to operate at any one of 2.4 GHz; 5 GHz to 6 GHz; 6 GHz to 7 GHz; or 5 GHz to 7 GHz, and that the second antenna is configured to operate in a frequency band different from a frequency band of the first antenna.

Example 1j is a radiohead circuitry. The radiohead circuitry may include a first multifeed antenna terminal, a second multifeed antenna terminal, and a third multifeed antenna terminal; a first radio frequency front-end circuitry coupled to the first multifeed antenna terminal and configured to transmit and/or receive a first component carrier frequency range via the first multifeed antenna terminal; a second radio frequency front-end circuitry coupled to the second multifeed antenna terminal and configured to transmit and/or receive a second component carrier frequency range via the second multifeed antenna terminal; a third radio frequency front-end circuitry coupled to the third multifeed antenna terminal and configured to transmit and/or receive a third component carrier frequency range via the third multifeed antenna terminal; and one or more processors configured to implement a carrier aggregation of the first component carrier frequency range and the second component carrier frequency range or the first component carrier frequency range and the third component carrier frequency range.

In Example 2j, the subject matter of Example 1j can optionally include that the carrier aggregation is a symmetrical carrier aggregation.

In Example 3j, the subject matter of any one of Examples 1j or 2j can optionally include that the first component carrier frequency range and the second component carrier frequency range have substantially the same bandwidths.

In Example 4j, the subject matter of any one of Examples 1j to 3j can optionally include that a bandwidth of the first component carrier frequency range and/or a bandwidth of the second component carrier frequency range is substantially 160 MHz.

In Example 5j, the subject matter of any one of Examples 1j to 4j can optionally include that the carrier aggregation is a non-contiguous carrier aggregation.

In Example 6j, the subject matter of any one of Examples 1j to 5j can optionally include that the first component carrier frequency range and the second component carrier frequency range are non-overlapping.

In Example 7j, the subject matter of any one of Examples 1j to 6j can optionally include that the third component carrier frequency range includes a frequency different from (e.g., lower) the first component carrier frequency range and/or from the second component carrier frequency range.

In Example 8j, the subject matter of any one of Examples 1j to 7j can optionally include that the third component carrier frequency range and the first component carrier frequency range and/or the second component carrier frequency range are within distinct bands.

In Example 9j, the subject matter of any one of Examples 1j to 8j can optionally include that the first component carrier frequency range and/or the second component carrier frequency range is above 5 GHz.

In Example 10j, the subject matter of any one of Examples 1j to 9j can optionally include that the radiohead circuitry further includes a multiplexer circuit electrically coupled to the first radio frequency front-end circuitry, the second radio frequency front-end circuitry and the third radio frequency front-end circuitry.

In Example 11j, the subject matter of any one of Examples 1j to 10j can optionally include that the radiohead circuitry further includes a first baseband circuit configured to control a first wireless communication (e.g., transmitted and/or received via a multifeed antenna). The first wireless communication is based on the first component carrier frequency range. The radiohead circuitry may further include a second baseband circuit configured to control a second wireless communication (e.g., transmitted and/or received via the multifeed antenna). The second wireless communication is based on the second component carrier frequency range or the third component carrier frequency range.

In Example 12j, the subject matter of any one of Examples 1 j to 11j can optionally include that the first wireless communication and the second wireless communication are in accordance with the same mobile network communication protocol.

In Example 13j, the subject matter of any one of Examples 11j or 12j can optionally include that the second baseband circuit is further configured to control a third wireless communication via the third component carrier frequency range.

In Example 14j, the subject matter of Example 13j can optionally include that the third wireless communication and the first wireless communication are in accordance with the same mobile network communication protocol.

In Example 15j, the subject matter of any one of Examples 11j to 14j can optionally include that the radiohead circuitry further includes a digital input terminal coupled to the first baseband circuit and/or the second baseband circuit (e.g., via the multiplexer circuit).

In Example 16j, the subject matter of Example 15j can optionally include that the one or more processors are configured to supply a first signal to the first baseband circuit and to supply a second signal to the second baseband circuit. The first signal and the second signal are based on the same digital data stream received by the digital input terminal.

In Example 17j, the subject matter of Example 16j can optionally include that the first wireless communication is based on the first signal. The second wireless communication is based on the second signal.

In Example 18j, the subject matter of any one of Examples 15j to 17j can optionally include that the one or more processors are further configured to: generate a digital data stream based on a first signal received from the first baseband circuit and a second signal received from the second baseband circuit; and output the digital data stream via the digital input terminal.

In Example 19j, the subject matter of Example 18j can optionally include that the first signal is based on the first wireless communication; and/or that the second signal is based on the second wireless communication.

In Example 20j, the subject matter of any one of Examples 1 j to 19j can optionally include that the radiohead circuitry implements a first transmission mode and a second transition mode, wherein the non-contiguous carrier aggregation is enabled in the first transmission mode and disabled in the second transmission mode.

Example 21j is a circuitry. The circuitry may include the radiohead circuitry if any of Examples 1 j to 20j; and a multifeed antenna. The multifeed antenna includes a first feed port coupled with the first multifeed antenna terminal. The multifeed antenna includes at least one second feed port coupled with the second multifeed antenna terminal or with the third multifeed antenna terminal.

In Example 22j, the subject matter of Example 21j can optionally include that the circuitry further includes a duplexer circuit selectively coupling the at least one second feed port with the second multifeed antenna terminal or with the third multifeed antenna terminal.

In Example 23j, the subject matter of any one of Examples 21j or 22j can optionally include that the circuitry further includes a bandpass filter circuit coupling the first feed port and with the first multifeed antenna terminal.

In Example 25j, the subject matter of any one of Examples 22j to 24j can optionally include that the circuitry further includes one or more circuit boards. The multifeed antenna and the radiohead circuitry are disposed (e.g. mounted on, formed directly on, at least partially integrated in or over) on and/or in the one or more circuit boards.

In Example 26j, the subject matter of any one of Examples 22j to 25j can optionally include that the antenna includes a patterned conductive, e.g. electrically conductive layer.

Example 27j is a circuitry. The circuitry may include a multifeed antenna including a first feed port and at least one second feed port; a first radio frequency front-end circuitry coupled to the first feed port and configured to transmit and/or receive a second component carrier frequency range via the first feed port; a second radio frequency front-end circuitry coupled to the at least one second feed port and configured to transmit and/or receive a second component carrier frequency range via the at least one second feed port; a third radio frequency front-end circuitry coupled to the at least one second feed port and configured to transmit and/or receive a third component carrier frequency range via the at least one second feed port; and one or more processors configured to implement a carrier aggregation of the first component carrier frequency range and the second component carrier frequency range or the first component carrier frequency range and the third component carrier frequency range.

Example 1k is a radiohead circuitry. The radiohead circuitry may include an antenna terminal to operate an antenna; a radio frequency front-end circuitry coupled to the antenna terminal and configured to transmit and/or receive a signal via the antenna terminal; and one or more processors configured to determine an operation point of the antenna based on the signal received via the antenna terminal.

In Example 2k, the subject matter of Example 1k can optionally include that the radiohead circuitry further includes a control terminal. The one or more processors are further configured to output an impedance control signal based on the operation point of the antenna.

In Example 3k, the subject matter of any one of Examples 1k or 2k can optionally include that the operation point of the antenna circuit represents at least one of the following: a first parameter representing an impedance of the antenna; a second parameter representing the wireless communication.

In Example 4k, the subject matter of any one of Examples 2k or 3k can optionally include that the first parameter includes or is at least one of the following: a voltage standing wave ratio (VSWR) of the antenna; a scattering parameter of the antenna; and/or a transmission performance of the antenna.

In Example 5k, the subject matter of any one of Examples 3k or 4k can optionally include that the second parameter includes or is at least one of the following: a frequency (e.g., component carrier frequency range frequency and/or band frequency) of the wireless communication; a bandwidth of the of the wireless communication; a peer of the wireless communication; a receive (Rx) spectral efficiency; and/or a transmit (Tx) spectral efficiency; a type of the wireless communication.

In Example 6k, the subject matter of Example 5k can optionally include that the type of the wireless communication is a first type including more Rx traffic than Tx traffic or a second type including more Tx traffic than Rx traffic.

In Example 7k, the subject matter of any one of Examples 1k to 6k can optionally include that the radiohead circuitry further includes one or more baseband circuits coupled to the radio frequency front-end circuitry.

In Example 8k, the subject matter of Example 7k can optionally include that the one or more baseband circuits are configured to control a wireless communication send and/or received by the antenna.

In Example 9k, the subject matter of Example 8k can optionally include that the wireless communication is in accordance with a mobile network communication protocol.

In Example 10k, the subject matter of any one of Examples 1k to 9k can optionally include that the radiohead circuitry is configured to implement a specific absorption rate determination (e.g., body proximity determination).

In Example 11k, the subject matter of Example 10k can optionally include that the specific absorption rate determination is based on a return loss of the antenna and/or based on a predefined (e.g., stored) reference return loss of the antenna.

In Example 12k, the subject matter of Example 11k can optionally include that the return loss of the antenna is based on a sensed electrical response of the antenna.

In Example 13k, the subject matter of any one of Examples 11k or 12k can optionally include that the specific absorption rate determination includes a comparison of the sensed return loss of the antenna and the reference return loss of the antenna.

Example 14k is a circuitry. The circuitry may include a radiohead circuitry of any of Examples 1k to 13k, a matching circuit coupled to the antenna terminal; and/or the antenna coupled to the antenna terminal.

In Example 15k, the subject matter of Example 14k can optionally include that the one or more processors are configured to control the matching circuit based on the operation point.

In Example 16k, the subject matter of Example 15k can optionally include that the one or more processors are configured to control the matching circuit based on the operation point by an impedance control signal output via a control terminal of the radiohead circuitry.

In Example 17k, the subject matter of any one of Examples 14k to 16k can optionally include that the control of the matching circuit includes to control an impedance of the matching circuit.

In Example 18k, the subject matter of any one of Examples 14k to 17k can optionally include that the circuitry further includes a circuit board. The matching circuit and the radiohead circuitry are disposed (e.g. mounted on, formed directly on, at least partially integrated in or over) on and/or in the circuit board.

In Example 19k, the subject matter of Example 18k can optionally include that the circuit board includes a monolithic substrate, on and/or in which the matching circuit and the radiohead circuitry are disposed.

In Example 20k, the subject matter of any one of Examples 14k to 19k can optionally include that the circuitry further includes the antenna is coupled to the matching circuit.

In Example 21k, the subject matter of Example 20k can optionally include that the radiohead circuitry is disposed proximate the antenna and/or proximate the matching circuit.

In Example 22k, the subject matter of any one of Examples 14k to 21k can optionally include that the circuitry further includes an electric connection coupling the antenna with the antenna terminal. An impedance of the electric connection is less than an impedance of the antenna.

In Example 23k, the subject matter of Example 22k can optionally include that the electric connection includes the matching circuit.

In Example 24k, the subject matter of any one of Examples 14k to 23k can optionally include that the circuitry further includes an electric conductor coupling the antenna with the antenna terminal. An impedance of the electric conductor is less than an impedance of the antenna.

In Example 25k, the subject matter of Example 24k can optionally include that the electric conductor includes one or more electrical conductive traces.

In Example 26k, the subject matter of any one of Examples 14k to 25k can optionally include that the circuitry further includes a circuit board. The antenna and the radiohead circuitry are disposed (e.g. mounted on, formed directly on, at least partially integrated in or over) on and/or in the circuit board.

In Example 27k, the subject matter of Example 26k can optionally include that the circuit board includes a monolithic substrate, on and/or in which the antenna and the radiohead circuitry are disposed.

In Example 28k, the subject matter of any one of Examples 14k to 27k can optionally include that the antenna includes a patterned conductive, e.g. electrically conductive layer.

In Example 29k, the subject matter of any one of Examples 14k to 28k can optionally include that a distance from the radiohead circuitry to the antenna is less than an extension of the antenna.

In Example 30k, the subject matter of any one of Examples 14k to 29k can optionally include that a distance from the radiohead circuitry to the antenna is less than 30 mm.

In Example 31k, the subject matter of any one of Examples 14k to 30k can optionally include that a distance from the matching network circuit to the antenna is less than a distance from the radiohead to the antenna.

In Example 32k, the subject matter of any one of Examples 14k to 31k can optionally include that the matching network circuit includes a controllable impedance.

Example 33k is a circuitry. The circuitry may include an antenna; a radiohead circuitry configured to control a wireless communication transmitted or received by the antenna; and an electric connection coupling the antenna with the radiohead circuitry. The radiohead circuitry is configured to control an impedance of the electric connection.

Example 1m is a circuitry. The circuitry may include a radio-head circuit; and a specific absorption rate (SAR) sensor circuit configured to implement a specific absorption rate determination of a wireless communication controlled by the radio-head circuit. The radio-head circuit is disposed proximate the SAR sensor circuit.

In Example 2m, the subject matter of Example 1m can optionally include that the circuitry further includes one or more sensing pads electrically coupled with the SAR sensor circuit. The SAR sensor circuit is configured to implement the specific absorption rate determination using the one or more sensing pads.

In Example 3m, the subject matter of Example 2m can optionally include that the SAR sensor circuit is disposed between the radio-head sensor and the one or more sensing pads.

In Example 4m, the subject matter of any one of Examples 2m or 3m can optionally include that a distance from the SAR sensor circuit to the radio-head circuit is less than a distance from a first sensing pad of the one or more sensing pads to a second sensing pad of the one or more sensing pads; and/or a distance from the one or more sensing pads to the radio-head circuit.

In Example 5m, the subject matter of any one of Examples 2m to 4m can optionally include that the circuitry further includes an electric conductor coupling the one or more sensing pads with the SAR sensor circuit. An impedance of the electric conductor is less than an impedance of an antenna used for the wireless communication.

In Example 6m, the subject matter of any one of Examples 1m to 5m can optionally include that the circuitry further includes an antenna coupled with the radio-head.

In Example 7m, the subject matter of Example 6m can optionally include that the one or more sensing pads are disposed adjacent to the antenna.

In Example 8m, the subject matter of Example 7m can optionally include that the antenna is disposed between two sensing pads of the one or more sensing pads.

In Example 9m, the subject matter of any one of Examples 6m to 8m can optionally include that a distance from the SAR sensor circuit to the radio-head circuit is less than an distance from the one or more sensing pads to the antenna.

In Example 10m, the subject matter of any one of Examples 6m to 9m can optionally include that a distance from the SAR sensor circuit to the radio-head circuit is less than a distance from the antenna to the radio-head circuit; and/or a distance from the antenna to the SAR sensor circuit.

In Example 11m, the subject matter of any one of Examples 6m to 10m can optionally include that the wireless communication is transmitted (e.g., sent and/or received) by the antenna.

In Example 12m, the subject matter of any one of Examples 6m to 11 m can optionally include that the antenna is electrically coupled with the SAR sensor circuit.

In Example 13m, the subject matter of Example 12m can optionally include that the SAR sensor circuit is configured to implement the specific absorption rate determination using at least a part of the antenna as sensing pad.

In Example 14m, the subject matter of any one of Examples 6m to 13m can optionally include that the SAR sensor circuit is disposed between the radio-head sensor and the antenna.

In Example 15m, the subject matter of any one of Examples 6m to 14m can optionally include that the circuitry further includes an electric conductor coupling the antenna with the radio-head circuit. An impedance of the electric conductor is less than an impedance of the antenna.

In Example 16m, the subject matter of any one of Examples 6m to 15m can optionally include that a distance from the SAR sensor circuit to the radio-head circuit is less than an extension of the antenna.

In Example 17m, the subject matter of any one of Examples 6m to 16m can optionally include that the specific absorption rate determination is based on sensing a return loss of the antenna and/or based on a predefined (e.g., stored) reference return loss of the antenna.

In Example 18m, the subject matter of any one of Examples 6m to 17m can optionally include that a distance from the radio-head circuit to the antenna is less than an extension of the antenna.

In Example 19m, the subject matter of any one of Examples 6m to 18m can optionally include that a distance from the radio-head circuit to the antenna is less than 30 mm.

In Example 20m, the subject matter of any one of Examples 6m to 19m can optionally include that the antenna includes a patterned conductive, e.g. electrically conductive layer.

In Example 21m, the subject matter of Example 20m can optionally include that the electric conductor includes one or more electrical conductive traces.

In Example 22m, the subject matter of any one of Examples 1m to 21m can optionally include that the circuitry further includes a circuit board. The radio-head circuit and the SAR sensor circuit are disposed on and/or in the circuit board.

In Example 23m, the subject matter of Example 22m can optionally include that an antenna used for the wireless communication is disposed on and/or in the circuit board.

In Example 24m, the subject matter of any one of Examples 22m or 23m can optionally include that at least one sensing pad used for the specific absorption rate determination is disposed on and/or in the circuit board.

In Example 25m, the subject matter of any one of Examples 22m to 24m can optionally include that the circuit board includes a monolithic substrate, on and/or in which the radio-head circuit and the SAR sensor circuit are disposed.

In Example 26m, the subject matter of Example 25m can optionally include that an antenna used for the wireless communication is disposed on and/or in the substrate.

In Example 27m, the subject matter of any one of Examples 25m or 26m can optionally include that at least one sensing pad used for the specific absorption rate determination is disposed on and/or in the substrate.

In Example 28m, the subject matter of any one of Examples 1m to 27m can optionally include that a distance from the SAR sensor circuit to the radio-head circuit is less than 30 mm.

In Example 29m, the subject matter of any one of Examples 1 m to 28m can optionally include that the circuitry further includes a power controller configured to control a power of the wireless communication (e.g., sent and/or received by the antenna) based on a result of the specific absorption rate determination.

In Example 30m, the subject matter of Example 29m can optionally include that the wireless communication is in accordance with a mobile network communication protocol.

Example 31m is a circuitry. The circuitry may include a radio-head circuit including a radio frequency front end circuit configured to operate an antenna based on a control signal; the radio frequency front end circuit including an antenna terminal and configured to transmit or receive an antenna signal to or from the antenna via the antenna terminal; and a specific absorption rate (SAR) sensor circuit including a sensing terminal. The SAR sensor circuit is configured to sense a specific absorption rate and to provide a sensing signal at the sensing terminal based on the specific absorption rate. The circuitry may further include a circuit board. The radio-head circuit and the SAR sensor circuit are disposed on and/or in the circuit board. The circuitry may further include one or more processors coupled to the sensing terminal and configured to: receive the sensor signal; determine a human proximity based on the sensor signal; generate the control signal based on the human proximity; and output the control signal to the radio-head circuit.

Example 1n is a circuitry. The circuitry may include a radio-head circuit configured to exchange electrical power with an antenna to control a wireless communication transmitted by an antenna and a matching network circuit configured to influence the exchange of electrical power. The radio-head circuit is disposed proximate the antenna tuner circuit.

In Example 2n, the subject matter of Example 1n can optionally include that the circuitry further includes the antenna coupled with the radio-head.

In Example 3n, the subject matter of Example 2n can optionally include that the radio-head is configured to control a wireless communication by the signal. The wireless communication is transmitted (e.g., sent and/or received) by the antenna.

In Example 4n, the subject matter of any one of Examples 2n or 3n can optionally include that the antenna is electrically coupled with the matching network circuit.

In Example 5n, the subject matter of any one of Examples 2n to 4n can optionally include that the matching network circuit is disposed between the radio-head sensor and the antenna.

In Example 6n, the subject matter of any one of Examples 2n to 5n can optionally include that a distance from the matching network circuit to the radio-head circuit is less than an extension of the antenna.

In Example 7n, the subject matter of any one of Examples 2n to 6n can optionally include that a distance from the matching network circuit and/or from the radio-head circuit to the antenna is less than an extension of the antenna.

In Example 8n, the subject matter of any one of Examples 2n to 7n can optionally include that a distance from the matching network circuit and/or from the radio-head circuit to the antenna is less than 30 mm.

In Example 9n, the subject matter of any one of Examples 2n to 8n can optionally include that the circuitry further includes an electric conductor coupling the antenna with the radio-head circuit. An impedance of the electric conductor is less than an impedance of the antenna.

In Example 10n, the subject matter of Example 9n can optionally include that the electric conductor is coupled to the matching network circuit.

In Example 11n, the subject matter of any one of Examples 9n or 10n can optionally include that the electric conductor includes one or more electrical conductive traces.

In Example 12n, the subject matter of any one of Examples 9n to 11n can optionally include that the antenna includes a patterned conductive, e.g. electrically conductive layer.

In Example 13n, the subject matter of any one of Examples 1n to 12n can optionally include that the matching network circuit includes an impedance, which is changed by controlling the matching network circuit.

In Example 14n, the subject matter of Example 13n can optionally include that the impedance influences the exchange of electrical power.

In Example 15n, the subject matter of any one of Examples 1n to 14n can optionally include that the circuitry further includes a circuit board. The radio-head circuit and the matching network circuit are disposed on and/or in the circuit board.

In Example 16n, the subject matter of Example 15n can optionally include that the antenna is disposed on and/or in the circuit board.

In Example 17n, the subject matter of any one of Examples 15n or 16n can optionally include that a specific absorption rate (SAR) sensor circuit is disposed on and/or in the circuit board. The SAR sensor circuit is configured to implement a specific absorption rate determination of a wireless communication controlled by the radio-head circuit.

In Example 18n, the subject matter of any one of Examples 15n to 17n can optionally include that the circuit board includes a monolithic substrate, on and/or in which the radio-head circuit and the SAR sensor circuit are disposed.

In Example 19n, the subject matter of Example 18n can optionally include that the antenna is disposed on and/or in the substrate.

In Example 20n, the subject matter of any one of Examples 18n or 19n can optionally include that a specific absorption rate (SAR) sensor circuit is disposed on and/or in the substrate. The SAR sensor circuit is configured to implement a specific absorption rate determination of a wireless communication controlled by the radio-head circuit.

In Example 21n, the subject matter of any one of Examples 1n to 20n can optionally include that a distance from the matching network circuit to the radio-head circuit is less than 30 mm.

In Example 22n, the subject matter of any one of Examples 1n to 21n can optionally include that the radio-head circuit includes a matching network controller configured to control the matching network circuit.

In Example 23n, the subject matter of Example 22n can optionally include that the matching network controller is configured to control the matching network circuit based on at least one of the following represented by the signal: an electrical response of the antenna; and/or a wireless communication transmitted (e.g., sent and/or received) by the antenna based on the signal.

In Example 24n, the subject matter of Example 23n can optionally include that the electrical response represents at least one of the following: a voltage standing wave ratio of the antenna; a scattering parameter of the antenna; and/or a transmission performance of the antenna.

In Example 25n, the subject matter of any one of Examples 22n to 24n can optionally include that the matching network controller is further configured to control the matching network circuit based on at least one property of the following properties represented by the signal: a frequency (e.g., component carrier frequency range frequency and/or band frequency) of the wireless communication; a bandwidth of the of the wireless communication; and/or a peer of the wireless communication.

In Example 26n, the subject matter of any one of Examples 22n to 25n can optionally include that the matching network controller is configured to control the matching network circuit to change (e.g., increase) at least one of: a Rx spectral efficiency and/or a Tx spectral efficiency.

In Example 27n, the subject matter of Example 26n can optionally include that the matching network controller is configured to control the matching network circuit to change (e.g., increase) the Rx spectral efficiency and/or a Tx spectral efficiency as a function of a type of the wireless communication.

In Example 28n, the subject matter of Example 27n can optionally include that the type of the wireless communication is a first type including more Rx traffic than Tx traffic or a second type including more Tx traffic than Rx traffic.

In Example 29n, the subject matter of any one of Examples 1n to 28n can optionally include that the wireless communication is in accordance with a mobile network communication protocol.

Example 30n is a circuitry. The circuitry may include a radio-head circuit including a radio frequency front end circuit configured to operate an antenna. The radio frequency front end circuit includes an antenna terminal and is configured to transmit or receive an antenna signal to or from the antenna via the antenna terminal. The circuitry may further include a matching network circuit including an impedance coupled to the antenna terminal. The matching network circuit is configured to change the impedance based on a control signal. The circuitry may further include a circuit board. The radio-head circuit and the matching network are disposed on and/or in the circuit board. The circuitry may further include one or more processors coupled to the matching network and configured to: determine an operation point of the antenna based on the antenna signal; generate the control signal based on the operation point; and output the control signal to the matching network circuit.

Example 1o is a beamforming device. The beamforming device may include a substrate, a plurality of antennas, arranged on the substrate along a common plane, and a radiofrequency integrated circuit, mounted on the substrate at a side opposite to the plurality of antennas and electrically conductively connected to the plurality of antennas. The radiofrequency integrated circuit includes a baseband circuit, configured to transmit a wireless signal via the plurality of antennas according to a predefined beamforming parameter.

In Example 2o, the subject matter of Example 1o can optionally include that the predefined beamforming parameter is a parameter to control a beamforming pattern of the wireless signal along an azimuthal plane.

In Example 3o, the subject matter of any one of Examples 1o or 2o can optionally include that the plurality of antennas are flush-mount antennas.

In Example 4o, the subject matter of any one of Examples 1o to 3o can optionally include that the plurality of antennas are arranged on the substrate in a circular pattern.

In Example 5o, the subject matter of any one of Examples 1o to 3o can optionally include that the plurality of antennas are arranged on the substrate in a grid pattern.

In Example 6o, the subject matter of any one of Examples 1o to 5o can optionally include that the radiofrequency integrated circuit further includes a memory, on which is stored a plurality of beamforming code words, each beamforming code word corresponding to a predefined beamforming parameter. Transmitting the wireless signal via the plurality of antennas according to a predefined beamforming parameter includes transmitting the wireless signal according to one of the plurality of beamforming codewords.

In Example 7o, the subject matter of Example 6o can optionally include that the plurality of beamforming code words are codewords for digital beamforming.

Example 8o is a beamforming device. The beamforming device may include a substrate and an antenna circuitry including a plurality of antennas, arranged on the substrate along a common plane. Each antenna of the plurality of antennas includes a first terminal. The beamforming device may further include a radiofrequency circuitry, mounted on the substrate at a side opposite to the plurality of antennas and including a plurality of second terminals. Each first terminal is electrically connected to a second terminal of the plurality of second terminals. The radiofrequency integrated circuit may further include a baseband circuit, configured to transmit a wireless signal via the plurality of antennas according to a predefined beamforming parameter.

In Example 9o, the subject matter of Example 8o can optionally include that the predefined beamforming parameter is a parameter to control a beamforming pattern of the wireless signal along an azimuthal plane.

In Example 10o, the subject matter of any one of Examples 8o or 9o can optionally include that the plurality of antennas are flush-mount antennas.

In Example 11o, the subject matter of any one of Examples 8o to 10o can optionally include that the plurality of antennas are arranged on the substrate in a circular pattern.

In Example 12o, the subject matter of any one of Examples 8o to 10o can optionally include that the plurality of antennas are arranged on the substrate in a grid pattern.

In Example 13o, the subject matter of any one of Examples 8o to 12o can optionally include that the radiofrequency circuitry further includes a memory, on which is stored a plurality of beamforming code words, each beamforming code word corresponding to a predefined beamforming parameter. Transmitting the wireless signal via the plurality of antennas according to a predefined beamforming parameter includes transmitting the wireless signal according to one of the plurality of beamforming codewords.

In Example 14o, the subject matter of Example 13o can optionally include that the plurality of beamforming code words are codewords for digital beamforming.

In Example 15o, the subject matter of any one of Examples 8o to 14o can optionally include that the radiofrequency circuitry is an integrated circuit.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

The term "wireless communication device", as used herein, includes, for example, a device capable of wireless communication, a communication device capable of wireless communication, a communication station capable of wireless communication, a portable or non-portable device capable of wireless communication, or the like. In some aspects, a wireless device may be or may include a peripheral that is integrated with a computer, or a peripheral that is attached to a computer.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

The term "circuitry" as used herein, may refer to, be part of, or include hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor" or "processor circuitry" as used herein may refer to, be part of, or include circuitry capable of sequentially and automatically carrying out a sequence of arithmetic or logical operations, or recording, storing, and/or transferring digital data. The term "processor" or "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface" as used herein may refer to, be part of, or include circuitry that enables the exchange of information between two or more components or devices. The term "interface circuitry" may refer to one or more hardware interfaces, for example, buses, I/O interfaces, peripheral component interfaces, network interface cards, and/or the like.

The term "logic" as used herein may refer to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

The terms "coupled," "communicatively coupled," along with derivatives thereof as used herein, may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "antenna" as used herein may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

The term "channel" as used herein may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A radio frequency circuit, comprising:
   a layer in a plane, wherein the layer comprises a center region that is coplanar with an edge region that at least partially surrounds the center region, wherein the center region and the edge region are coplanar with one another in the plane, wherein the layer further comprises:
   a radio frequency front-end to antenna (RF FE-to-Ant) connector, the RF FE-to-Ant connector comprising a conductor track structure and a layer connection structure coupled to the conductor track structure; and
   radio frequency front-end circuitry monolithically integrated in the layer, wherein the layer connection structure comprises at least one of a solderable structure, a weldable structure, or an adherable structure, wherein the layer connection structure is configured to form at least one radio frequency signal interface with an antenna circuit connection structure of a layer-external antenna circuit;

wherein the layer connection structure is disposed in the edge region of the layer, wherein the layer and the layer-external antenna circuit are arranged coplanar with one another, wherein the layer connection structure and the antenna circuit connection structure are configured to mate with one another in the plane to form the at least one radio frequency signal interface.

2. The radio frequency circuit of claim 1,
wherein the layer connection structure comprises a solder bump or conductive adhesive.

3. The radio frequency circuit of claim 1,
wherein the layer connection structure comprises at least a first port configured to be coupled to a first port of the antenna circuit to form a first radio frequency signal interface and a second port configured to be coupled to a second port of the antenna circuit to form a second radio frequency signal interface.

4. The radio frequency circuit of claim 1,
wherein the layer further comprises a radio frequency integrated circuit circuitry,
wherein the radio frequency front-end circuitry and the radio frequency integrated circuit circuitry are coupled to the conductor track structure.

5. The radio frequency circuit of claim 4,
wherein at least one of the radio frequency integrated circuit circuitry or the radio frequency front-end circuitry is coupled to the layer via a solder structure.

6. The radio frequency circuit of claim 4, further comprising:
a further layer connection structure on the layer and coupled to the radio frequency integrated circuit circuitry, the further layer connection structure comprising at least one of a solderable structure, a weldable structure, or an adherable structure,
wherein the further layer connection structure is configured to form at least one radio frequency signal interface with a cable of a layer-external digital interface.

7. The radio frequency circuit of claim 6,
wherein the further layer connection structure may be of the same kind as the layer connection structure.

8. A radio frequency circuit, comprising:
a layer in a plane comprising a radio frequency front-end to antenna (RF FE-to-Ant) connector, the RF FE-to-Ant connector comprising a conductor track structure along a plane of the layer; and
a first layer connection structure coupled to the conductor track structure in the plane, wherein the first layer connection structure comprises at least one of a solderable structure, a weldable structure, or an adherable structure, wherein the first layer connection structure is configured to form at least one radio frequency signal interface with an antenna circuit connection structure of a layer-external antenna circuit;
wherein the layer further comprises radio frequency front-end circuitry monolithically integrated in the layer and a second layer connection structure coupled to the radio frequency front-end circuitry; and
wherein the second layer connection structure comprises at least one of a solderable structure, a weldable structure, or an adherable structure, and the second layer connection structure is configured to form at least one radio frequency signal interface with a cable of a layer-external digital interface, wherein the first layer connection structure is disposed in the plane at an edge region of the layer, wherein the layer and the layer-external antenna circuit are arranged coplanar with one another, wherein the first layer connection structure is configured to mate in the plane with the antenna circuit connection structure to form the at least one radio frequency signal interface.

9. The radio frequency circuit of claim 8,
wherein the layer comprises a center region and a first edge region and a second edge region, the first and second region at least partially surrounding the center region;
wherein the first layer connection structure is disposed in the first edge region; and
wherein the second layer connection structure is disposed in the second edge region.

10. The radio frequency circuit of claim 8,
wherein the second layer connection structure is of the same kind as the first layer connection structure.

11. The radio frequency circuit of claim 8,
wherein at least one of the first or the second layer connection structures comprises a solder bump or conductive adhesive.

12. The radio frequency circuit of claim 8,
wherein the first layer connection structure comprises at least a first port configured to be coupled to a first port of the antenna circuit to form a first radio frequency signal interface and a second port configured to be coupled to a second port of the antenna circuit to form a second radio frequency signal interface.

13. The radio frequency circuit of claim 8,
wherein the layer further comprises a radio frequency integrated circuit circuitry,
wherein the radio frequency front-end circuitry and the radio frequency integrated circuit circuitry may be coupled to the conductor track structure.

14. The radio frequency circuit of claim 13,
wherein the radio frequency integrated circuit circuitry is coupled to the layer via a solder structure.

15. The radio frequency circuit of claim 13,
wherein the radio frequency front-end circuitry is coupled to the layer via a solder structure.

16. The radio frequency circuit of claim 8,
wherein the layer is a semiconductor layer.

17. An antenna circuit, comprising:
a layer in a plane, wherein the layer comprises a center region and an edge region that at least partially surrounds the center region, wherein the center region and the edge region are coplanar with one another in the plane, wherein the layer further comprises an antenna and an antenna to RF front-end (Ant-to-RF FE) connector coupled to the antenna,
wherein the Ant-to-RF FE connector comprises a layer connection structure that is at least one of a solderable structure, a weldable structure, or an adherable structure, wherein the layer connection structure is configured to form at least one radio frequency signal interface with a radio frequency circuit connection structure of a layer-external radio frequency circuit;
wherein the connection structure is disposed in the edge region, wherein the layer and the layer-external radio frequency circuit are arranged coplanar with one another, wherein the layer connection structure and the radio frequency circuit connection structure are configured to mate with one another in the plane to form the at least one radio frequency signal interface.

18. The antenna circuit of claim 17, wherein the antenna is monolithically integrated in the layer.

19. The antenna circuit of claim 17, wherein the layer connection structure comprises a solder bump or conductive adhesive.

20. The antenna circuit of claim 17, wherein the layer connection structure comprises at least a first port configured to be coupled to a first port of the radio frequency circuit to form a first radio frequency signal interface and a second port configured to be coupled to a second port of the radio frequency circuit.

* * * * *